United States Patent
Henrichs

(10) Patent No.: US 6,249,824 B1
(45) Date of Patent: Jun. 19, 2001

(54) MAGNETIC DATA STORAGE FIXED HARD DISK DRIVE USING STATIONARY MICROHEAD ARRAY CHIPS IN PLACE OF FLYING-HEADS AND ROTARY VOICE-COIL ACTUATORS

(76) Inventor: Joseph Reid Henrichs, 641 NE. Swann Cir., Lee's Summit, MO (US) 64086-8464

( * ) Notice: Subject to any disclaimer, the term of this patent is extended or adjusted under 35 U.S.C. 154(b) by 0 days.

(21) Appl. No.: 09/210,466

(22) Filed: Dec. 12, 1998

(51) Int. Cl.[7] ................................................ G06F 13/00
(52) U.S. Cl. .............................. 710/8; 360/97.01
(58) Field of Search ........................ 360/97.01, 121, 360/244, 246.6; 710/8, 62–74

(56) References Cited

U.S. PATENT DOCUMENTS

| | | | |
|---|---|---|---|
| 4,439,793 | * 3/1984 | Nater | 360/121 |
| 5,086,362 | * 2/1992 | Maurice | 360/121 |
| 5,227,938 | * 7/1993 | Colineau et al. | 360/114 |
| 5,293,282 | * 3/1994 | Squires et al. | 360/77.08 |
| 5,325,342 | * 6/1994 | Vo-Dinh | 369/13 |
| 5,606,474 | * 2/1997 | Ketchersid, III | 360/98.01 |
| 5,909,150 | * 6/1999 | Kostelnik et al. | 331/34 |
| 5,983,485 | * 11/1999 | Misso | 29/603.03 |
| 6,078,471 | * 6/2000 | Fiske | 360/104 |
| 6,115,215 | * 9/2000 | Adams et al. | 360/106 |

* cited by examiner

Primary Examiner—Christopher B. Shin

(57) ABSTRACT

A magnetic data storage fixed hard disk drive using stationary Microhead Array Chips in place of conventional Flying-Heads and Rotary Voice-Coil Actuators or other Servo-Tracking mechanisms. Every Microhead Array Chip has a minimum of one thousand or maximum of four billion individual and addressable microhead read and write data-transducers built into it. The hard disk drive unit assembly that uses the Microhead Array Chip approach will have within its assembly as few as two or as many as twenty-eight installed Microhead Array Chips. The Microhead Array Chip hard disk drive unit assemblies will have at least one storage disk-platter with two disk-platter data-surfaces containing a multiplicity of concentric data-tracks that rotates at a substantially constant angular velocity. While Microhead Array Chips are made stationary by specially designed circuit boards, that positions a Microhead Array Chip over each of two data-surfaces of every disk-platter within the hard disk drive assembly. The total number of microheads within a stationary positioned Microhead Array Chip's Microhead Array is what determines the total number of available tracks on and across a data-platter's data-surface (i.e., 65,000 microheads would equal 65,000 cylinder/tracks).

20 Claims, 104 Drawing Sheets

FIG. —4

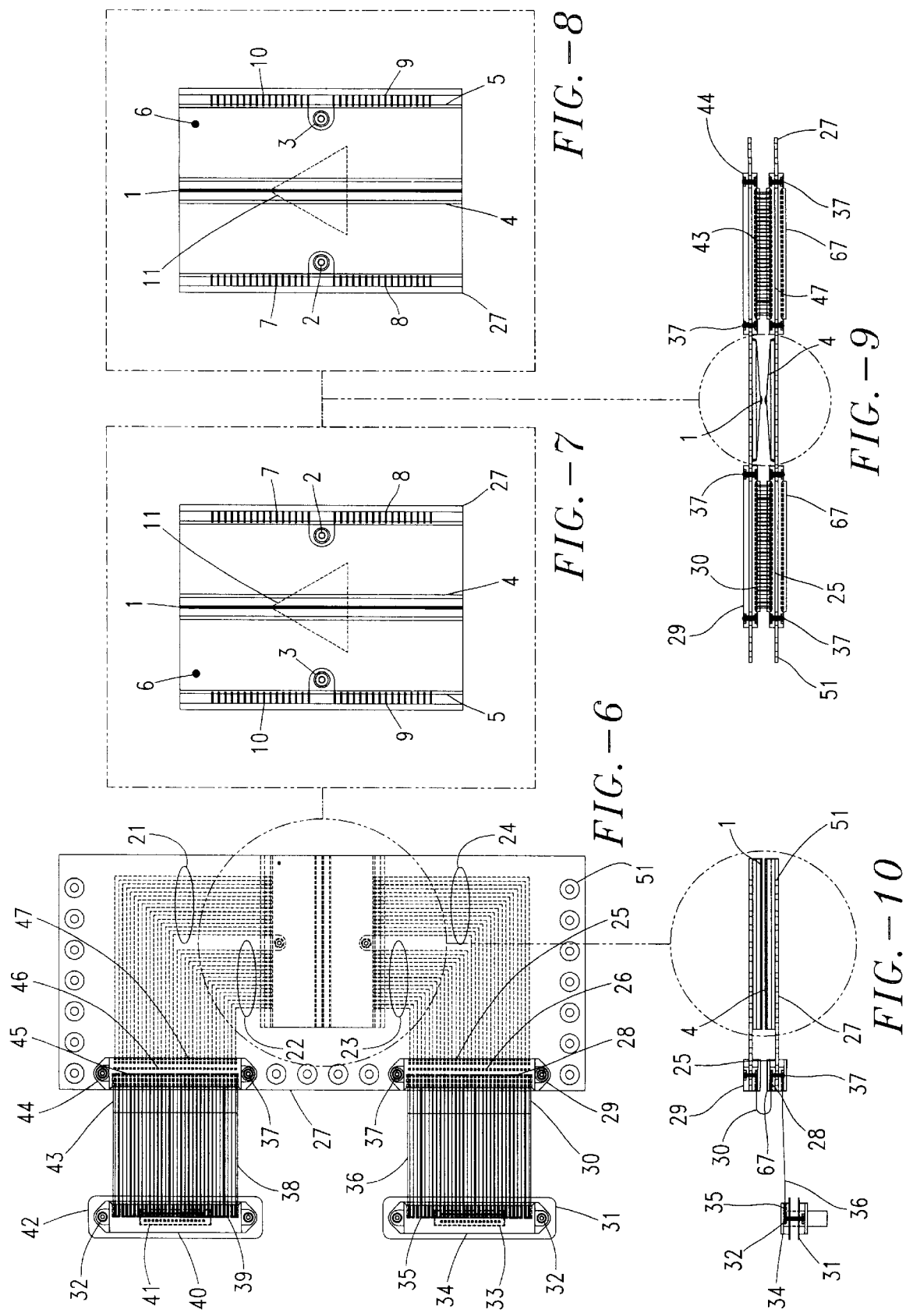

FIG.-15

◄── Front End Of Disk Drive

| Left | Right |
|---|---|
| 64 | 64 Dout |
| 63 | 63 Din |
| 62 | 62 FUT |
| 61 | 61 FUT |
| 60 | 60 FUT |
| 59 | 59 FUT |
| 58 | 58 FUT |
| 57 | 57 FUT |
| 56 | 56 -CS7 |
| 55 | 55 -CS6 |
| 54 | 54 -CS5 |
| 53 | 53 -CS4 |
| 52 | 52 -CS3 |
| 51 | 51 -CS2 |
| 50 | 50 -CS1 |
| 49 | 49 -CS0 |
| 48 | 48 FUT |
| 47 | 47 FUT |
| 46 | 46 FUT |
| 45 | 45 FUT |
| 44 | 44 FUT |
| 43 | 43 FUT |
| 42 | 42 FUT |
| 41 | 41 FUT |
| 40 | 40 -DTACK |
| 39 | 39 -ADACK |
| 38 | 38 RD |
| 37 | 37 -AS |
| 36 | 36 CLK |
| 35 | 35 R/-W |
| 34 | 34 +5V |
| 33 | 33 GND |

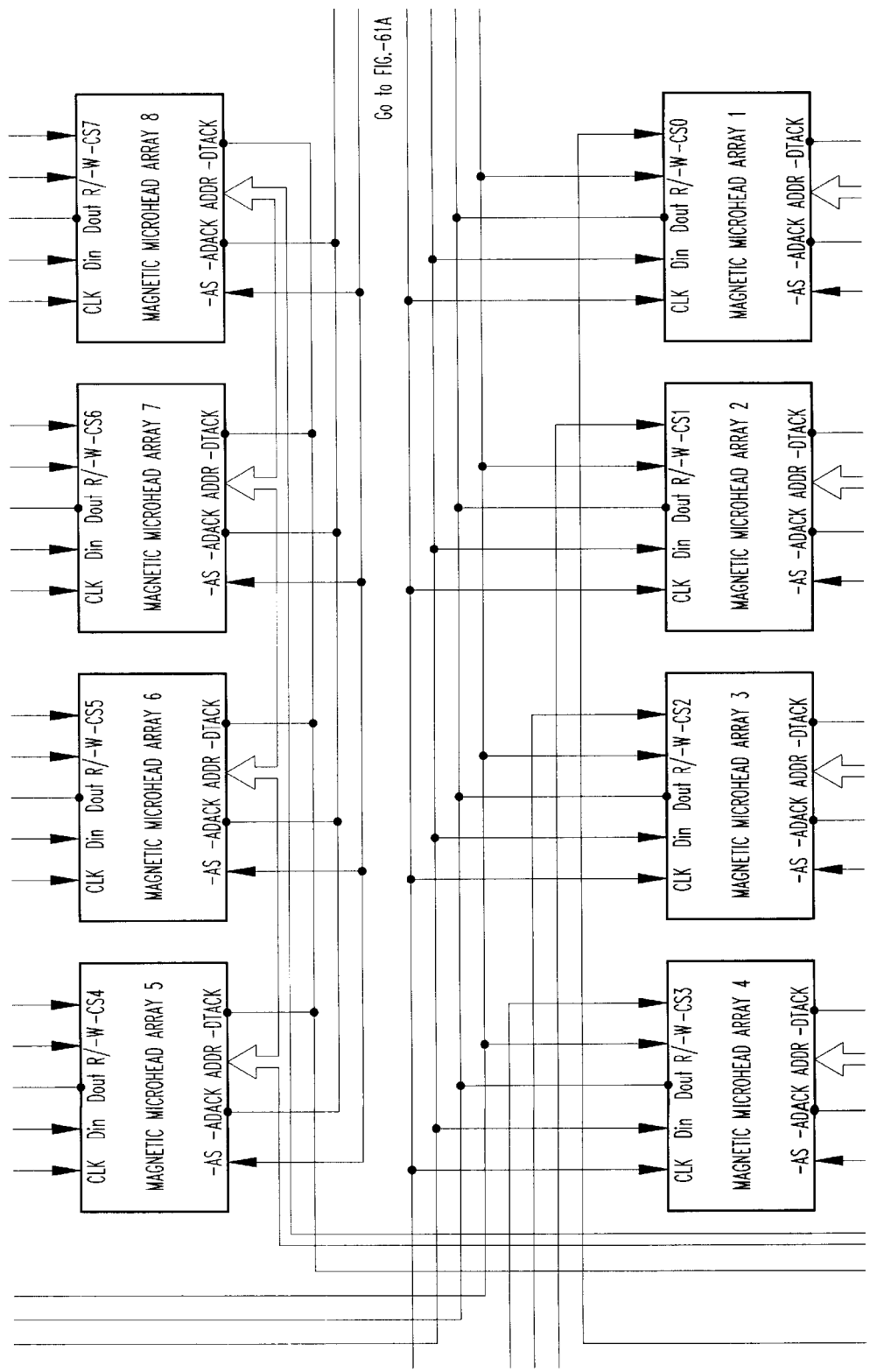

FIG.−64B
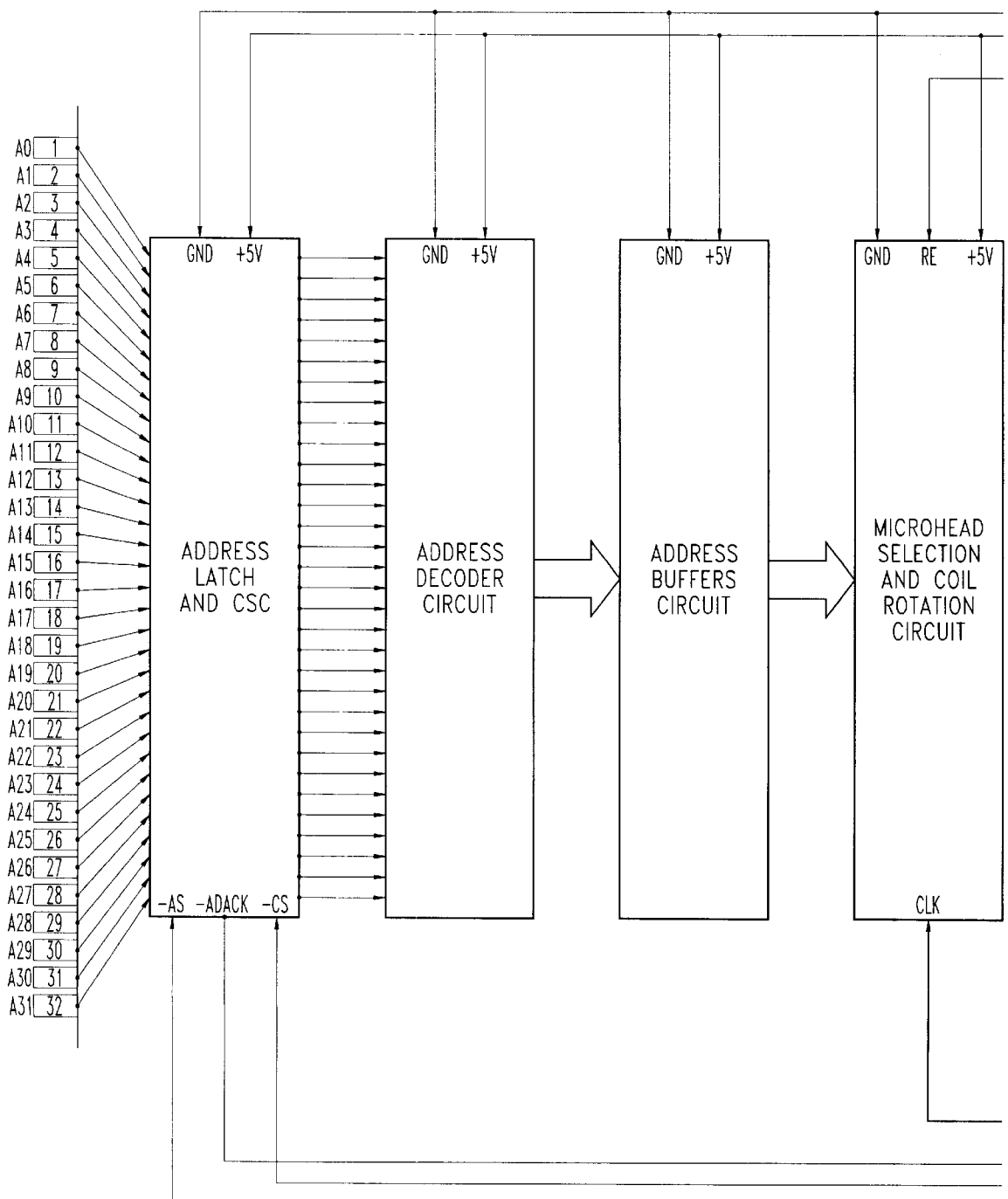

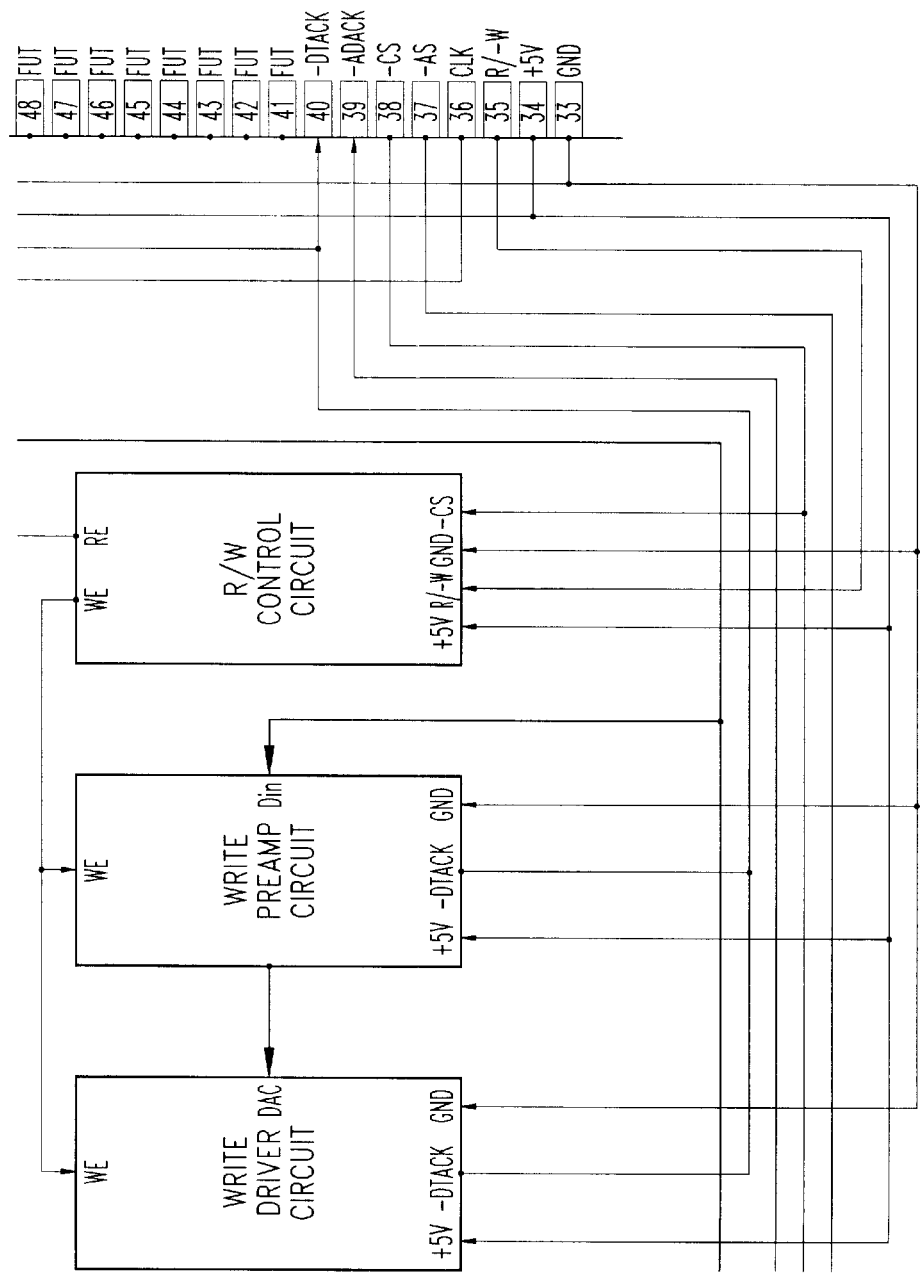

FIG.-66
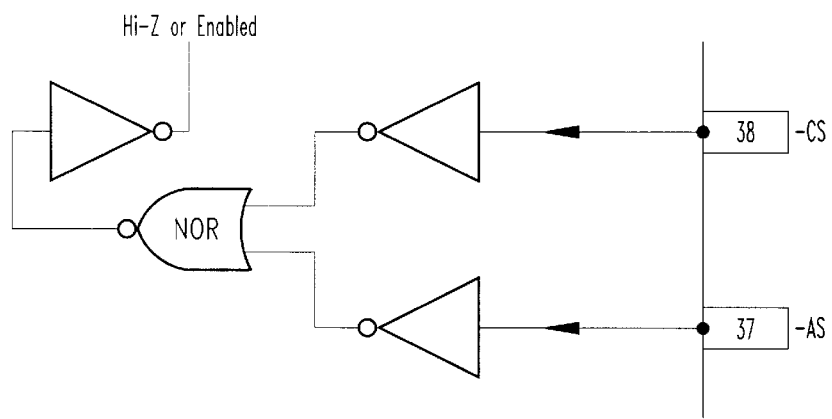
FIG.-67
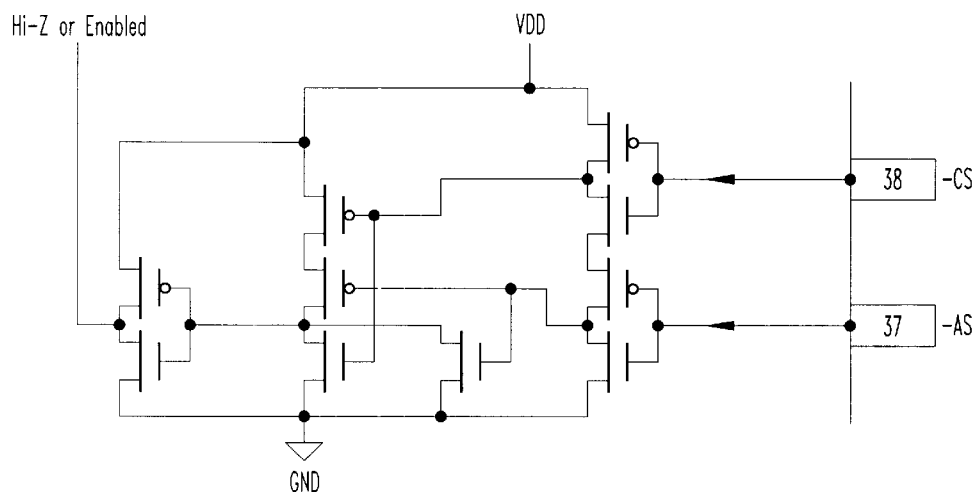
FIG.-69
| Conversions |
|---|
| Hi-Z=+0.9V/+2.3V |
| VDD=+5V=True |
| GND=0V=False |
FIG.-68
TRUTH TABLE
| Inputs | | Outputs |
|---|---|---|
| 37 | 38 | Hi-Z or Enabled |
| True | True | Hi-Z |
| True | False | Hi-Z |
| False | True | Hi-Z |
| False | False | Enabled |

FIG.-94
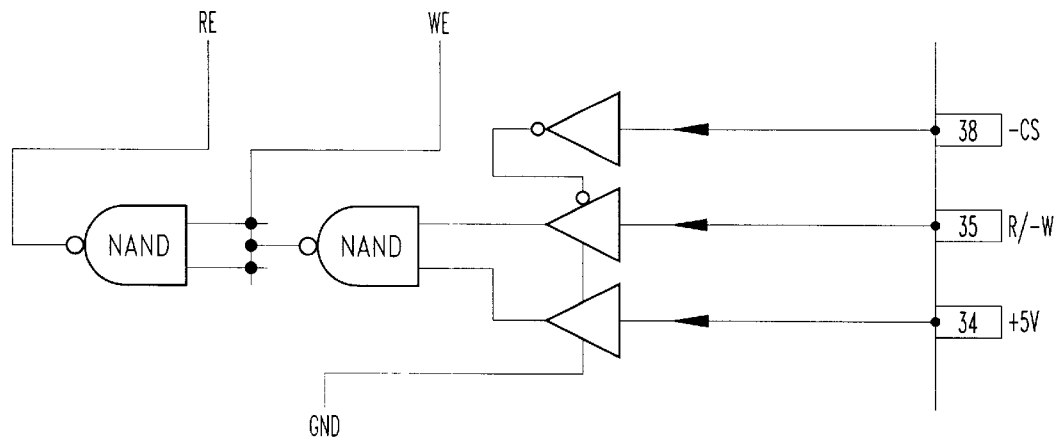
FIG.-95
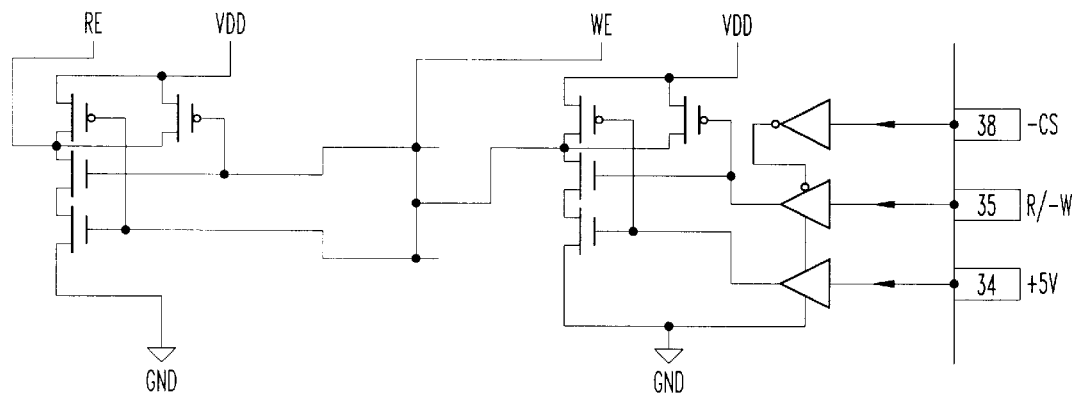
FIG.-97
| Conversions |
|---|
| Hi-Z=+0.9V/+2.3V |
| VDD=+5V=True |
| GND=0V=False |
FIG.-96
TRUTH TABLE
| Inputs | | | Outputs | |
|---|---|---|---|---|
| 34 | 35 | 38 | WE | RE |
| True | True | False | Hi-Z | Enabled |
| True | False | False | Enabled | Hi-Z |

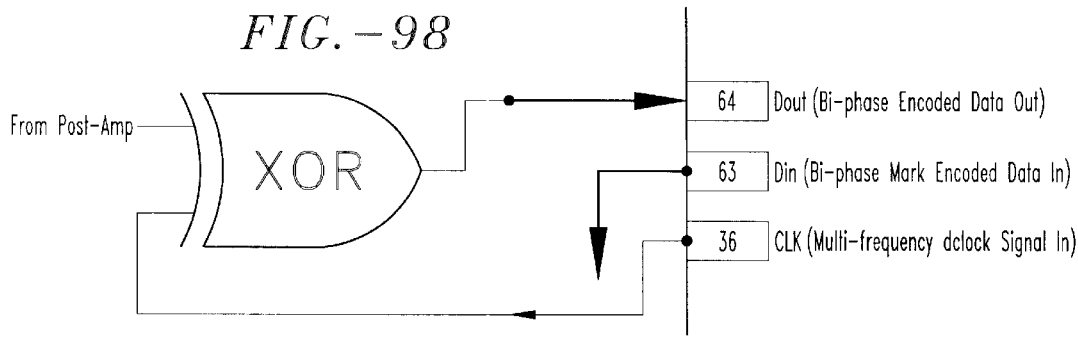
*FIG.–98*
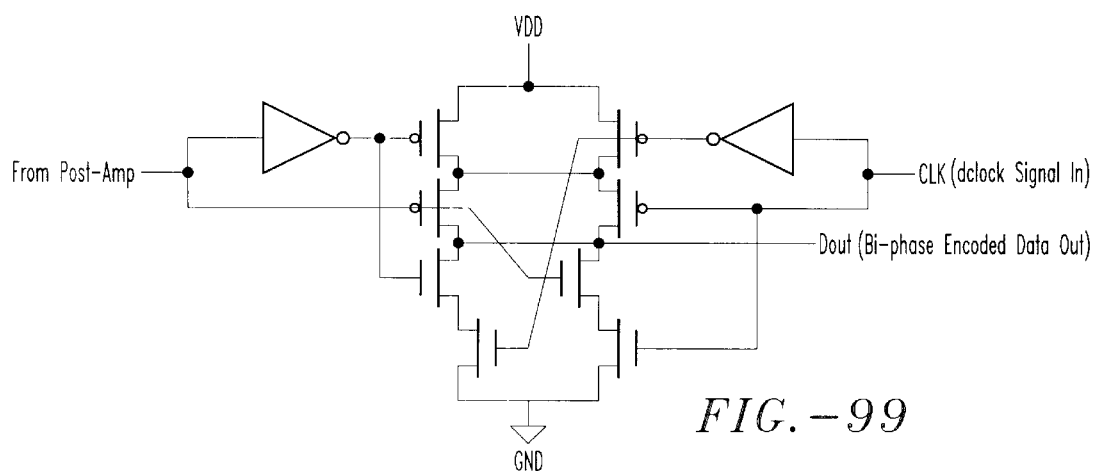
*FIG.–99*
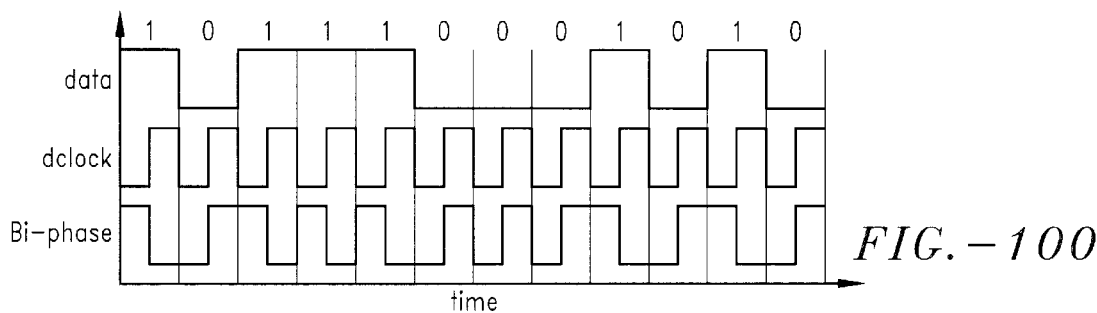
*FIG.–100*
*FIG.–101*
*FIG.–102*
| Conversions |
|---|
| Hi-Z=+0.9V/+2.3V |
| VDD=+5V=True |
| GND=0V=False |
TRUTH TABLE
| Inputs | | Output |
|---|---|---|
| A | B | A ⊕ B |
| False | False | False |
| False | True | True |
| True | False | True |
| True | True | False |

FIG.-109
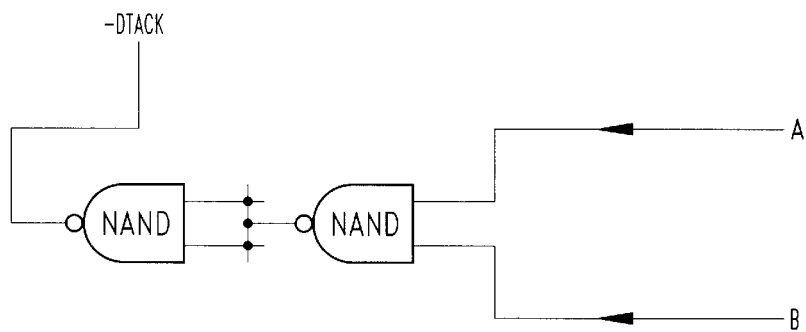
FIG.-110
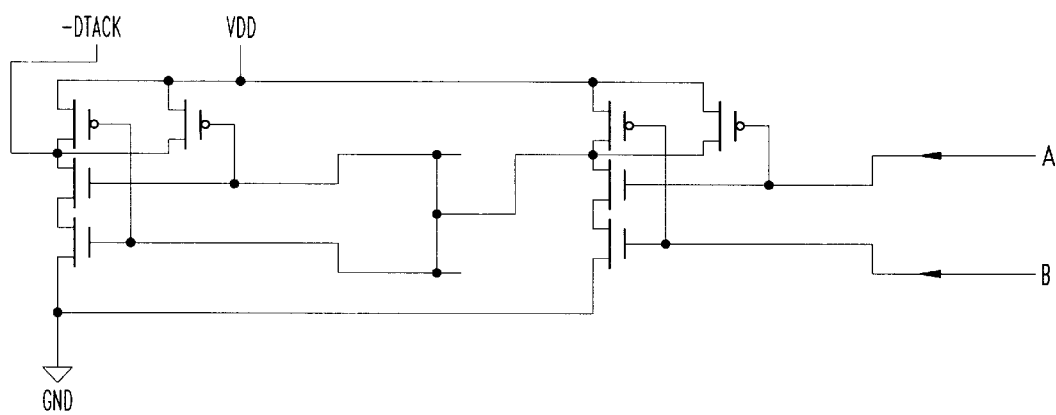
FIG.-112
| Conversions |
|---|
| Hi-Z=+0.9V/+2.3V |
| VDD=+5V=True |
| GND=0V=False |
FIG.-111
TRUTH TABLE
| Inputs | | Outputs |
|---|---|---|
| A | B | -DTACK |
| True | True | Hi-Z |
| False | False | Enabled |

MAGNETIC DATA STORAGE FIXED HARD DISK DRIVE USING STATIONARY MICROHEAD ARRAY CHIPS IN PLACE OF FLYING-HEADS AND ROTARY VOICE-COIL ACTUATORS

CROSS-REFERENCE TO RELATED APPLICATIONS

Not Available

BACKGROUND

1. Field of the Invention

This invention is a magnetic data storage fixed hard disk drive that uses stationary Microhead Array Chips in place of conventional "Flying-Heads", conventional "Rotary Voice-Coil Actuators", or other conventional "Servo-Tracking" mechanisms. Every "Microhead Array Chip" has a minimum of one thousand or a maximum of four billion individual and addressable microhead read and write data-transducers built into it. The hard disk drive unit assemblies using the Microhead Array Chip could have as few as two or as many as twenty-eight Microhead Array Chips installed within each hard disk drive unit assembly. The Microhead Array Chip hard disk drive unit assemblies will have at least one storage disk-platter with two disk-platter data-surfaces containing a multiplicity of concentric data-tracks, which are rotated at a substantially constant angular velocity.

In addition, Microhead Array Chips are installed using specially designed circuit boards. These specially designed circuit boards are used to position a Microhead Array Chip into a stationary fixed location over each one of two disk-platter's data-surfaces. The multitude of Induction Channel Coils and Magnetoresistor microheads located inside the Microhead Array Chips are design to be linearly positioned with a location across the top center length of an entire Microhead Array Chip. While disk-platter, radial-width determines the total-length of the Microhead Array Chips that are installed into Microhead Array Chip hard disk drive unit-assemblies. Therefore, the length of the Microhead Array Chips will vary with different disk drive data-platter sizes and hard disk drive designs.

Furthermore, the total number of microheads within a Microhead Array Chip's "Microhead Array" will determine the total number of available tracks on and across it's hard disk data-platter's data-surface (i.e. 65,000 microheads would equal 65,000 cylinder/tracks). Moreover, a Microhead Array of sixty-five thousand micron sized microheads would measure about "2.358" inches in length, giving a hard disk drive using the Microhead Array Chip's design a 3.5-inch hard disk drive form-factor. All Microhead Array Chips installed into a hard disk drive unit assembly are stationary and positioned approximately one-micron above and oriented perpendicular to the hard disk drive's data-platter data-surfaces. The microheads contained within a Microhead Array would also have a fixed microhead-to-microhead distance of one-micron. Moreover, a distance that is measured from a microhead's Magnetic-Flux Concentration Tip centerline to the microhead's Magnetic-Flux Concentration Tip centerline that is linearly next in line. Every microhead located within a Microhead Array will also have a head-gap distance of "0.5" microns. Furthermore, these measurements are a-typical for every Microhead Array Chip that is installed in a hard disk drive unit assembly. In addition, standard (CMOS) or "Complimentary Metal-Oxide Semiconductor" lithography, etching, and masking techniques are used to manufacture the Microhead Array Chips containing the previously mentioned microhead arrays.

Furthermore, as demonstrated in prior art, conventional Flying-Head assemblies (i.e., sometimes called a Head Stack Assembly) are simultaneously moved to or from various data-track locations during the execution of a host-requested read or write-data disk operation. Conventional technologies will use a Rotary Voice-Coil Actuator or what is sometimes called a "Rotary Positioner" to accomplish these track to track movements. However, during a Microhead Array Chip's host-requested read or write-data disk operation, the mechanical movement of a Microhead Array Chip's microheads to or from a hard disk drive's various data cylinder/track locations is unnecessary. Moreover, because the Microhead Array Chips having a multitude of stationary microheads would already have ready for use one of its stationary microheads already in position at that host-requested data track/cylinder location. Unlike the conventional electromechanical head switching and head-positioning of a Rotary Voice-Coil, the Microhead Array Chips will switch from one-microhead to another electronically.

In addition, a Microhead Array Chip hard disk drive's cylinder/track address-numbers and the Microhead Array Chip hard disk drive's microhead address-numbers are in reality the same address numbers, at least for the purposes of the Microhead Array Chip design they are. For example, when a Microhead Array Chip hard disk drive's "Disk Controller" addresses a single stationary microhead within a selected Microhead Array Chip's Microhead Array, during a host-requested disk operation, the previously mentioned Disk Controller is not only selecting a microhead with a specific address, but is also selecting the cylinder/track that is located directly underneath its fixed position, which also happens to have the same address number.

Moreover, during a host-requested read or write-data disk operation the Disk Controller will receive from the host-system data-address information. This data-locating data-address information communicates to the Disk Controller which stationary Microhead Array Chip is positioned above the particular cylinder/track data-sector area containing host-requested data or host-requested data-space that is empty. The "Printed Circuit Board" (PCB) containing the Disk Controller used by the Microhead Array Chip design forwards this address information to its "Address Controller" for translation. When a selected Microhead Array Chip receives a translated microhead address from the PCB's Address Controller, the selected Microhead Array Chip responds by latching and decoding that address. The decoding of a microhead's address will cause the selection of a single microhead. Consequently, the selected microhead will have the same physical-location and address-number as the host-requested cylinder/track containing data-sectors of requested data or available for recording data-areas. Furthermore, once the microhead positioned over the host-requested data-area is selected the read or write disk operation is executed.

In addition, every Microhead Array Chip installed into a Microhead Array Chip Hard Disk Drive's unit assembly is a fully integrated and self-contained CMOS device. The Microhead Array Chips are designed to be fully-integrated semiconductor devices with the microhead arrays, the addressing latching, the address decoding, the address buffering, the microhead selecting, the microhead switching, the signal amplifying, and the data I/O control circuitry all built into a single CMOS chip-package. Its because the Microhead Array Chips are fully-integrated that the Microhead Array Chips can execute "150" nanosecond "track-to-tack" switching operations (i.e., what is sometimes called in conventional hard disk drive design terminology average-seek-times). In addition, the Microhead Array Chip hard disk drive design will use an "ID-less" sector-tracking system for the sector tracking of sector-locations. Moreover, an ID-less sector-tracking system has several advantages over the conventional "ID After Wedge" or "ID Before Sector" methods of typical sector tracking. For example, the lack of an (ID) "Identifier" field, which is normally written to the data-surfaces of a hard disk drive's data-platters, will regain approximately 4% of the hard disk drive's data-surface real estate for end-user data-storage. Furthermore, because no "Sector-ID" has to be read or corrected during a disk operation, in case of an error, the overall throughput of a Microhead Array Chip based hard disk drive is also increased.

2. Description of Prior Art

Hard disk drives, particularly fixed hard disk drives, are valued because of several factors. Including, the hard disk drive's size (i.e., sometimes referred to as "form factor"), data storage capacity, random access times (i.e., sometimes referred to as "access time" or "average-accesstime"), cost per byte stored, and "Mean Time Before Failure" (MTBF) as it is sometimes called. When data-tracks are arranged as concentric-circles on a circular storage data-surface, its outer-tracks or track circles are longer and, therefore having greater numbers of magnetic-storage cell domains available than on the inner-tracks. And when data-storage disk-platters are rotated at a constant angular velocity the data transducers' head-sliders will fly at a faster and somewhat higher altitude above the disk-platters' outer-tracks, where relative head to disk velocity is greatest. However, when data-storage disks are rotated at a constant angular velocity the data transducers' head-sliders will fly at a slower and somewhat lower altitude above the disk-platters' inner-tracks, where relative head to disk velocity is at a minimum.

Moreover, one known way to increase a hard disk drive's data storage capacity is to divide the data storage surfaces into radial data-zones of concentric tracks, which optimizes the data transfer rate to the smallest track (i.e., innermost track) within each particular radial data-zone (i.e., sometimes called "zoned data recording"). Typically, the number of data-sectors or data-fields within each track may vary from zone-to-zone. Therefore, in order to switch from data-zone to data-zone, it is necessary for the hard disk drive to adapt itself in real-time to a different number of data-sectors and too new data transfer-rates. Other known ways to increase data storage capacity, includes varying disk-rotation in function of the radial position of an optical data-head while maintaining a data transfer-rate as substantially constant, as in "Optical Disk" technologies. As opposed to varying the data transfer-rate with each data-track in function of the radial position of the data transducer heads while maintaining a disk-rotation as substantially constant, as in "Fixed Disk Flying-Head" technologies.

In addition, other issues confronting the designer of a hard disk drive might include head positioning and data-block transfer. Moreover, a flying data head's positioning is typically carried out with a "Head Positioner" or Rotary Voice-Coil Actuator and normally involves "track seeking operations" for moving its Head-Stack from a departure track to a destination track. Moreover, this is done throughout the radial-extent of the storage area of a hard disk drive's data-platters, while using data-track following operations for causing the previously mentioned Head-Stack to follow precisely one particular data-track during data-block reading or writing disk operations. To provide precise Head-Stack positioning, during both data-track seeking and following, some servo information must be provided to the Rotary Voice-Coil Actuators mechanism. This information may be contained on a special data-surface written exclusively with servo-information (i.e., sometimes called a "dedicated servo surface").

In addition, servo information may be externally supplied by an "Optical Encoder" coupled to the "Head-Stack positioning Arm". In addition, servo information may be supplied from servo information interspersed or embedded among the data fields within each data-track. One other approach is provided by the "Open Loop Stepper-Motor" Head-Stack positioning servo. In this approach, the positional stability of the transducer data-head at each selected data-track location is provided by the electromagnetic detents of a hard disk drive's Stepper-Motor. When servo-information is embedded on a data-surface having zoned-data recording, complications may arise in the reliably of providing robust servo head position information. Therefore, there must be sufficient embedded information to provide stability to the "Servo Loop" and to provide position responses during high-speed portions of track-seeking and track-following operations so that velocity or position profiles may be adjusted, based on present head-velocity, or position at the time of the sample.

Typically, if the servo-information is recorded at the same data-rate and within a positional relationship with the data-blocks, as has been conventionally employed, the servo-architecture is normally complex enough, in the sense of having information, to successfully switch data-rates and servo positions. However, if regularly spaced servo-information were radially placed across data-storage surfaces, while splitting some of the data-fields on those surfaces into segments, when data-zones are crossed-over complications could arise when trying to read each "Split Data-Field" as a single data-block. Furthermore, in order to read Split data-fields data-platter rotational-velocity must be carefully monitored and maintained at a predetermined constant angular velocity.

In addition, the previously mentioned data-fields are conventionally managed by a "Data Sequencer". A typical Data Sequencer may include an "Encoder and Decoder" for transforming (NRZ) "Non-Return to Zero" data into a coded data-formats. For example, such as a three-to-two 1,7 (RLL) "Run Length-Limited" code to achieve a compression of data relative to the "Flux-Transition Density" on a data-surface (i.e., 1,7 RLL coding is based on three code-bits or groups for two non-encoded data-bits, but results in a four-to-three overall data compression rate and therefore permits more data to be recorded on a disk-platter's data-surface per the number of "fluxtransitions" that may be contained within data-surface "Magnetic-Storage Domain-Cells"). A Disk Controller's Sequencer conventionally performs the task of decoding "Data-Sector" overhead information in order to locate a desired storage location, and to obtain information relating to the correctness or validity of data read back from that storage location. Typically, implemented as a state machine, a Sequencer conventionally monitors all incoming data-flow to locate a data-ID's "Preamble-Field", a data-ID's "Address Mark", a data-ID's "Sector-Field", a data-ID's "Data Field", and usually a small number of "Error-Correction-Syndrome" bytes appended to the end of the previously mentioned Data-Field.

In addition, the Disk Controller's Sequencer will cause the appropriate action to be taken when each of the fields is located. For example, if a data-block from a Data-Field of a particular track and sector is being sought, the Sequencer compares incoming Sector-Field information with sought after sector information stored in a register. Moreover, when a positive comparison occurs the Disk Controller's Sequencer will cause the bytes read from the Data-Field via a data-transducer head and Read Channel to be sent to a "block buffer memory" location, and the Error-Correction-Code Syndrome remainder-bytes to be checked. If there are no detected errors in the data-bytes as determined by analyzing the (ECC) "Error Correction Code" remainder-bytes, then the data-block is sent from the buffer memory to the host-system computer through a suitable interface, such as the (SCSI) "Small Computer System Interface" or (IDE/ATA-2) "Integrated Drive Electronics/AT Attachment" interface.

Moreover, in conventional hard disk drives, each sector is handled individually in response to specific-input from a supervisory microcontroller. Typically, as a particular sector is being read, the microcontroller would inform the Disk Controller's Sequencer whether to read or not read the next adjacent data-sector, in other words, microcontroller intervention would occur for every data-sector. Moreover, this is done with a programmable "Sector-Counter", which is preset by the previously mentioned microcontroller to a desired sector-count, then the Sequencer would process sectors sequentially until the count in the Sector-Counter was reached. Some hard disk drives do not use or normally include the complication of zoned-data recording and Split Data-Fields. Positioner stability in some hard disk drive designs is provided by an "Optical Encoder" coupled between a rotary head positioner and the drive-base, which foregoes the use of "Embedded Servo-Sectors", as is conventional in some art.

However, while "split-data recording" schemes have been proposed in prior art, recent proposals have appointed the microcontroller with the responsibility of managing each Split Data-Field layout in real-time. This leads to tremendous levels of bus-traffic between the microcontroller and the Disk Controller's Sequencer during reading and writing disk operations. This precludes the microcontroller from performing other very useful tasks, such as "head-positioning servosupervision", error-correction, and command-status exchanges with the host-system computer over a hard disk drive's "interface-bus-structure", to cite a few examples. However, this prior art approach would require a separate data-transference microprocessor, meaning that at least two microprocessors would be required to implement overall hard disk drive architecture.

SUMMARY OF THE INVENTION

In accordance with the present invention a magnetic hard disk drive that uses stationary Microhead Array Chips instead of conventional Flying-Head technologies, like Rotary Voice-Coil Actuators or Rotary Positioners, to execute track seeking operations throughout the radial-extent of the data-platters of a Microhead Array Chip Hard Disk Drive, using an electronically controlled data-track switching operation for causing one microhead located above one particular data-track location to switch off, while another microhead located above a different data-track location is switched on.

OBJECTS AND ADVANTAGES

Accordingly, besides the objects and advantages of the Microhead Array Chip Hard Disk Drive described in my patent above, several objects and advantages of the present invention are:

(a) A general object of the present invention is to provide a fixed disk magnetic data storage device that over- comes several limitations and drawbacks present in the prior art previously disclose;

(b) to provide a magnetic hard disk drive that uses a dedicated head-to-track system. Where each installed Microhead Array Chip could have a minimum of one-thousand or maximum of four-billion stationary, individual, and addressable read and write microhead data-transducers constructed into each Microhead Array Chip's microhead array;

(c) to provide a Microhead Array Chip design that uses exclusively Induction Channel Coil Read and Write Elements;

(d) to provide a Microhead Array Chip design that uses a combination of Magnetoresistor Read Elements and Induction Channel Coil Write Elements;

(e) to provide "average access times", or the amount of time it takes to find requested data by moving the head stack assemblies from one data-track to another data-track, as described in the prior art, for the Microhead Array Chip Hard Disk Drive design, is about "150" nanoseconds in duration. This "average seek time" is about two thousand times faster than any conventional hard disk drive using Flying-Heads, and marks an incredible improvement in the "average seek time" and "full stroke seek time" ratings for magnetic hard disk drive design. Typically, conventional Flying-Head hard disk drives normally have their "average access times" measured in "milliseconds" or "thousandths-of-a-second" and typically have "access seek time" of around 8.5-milliseconds. Furthermore, if the "average seek times" as described above are decreased in any way by a particular hard disk drive design then a marked improvement for that particular hard disk drive design has been demonstrated;

Further objects and advantages are to provide a magnetic hard disk drive which uses one Microhead Array Chip that is dedicated to and positioned above every single data-surface within a Microhead Array Chip Hard Disk Drive's unit assembly. Therefore, the Microhead Array Chips would have their read and write microheads ready to use and already in position over every single data-track location across an entire data-platter's radial-length. Moreover, the switching from one data-track to another data-track occurs electronically inside the Microhead Array Chip itself, unlike the mechanical track-to-track switching used by conventional Rotary Positioned Flying-Head technologies. Consequently, instead of using a "millisecond" or "thousandths-of-a-second" as a unit of measure a Microhead Array Chip Hard Disk Drive must use the much faster "nanosecond" or "billionths-of-a-second" unit of measure to accurately sample its "average seek times" and "full stroke seek times". In other words, the "average access time" ratings of conventional Flying-Head hard disk drives can be seriously outmatched by the Microhead Array Chip design.

Consequently, by using CMOS transmission-gates to execute microhead addressing, microhead selection, and microhead switching within the Microhead Array Chips, new high-speed "average seek time" ratings have been made possible. Typically, CMOS transmission-gates have their operational-speeds measured in nanoseconds (i.e., transmission-gate CMOS inverters switch on average around "10" nanoseconds, per changed state). Therefore, the Microhead Array Chip's "average access times" for its "track to track seeks", plus the time it takes to address a new microhead, which is located over a new cylinder/track location, would be about "150" nanoseconds in duration. This "average seek time" is about two thousand times faster than any conventional hard disk drive using Flying-Heads, and marks an incredible improvement in the "average seek time" and "full stroke seek time" ratings in a hard disk drive design.

Furthermore, by removing head stack rotary voice-coil head positioners the Microhead Array Chip Hard Disk Drive design also improves a drive's useful life, which is normally measured using a MTBF (i.e., sometimes called Mean Time Before Failure) rating. This is because 60% of flying-head hard disk drive failures are caused by rotary-voice-coil mechanical malfunctions or because of flying-head hard disk crashes. Moreover, Flying-Heads by design never actually touch the data-surface of a hard disk drive, but strive to maintain a 1.0 to 2.5-micron distance above the disk surface, on what is normally called the "air bearing". Typically, this air bearing is accomplished through the aerodynamic design of the head sliders, which are typical of conventional Flying Heads. In fact, within a rotary positioner Flying-Head design, Flying-Head distances of "1.0" to "2.5" microns would be difficult to maintain, if not impossible, were it not for the previously mentioned air bearing and the aerodynamic design of head-sliders.

Furthermore, hard disk drive failure often occurs when the head-stack assembly has not been properly positioned into the hard disk drive's innermost disk-platter area (i.e., sometimes called the head parking area). When the Spindle-Motor's power fails and the hard disk drive spins-down the air bearing which keeps the head-sliders aloft and flying will begin to decrease and decay. Consequently, with the loss of this air bearing the head-sliders can no longer maintain lift, and will ultimately crash (i.e., come in contact with) into the hard disk drive's data-platter data-surfaces. This is sometimes called "hard disk crashing" and accounts for about 60% of all hard disk drive failures. There can be many root-causes leading to this kind of hard disk drive failure like EEPROM-BIOS failure, Disk-Controller failure, and Spindle-Motor failure. However, whatever the cause, the end-result is always the same, hard disk crashes and severe data-loss. Consequently, a hard disk drive crash will never occur with the Microhead Array Chip Hard Disk Drive design. Whether a Microhead Array Chip Hard Disk Drive's Spindle-Motor fails causing the drive to power down or there is some kind of system (BIOS) "Basic-In-Out-System" failure. The Microhead Array Chips containing Microhead Arrays, because they are positioned in stationary locations about "1.0" micron above every disk-platter's data-surface, the microheads, during a failure, will never come in contact with disk-platter data-surfaces. In addition, unless a Microhead Array Chip itself has a failure, once it is put into place, the previously mentioned Microhead Array Chip is never moved. Reliance on conventional Flying Heads and head-slider air bearings is therefore non-existent for the Microhead Array Chip hard disk drive design. Consequently, the stationary microhead approach doubles the MTBF rating of hard disk drives using the Microhead Array Chip design, over that of conventional Flying-Head hard disk drives.

In addition, another specific object of the present invention is to provide two Induction Channel Coils per microhead "Yoke Core". The dual-coil high-turn Induction Channel Coil design improves the Induction Channel Coil microhead's ability to read and write "magnetic-flux transitions" to the hard disk drives data-surfaces. However, an increase in Induction Channel Coil windings has an inherent design-flaw, which occurs in all induction coil magnetic-head designs, and that flaw is called "reactance". Consequently, the greater the number of Induction Channel Coils or windings the greater the increase in the strength of "magnetic flux transitions", which grows proportionally with every channel coil turn winding around a microhead's Yoke Core. However, this will also decrease a microhead's ability to respond to the fast current-reversals that are necessary in a "near field" induction coil head design.

Moreover, "reactance distortion" is why conventional high-frequency Flying Heads can use no more than five induction coil winding turn's per Flying-Head Yoke Core, and why Flying Head head-sliders are now being flown above hard disk drive data-surfaces at distances of "1.0" micron or less. Typically, in (AC) "Alternating Current" circuits, inductors and capacitors build up voltages that oppose the directional flow of current, this opposition, is called "reactance". The reactance produced by inductance is proportional to the frequency of the alternating current, whereas the reactance produced by capacitance is inversely proportional to the frequency. However, the poor high-frequency response caused by "reactance distortion" within a continuously alternating current analog signal is circumvented in the present invention.

Unlike, a conventional Flying-Head single induction coil design the Microhead Array within each Microhead Array Chip uses two Induction Channel Coils in place of a single copper wire per microhead Yoke Core, where one Induction Channel Coil is dedicated to one of the microhead Yoke Cores' two magnetic poles. Where each microhead Yoke Core within a Microhead Array will have an "Alpha" Induction Channel Coil, which is dedicated to binary "1" data-bits, and a "Beta" Induction Channel Coil, which is dedicated to binary "0" data-bits. Nevertheless, "reactance distortion" will still occur within these high-turn Induction Channel Coils. However, because each Induction Channel Coil is dedicated to and used only by its particular current direction and logic bit-state, current reversal within either the Alpha or the Beta Induction Channel Coil will never occur. In addition, the coil switching and rotation between a selected microhead's Alpha and Beta Induction Channel Coils replaces the conventional current reversals normally used during write-data to disk transcriptions. Therefore, a high-frequency signal can now be used in high-turn induction coils to impart data to disk-platter data-surfaces without the interference caused by "reactance distortion". Moreover, during a write-data disk operation's recording of an incoming data-stream, the "Rotate Toggle" selection between the two Induction Channel Coils that are located within a Microhead Yoke Core will occur during a single bit's time-period, which is controlled by two "Bi-Phase Mark Encoded Data Stream" signals that are supplied simultaneously by the Disk Controller's Sequencer to all of the Microhead Array Chips installed and connected across a Microhead Array Chip Hard Disk Drive's data-bus.

Moreover, during a read-data disk operation a selected microhead's Alpha and Beta Induction Channel Coils are simultaneously switched on by a logic-high control signal called the (RE) "Read Enable" signal. The (RE) "Read Enable" signal comes from the "R/W Control Circuit", which is located within the selected Microhead Array Chip. The previously mentioned (RE) Read Enable signal, which comes from the R/W Control Circuit will enter a (RE) Read Enable input that is located at the Microhead Array Chip's "Microhead Selection And Coil Rotation Circuit". While in the "Microhead Selection And Coil Rotation Circuit" the (RE) signal will simultaneously enable both coil-switching bus-lines with a logic-high control signal. Consequently, a selected microhead's Alpha and Beta Induction Channel Coils are simultaneously turned-on or Switch-Toggled on during the read-data disk operation. This switching-on or Switch Toggle of a selected rmicrohead's two Induction Channel Coils was chosen for read-data disk operations for two reasons:

(i) Because, the problem of reactance distortion will adversely effect the frequency-response of the microhead's Induction Channel Coils only during a write-data disk operation. Therefore, Rotate-Toggling of a selected microhead's Alpha and Beta Induction Channel Coils during a read-data disk operation is unnecessary, (ii) Furthermore, by simultaneously using the selected microhead's two Induction Channel Coils during a read-data disk operation, the Read Channel's signal strength is greatly increased.

However, during a write-data disk operation a selected microhead's Alpha and Beta Induction Channel Coils are simultaneously switched to the Rotate Toggle mode. Moreover, Rotate-Toggle mode is switched on by a logic-low control signal called the "Read Disable" signal, which comes from the "R/W Control Circuit" that is located within the selected Microhead Array Chip. This Read Disable signal, which comes from the "R/W Control Circuit" will enter the (RE) "Read Enable" input at the Microhead Array Chip's "Microhead Selection And Coil Rotation Circuit". While in the "Microhead Selection And Coil Rotation Circuit" the (RD) "Read Disable" signal will activate the Rotate Toggle feature.

Furthermore, during a write-data disk operation the Disk Controller's Sequencer will send a Bi-Phase Mark Encoded Data Stream signal to all of the Microhead Array Chip's (Din) "Data-In" input-contact pin-number "63". The Bi-Phase Mark Encoded Data Stream is internally routed from the (Din) Data-In input-contact pin-number "63" to two different Microhead Array Chip's circuit areas. The first Bi-Phase Mark Encoded Data Stream signal is routed to the "Write Driver Circuit" of a selected Microhead Array Chip, while the second Bi-Phase Mark Encoded Data Stream signal is routed to the input of the "Coil Switch And Rotate Toggle Flip-Flop Circuit" of the selected Microhead Array Chip's "Microhead Selection And Coil Rotation Circuit". Moreover, the second Bi-Phase Mark Encoded Data Stream signal is re-routed from the Microhead Array Chip's (Din) Data-In input-contact pin-number "63" to the Microhead Array Chip's Microhead Coil Selection And Rotation Circuit's flip-flop input. While in the Coil Switch And Rotate Toggle Flip-Flop Circuit the previously mentioned Bi-Phase Mark Encoded Data Stream signal is split into two overlapping bus-signals. Thereafter, each resulting bus-signal will always have an opposite bit-state on its bus-line for every time-period of the inputted Bi-Phase Mark Encoded Data Stream entering the Coil Switch And Rotate Toggle Flip-Flop Circuit. These overlapping but opposite bus-signals communtate over bus-line "01" and bus-line "02, and are used to Switch Toggle or Rotate Toggle the Microhead Coil Selection And Rotation Circuit's two transmission-gates, which are responsible for a selected microhead's Alpha and Beta Induction Channel Coils switched accessibility to the Read and Write Input circuit.

In addition, another specific object of the present invention is to provide a chip-positioning circuit board design of the Microhead Array Chip. The Microhead Array Chip Hard Disk Drive unit assemblies will have at least one storage disk-platter with two opposed data-surfaces containing a multiplicity of concentric data-tracks with a single Microhead Array Chip located in a stationary position over each of the two disk-platter's data-surfaces. The previously mentioned Microhead Array Chips are stationary and positioned by specially designed circuit boards. These chip-positioning circuit boards are designed to be very rigid, non-flexible, and lightweight. A non-flexible chip-positioning circuit board design is important because a critical distance of one micron must be maintained between the microheads of the Microhead Array Chip and disk-platter data-surfaces. In order to achieve maximum support the previously mentioned chip-positioning circuit boards must not exhibit any flexible surface areas. Consequently, the cores of the chip-positioning circuit boards must be fabricated from a lightweight and rigid material like "Titanium" or from a "Carbon Graphite Composite" material. The outer surface of the chip-positioning circuit boards' inner core will be coated with several layers of insulating fiberglass. Moreover, the previously mentioned fiberglass is used to both contain and insulate the copper circuit-traces, which connect circuit-contacts of surface mounting chip-sockets to the chip positioning circuit boards' "Polymer Flex-Cable Connector" circuit contacts.

In addition, another specific object of the present invention is to provide a "Bi-Phase Data Encoding" scheme (i.e., sometimes called "Bi-Phase-L" or "Manchester NRZ") to resolve the data transfer-rate for any particular data-zone during read-data disk operations. Rather than using conventional "Preamble Fields", which contain predetermined sync-patterns that are read by a Disk Controllers analog (PLL) "Phased-Locked Loop" circuit, which is contained within a Data Sequencer, and used to resolve data-transfer rates, as shown in prior art. The Sequencer of the Microhead Array Chip design, instead, will calculate the optimal data transfer-rate for any particular data-zone needing to be read and send that calculation to the Disk Controller's "Clock Synthesizer", which will generate a clock-synthesized signal at the frequency rate that was previously calculated by the Sequencer. Moreover, the Disk Controller's Clock Synthesizer will send the previously mentioned clock-synthesized signal to a selected Microhead Array Chip that is positioned over the hard drive's disk-platter data-surface containing the data-zone the Sequencer had made data transfer-rate calculations for at the beginning of the read-data disk operation. The Clock Synthesizer's clock-Synthesized signal is input at a selected Microhead Array Chip's input-contact pin-number "36" (CLK) "Clock" input. Moreover, after entering a selected Microhead Array Chip the Clock Synthesizer and the Read Channel's post-amplified (NRZ) "None Return to Zero" data-stream signals are sent to the selected Microhead Array Chip's Read Channel (XOR) "Exclusive OR" circuit input. The previously mentioned XOR circuit will average the two input signals and output a "Bi-Phase Encoded Data Stream" NRZ signal to the (Dout) "Data-Out" output contact pin-number "64" of the selected Microhead Array Chip. This outputted "Bi-Phase Encoded Data Stream" NRZ signal is carried from the (Dout) "Data-Out" through a data-bus flex-cable to the Disk Controller's "Read Data" input, which leads to the Disk Controller's Sequencer. The (DPLL) "Digital Phased-Locked Loop" circuit which is located within the Disk Controller's Sequencer will perform a recovery of the clock signal from the previously mentioned Bi-Phase Encoded Data Stream. The recovered clock signal is then used to resolve the data-transfer rates of any data-zone being read during a read-data disk operation. Moreover, the Sequencer accomplishes a data-signal synchronization between the hard disk drive's Disk Controller and selected Microhead Array Chips by doing an on-the-fly frequency-rate comparison. The previously mentioned frequency-rate comparison is first done between the Bi-Phase Encoded Data Stream's recovered clock signal and the original clock-synthesized signal sent earlier to the Read Channel's XOR circuit at the beginning of the read-data disk operation. This method will recover more of the hard disk drive's overall real estate by eliminating the "data rate preamble sync marks" normally placed on the hard drive disk-platter's data-surfaces, which normally takes up end-user storage space.

Furthermore, data-transfer rates determined by "data rate preamble sync mark" read processes can be affected by any Spindle-Motor fluctuations and rotational speed-variances, causing data-transfer read-errors. By recovering a specific clock-signal from a Read Channel's Bi-Phase Encoded Data Stream output-signal for any particular data-zone being read the Sequencer can easily resolve any data-transfer rates needed for a host requested read-data disk operation. The Bi-Phase Data Encoding scheme will later make it possible for the Sequencer to convert the Bi-Phase Encoded Data Stream into a regular NRZ data-stream signal. Later in the process the previously mentioned regular NRZ data-stream signals created by the Sequencer's DPLL circuit will be converted into double-word data-packets by the Disk Controller's "Buffer Controller" for buffer-to-interface data-transfers. The Bi-Phase Data Encoding scheme of the Read Channel's data-stream output, will also make it possible for the Sequencer's DPLL circuit to quickly, and with a greater amount of accuracy, phase lock-loop with the Bi-Phase Encoded Data Stream signal. In addition, parity bits or having to place an "odd-parity bit" at the end of every eight-bit word, which is used to eliminate the possibility of all eight-bits being high, will not be needed for data-transfer synchronization. The Microhead Array Chip's XOR Bi-Phase Data Encoding, in concert with the Disk Controller Sequencer's DPLL circuit, will ensure greater accuracy in determining a data-zones' optimal transfer-rate. Therefore, it will also promote faster phased locked-loops for quicker data-transfer synchronization between the Disk Controller and the installed Microhead Array Chips.

In addition, another specific object of the present invention is to provide an "Asynchronous Microhead Address Controller". The Asynchronous Microhead Address Controller's function is to provide all of the Microhead Array Chips with the necessary control-signals for (-CS) "Chip Select", for (-AS) "Address Strobe", and for (-ADACK) "Address Acknowledge". Furthermore, the Address Controller will also function as an interface between the typical hard disk drive architectures of today (i.e., IDE ATA-2 "Integrated Drive Electronic AT Attachment rev.2" and SCSI-2 "Small Computer System Interface rev.2"), and the Microhead Array Chips in a Microhead Array Chip Hard Disk Drive's unit assembly. For example, when the Disk Controller receives a request to retrieve recorded data at a specific hard disk drive's memory location that address is forwarded to the Address Controller. Moreover, within the Address Controller is a "Translator" circuit with a translation register. The Translator circuit receives an address request and translates it into something the Address Controller can use to control selected Microhead Array Chips during disk operations. Furthermore, once the address request is translated, the Address Controller will send all the necessary microhead addressing, chip-selection, and control-signals to all Microhead Array Chips that are connected to a Microhead Array Chip Hard Disk Drive's address and control buses.

For example, if the previously mentioned Disk Controller forwards a read data request like "Retrieve data from cylinder location: 54, using head: 8, at sectors: 42,43,44,45", the Address Controller's Translator would first translate this information and then store it in its "translation register". The Disk Controller's data request, after receiving its translation, which essentially tells the Address Controller that the requested data is located under microhead: 54, at cylinder/track: 54, can be accessed using Microhead Array Chip: 8, at read sectors: 42,43,44,45". Moreover, the Address Controller's response to this translated data request would next be to set the control (-CS7) "Chip Select" line-8, which has now changed from a logic-high to a logic-low signal. This would select and enable Microhead Array Chip Number-8, moreover the Microhead Array Chip located above disk-platter "4" and data-surface number "8". Next, the Address Controller would send out a binary-signal representing the address number "54" down its 32-bit address-bus to all of the installed Microhead Array Chips, while simultaneously changing the (-AS) "Address Strobe" control line from a logic-high signal to a logic-low signal. As a consequence Microhead Array Chip Number-8 would be the only Microhead Array Chip that is connected to the Microhead Array Chip Hard Disk Drive's address and control-bus to have its (-CS7) Chip Select Line Number-8 and its (-AS) Address Strobe control lines simultaneously enabled with logic-low signals. Moreover, the previously mentioned Microhead Array Chip Number-8 would become enabled and latch the previously mentioned 32-bit address from the address-bus into its tri-state "Address Latch Circuit". This would next select microhead number "54", which is located within the selected Microhead Array Chip Number-8. Moreover, the selected Microhead Array Chip Number-8, which is positioned above disk-platter "4", data-surface number "8", would use microhead "54", which is positioned above track number "54" to retrieve previously stored data. The selected Microhead Array Chip Number-8, would next, after "50" nanoseconds, send a logic-low signal down the (-ADACK) Address Acknowledge control-bus line to the Address Controller's (-ADACK) input. This would next signal the Address Controller that the address is now latched and that microhead "54" of Microhead Array Chip Number-8 has been selected for use in the read-data disk operation. Furthermore, the Disk Controller can now read the requested data from disk-platter number "4", data-surface number "8", and data-sectors "42,43,44,45" into the Disk Controller's memory cache buffers.

In addition, another specific object of the present invention is to provide a multi-layered CMOS construction of the Microhead Array Chip's Induction Channel Coils, Yoke Cores, Magnetic Flux Concentration Tips, and Magnetoresistor microhead design. Unlike conventional Ferrite "thin film" data heads, which use copper wires wrapped around the induction head's Yoke Core, the Microhead Array Chips will use an Induction Channel Coil. Typically, these Induction Channel Coils will be created layer-upon-layer using CMOS photo-resistant oxide masking and etching techniques. Moreover, here is a short explanation of the process. The doped silicon wafer-chip is covered with an oxide material, where this first layer of oxide material is covered with a photo-resistant oxide material layer. By using photo-masking the doped silicon wafer-chip when exposed to ultraviolet light will cause the photo-resistant oxide layer areas of the doped silicon wafer-chip not masked to become photo-chemically changed. Afterwards, the photo-resistant oxide areas having been exposed to ultraviolet light are photo-chemically developed to expose the oxide layer beneath the photo-resistant oxide material. In addition, these lower layers of oxide are then etched-out chemically to become the microhead's Induction Channel Coil channels for that layer. Moreover, after the etching process is completed the next process is to fill in the etched-out Induction Channel Coil area with an electron conducting material, like "Aluminum" or "Copper".

Moreover, the previously mentioned Microhead Array's Microhead Yoke Cores are created at the same time and in the same way as the Induction Channel Coils; layer-by-layer using a CMOS photo-resistant oxide masking, layering, and etching technology. Typically, these Yoke Cores will be created using CMOS photo-resistant oxide masking and etching techniques. The doped silicon wafer-chip is covered with an oxide material; moreover, this first layer of oxide material is covered with a photo-resistant oxide material layer. By using photo-masking the doped silicon wafer-chip when exposed to ultraviolet light will cause the photo-resistant oxide layer areas of the doped silicon wafer-chip not masked to become photo-chemically changed. Afterwards, the photo-resistant oxide areas having been exposed to ultraviolet light are photo-chemically developed to expose the oxide layer beneath the photo-resistant oxide material. In addition, the previously mentioned lower layers of oxide are then etched-out chemically to become the Yoke Cores for that layer. After the etching process is completed, the next process is to fill in the etched-out Yoke Core area with a nonpermanent magnetic Ferrite material, like Ni—Zn Ferrite material.

In addition, the Magnetic-Flux Concentration Tips are created in the same way as the microhead's Yoke Cores and Induction Channel Coils, layer-by-layer using a CMOS photo-resistant oxide masking, layering, and etching technology. Typically, the previously mentioned Magnetic-Flux Concentration Tips will be created using CMOS photo-resistant oxide masking and etching techniques. Moreover, the doped silicon wafer-chip is covered with an oxide material; moreover, this first layer of oxide material is covered with a photo-resistant oxide material layer. By using photo-masking the doped silicon wafer-chip when exposed to ultraviolet light will cause the photo-resistant oxide layer areas of the doped silicon wafer-chip not masked to become photo-chemically changed. Afterwards, the photo-resistant oxide areas having been exposed to ultraviolet light are photo-chemically developed to expose the oxide layer beneath the photo-resistant oxide material. In addition, the previously mentioned lower layers of oxide are then etched-out chemically to become the microhead's Magnetic-Flux Concentration Tips. After the etching process is completed, the next process is to fill in the etched-out Magnetic-Flux Concentration Tip areas with a non-permanent magnetic Ferrite material, like Mn—Zn Ferrite material.

In addition, the (MR) Magnetoresistor read elements are created in the same way and at the same time as the microhead's Yoke Cores, Induction Channel Coils, and Magnetic-Flux Concentration Tips, layer-by-layer using a CMOS photo-resistant oxide masking, layering, and etching technology. Typically, the previously mentioned Magnetoresistor read elements will be created using CMOS photo-resistant oxide masking and etching techniques. Moreover, the doped silicon wafer-chip is covered with an oxide material; moreover, this first layer of oxide material is covered with a photo-resistant oxide material layer. By using photo-masking the doped silicon wafer-chip when exposed to ultraviolet light will cause the photo-resistant oxide layer areas of the doped silicon wafer-chip not masked to become photo-chemically changed. In addition, the photo-resistant oxide areas having been exposed to ultraviolet light are photo-chemically developed to expose the oxide layer beneath the photo-resistant oxide material. Moreover, the previously mentioned lower layers of oxide are then etched-out chemically to become the microhead's Magnetoresistor read elements. After the etching process is completed, the next process is to fill in the etched-out Magnetoresistor read element areas with various Permalloy materials. Moreover, all of the microheads within a Microhead Array would have their Yoke Cores, Induction Channel Coils, Magnetic-Flux Concentration Tips, and (MR) Magnetoresistor read elements built-up layer-upon-layer. This building process would continue until the exact number of Induction Channel Coil turns had been reached and the proper formation of Microhead Yoke Cores, Magnetic Flux Concentration Tips, and (MR) Magnetoresistor read element structures has been achieved.

In addition, another specific object of the present invention is to provide for a full-integration of the Microhead Array Chip's Read and Write Microhead Arrays along with their control-circuitry, into a single CMOS device using standard CMOS photo-resist oxide masking, etching, and layer fabrication techniques to create the fully integrated Microhead Array Chips that are used in this hard disk drive design. The previously mentioned Microhead Array Chip's microheads along with their control, switching, addressing, amplifying, encoding, and decoding circuitry will be fabricated as a single CMOS Microhead Array Chip device. Therefore, a fully-integrated Microhead Array Chip would consist of "1,000" or more microhead data-transducers, a 32-bit tri-state Address Latch, a 32-bit Address Tree Decoder, a tri-state Address Buffer, a Microhead Selection And Coil Rotation Circuit, a Read or Write Enable Circuit, a Read Channel Pre-Amp, a Read Channel XOR Bi-Phase Encoder, a Write Channel Pre-Amp, a Write Channel Bi-Phase Decoder, and a Write Channel Write-Driver Circuit. Moreover, the Microhead Array's, the addressing, the control, and the signal processing circuits that will make-up the Microhead Array Chips internal CMOS structures are together fully-integrated and are all necessary for the normal functioning of a Microhead Array Chip device.

DRAWING FIGURES

In the drawings, closely related figures have the same number but different alphabetic suffixes:

FIG. 1. shows an orthographic plan-view of a hard disk drive unit assembly for a magnetic Microhead Array Chip design with the hard disk drive cover and sealing gasket removed.

FIG. 6 shows an orthographic plan-view of the chip-positioning circuit board and surface mounting chip-socket a magnetic Microhead Array Chip design.

FIG. 7 shows an orthographic plan-view of the Bottom Data Surface Microhead Array Chip for a magnetic head Array Chip design.

FIG. 8 shows orthographic plan-view of the Top Data Surface Microhead Array Chip for a magnetic Microhead Array Chip design.

FIG. 9 shows an orthographic front-view of the combined Top and Bottom chip-positioning circuit boards for a magnetic Microhead Array Chip design, with their Microhead Array Chips installed into surface mounting chip-sockets, and two Polymer flex-cables inserted into their Polymer Flex-cable connectors, displaying circuit board connectivity.

FIG. 10 shows an orthographic side-view of the combined Top and Bottom chip-positioning circuit boards for a magnetic Microhead Array Chip design, with their Microhead Array Chips installed into a surface mounting chip-sockets, and four Polymer flex-cables inserted into their Polymer Flex-cable connectors, displaying circuit board connectivity.

FIG. 15 shows a plan-view of a typical Polymer flex bus cable for the chip-positioning circuit board's right side connector for a magnetic Microhead Array Chip design displaying data, future, and control-bus assignments.

FIG. 61B shows a detailed enlargement of a block-diagram for the SCSI Disk Controller used in the magnetic Microhead Array Chip design, displaying top-portion details of diagram 61A.

FIG. 64B shows a detailed enlargement block-diagram for the Microhead Array Chip, displaying microhead addressing, coil rotation, and chip selection circuits.

FIG. 65D shows a detailed enlargement block-diagram for the Magnetoresistor Microhead Array Chip, displaying the data Write Channels, and the data-acknowledgment control circuits.

FIG. 66 shows a logic-diagram for the address-strobe and chip-select circuit for a magnetic Microhead Array Chip design.

FIG. 67 shows a circuit-diagram of the address-strobe and chip-select circuit for a magnetic Microhead Array Chip design.

FIG. 68 shows a truth-table diagram of the address-strobe and chip-select circuit for a magnetic Microhead Array Chip design.

FIG. 69 shows a conversion table diagram of the address-strobe and chip-select circuit for a magnetic microhead Array Chip design.

FIG. 94 shows a logic-diagram of the R/W Control Circuit for the Microhead Array Chips.

FIG. 95 shows a circuit-diagram of the R/W Control Circuit for the Microhead Array Chips.

FIG. 96 shows a truth table diagram of the R/W Control Circuit for the Microhead Array Chips. Fig shows a truth table diagram of the R/W Control Circuit for the Microhead Array Chips.

FIG. 97 shows a conversion table diagram of the R/W Control Circuit for the Microhead Array Chips.

FIG. 98 shows a logic-diagram of the Read Channel CMOS AOI XOR bi-phase encoded data-out and dclock-input circuit for a magnetic Microhead Array Chip design.

FIG. 99 shows a circuit-diagram of the Read Channel CMOS AOI XOR bi-phase encoded data-out and dclock-input circuit for a magnetic Microhead Array Chip design.

FIG. 100 shows a bi-phase data encoding scheme diagram of the Read Channel CMOS AOI XOR biphase data-out and dclock-input circuit for a magnetic Microhead Array Chip design.

FIG. 101 shows a truth table diagram of the Read Channel CMOS AOI XOR bi-phase encoded data-out and dclock-input circuit for a magnetic Microhead Array Chip design.

FIG. 102 shows a conversion table diagram of the Read Channel CMOS AOI XOR bi-phase encoded data-out and dclock-input circuit for a magnetic Microhead Array Chip design.

FIG. 109 shows a logic-diagram of the (-DTACK) or data-acknowledge circuit for a magnetic Microhead Chip design.

FIG. 110 shows a circuit-diagram of the (-DTACK) or data-acknowledge circuit for a magnetic Microhead Array Chip design.

FIG. 111 shows a truth table diagram of the (-DTACK) or data-acknowledge circuit for a magnetic Microhead Array Chip design.

FIG. 112 shows a conversion table diagram of the (-DTACK) or data-acknowledge circuit for a magnetic Microhead Array Chip design.

Figure 116:
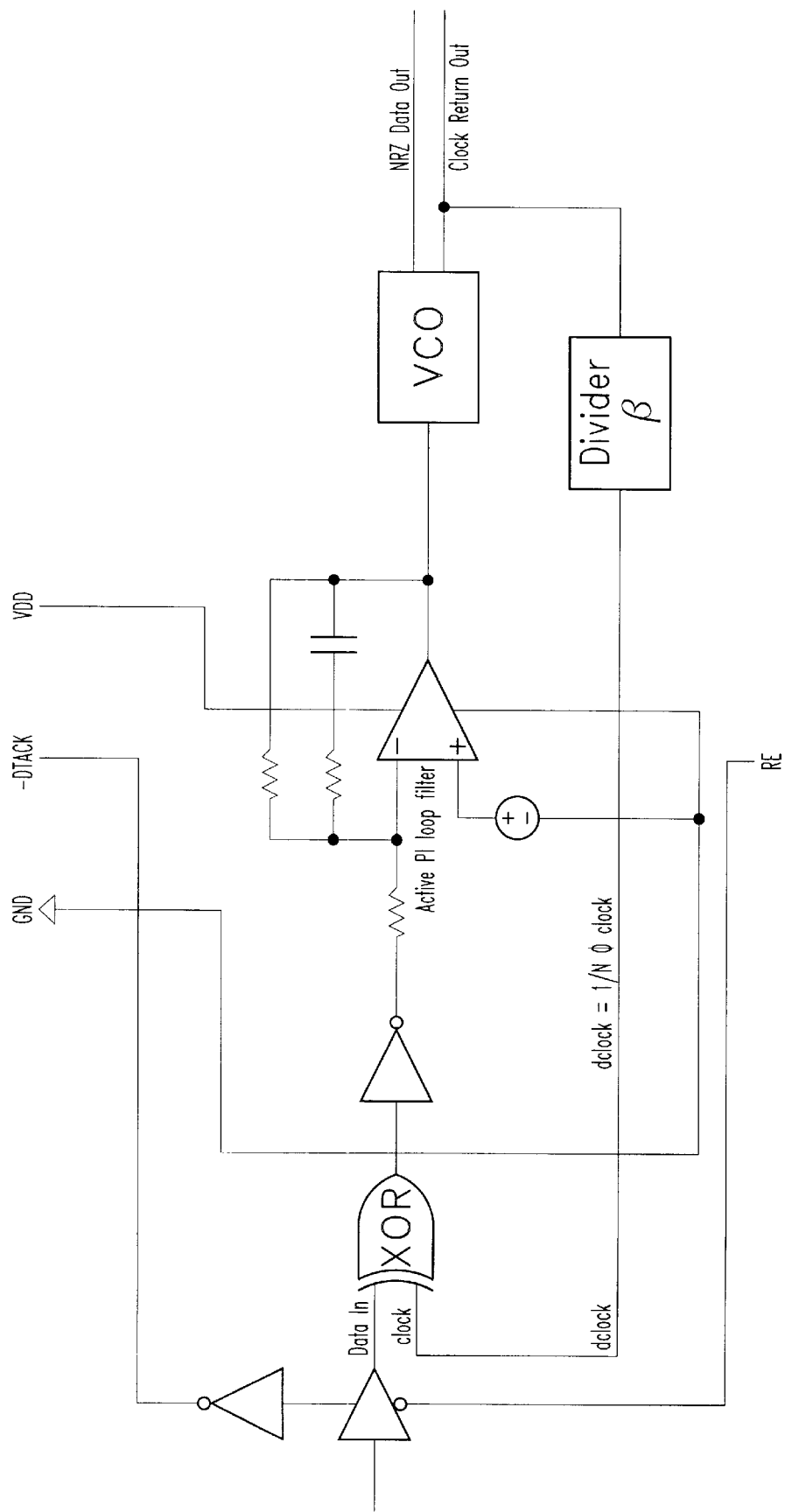

FIG. 116 a logic and block-diagram of the Read Channel XOR and DPLL circuits for a magnetic Microhead Array Chip design.

Figure 117:
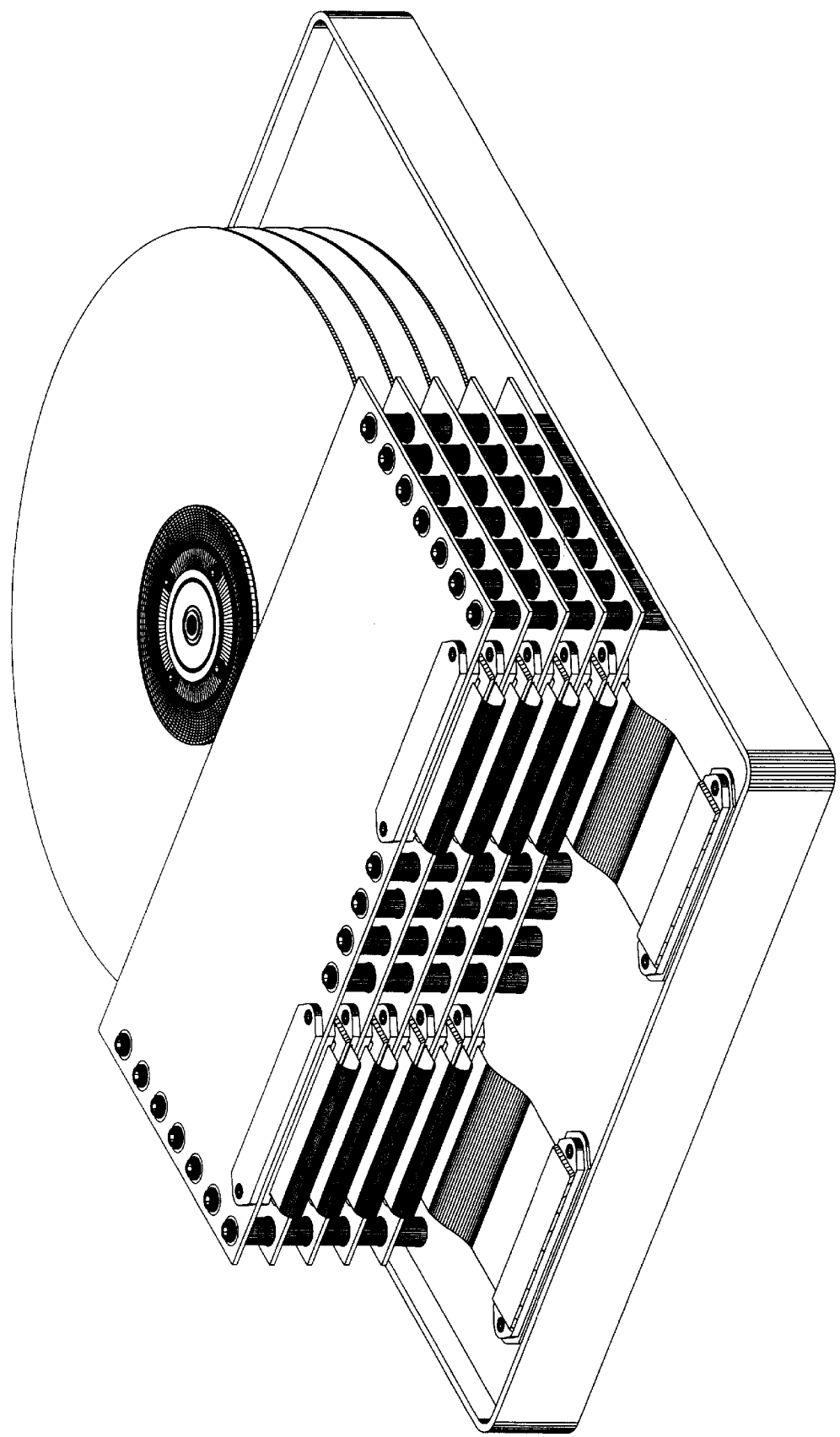

FIG. 117 shows a 3D perspective-view of the fixed hard disk drive unit assembly for a magnetic Microhead Array Chip design, illustrated with the hard disk cover and sealing gasket as removed and not shown.

DETAILED DESCRIPTION OF A PREFERRED EMBODIMENT

A preferred embodiment of the present invention, as illustrated in FIGS. 1, 2, 3, 4, 5, 6, 7, 8, 9, and 10, moreover is described below. Wherein, some of the issues confronting a designer of a high capacity magnetic hard disk drive are "average seek times", and "full stroke seek times". Furthermore, seek-times as defined, is the movements of read or write data head assemblies from one data track to another for the facilitating of data storage or retrieval. To a designer this approach presents a serious amount of lag-time or a "bottle neck" in the process of data retrieval and storage. The loss of the hard disk drives data-surface real estate to embedded-servo sector and system information that is sometimes needed by a conventional hard disk drive's tracking and servo system is also of great concern to a designer. With the Microhead Array Chip hard disk drive design the problems normally associated with traditional tracking methods and conventional voice-coil actuators are not improved upon, or fixed in any way, but are eliminated all-together. Furthermore, to understand the Microhead Array Chip and its hard disk drive design, we will begin by considering the drawing FIGS. 1, 2, and 3. These drawing figures are orthographic views of a hard disk drive unit assembly of the Microhead Array Chip design.

Figure 1:
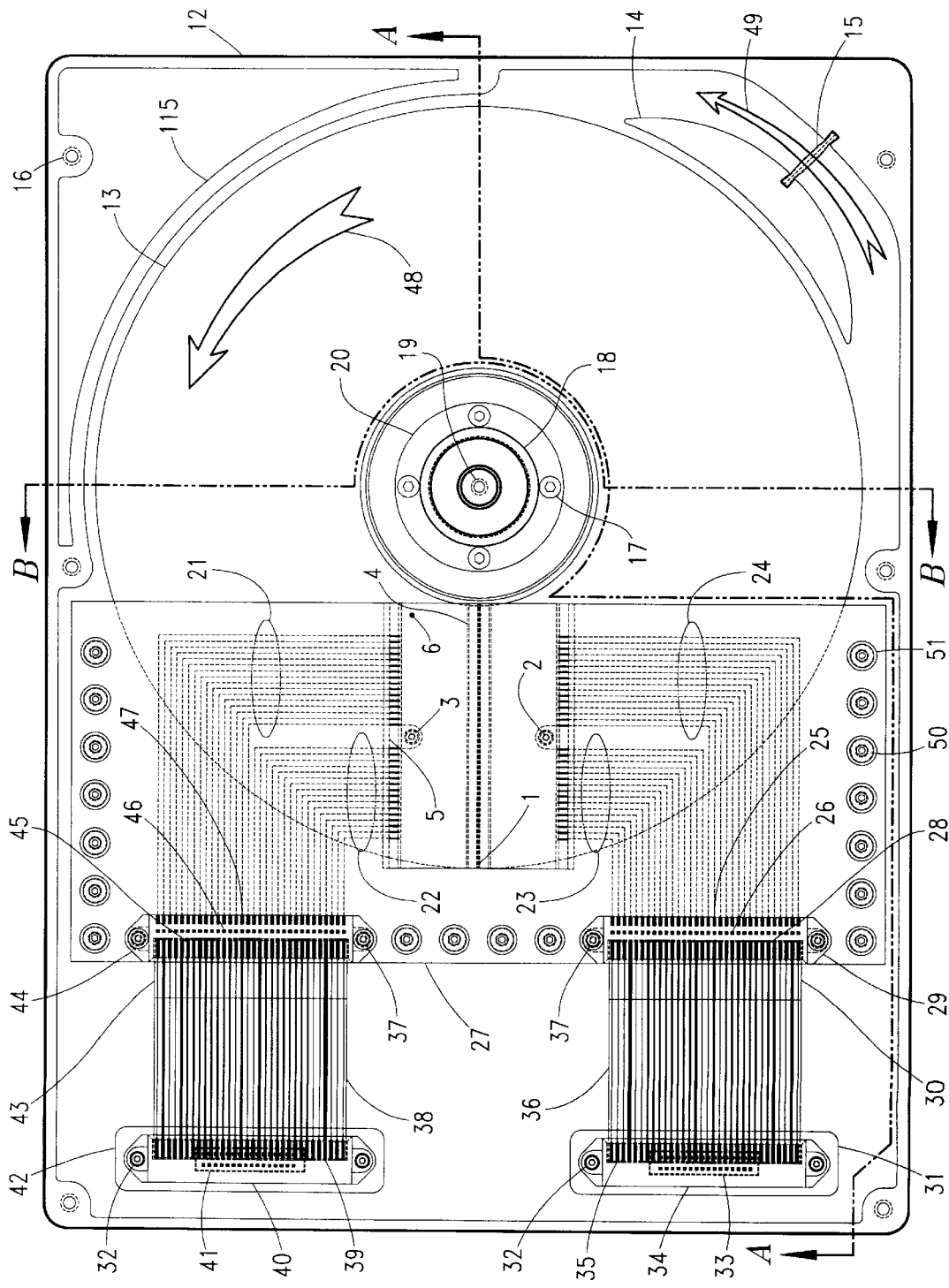
Figure 2:
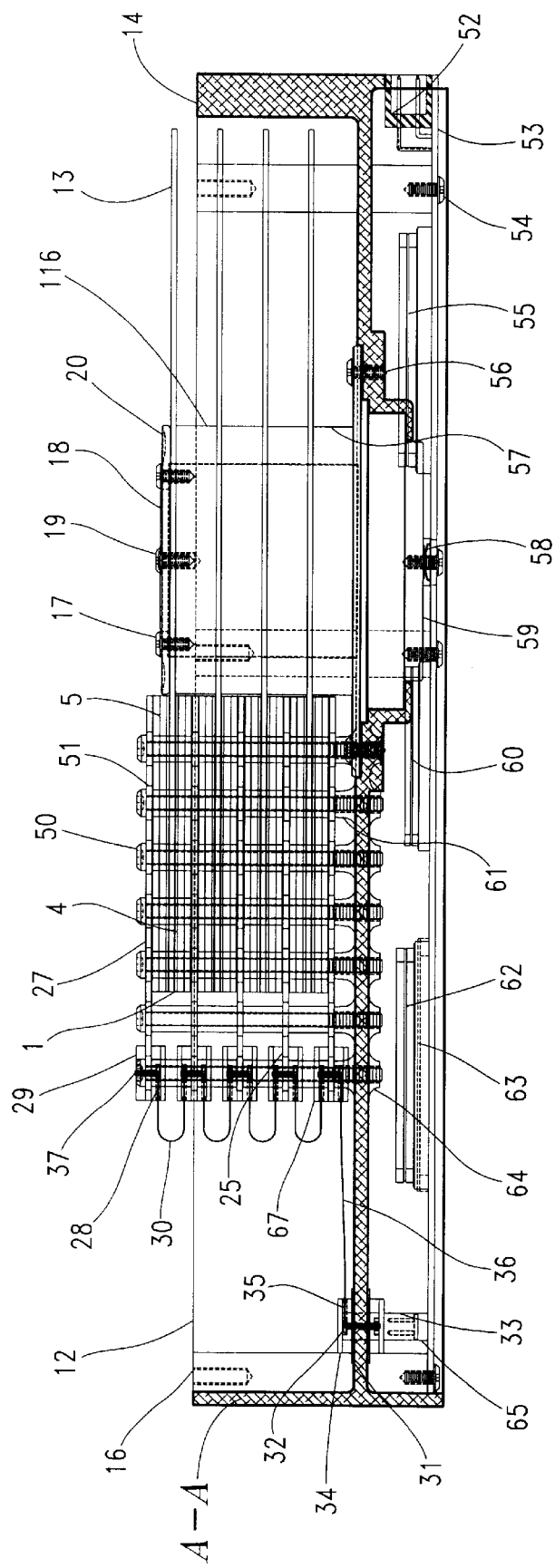
FIG. 2 shows an orthographic side-view of an unit assembly for a magnetic Microhead Array Chip design, with the hard disk drive cover and sealing gasket removed, displaying section A—A.
Figure 3:
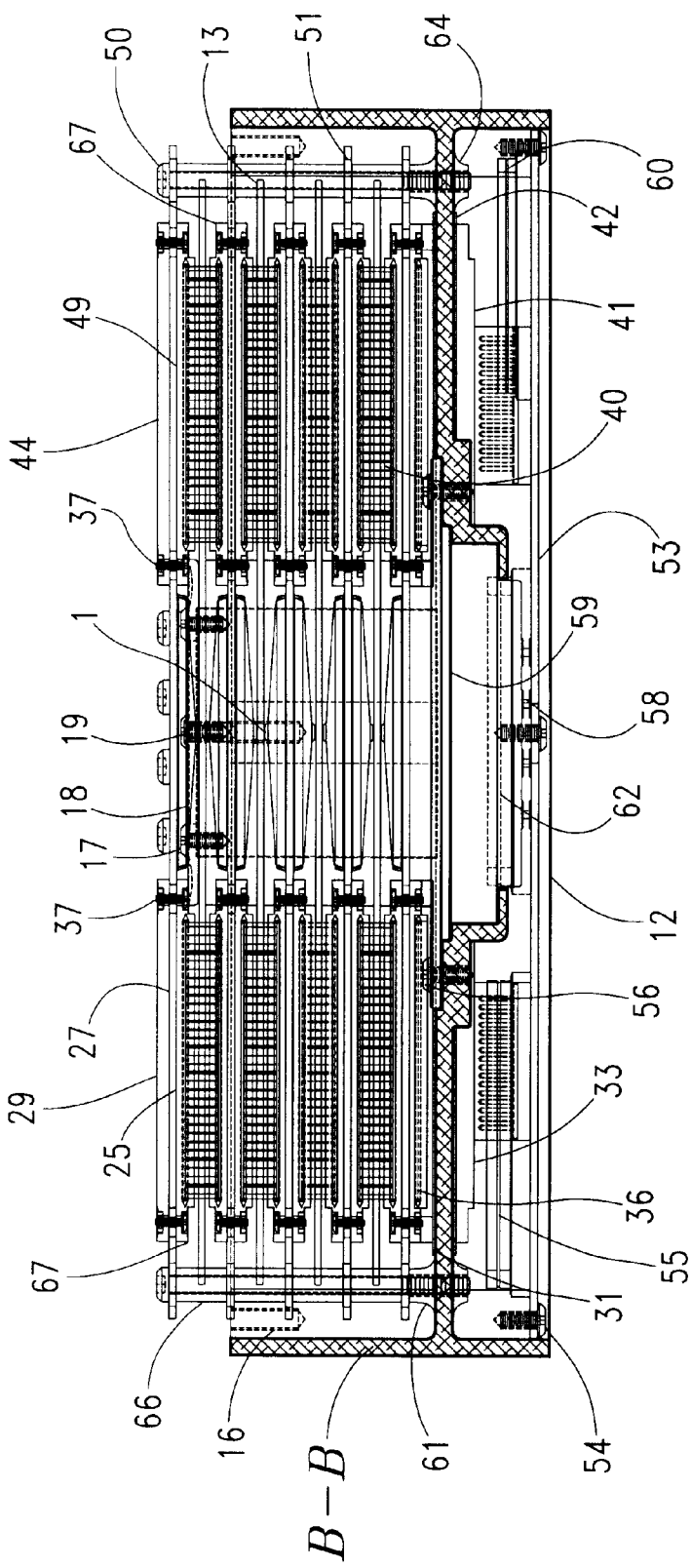
FIG. 3 shows an orthographic front-view of a unit assembly for a magnetic Microhead Array Chip design, with the hard disk drive cover and sealing gasket, displaying section B—B.

The casting-base is constructed from a single machined piece of aluminum-alloy 12 (FIGS. 1, 2, and 3) that provides a mounting surface for the hard disk's drive mechanism 59 (FIGS. 2 and 3), the PCB 53, 81 (FIGS. 4 and 5), the hard disk drive's cover and gasket (i.e., not shown), and the Microhead Array Chip's chip-positioning circuit board assemblies 27 (FIGS. 1, 2, 3, 6, 9, and 10). In addition, the bottom inside of the casting-base 12 (FIGS. 1, 2, and 3) also acts as a mounting flange for the DC "Spindle-Motor" assembly 59 (FIGS. 2 and 3). Integral with the casting-base 12 the DC Spindle-Motor assembly is a fixed-shaft brushless DC Spindle-Motor 59 that drives the "counterclockwise" rotation 48 (FIG. 1) of the hard disk drive's data-storage disk-platters 13 (FIGS. 1, 2 and 3).

Moreover, the magnetic data storage fixed hard disk drive, as presented in this art are shown with four hard drive disk-platters 13 (FIGS. 1, 2, and 3). The data-surfaces of these hard drive disk-platters are covered in a magnetic material used to store data in the form of magnetic bit-cell domains, as is conventional in the prior art. Furthermore, these hard drive disk-platters are mounted upon a rotating spindle assembly 57 (FIGS. 2 and 3), which is rotated "3,400" to "10,000" rpm by an in-spindle brushless (DC) "Direct Current" Spindle-Motor 59 (FIGS. 2 and 3) relative to a frame casting-base 12 (FIGS. 1, 2, and 3). Typically, the Spindle-Motor is secured to the aluminum-alloy casting-base 12 (FIGS. 1,2, and 3) with four motor mounting hex-screws 56 (FIGS. 1, 2, and 3). In addition, the Spindle-Motor 59 (FIGS. 2 and 3) has a rotor 57 (FIGS. 2 and 3) that is flanged at the base and has a platter-axle in its center. The rotor's rotating platter-axle is used to position and firmly secure all the hard drive's disk-platters to the housing of the rotor. While each hard drive disk-platter has a disk-spacer 116 (FIGS. 2 and 3) placed between it and each proceeding hard drive disk-platter. In addition, having the final hard drive disk-platter 13 (FIGS. 1, 2, and 3) secured into place with a rotor-housing cap 20 (FIGS. 1, 2, and 3), and four rotor cap mounting hex-screws 17 (FIGS. 1, 2, and 3). Most preferably, Spindle-Motor bearings formed as a part of the Spindle-Motor assembly 59 (FIGS. 2 and 3) are used to rotate the spindle-assembly 57 (FIGS. 2 and 3) relative to the frame casting-base 12 (FIGS. 1, 2, and 3). Furthermore, the Spindle-Motor 59 (FIGS. 2 and 3) itself is mounted to the bottom inside of the casting-base 12 (FIGS. 1, 2, and 3) with four motor mounting hex-screws 56 (FIGS. 1 and 2). While the hard disk drive's cover is partially mounted to the casting-base using a center top-end threaded cover mounting screw-hole 19 (FIGS. 1, 2, and 3), which is located at the top of the rotor's bearing housing 18 (FIGS. 1, 2, and 3) at the center of the non-moving bearing-rod at the Spindle-Motor's core, as is conventional in the art. Furthermore, a motor driver circuit called the "Spindle And Power Controller" 60 (FIG. 4), 82 (FIG. 5) is provided to communtate e.g. with the three-phase windings of the hard disk drive's brushless Spindle-Motor 59 (FIGS. 2 and 3). Hall-Sensors "not shown" are also provided in order to determine the position of the rotary permanent magnetic elements in the rotor relative to the fixed windings and poles of the Spindle-Motor 59. Typically, they will provide response control information to the Spindle-Motor's Spindle And Power Controller 60 (FIG. 4) 82 (FIG. 5) driver circuit. The "not shown" Hall-Sensors is also being controlled in a conventional fashion by the Spindle And Power Controller driver circuit as well. There are "6" other threaded hex-screw holes 16 (FIGS. 1, 2, and 3) in the casting-base hard disk drive's housing. Moreover, the previously mentioned hex-screw holes are used for the securing and the sealing of the hard disk drive's "not shown" cover and sealing gasket. Moreover, the final assembly of the hard disk drive of the Microhead Array Chip is to be done in a contamination free "Clean Room" manufacturing facility. To provide the Microhead Array Chip Hard Disk Drives with a contamination free internal environment a gasket providing a seal between the casting-base hard disk drive housing 12 (FIGS. 1, 2, and 3) and its "Aluminum" metal cover is installed. The previously mentioned gasket will be installed during the final assembly of the Microhead Array Chip's hard disk drive unit assemblies, using "6" threaded hex-screws "not shown". To provide an environment that continues to be clean and free from air contaminants an internal air-filtering device is used 15 (FIG. 1). Moreover, the orthographic plan-view drawing FIG. 1 shows the location of this internal air-filtering device 15, while displaying the airflow direction 49 (FIG. 1) through the air-filter 15 (FIG. 1) with an arrow. The circulating direction of the airflow is also indicated with an arrow 49 that also showing that the air flowing through the air-filter is moving in the same direction as the hard disk drive disk-platter's 13 (FIGS. 1, 2, and 3) "counterclockwise" rotational direction.

In addition, the Microhead Array Chips used in a hard disk drive unit assembly will need to be positioned very close to the hard disk drive's rotating disk-platter data-surfaces. Therefore, it is essential that the air circulating through the hard disk drive be kept free of dust, pollen, and other air-borne particles and contaminates least they become trapped between a Microhead Array and a disk-platter's data-surface; moreover, causing micro-damage and maybe data-loss. When the hard disk drive is in use the rotation of its disk-platters will force air through the hard disk drives internal air-filter 15 (FIG. 1), where the highest internal air pressure within the hard disk drive's unit assembly will be at the outer perimeter of its rotating disk-platters, where a constant stream of air will flow through a "0.3" micron circulation air-filter 15 (FIG. 1). Moreover, located in a slot between the upper right-hand corner of the casting-base 12 (FIG. 1) and the air circulation scoop 14 (FIG. 1) of the casting-base is the hard disk drive's previously mentioned air-filter 15 (FIG. 1). Furthermore, this internal air-filtering design will provide a continuous-flow of clean filtered air flowing through the hard disk drive while its disk-platters are rotating. Coincidentally, while the hard disk drive is in use, the continuous flow of clean air will also help keep the Microhead Array Chip Hard Disk Drives cool as well as clean.

In addition, the Microhead Array Chips are placed in and positioned by specially designed chip-positioning circuit boards 27, as illustrated in FIGS. 1, 2, 3, 6, 9, and 10. Furthermore, these chip-positioning circuit boards will have their inner-cores composed of a material that is very rigid; moreover, like a "Titanium" alloy or a "Graphite Carbon Composite" material. The chip-positioning circuit boards will consist of two outer-core surfaces, while each outer-core surface has eighteen embossed bolt-flanges with thirty-six embossed bolt-flanges 51 (FIG. 6) per-chip positioning circuit board device. The previously mentioned embossed bolt-flanges will protrude about "1/16" of an inch from each of the chip positioning circuit board's out-core surfaces. In addition, each embossed bolt-flange will have its topmost surface machined to a leveled perfectly flat plane, while having a plane-tolerance of plus or minus "1/8" of one-micron.

Moreover, after each chip-positioning circuit board assembly has had its thirty-six embossed bolt-flanges machined to specified tolerances the application of their first layer of fiberglass insulation, which will occur for each of the chip-positioning circuit board's two outer-core surfaces, can proceed. The first fiberglass layer will provide insulation for the Microhead Array Chip's chip-positioning circuit board's copper circuit traces 21, 22, 23, 24, as illustrated in FIGS. 1, 6, 29, 30, 31, 32, 34, 35, 36, and 37. When the first layer of fiberglass insulation has been applied to all of the outer-core surfaces of all of the chip-positioning circuit boards used in the Microhead Array Chip Hard Disk Drive's unit assembly has been accomplished. Then the installation of all of the chip-positioning circuit board's "64" copper circuit-traces, which will occur over the first fiberglass layer, can occur for all of the chip-positioning circuit boards used in the Microhead Array Chip Hard Disk Drive's unit assembly. Furthermore, the layers of applied fiberglass insulation will both protect and isolate the newly installed "64" copper circuit traces from each other, and from the chip-positioning circuit boards outer-core metal surfaces as well. The previously mentioned eighteen chip-positioning circuit board embossed bolt-flanges 51 (FIGS. 1 and 6), which are used for installing the completed chip-positioning circuit board assemblies into the hard disk drive unit assemblies FIG. 117 will need to be free of any dirt, fiberglass, or other particulate matter. If, during the Microhead Array Chip Hard Disk Drive's final assembly FIG. 117, any particulate matter were left on a chip-positioning circuit board's embossed bolt-flange mounting surface the precise placement of all of the chip-positioning circuit boards installed into a Microhead Array Chip Hard Disk Drive's unit assembly would be adversely affected.

Figure 30:
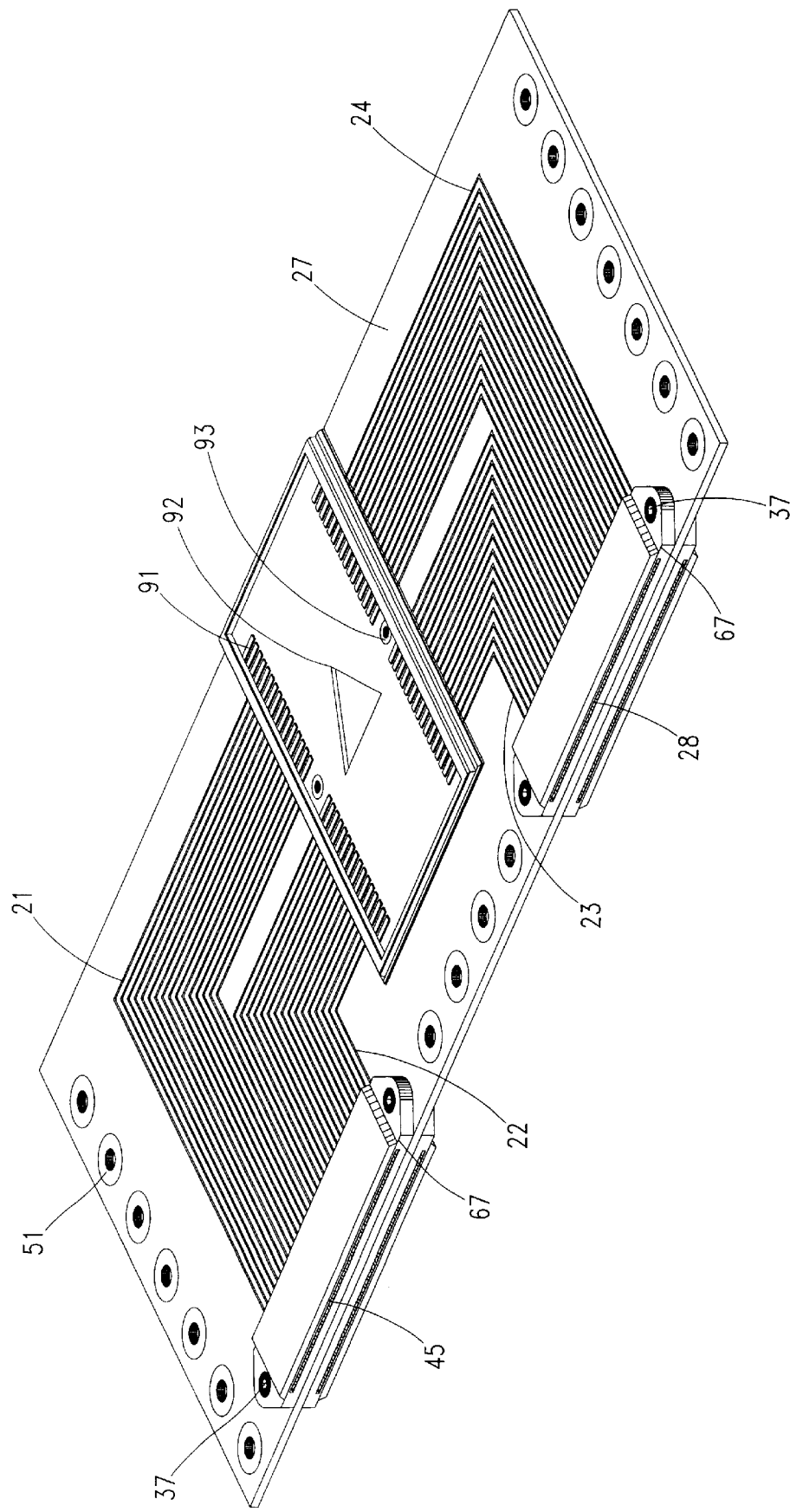
FIG. 30 shows a 3D top back-view of a double chip-positioning circuit board assembly for a magnetic Microhead Array Chip design, illustrated with the Microhead Array Chips as not installed.
Figure 31:
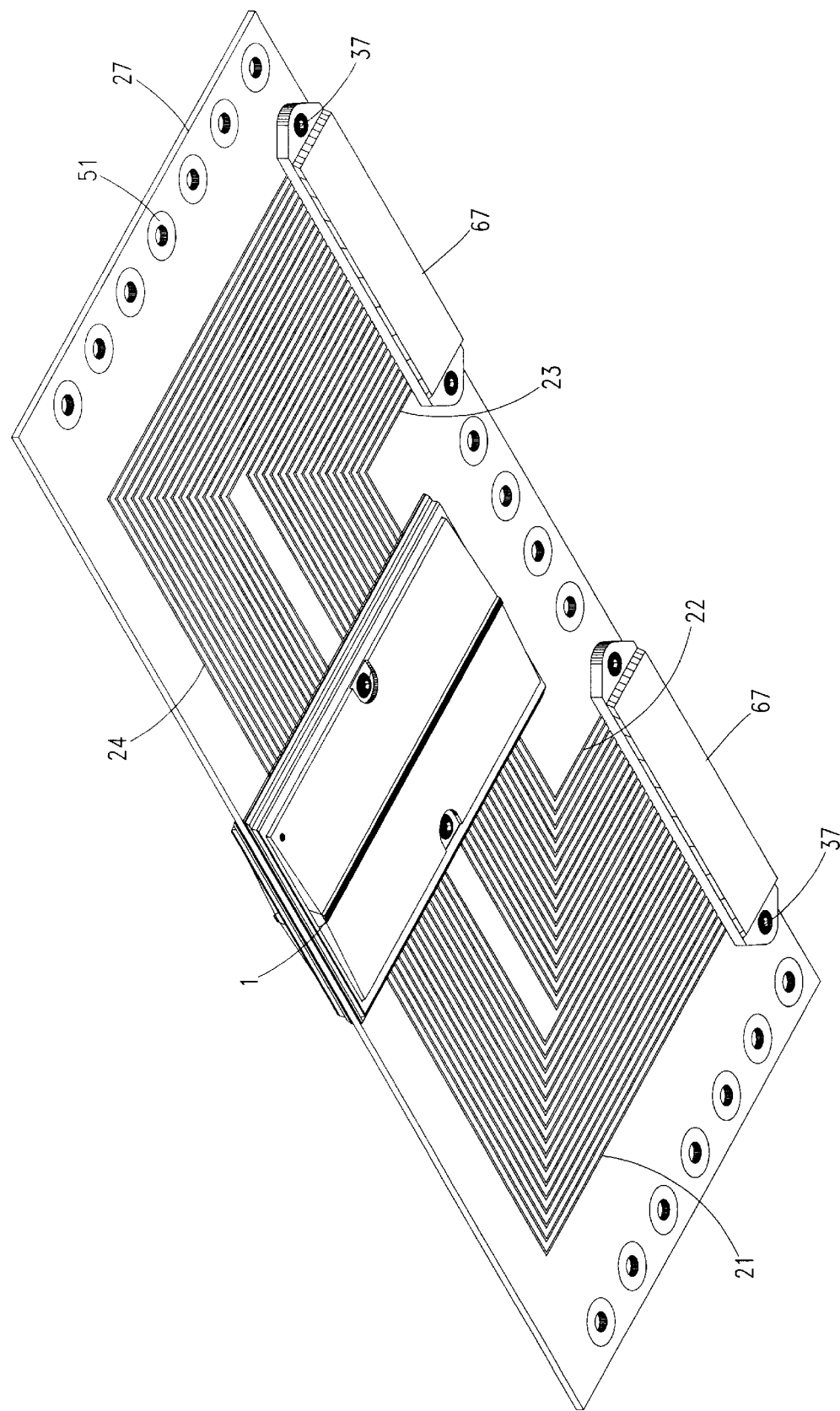
FIG. 31 shows a 3D bottom front-view of a double chip-positioning circuit board assembly for a magnetic Microhead Array Chip design, illustrated with both Microhead Array Chips as installed.
Figure 32:
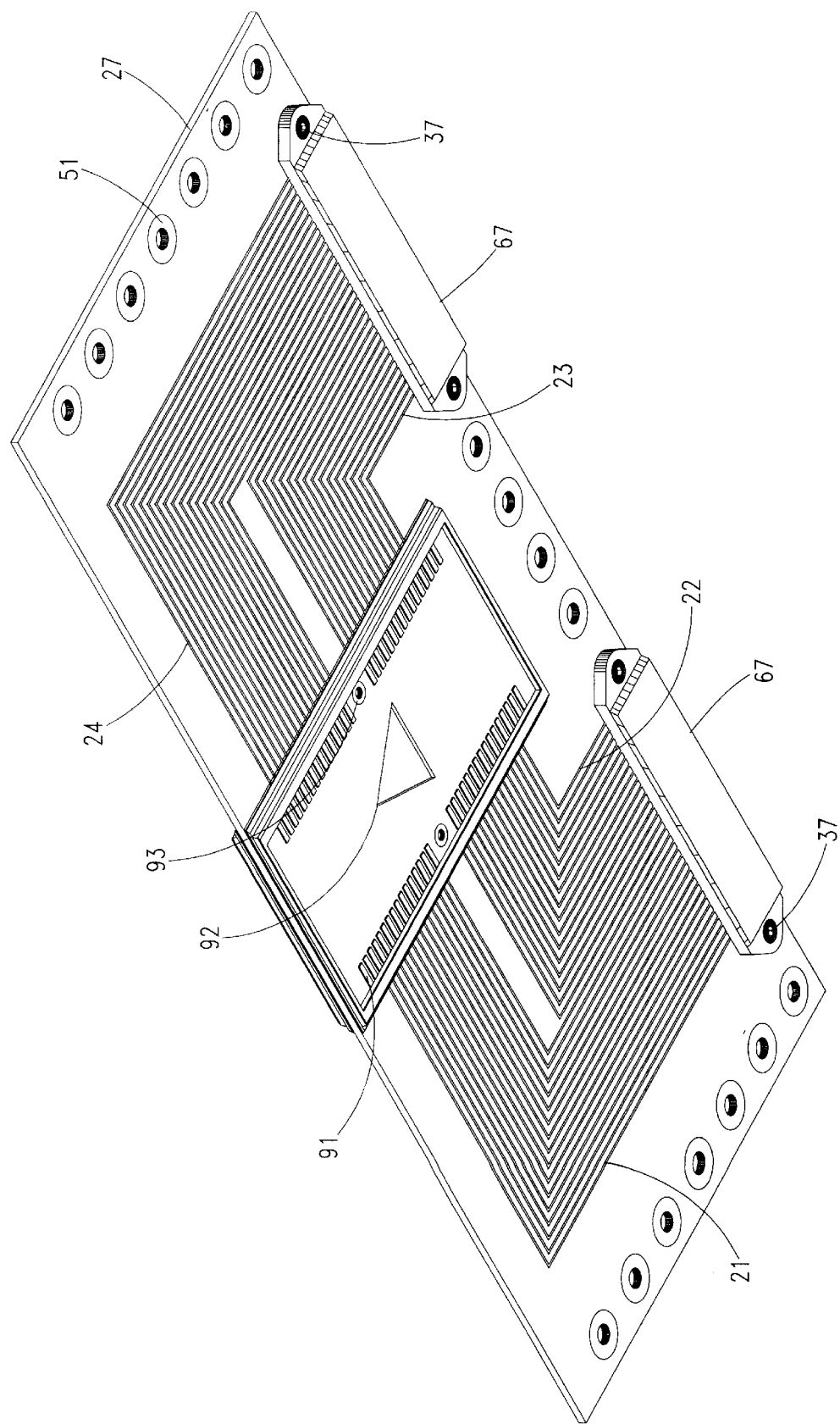
FIG. 32 shows a 3D bottom front-view of a double chip-positioning circuit board assembly for a magnetic Microhead Array Chip design, illustrated with the Microhead Array Chips as not installed.
Figure 35:
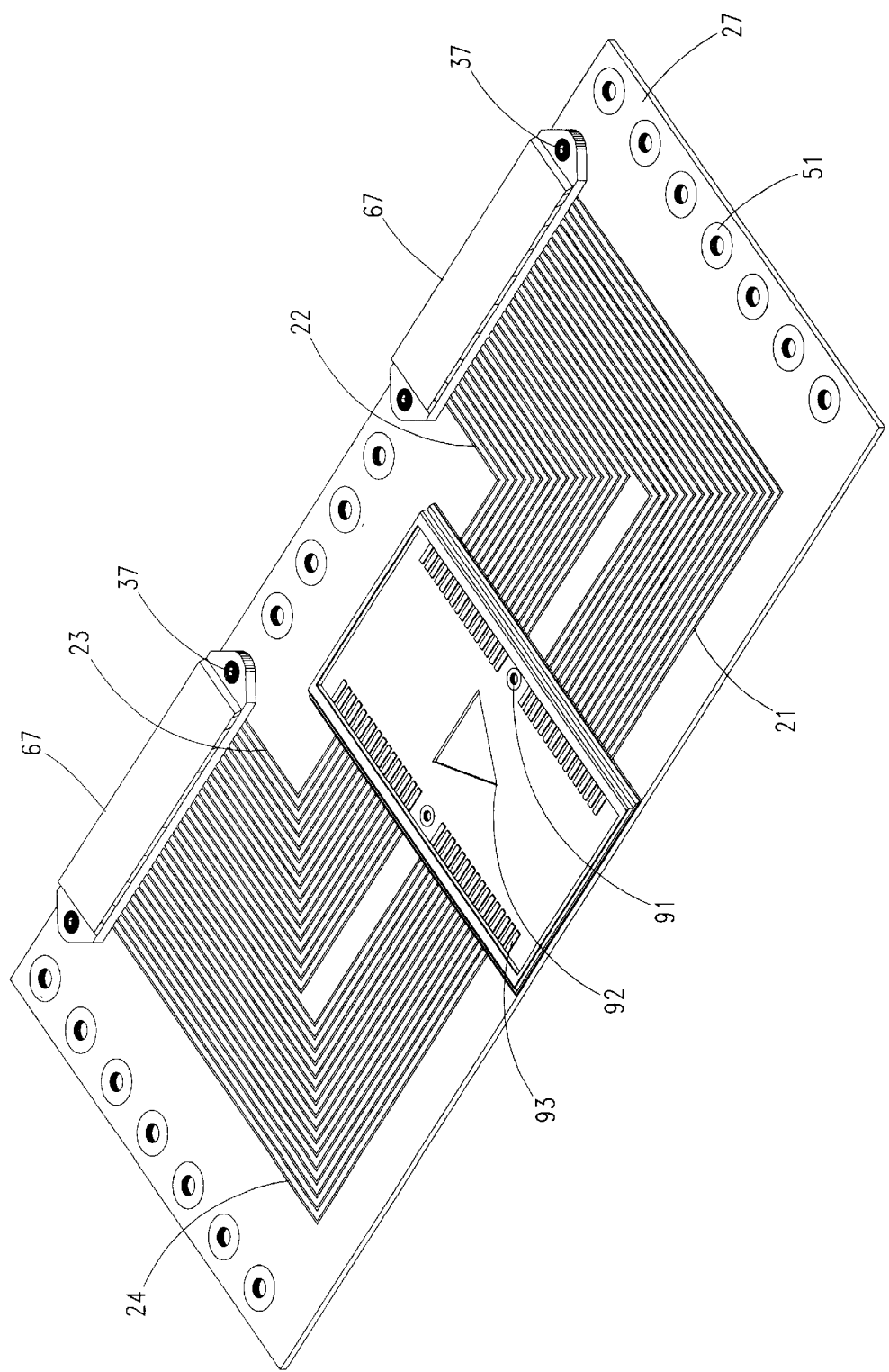
FIG. 35 shows a 3D top front-view of the first disk-platter's chip-positioning circuit board assembly for magnetic Microhead Array Chip design, illustrated with the Microhead Array Chip as not installed.
Figure 36:
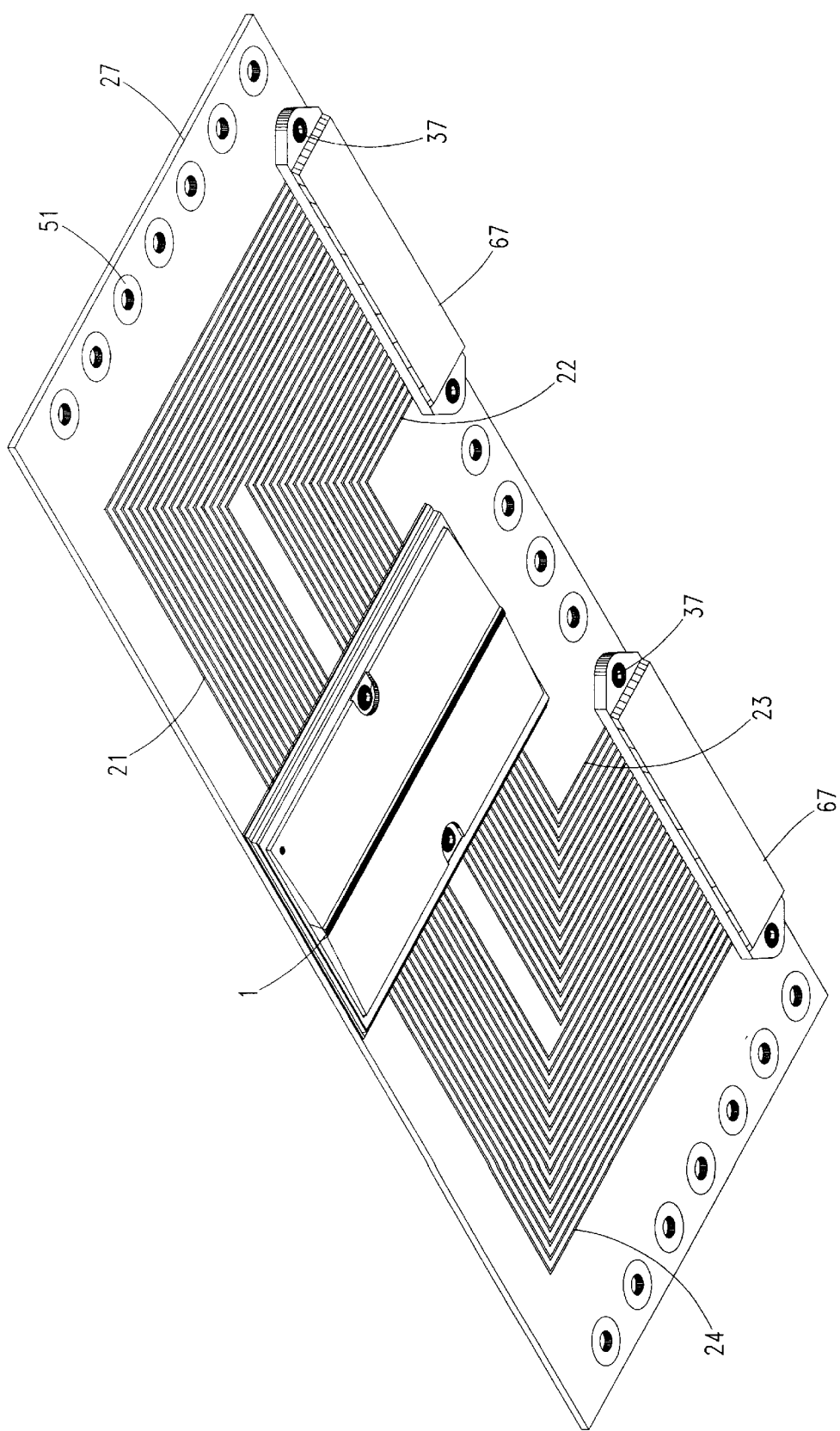
FIG. 36 shows a 3D bottom front-view of the last disk-platter's chip-positioning circuit board assembly for a magnetic Microhead Array Chip design, illustrated with the Microhead Array Chip as installed.
Figure 37:
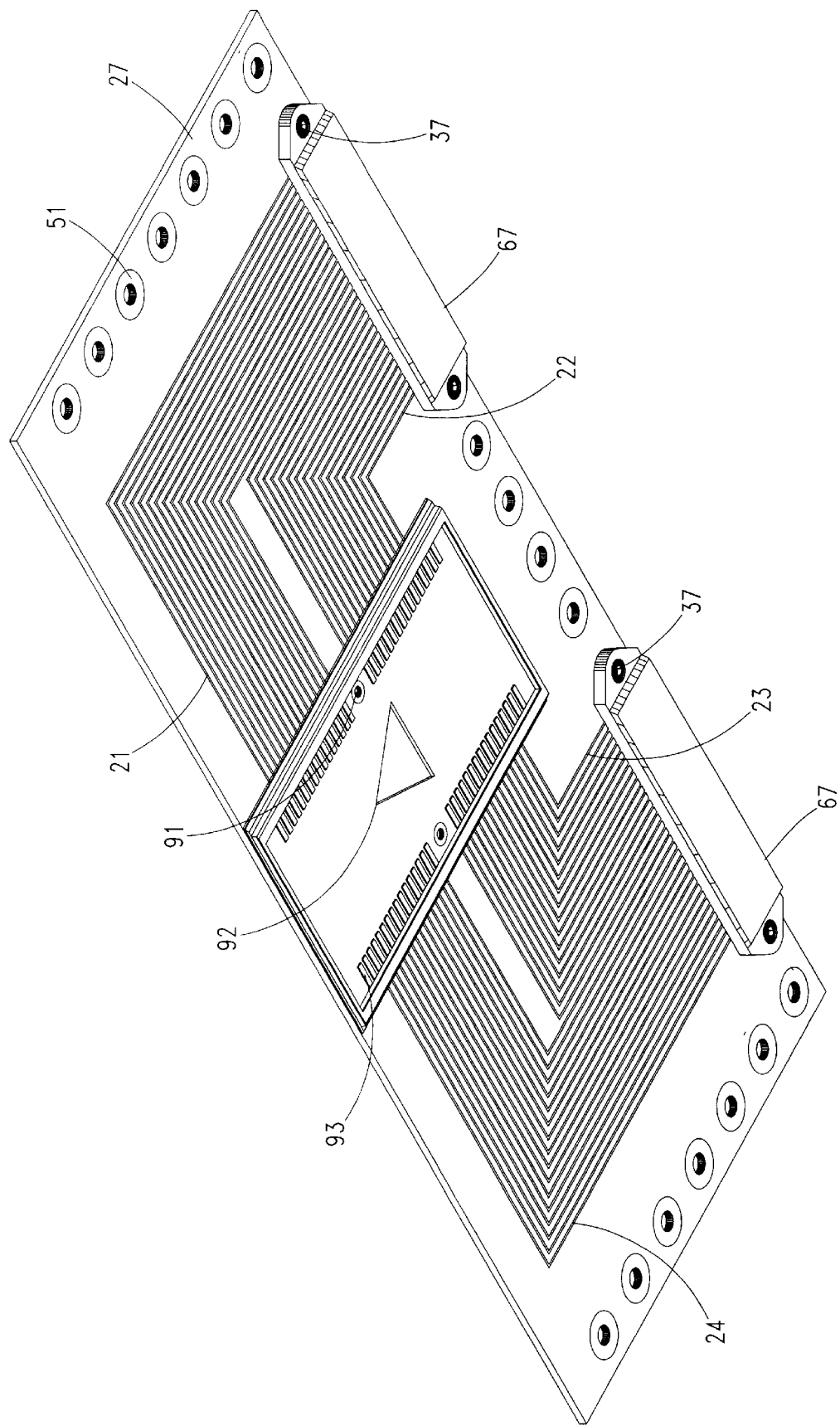
FIG. 37 shows a 3D-bottom front-view of the last disk-platter's chip-positioning circuit board assembly for a magnetic Microhead Array Chip design, illustrated with the Microhead Array Chip as not istalled.
Figure 38:
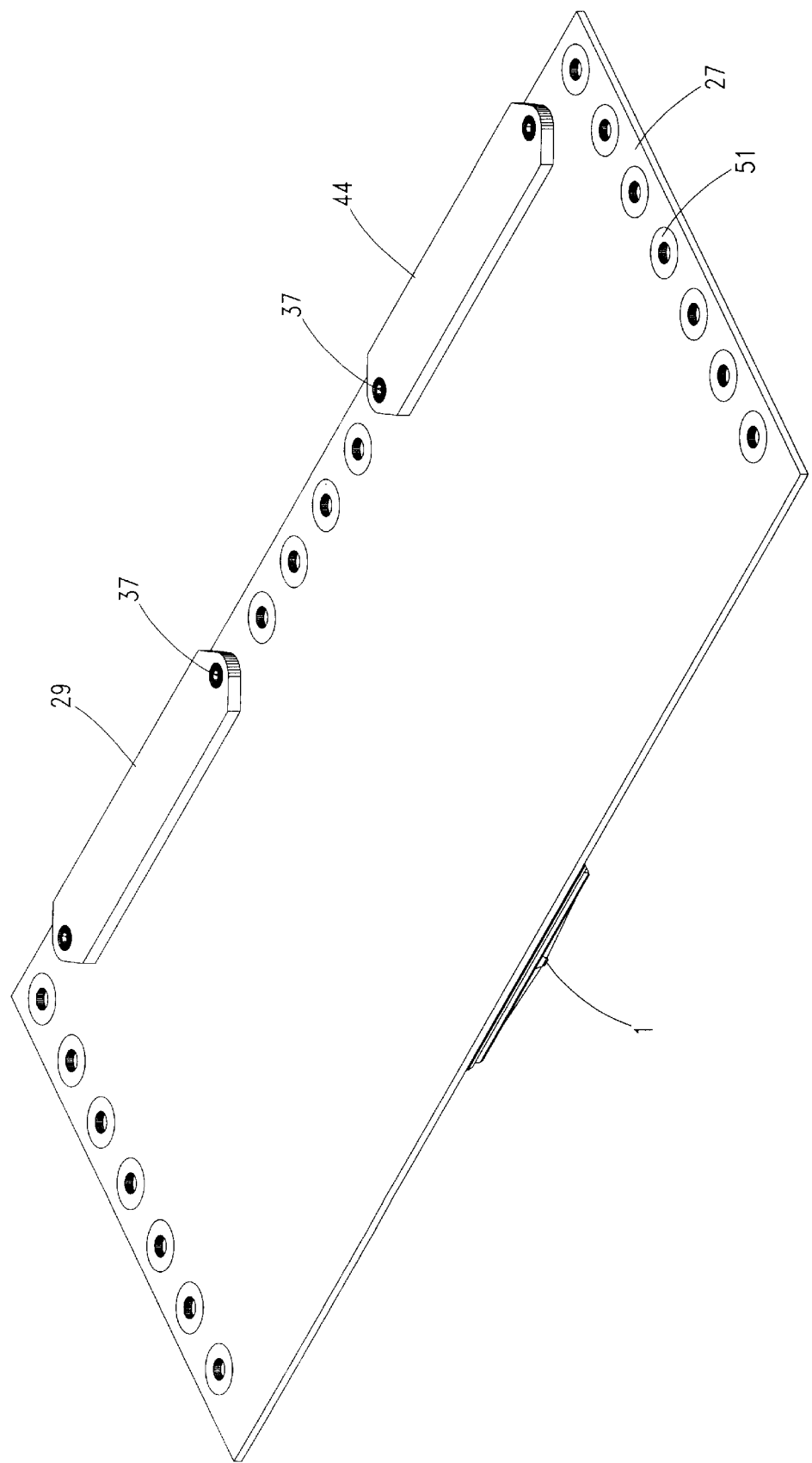
FIG. 38 shows a 3D top front-view of the last disk-platter's chip-positioning circuit board assembly for a magnetic Microhead Array Chip design, illustrated with the Microhead Array Chip as installed.

Moreover, after the application of the fiberglass insulation to all of the chip-positioning circuit board's outer-core surfaces the chip-positioning circuit board's embossed bolt-flange mounting areas 51 (FIGS. 1 and 6) will need to be cleaned and made fiberglass free. The surface mounting chip-sockets 5 (FIGS. 1 and 6) of the Microhead Array Chip's chip-positioning circuit boards can now be attached to the circuit board's outer surfaces 27 (FIGS. 30, 32, 35, and 37). After, the installation of the chip-positioning circuit board's surface mounting chip-sockets has been accomplished a final topcoat layer of insulating fiberglass will need to be applied to all of the chip-positioning circuit board's outer-surfaces and to the surface mounting chip-socket's outer-base surface areas as well. Moreover, this will help to seal and secure the chip-mounting circuit board's surface mounting chip-sockets of the Microhead Array Chip design into place. While applying any Fiberglass to a chip-positioning circuit boards and their surface mounting chip-sockets care must be taken to keep the fiberglass insulation off any of the chip-positioning circuit board's embossed machined bolt-flange mounting surfaces. Remembering to keep the fiberglass insulation out of the chip-positioning circuit board surface mounting chip-socket's contact-circuit areas 91 (FIGS. 30, 32, and 35). Moreover, the location of these contact-circuit areas is at the inner-bottom surface of every surface mounting chip-socket device 93 (FIGS. 30, 32, 35, and 37).

Figure 26:
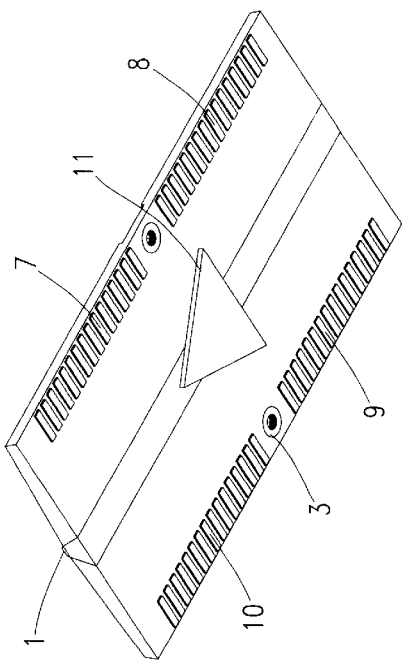
FIG. 26 shows a 3D bottom-view of a disk-platter's Top Data Surface Microhead Array Chip for a magnetic Microhead Array Chip design.
Figure 27:
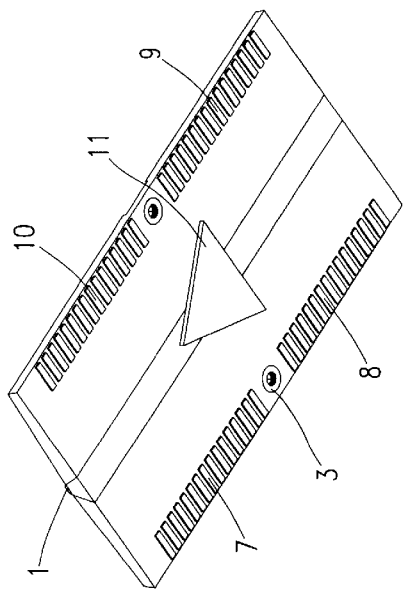
FIG. 27 shows a 3D bottom-view of a disk-platter's Bottom Data Surface Microhead Array Chip for a magnetic Microhead Array Chip design.

Moreover, the Microhead Array Chip's surface mounting chip-sockets of the chip-positioning circuit boards 5 (FIGS. 1, 7, and 8) have been designed to firmly secure and position the Microhead Array Chips into their pre-designated chip-positioning circuit board's surface mounting chip-socket. The secured installation of the Microhead Array Chips into their surface mounting chip-sockets is accomplished through specially designed and triangular-shaped "Chip Placement Keys" 11 (FIGS. 7, 8, 26, and 27), and two threaded surface mounting chip-socket hex-screws; two threaded hex-screws per Microhead Array Chip 2 (FIGS. 1 and 6). The Chip Placement Keys of the Microhead Array Chips are molded out of the bottom-surface material of every Microhead Array Chip's plastic outer-shell 4 (FIGS. 26 and 27). Furthermore, to meet with exacting tolerances the Chip Placement Keys of the Microhead Array Chips are extruded and then machined into a triangular-shaped protrusion. After having been machined the Chip placement Keys will protrude "1/16" of an inch from the bottom-center surface of the Microhead Array Chips. The previously mentioned triangular-shaped Chip Placement Keys will position and help secure the Microhead Array Chips into their chip-positioning circuit board's surface mounting chip-socket by fitting the triangular-shaped Chip Placement Keys into their triangular-shaped and correspondingly sized "Chip Placement Keyholes" 92 (FIGS. 30, 32, 35, and 37).

Moreover, the Chip Placement Keyholes in every Microhead Array Chip's surface mounting chip-socket are located at the top-center surface of the bottom-center plane of surface mounting chipsocket device 92 (FIGS. 30, 32, 35, and 37). The previously mentioned Chip Placement Keyholes will have the apex of their triangle shaped keyholes pointed toward the front end 92 of the chip-positioning circuit board assembly. Moreover, by using the two threaded Microhead Array Chip's surface mounting chip-socket hex-screws 2 (FIGS. 1, 6, 7, and 8); pushing them through the Microhead Array Chip's surface mounting chip-socket hex-screw holes 3 (FIGS. 1, 6, 7, 8, 25, 26, 27, and 28) and threading them into the Microhead Array Chips surface mounting chip-socket's threaded hex-screw mounting holes 93 (FIGS. 30, 32, 35, and 37), while turning them in a clockwise-direction until the surface mounting chip-socket hex-screws have reached a specified torque. This is how all of the chip-positioning circuit board's surface mounting chip-sockets will keep their Microhead Array Chips tightly seated and secured onto each chip-positioning circuit board's surface designated with the location placement of a Microhead Array Chip.

In addition, the Polymer flex-cable connectors 67, as illustrated in FIGS. 1, 2, 3, 6, 9, 10, 29, 30, 31, 32, 33, 34, 35, 36, and 37, connect to the Microhead Array Chip's chip-positioning circuit boards through open-circuit contact-points at the bottom-edge of their connector-housings 25, 47 (FIGS. 1, 2, 3, 6, 9, and 10). These contact-points will make a connection with the Microhead Array Chip chip-positioning circuit board's 27 (FIGS. 1, 2, 3, 6, 9, and 10) sixty-four copper circuit traces 21, 22,23,24 (FIGS. 1, 6, 29, 30, 31, 32, 34, 35, 36, and 37). Moreover, the previously mentioned Polymer flex-cable connectors 67 are bolted down onto their chip-positioning circuit boards 27 (FIGS. 1, 2, and 3) with two Polymer flex-cable connector's hex-screws 37 (FIGS. 1, 2, and 3). The Polymer flex-cables 43, 30 (FIGS. 1, 6, 9, 10, 15, and 16) when inserted into the chip-positioning circuit board's flex-cable connectors 67 are held into place by a group of spring-contacts 28, 45 (FIG. 1), (FIG. 2), (FIG. 6), (FIG. 10); moreover, connecting Polymer flex-cable 43, 30 substrate copper circuit traces to the circuit traces 21, 22, 23, 24 (FIGS. 1, 6, 29, 30, 31, 32, 34, 35, 36, and 37) that are located on the Microhead Array Chip's chip-positioning circuit boards 27 (FIGS. 1, 2, 3, 6, 9, and 10). Moreover, each Polymer flex-cable connector connects to an adjoining connector on the other side of a chip-positioning circuit board through a group of pin-connector holes 27, which are drilled through the chip-positioning circuit boards for the placement of thirty-two tiny micro-plugs that have a smaller diameter size then the holes they will connect through; thereby, avoiding any problems with short-circuits caused from any contact with the chip-positioning circuit board's Titanium metal core 26, 46 (FIGS. 1 and 6). The previously mentioned thirty-two micro-plugs will connect the top and bottom portions of the chip-positioning circuit board's spring-contact Polymer flex-cable connectors to one another, making a closed circuit through the chip-positioning circuit boards structure and core materials.

Figure 33:
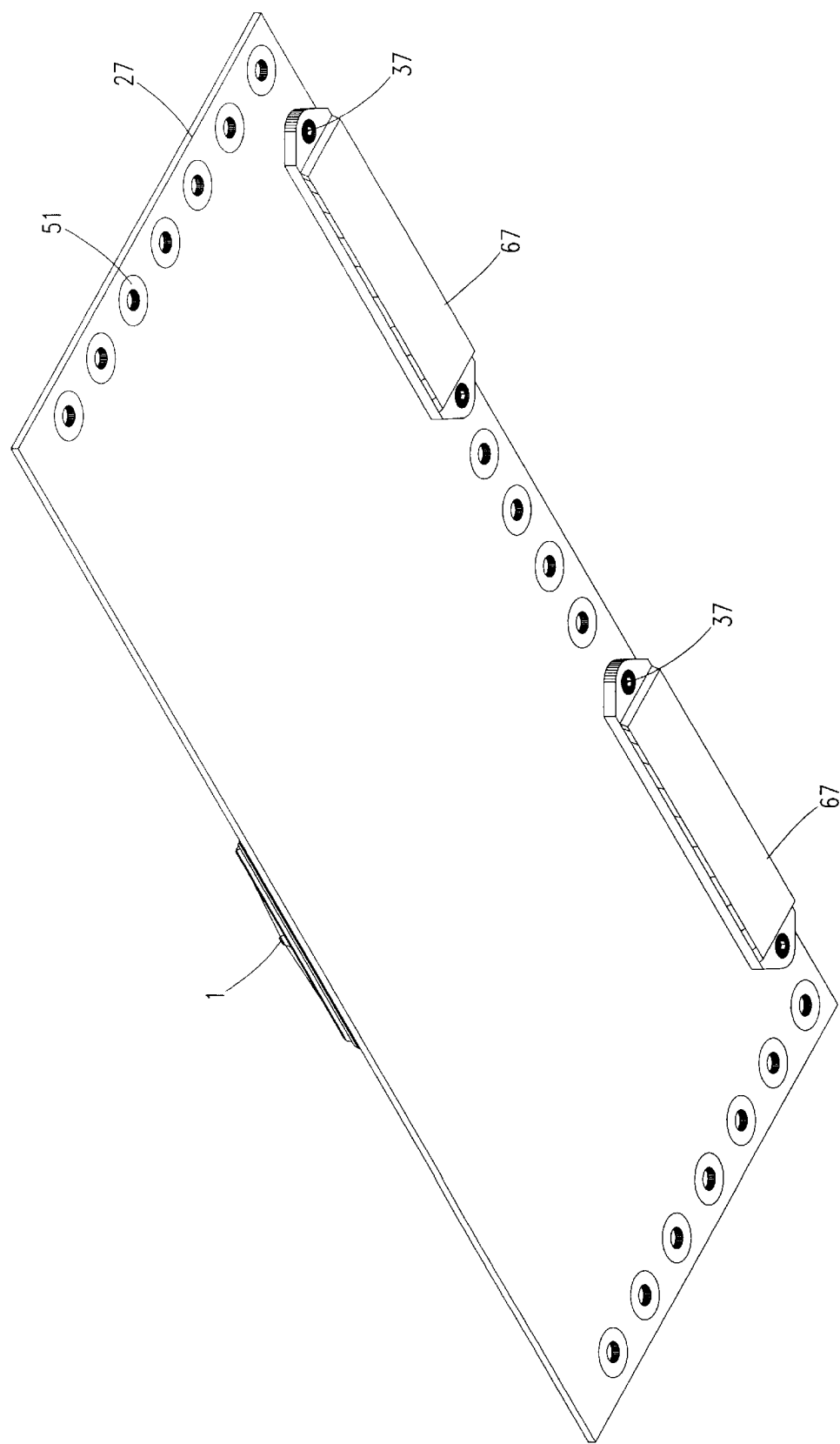
FIG. 33 shows a 3D bottom front-view of the first disk-platter's chip-positioning circuit board assembly for a magnetic Microhead Array Chip design, illustrated with the Microhead Array Chip as installed.
Figure 34:
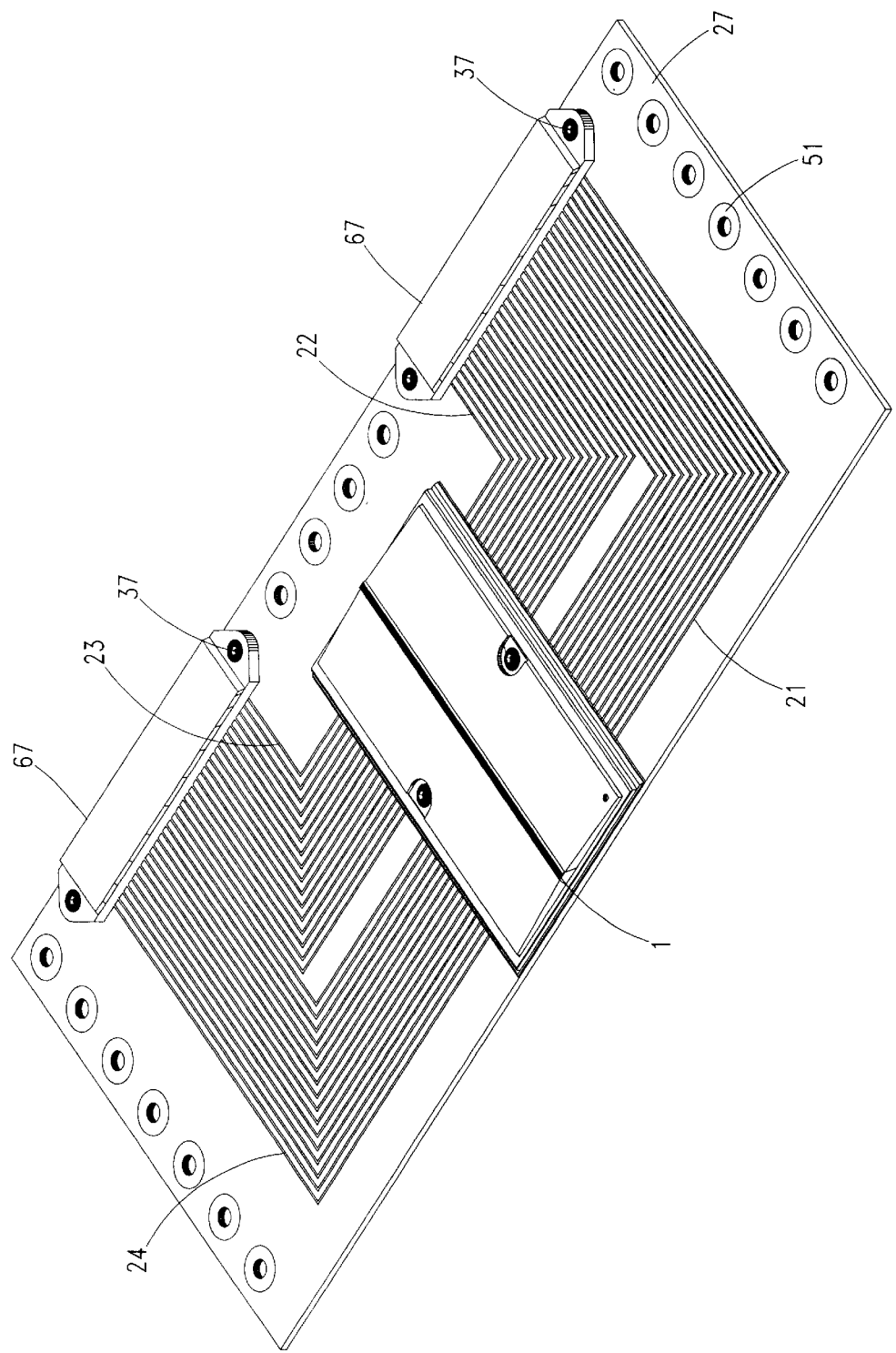
FIG. 34 shows a 3D top front-view of the first disk-platter's chip-positioning circuit board assembly a magnetic Microhead Array Chip design, illustrated with the Microhead Array Chip as installed.

In addition, the first Microhead Array Chip chip-positioning circuit board, like the one illustrated in FIGS. 33, 34, and 35, will be positioned at and attached to the hard disk drive casting-base 12 (FIGS. 1, 2, and 3) chip-positioning circuit board's mounting pedestals 61, 64 (FIGS. 2, 3, and 117). Furthermore, when viewed with the front-end of the Microhead Array Chip Hard Disk Drive turned vertically up into the Y-position of Cartesian coordinates or what is sometimes called a portrait position. The Polymer flex-cable connectors 34 (FIGS. 1 and 6), 67 (FIGS. 9 and 10) and the Polymer flex-cables 36 (FIGS. 1, 6, 10, and 15), which are located on the right-hand side of installed chip-positioning circuit boards, and dedicated to the Microhead Array Chips' Power, Ground, Data I/O, and Control bus systems. The previously mentioned Polymer flex-cables and Polymer flex-cable connectors, which are located on the right-hand side of all installed chip-positioning circuit boards used within a Microhead Array Chip Hard Disk Drive's unit assembly (FIG. 117) will create a circuit connection between the Microhead Array Chip's chip-connecting contact-points 7, 8 (FIGS. 7, 8, 26, and 27) and the Disk Controller's PCB. Remembering that the Microhead Array Chip Disk Controller's PCB is positioned under the Microhead Array Chip Hard Disk Drive's Spindle Motor unit assembly at the bottom of the casting-base 12 (FIGS. 1, 2, and 3).

Moreover, when viewed with the front-end of the Microhead Array Chip Hard Disk Drive turned vertically up into the Y-position of Cartesian coordinates or what is sometimes called a portrait position. The Polymer flex-cable connectors 40 (FIGS. 1 and 6) 67 (FIGS. 9 and 10) and the Polymer flex-cables 38 (FIGS. 1, 6, 10, and 16), which are located on the left-hand side of installed chip-positioning circuit boards, and dedicated to the Microhead Array Chip's 32-bit Address-bus system. The previously mentioned Polymer flex-cables and Polymer flex-cable connectors, which are located on the left-hand side of all the installed chip-positioning circuit boards used within Microhead Array Chip Hard Disk Drive's unit assembly (FIG. 117) will create a circuit connection between the Microhead Array Chips' chip-connecting contact-points 9, 10 (FIGS. 7, 8, 26, and 27) and the Disk Controller's PCB assembly. Remembering that the Microhead Array Chip Disk Controller's PCB assembly is positioned under the Microhead Array Chip Hard Disk Drive's Spindle Motor unit assembly, at the bottom of the casting-base 12 (FIGS. 1, 2, and 3).

Furthermore, the two main Polymer flex-cable connectors that connect the chip-positioning circuit board assemblies to the Disk Controller's PCB assemblies 34, 40 (FIGS. 1, 6, and 10) are called female bridge-connectors. Wherein each female bridge-connector's top plug portion consists of a 32-bit spring-contact Polymer flex-cable connector 33, 41 (FIGS. 1, 2, and 3), which is located on the bottom-inside surface of the casting-base toward and next to the back of the Microhead Array Chip Hard Disk Drive's unit assembly 12 (FIGS. 1, 2, and 3). While each female bridge-connector's bottom plug portion consists of a 32-pin micro-plug female-connector 33, 41 (FIGS. 1, 2, and 3), which is located on the bottom-outside surface of the Microhead Array Chip Hard Disk Drive's casting-base facing toward and next to the back of the Microhead Array Chip Hard Disk Drive's unit assembly 12 (FIGS. 1, 2, and 3). Moreover, the two female bridge-connectors are used for connecting the Microhead Array Chip's chip-positioning circuit boards to the Disk Controller's two 32-pin micro-plug male connectors 65, 69 (FIG. 4) 77, 79 (FIG. 5), which are located at the top-surface of the Disk Controller's PCB assembly, and facing toward the Spindle-Motor's flanged mounting-base, as illustrated in FIGS. 1, 2, and 3.

Moreover, the top plug portion of the previously mentioned female bridge-connectors 34, 40 (FIGS. 1 and 6) consist of the same type of Polymer flex-cable spring-contact connector plugs 35, 39 (FIGS. 1, 2, and 3) that are used in the chip-positioning circuit board's Polymer flex-cable connectors 67 (FIGS. 1, 2, and 3). Wherein, each female bridge-connector 34, 40 (FIGS. 1, 6, 10, and 117) will have a sealing gasket 31, 42 (FIGS. 1, 6, and 10), which is used for sealing the Microhead Array Chip Hard Disk Drive's interior from both outside air and dust. Moreover, there are four sealing gaskets, two for the right, and the left top plug portions of the two female bridge-connectors, and two for the right and the left bottom plug portions of the two female bridge-connectors 31, 42 (FIGS. 1, 2, 3, 6, 10, and 117). The previously mentioned gaskets will seal both the top and bottom portions of the female bridge-connectors as well as the hard disk drive's interior 34, 40, 33, 41 (FIGS. 1, 2, and 3). The previously mentioned female bridge-connectors are fastened to the Microhead Array Chip Hard Disk Drive's casting-base 12 (FIGS. 1, 2, and 3) with two threaded bridge-connector hex-screws 32, 43 (FIGS. 1, 2, 3, 6, 9, and 10). The top plug portions of the previously mentioned female bridge-connectors 34, 40 (FIGS. 1 and 6) are used to connect with the two main Microhead Array Chip's Polymer system-bus flex-cables 36, 38 (FIGS. 1, 6, 10, 15, 16, and 117).

Furthermore, the Microhead Array Chip's two main Polymer system-bus flex-cables will connect from the two female bridge-connectors at the bottom inside of the Microhead Array Chip Hard Disk Drive's casting-base 12 to the first chip-positioning circuit board's two bottom Polymer flex-cable connectors 67 (FIGS. 2 and 10). The first chip-positioning circuit board of the Microhead Array Chip Hard Disk Drive's unit assembly is put into position by eighteen "Titanium" alloy circuit-board spacers 66 (FIG. 3), and the casting-base's eighteen hex-screw bolt-pedestals 61, 64 (FIGS. 1, 2, and 3). In addition, there will also be eighteen circuit board spacers for each proceeding chip-positioning circuit board needing to be installed into the Microhead Array Chip Hard Disk Drive's unit assembly; moreover, with the last chip-positioning circuit board assembly (FIGS. 2, 3, 36, 37, 38, and 117) locked into place 66 (FIGS. 1, 2, 3, and 117) using the same eighteen chip-positioning circuit board spacers and same eighteen chip-positioning circuit board hex-screws 50 (FIGS. 1, 2, 3, and 117). Moreover, installed through the fifth and last chip-positioning circuit board's top hex-screw holes 51 the chip-positioning circuit board hex-screws 50 are subsequently inserted through all of the chip-positioning circuit board's spacers and spacer holes 66 (FIGS. 1, 2, 3, and 117) passing the previously mentioned hex-screws 50 through all of the chip-positioning circuit board's embossed bolt-flange hex-screw holes 51 (FIGS. 1, 2, 3, and 6). Next, threading them into the casting-base's eighteen hex-screw bolt-pedestals 61, 64 (FIGS. 1, 2, and 3), which are located at the inside-bottom surface of the Microhead Array Chip Hard Disk Drive's component mounting casting-base, as illustrated by FIG. 117; moreover, securing all of the chip-positioning circuit boards of the Microhead Array Chip Hard Disk Drive into their final installation and stationary positions (FIGS. 1, 2, 3, and 117).

Moreover, as illustrated by FIGS. 33, 34, and 35 the first chip-positioning circuit board of the Microhead Array Chip design puts a top-installed "Bottom Surface Microhead Array Chip" (FIG. 28) into a stationary position over disk-platter one data-surface one. In addition, the first chip-positioning circuit board will have its two bottom-most Polymer flex-cable connectors located closest to the Microhead Array Chip Hard Disk Drive's casting-base 36,38 (FIGS. 1, 6, 15, 16, and 117). Moreover, by using the two main system-bus Polymer flex-cables 36, 38 (FIGS. 1, 2, and 117), and the first chip-positioning circuit board's bottom two 32-bit spring-contact flex-cable connectors 36, 38 (FIGS. 1, 6, 15, and 16) the Microhead Array Chip Hard Disk Drive's design parallel-connects all of its chip-positioning circuit board assemblies into the two female bridge-connectors that are located at the inside-bottom surface of the Microhead Array Chip Hard Disk Drive's casting-base 34, 40 (FIGS. 1 and 6). The two female bridge-connectors also connect to the Disk Controller's two 32-pin male mini-plug connectors located on its PCB 65, 69 (FIG. 4) 77, 79 (FIG. 5) through two rectangular shaped holes in the casting-base's 12 component mounting surface next to the back of the Microhead Array Chip Hard Disk Drive's unit assembly.

Moreover, as illustrated by FIGS. 29, 30, 31, and 32 the second chip-positioning circuit board of the Microhead Array Chip design, which is a "Between Disk-Platter" chip-positioning circuit board, puts a bottom-installed "Top Surface Microhead Array Chip" (FIG. 25) into a stationary position over disk-platter one data-surface two; moreover, while putting a bottom-installed Bottom Surface Microhead Array Chip (FIG. 28) into a stationary position over disk-platter two data-surface one. In addition, the second chip-positioning circuit board's bottom two Polymer flex-cables 30, 43 (FIGS. 1, 2, 3, and 117) connect to the first chip-positioning circuit board's top two 32-bit Polymer flex-cable spring-contact connectors. Moreover, this is the beginning of a daisy chain bus-system for all of the installed Microhead Array Chips and their chip-positioning circuit board assemblies.

Moreover, as illustrated by FIGS. 29, 30, 31, and 32 the third chip-positioning circuit board of the Microhead Array Chip design, which is also a Between Disk-Platter chip-positioning circuit board, puts a bottom-installed Top Surface Microhead Array Chip (FIG. 25) into a stationary position over disk-platter two data-surface two; moreover, while putting a top-installed Bottom Surface Microhead Array Chip (FIG. 28) into a stationary position over disk-platter three's data-surface one. In addition, the third chip-positioning circuit board's bottom two Polymer flex-cables 30, 43 (FIGS. 1, 2, 3, and 117) connect to the chip-positioning circuit board's top two 32-bit flex-cable spring-contact connectors.

Moreover, as illustrated by FIGS. 29, 30, 31, and 32 the fourth chip-positioning circuit board of the Microhead Array Chip design, which is also a Between Disk-Platter circuit board, puts a bottom-installed Top Surface Microhead Array Chip (FIG. 25) into a stationary position over disk-platter three data-surface two; moreover, while putting a top-installed Bottom Surface Microhead Array Chip (FIG. 28) into a stationary position over disk-platter four data-surface one. In addition, the fourth Microhead Array Chip chip-positioning circuit board's bottom two Polymer flex-cables 30, 43 (FIGS. 1, 2, 3, and 117) connect to the third Microhead Array Chip chip-positioning circuit board's top two 32-bit flex-cable spring-contact connectors.

Moreover, as illustrated by FIGS. 29, 30, 31, and 32 the fifth and last chip-positioning circuit board of the Microhead Array Chip design puts a bottom-installed Top Surface Microhead Array Chip (FIG. 25) into a stationary position over disk-platter four data-surface two. In addition, the fifth Microhead Array Chip chip-positioning circuit board's bottom two Polymer flex-cables 30, 43 (FIGS. 1, 2, 3, and 117) connect to the fourth Microhead Array Chip chip-positioning circuit board's top two 32-bit flex-cable spring-contact connectors. Moreover, the last two top-connectors 29, 44 (FIGS. 1, 2, 3, 6, and 117) are not really Polymer flex-cable connectors at all, but are in reality Polymer flex-cable connector termination-caps. The connector termination-caps are located on the topside surface of the fifth and last chip-positioning circuit board of the Microhead Array Chip design. In addition, the fastening of the fifth chip-positioning circuit board's two connector termination-caps to the board's top surface is accomplished with four flex-cable connector hex-screws 37 (FIGS. 1, 2, 3, 6, 9, 10, and 117).

Moreover, every chip-positioning circuit board of the Microhead Array Chip design is connected to the next and higher-up chip-positioning circuit board with two Polymer flex-cables 30, 43 (FIGS. 1, 2, 3, and 117). In addition, all of the chip-positioning circuit boards of the Microhead Array Chip design are connected together in a daisy chain system bus-cable configuration. Moreover, the chip-positioning circuit boards of the Microhead Array Chip design are daisy chained starting from the casting-base female bridge-connectors 34, 40 (FIGS. 1, 6, and 10) to the fifth and last chip-positioning circuit board installed into the Microhead Array Chip Hard Disk Drive's unit assembly, as illustrated by FIGS. 1, 2, 3 and 117. Furthermore, the chip-positioning circuit boards used within Microhead Array Chip Hard Disk Drive design along with their daisy chain system bus-cable configurations will truly simplify the Microhead Array Chip Hard Disk Drive's manufacturing, upgrading, and repair.

Figure 4:
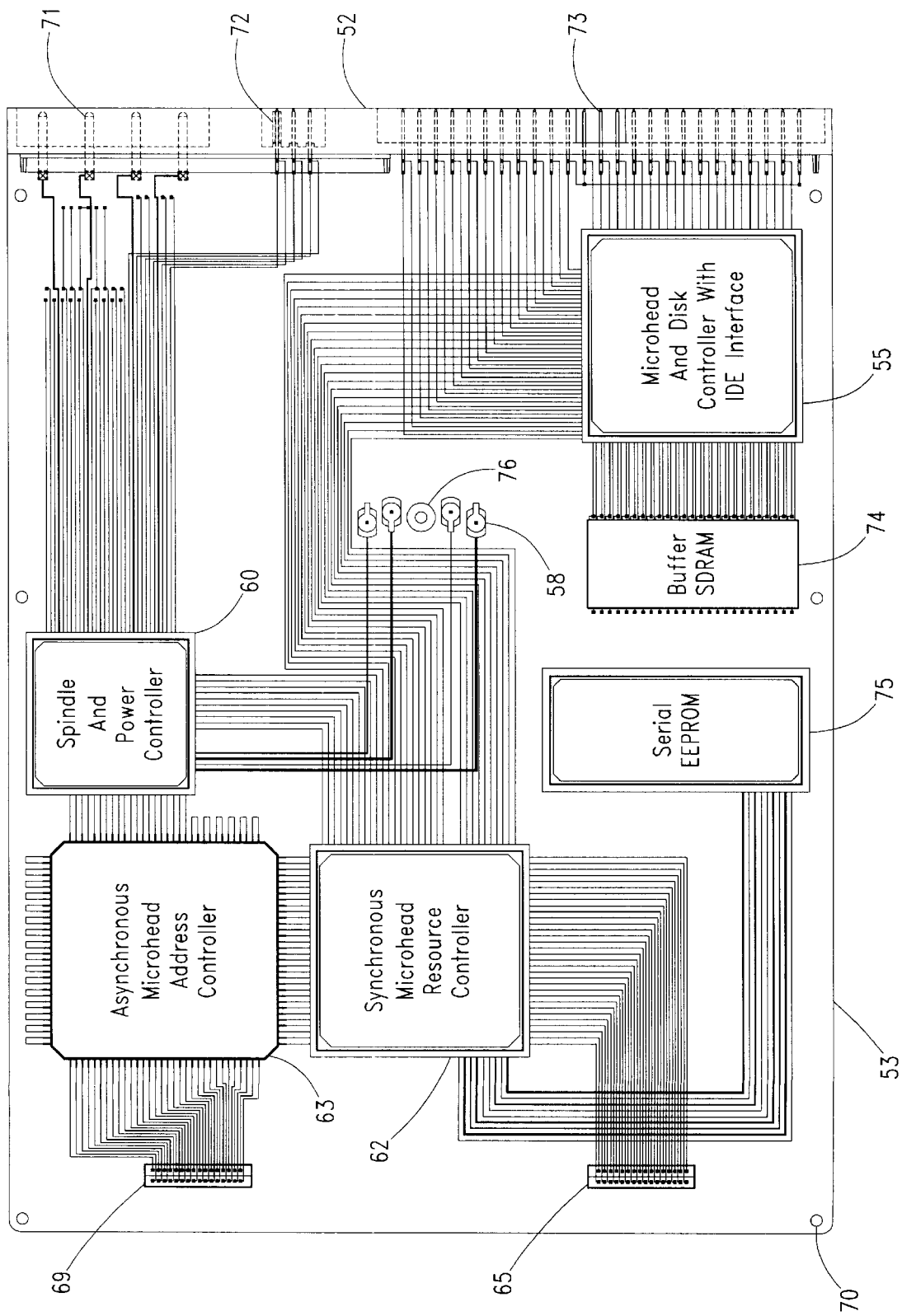
FIG. 4 shows an orthographic plan-view of an ATA-2 IDE Disk Controller PCB for a magnetic Microhead Array Chip design.
Figure 5:
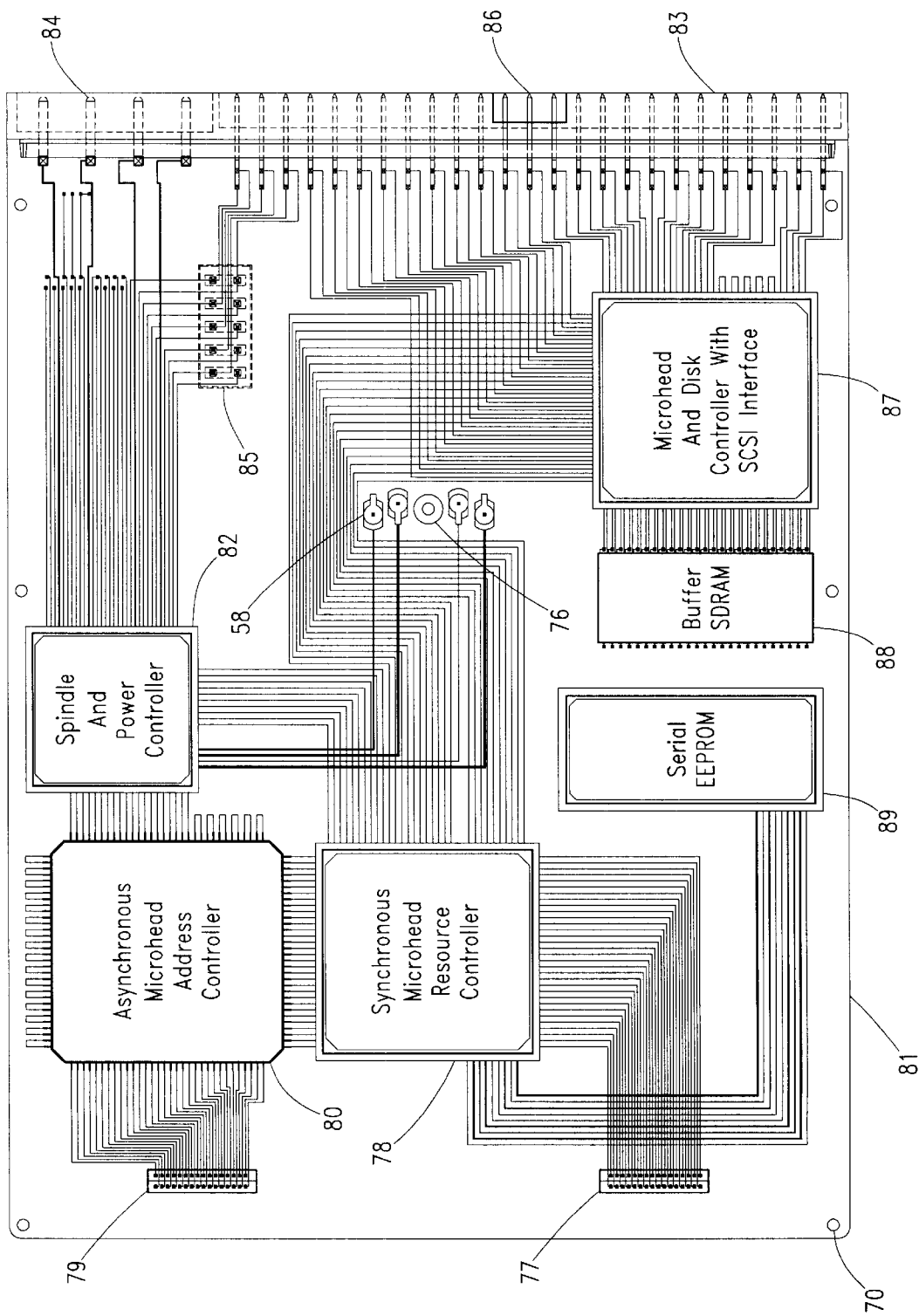
FIG. 5 shows an orthographic plan-view of a SCSI Disk Controller PCB for a magnetic Microhead Array Chip design.

In addition, the Disk Controller PCB assemblies used in the Microhead Array Chip Hard Disk Drive design 53 (FIGS. 2, 3, and 4) 81 (FIG. 5) are located at the bottom-inside surface of the Microhead Array Chip Hard Disk Drive's casting-base 12 (FIGS. 1, 2, and 3), and connect to all of the Microhead Array Chip Hard Disk Drive's Microhead Array Chips and their chip-positioning circuit boards through the PCB's two 32-pin male mini-plug connectors 65, 69 (FIG. 4) 77, 79 (FIG. 5). The PCB's two 32-pin male mini-plug connectors 65, 69 (FIG. 4) 77, 79 (FIG. 5) connect to two 32-pin female mini-plug bridge-connectors, which are located at the bottom-outside surface of the Microhead Array Chip Hard Disk Drive's casting-base. The Disk Controller PCB is attached to the Microhead Array Chip Hard Disk Drive's casting-base with six PCB mounting hex-screws 54 (FIG. 2 and 3). Moreover, the previously mentioned hex-screws are inserted through the Disk Controller PCB's hex-screw holes 70 (FIG. 4) 76 (FIG. 5), and threaded into the PCB's mounting hex-screw holes 16 of the Microhead Array Chip Hard Disk Drive's casting-base 12 (FIGS. 1, 2, and 3).

In addition, the Disk Controller's PCB assembly used in the Microhead Array Chip Hard Disk Drive has attached at its center four metal circuit-contacts 58 (FIGS. 4, and 5). The circuit-contacts 58 are used by the Spindle And Power Controller's driver circuitry to communtate with the Disk Controller's PCB. Furthermore, when the Disk Controller's PCB assembly is installed onto the Microhead Array Chip Hard Disk Drive's casting-base 12 the previously mentioned circuit-contacts 58 will make contact with additional circuit-contacts located on a Polymer circuit-trace substrate cable at the bottom of the Spindle-Motor's stator housing 59 (FIGS. 1, 2, and 3); moreover, making a connection with the Spindle And Power Controller's driver circuitry. Moreover, by using monitoring signals two-way communication is executed through the previously mentioned circuit-contacts 58 (FIGS. 1, 2, 3, 4, and 5); moreover, giving control over the Spindle-Motor and its velocity. Moreover, this two-way communication occurs between the Spindle-Motor's Polymer circuit-trace substrate cable and the Disk Controller PCB's circuit-contacts 53 (FIGS. 2, 3, 4, and 5), and back again to the Spindle-Motor 59 (FIGS. 1, 2, and 3).

Figure 60A:
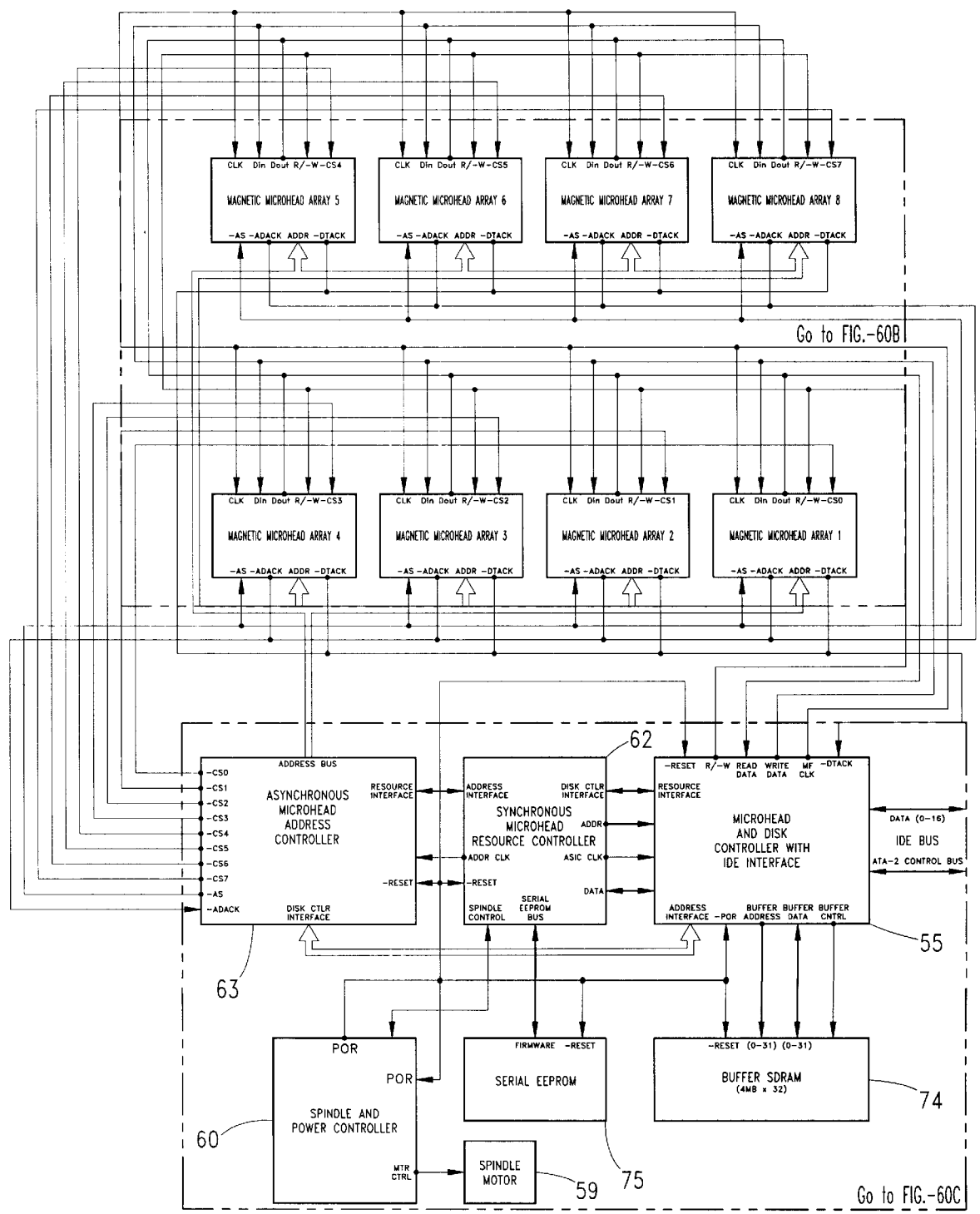
FIG. 60A shows a block-diagram for the ATA-2 IDE Disk Controller for a magnetic Microhead Array Chip design, displaying the location-key for block-diagram details.
Figure 60B:
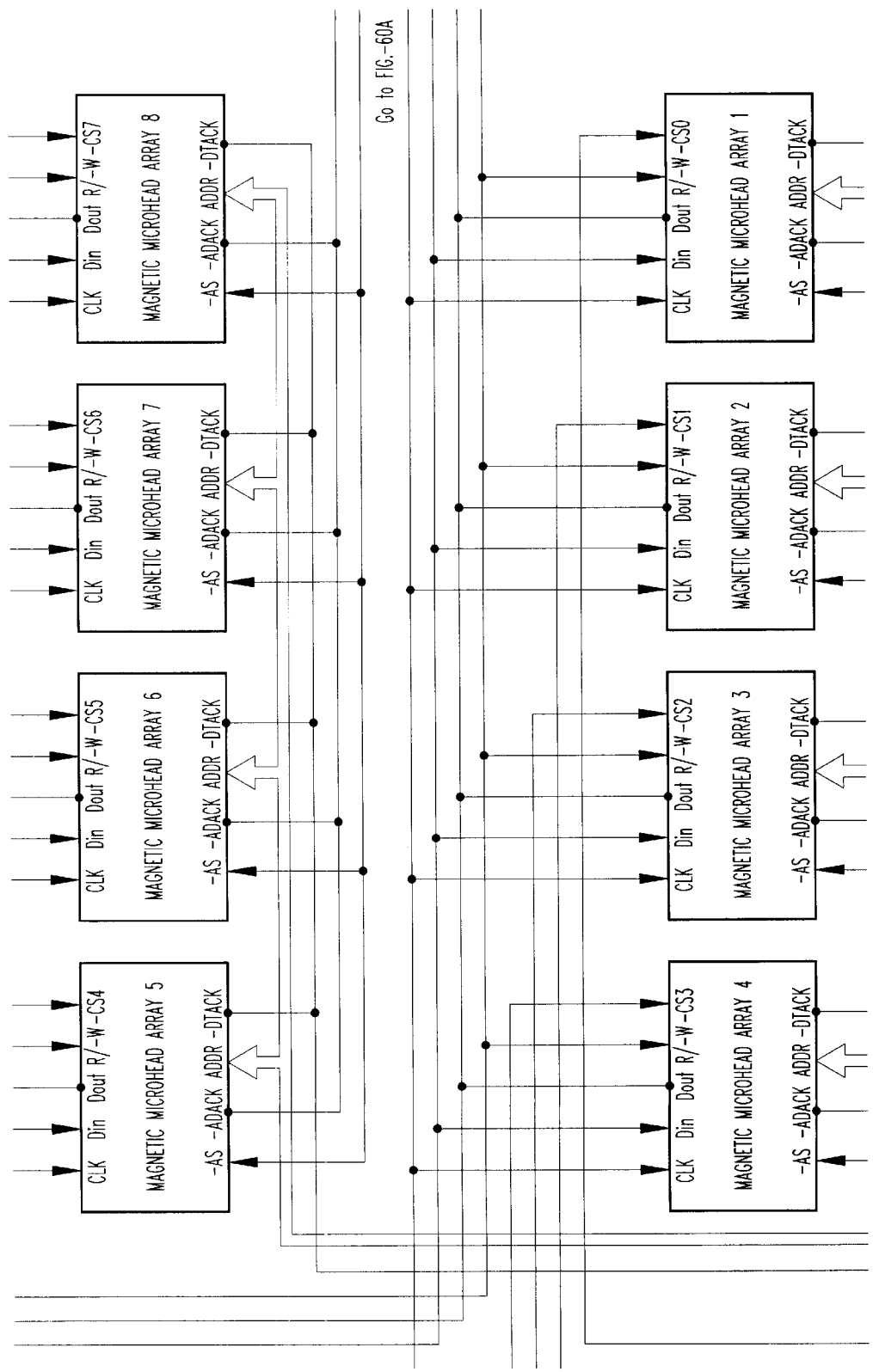
FIG. 60B shows a detailed enlargement block-diagram for the ATA-2 IDE Disk Controller for a magnetic Microhead Array Chip design, displaying top-portion details of diagram 60A.
Figure 60C:
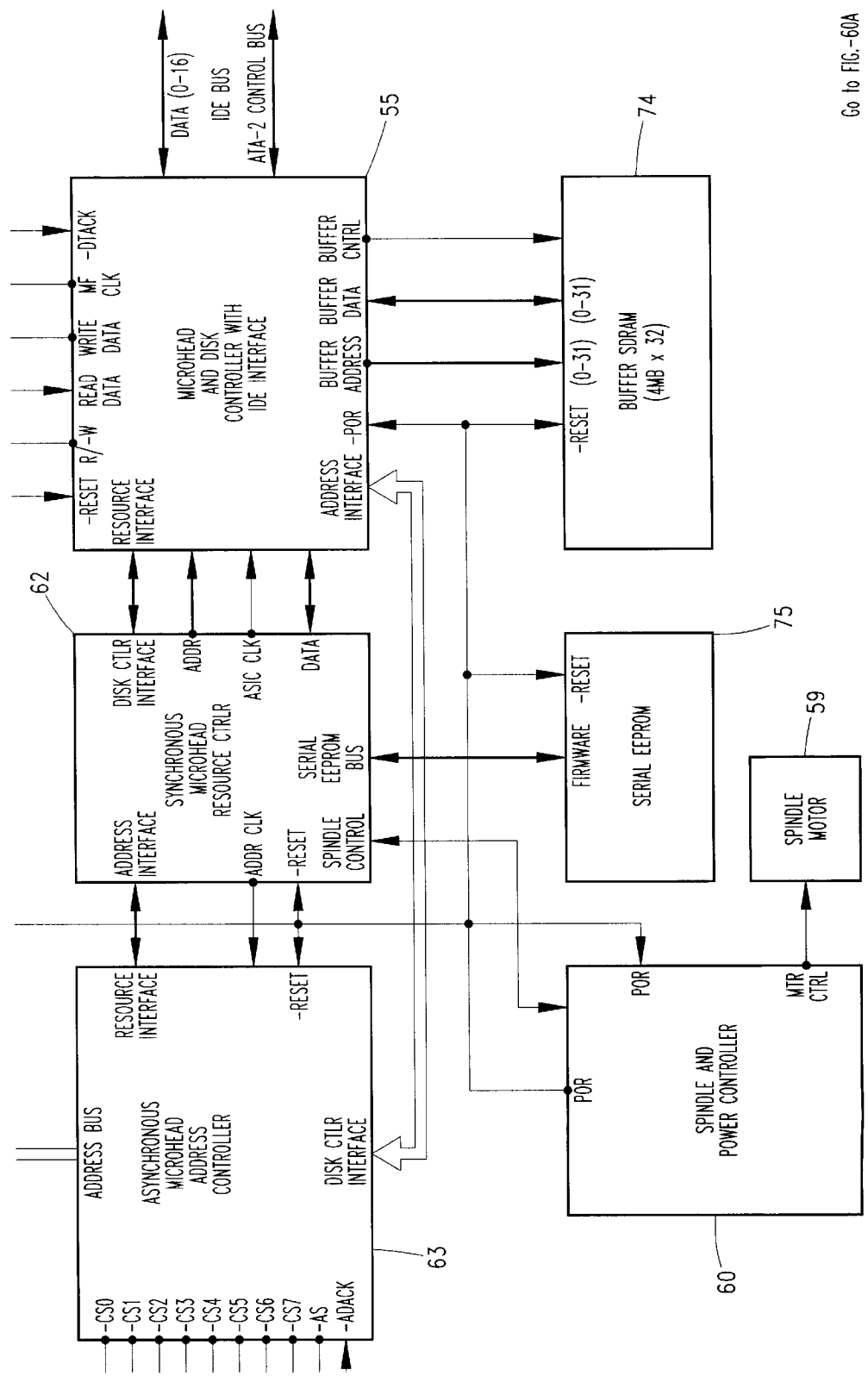
FIG. 60C shows a detailed enlargement block-diagram for the ATA-2 IDE Disk Controller for a magnetic Microhead Array Chip design, displaying bottom-portion details of diagram 60A.
Figure 61A:
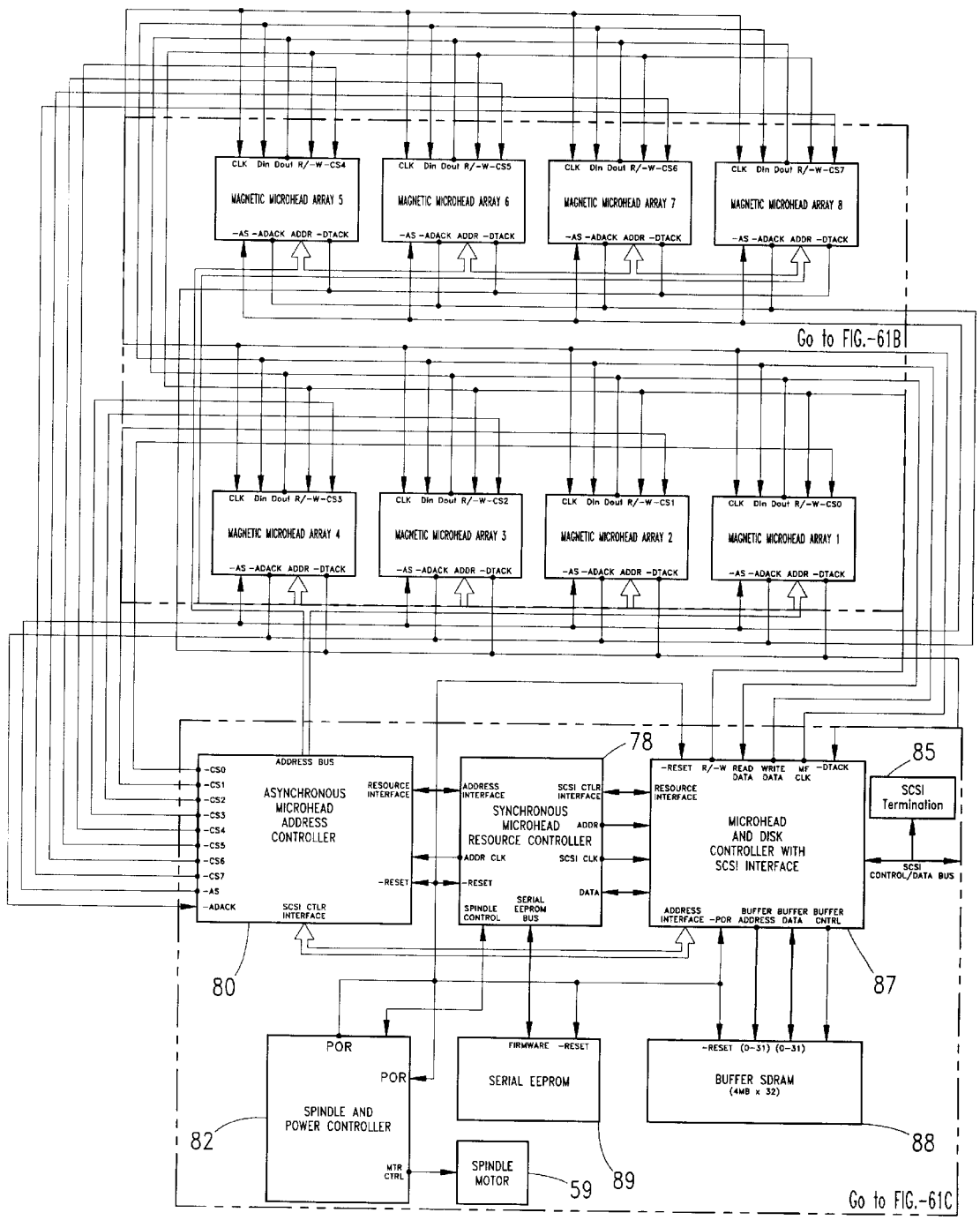
FIG. 61A shows a block-diagram for the SCSI Disk Controller for a magnetic Microhead Array Chip design, displaying the location-key for block-diagram details.
Figure 61C:
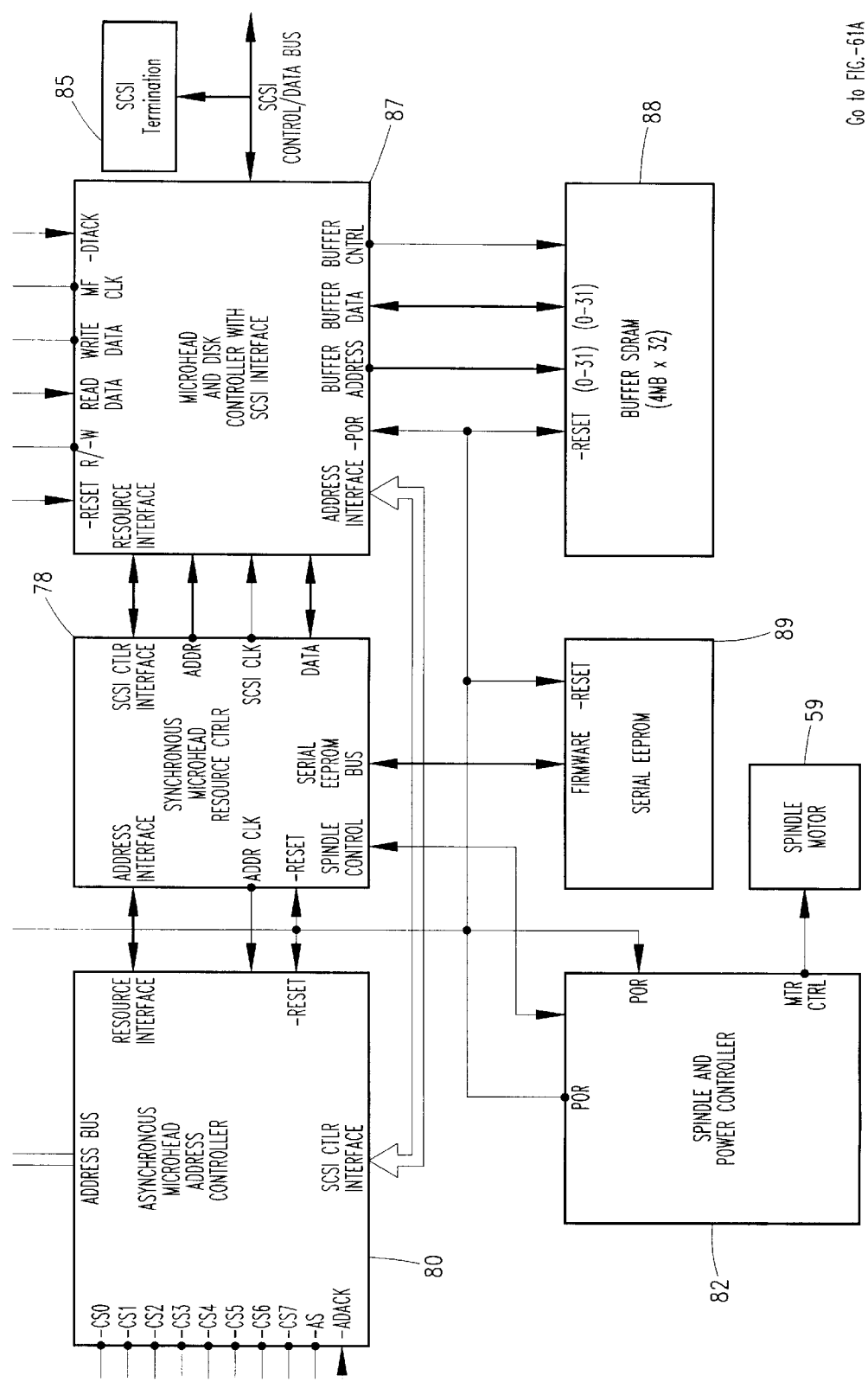
FIG. 61C shows a detailed enlargement of a block-diagram for the SCSI Disk Controller used in the magnetic Microhead Array Chip design, displaying bottom-portion details of diagram 61 A.

In addition, the Disk Controller PCB assemblies used in the Microhead Array Chip Hard Disk Drive contain most of the Microhead Array Chip Hard Disk Drive's electronics and consists of four main (VLSI) "Very Large Scale Integration" surface-mounted processors. Furthermore, the four VLSI components include, either an IDE bus interface (FIG. 4), or a SCSI bus interface (FIG. 5), which reside on the Disk Controller's (PCB) "Printed Circuit Board" assembly. Moreover, the Microhead Array Chip Hard Disk Drive's electronics involving microhead addressing, microhead selecting, microhead switching, reading and writing pre-amplifiers, microhead data encoders and decoders, and microhead write drivers are all built into the Microhead Array Chips themselves. Furthermore, integration between Microhead Array Chip Microhead Arrays and Microhead Array support circuitry significantly improves the signal-to-noise ratio of Read Channel output signals of the Microhead Array Chips. The previously mentioned Read Channel output signals are transported from the Microhead Array Chips to the Disk Controller's Sequencer through data bus-lines. Moreover, block diagrams are used to show the connectivity and the relationships that exist between the fully integrated Microhead Array Chips and the Microhead Array Chip Hard Disk Drive Disk Controller's four VLSI system processors. Furthermore, the previously mentioned block diagrams are illustrated in FIGS. 60A, 60B, and 60C for the Microhead Array Chip Hard Disk Drive's IDE bus design, and are illustrated in FIGS. 61A, 61B, and 61C for the Microhead Array Chip Hard Disk Drive's SCSI bus design.

Moreover, the "Synchronous Microhead Resource Controllers" for the IDE bus design 62 (FIG. 4) and for the SCSI bus design 78 (FIG. 5), will provide, under program control, local processor services to PCB electronics of the Microhead Array Chip Hard Disk Drive. Furthermore, the Synchronous Microhead Resource Controllers 62, 78 (FIGS. 4 and 5) manage the resources of the various PCB units that are installed in a Disk Controller. In addition, the various PCB units are the "Microhead And Disk Controller With a IDE or SCSI Interface" 55, 87 (FIGS. 4 and 5), the "Spindle And Power Controller" 60, 82 (FIGS. 4 and 5), the "Asynchronous Microhead Address Controller" 63, 80 (FIGS. 4 and 5), the "Serial EEPROM" 75, 89 (FIGS. 4 and 5), and the "Buffer SDRAM" 74, 88 (FIGS. 4 and 5). The Resource Controllers will communicate serially with a Serial EEPROM firmware chip 75, 89 (FIGS. 4 and 5) containing program code. Moreover, a Resource Controller will execute program code to complete hard disk drive power-on-resets, hard disk drive spin-ups, and hard disk drive re-calibration procedures. In addition, a Resource Controller will also read additional control-code from one of the Microhead Array Chip Hard Disk Drive's disk-platters and store it in the Disk Controller's memory buffer (SDRAM) "Synchronous Dynamic Random Access Memory" during hard disk drive operations 74, 88 (FIGS. 4 and 5). Furthermore, the previously mentioned code is called (Opcode) "Operational Code", and is used in much the same way as a host-computer's processor would use a disk stored operating system. Moreover, the Resource Controllers used in both PCB designs run as synchronous devices within a PCB Disk Controller 55, 87 (FIGS. 4 and 5). The Serial EEPROMs used in both PCB designs will also run as synchronous devices, along with SDRAM 74, 88 (FIGS. 4 and 5) buffer addressing, SDRAM data I/O bus control, and SDRAM control bus operations. Moreover, the Microhead And Disk Controllers With IDE or SCSI Interfaces 55, 87 (FIGS. 4 and 5) will provide control functions to the hard disk drives under the direction of their Resource Controllers 62, 78 (FIGS. 4 and 5).

Figure 62A:
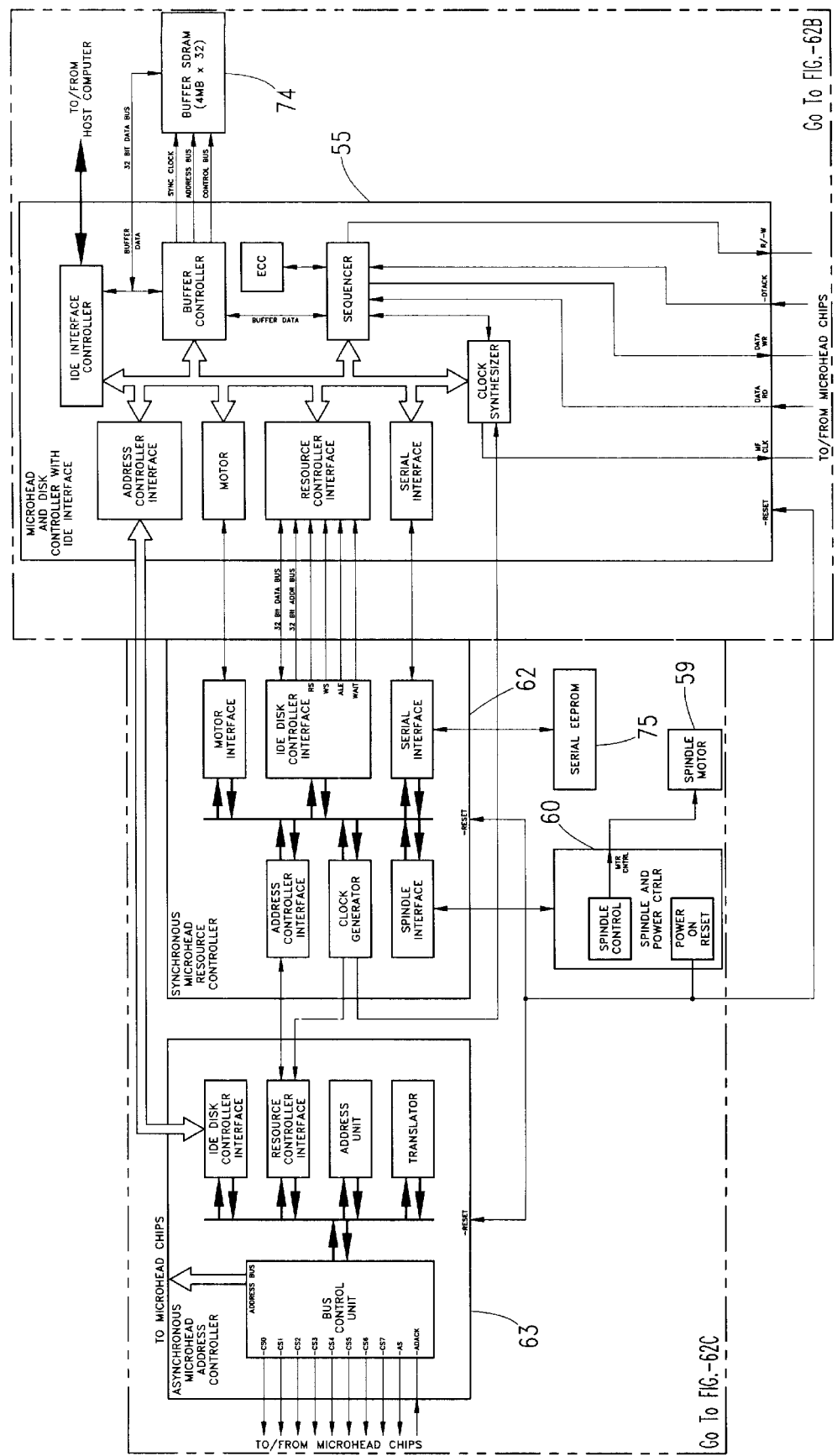
FIG. 62A shows an internal component block-diagram for the ATA-2 IDE Disk Controller used in the magnetic Microhead Array Chip design, displaying the location-key for block-diagram details.
Figure 62B:
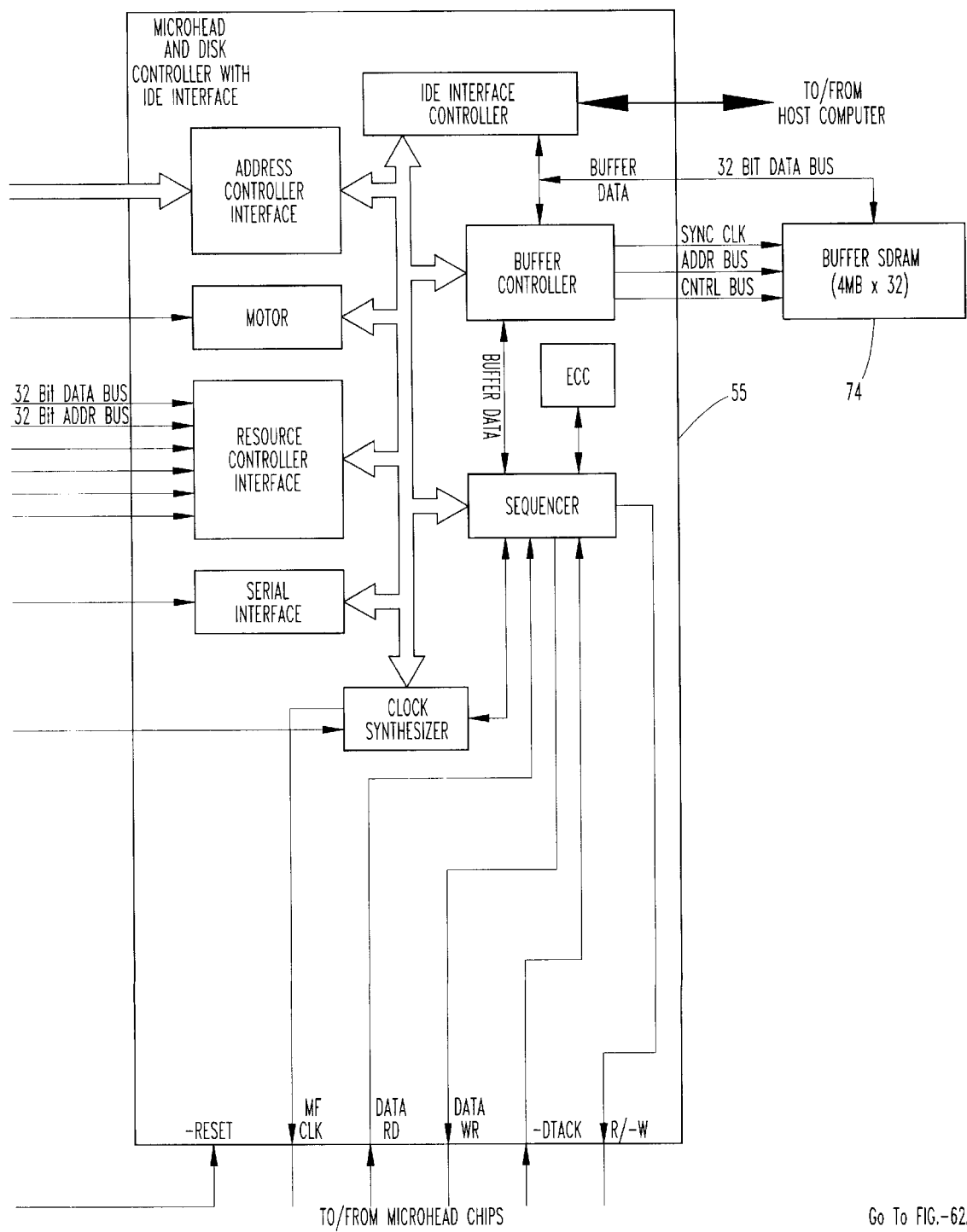
FIG. 62B shows a detailed enlargement of an internal component block-diagram for the ATA-2 IDE Disk Controller used in the magnetic Microhead Array Chip design, displaying top-portion details of diagram 62A.
Figure 62C:
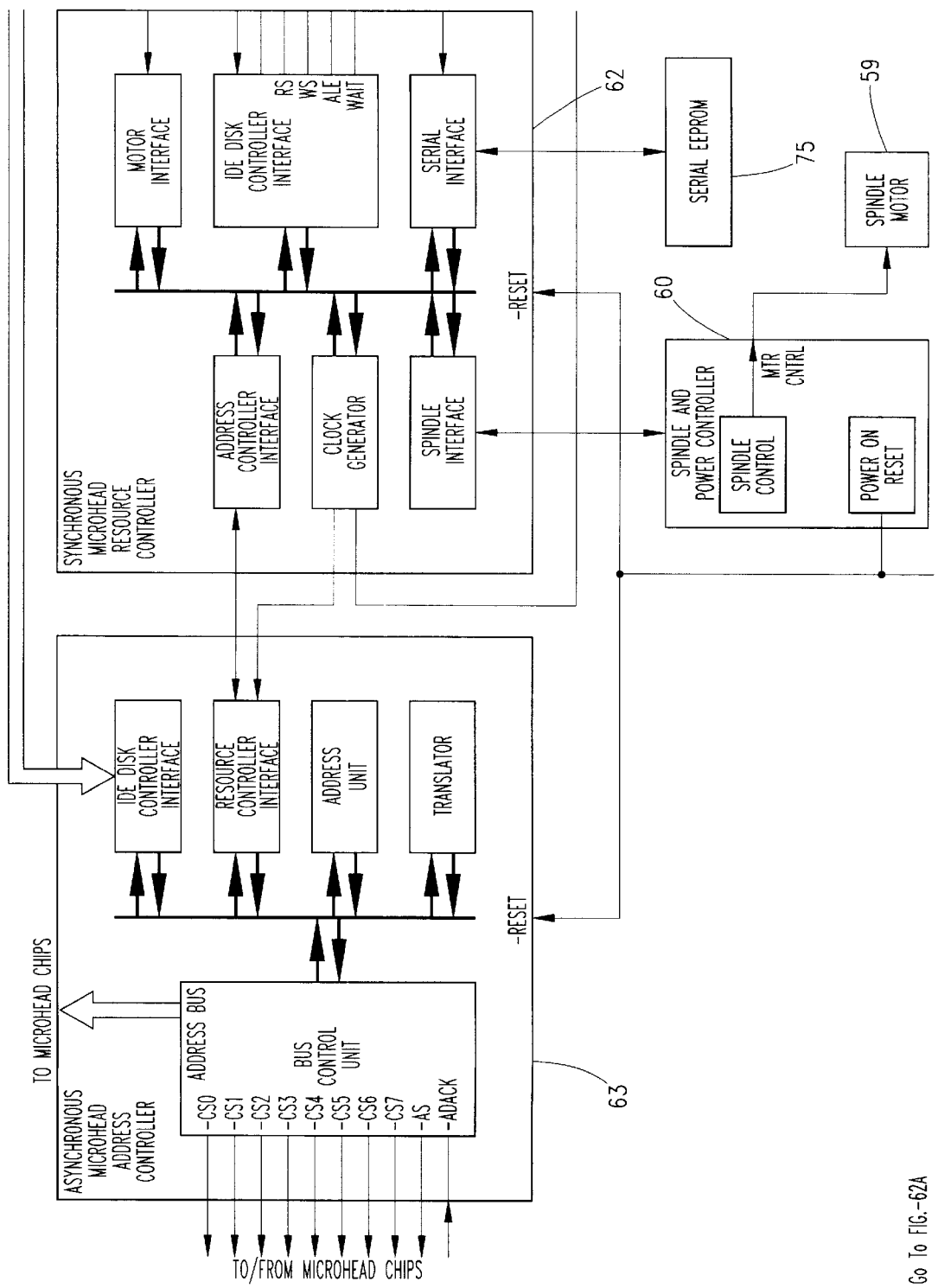
FIG. 62C shows a detailed enlargement of an internal component block-diagram for the ATA-2 IDE Disk Controller used in the magnetic Microhead Array Chip design, displaying bottom-portion details of diagram 62A.
Figure 63A:
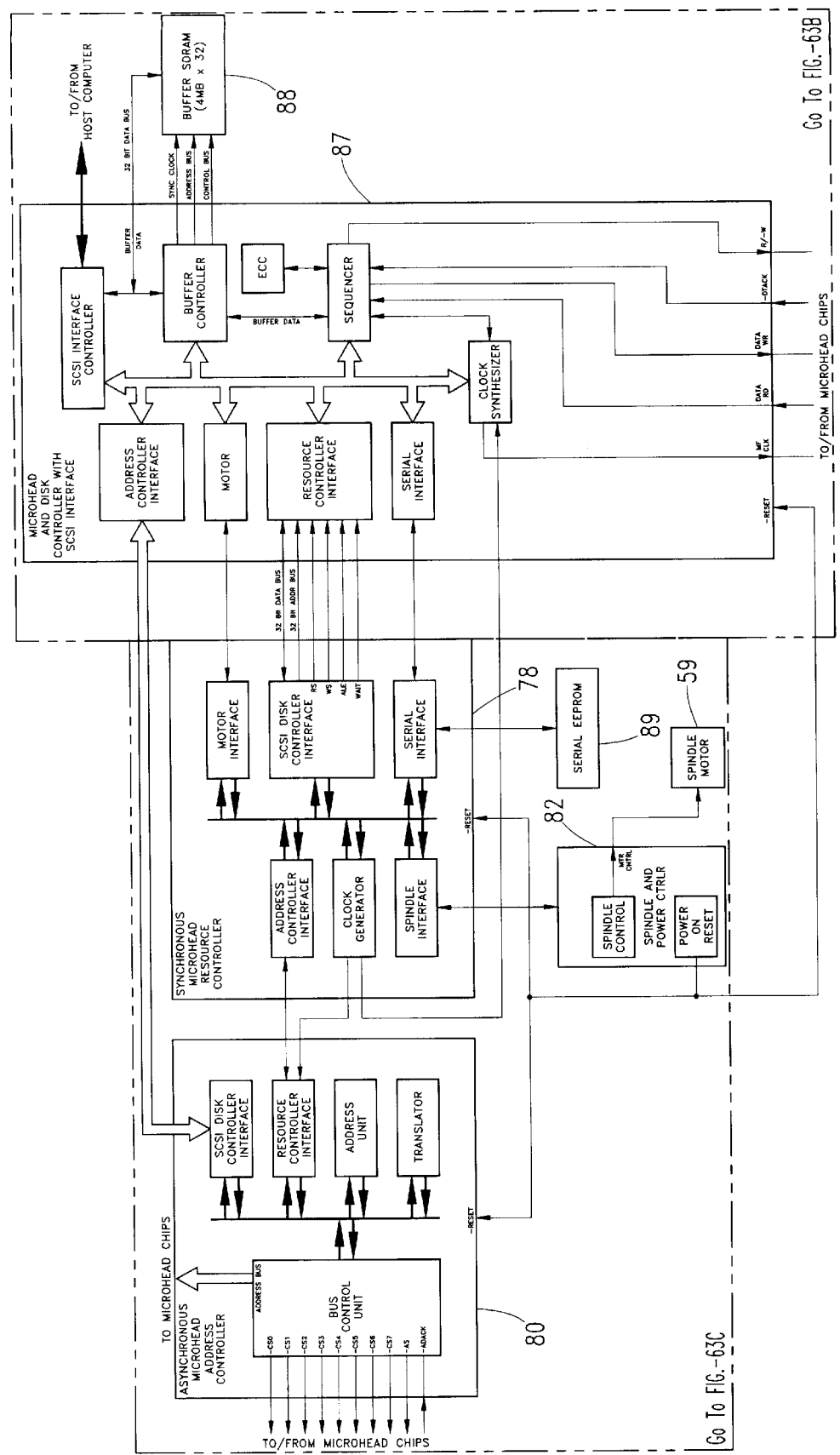
FIG. 63A shows an internal component block-diagram for the SCSI Disk Controller used in the magnetic ad Array Chip design, displaying the location-key for block-diagram details.
Figure 63B:
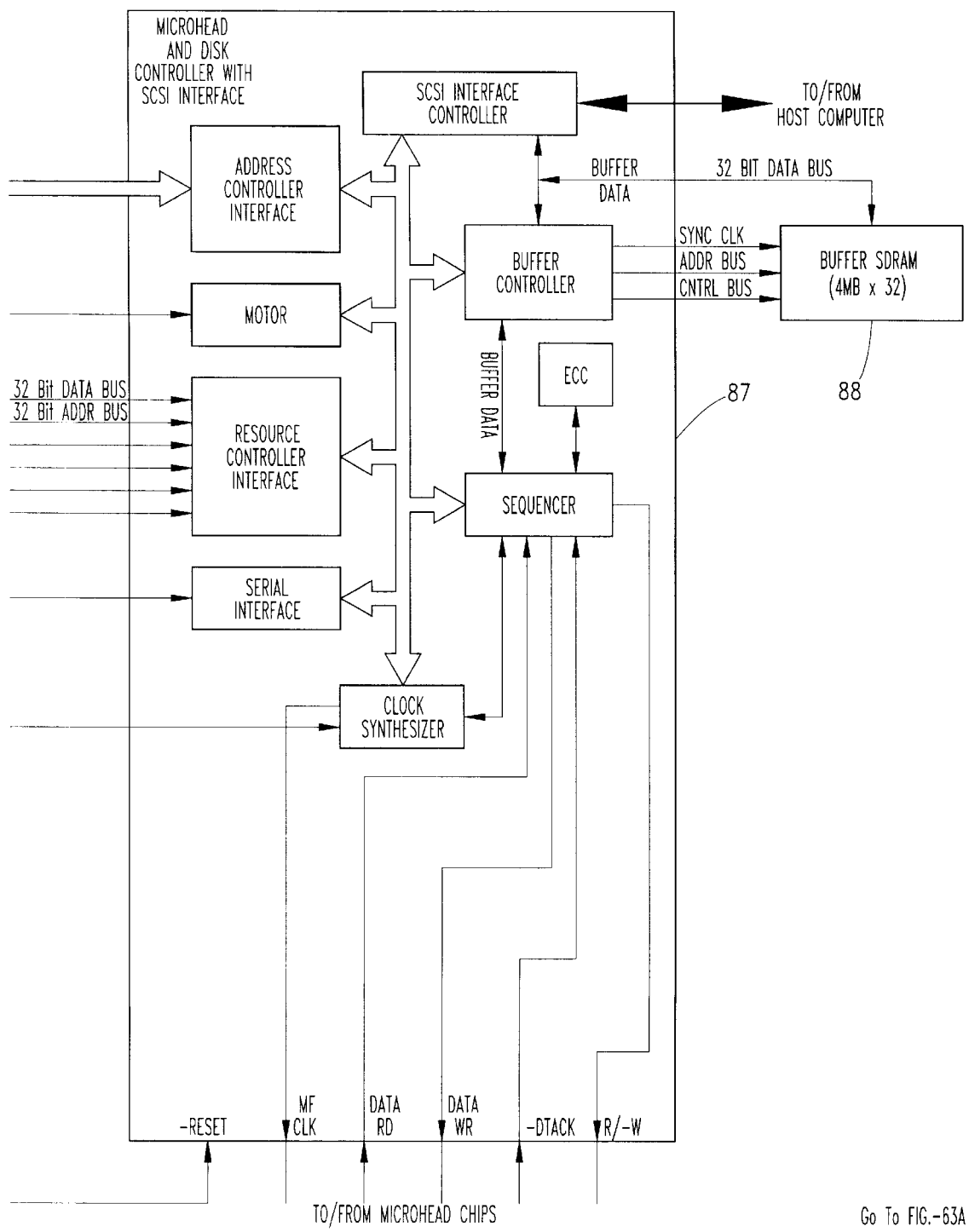
FIG. 63B shows a detailed enlargement of an internal component block-diagram for the SCSI Disk Controller used in the magnetic Microhead Array Chip design, displaying top-portion details of diagram 63A.
Figure 63C:
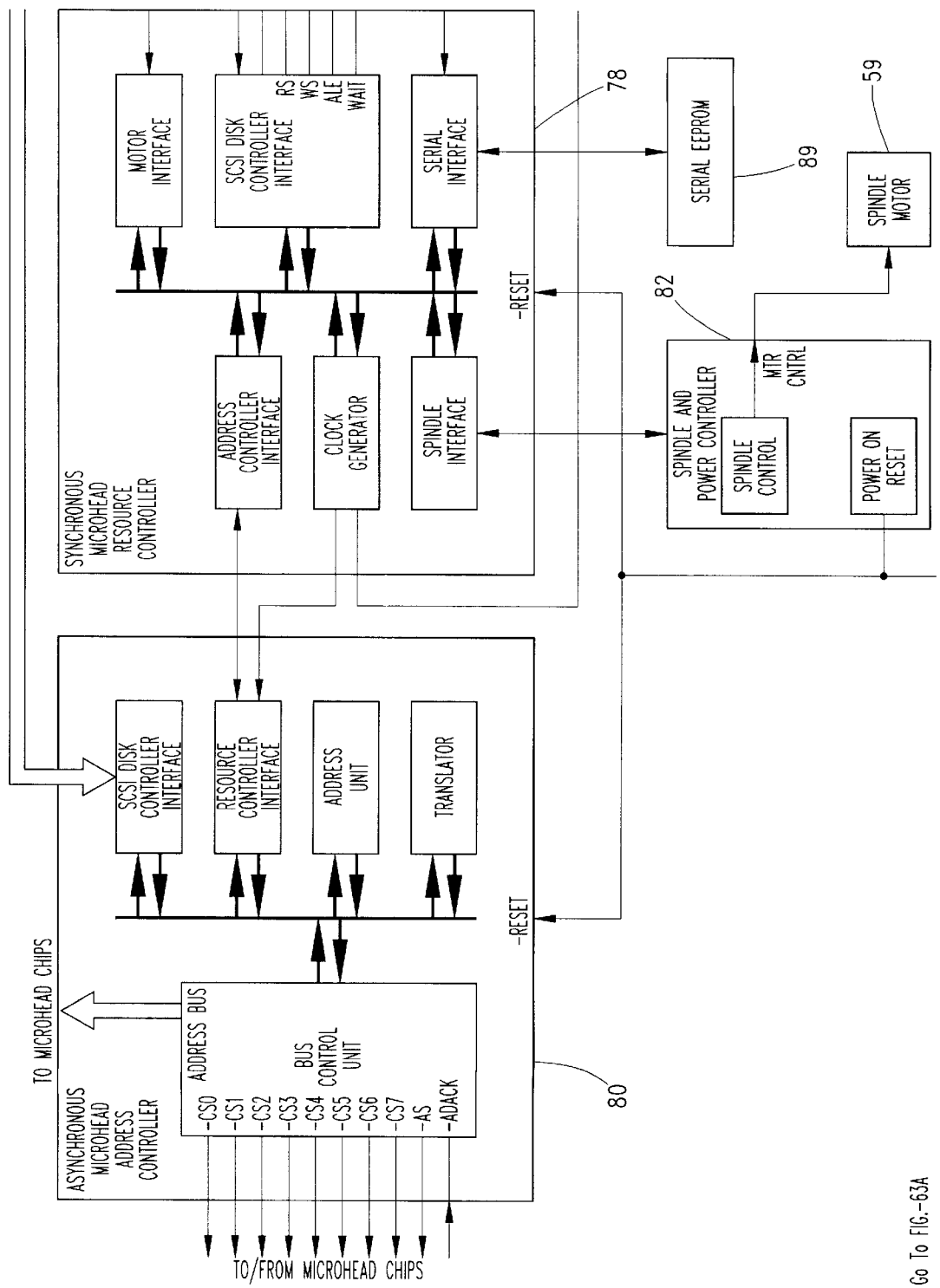
FIG. 63C shows a detailed enlargement of an internal component block-diagram for the SCSI Disk Controller used in the magnetic Microhead Array Chip design, displaying bottom-portion details of diagram 63A.

In addition, as illustrated by FIGS. 62A, 62B, and 62C the printed circuit board for the Disk Controller with the "IDE Interface" bus design (FIG. 4) has block-diagrams that illustrate its component modules and their connectivity. In addition, as illustrated by FIGS. 63A, 63B, and 63C the printed circuit board for the Disk Controller with the "SCSI Interface" bus design (FIG. 5) has block-diagrams that illustrate its component modules and their connectivity. Furthermore, the previously mentioned block-diagrams will illustrate how each of the Disk Controllers' internal modules connect and communicate with one another to form and facilitate a complete printed circuit board Disk Controller system. The PCB Disk Controller with the IDE bus design (FIG. 4) has an (ECC) "Error Correction Control" built into its Microhead And Disk Controller With IDE Interface 55 (FIGS. 4, 62A, 62B, and 62C). The PCB Disk Controller with the SCSI bus design (FIG. 5) also has an (ECC) Error Correction Control built into its Microhead And Disk Controller With SCSI Interface 87 (FIGS. 5, 63A, 63B, and 63C). Furthermore, the Error Correction Code used in both Disk Controllers uses a Reed-Solomon encoder/decoder circuit, which is used during either read-data or write-data disk operations.

In addition, as illustrated by FIGS. 62A, 62B, and 62C the PCB Disk Controller with the IDE bus design has a "Sequencer" (i.e., sometimes called a Data-Formatter) 55 (FIG. 4) built into its Microhead And Disk Controller With IDE Interface. In addition, as illustrated by FIGS. 63A, 63B, and 63C the PCB Disk Controller with the SCSI bus design also has a Sequencer 87 (FIG. 5) built into its Microhead And Disk Controller With SCSI Interface. Moreover, the Sequencer 55, 87 (FIG. 4 and 5) controls the operation of the Read Channel and Write Channel portions of the Disk Controllers. To initiate a disk-operation the Resource Controller 62 (FIGS. 4, 62A, and 62C) 78 (FIGS. 5, 63A, and 63C) will load a set of commands into a "Writable Control Store Register", where the loading and manipulating of this register is done through the Resource Controller's Interface registers. In addition, as illustrated by FIGS. 60A, 60B, 60C, 61A, 61B, and 61C the Sequencer 55, 87 (FIG. 4 and 5) directly controls the (R/-W) "Read and Write Enable" output line, the (-DTACK) "Data Acknowledge" input line, and the (MF CLK) "Multiple Frequency Clock" output line. Furthermore, the Sequencer 55, 87 (FIG. 4 and 5) also controls the (DATA RD) "Data Read" input line and (DATA WR) "Data Write" output line. Furthermore, as illustrated by FIGS. 62A, 63A, 62B, 63B, 62C, and 63C, during a read-data disk operation, when a particular data-zone, which is located on a Microhead Array Chip Hard Disk Drive's disk-platter needs to be read, its the Sequencer's (DPLL) "Digital Phased-Locked Loop" circuit that is used to calculate the optimal transfer-rate for that particular data-zone. In addition, the "Clock Synthesizer" or multi-frequency clock-circuit commutes with the (VCO) "Voltage-Controlled Oscillator", which is built into the Sequencer's DPLL circuit and controlled by the Sequencer. The Disk Controller's Sequencer 55, 87 (FIG. 4 and 5) also encodes all write-data going out over the data bus-line as transfer-rated Bi-Phase Mark Encoded Data streams. Moreover, as illustrated by FIGS. 64A, 64E, 65A, and 65C the previously mentioned encoding scheme will be used to execute magnetic reversals in a Write Channel's "Write Driver Circuit" for a selected Microhead Array Chips during write-data disk operations.

Moreover, the write-data bus-line, which connects to a pre-selected Microhead Array Chip, is the Write Channel's data-conduit for encoded write-data that is being copied to an addressed data-sector for the purpose of data-storage. Furthermore, the PCB Disk Controller with the IDE bus design (FIG. 4) will have a "Buffer Controller" built into its Microhead And Disk Controller With IDE Interface 55 (FIGS. 4, 62A, 62B, and 62C). In addition, the PCB Disk Controller with the SCSI bus design (FIG. 5) will also have a Buffer Controller built into its Microhead And Disk Controller With SCSI Interface 87 (FIGS. 5, 63A, 63B, and 63C). Moreover, the Buffer Controller, as illustrated in FIGS. 62A, 63A, 62B, 63B, 62C, and 63C will support "4" Mbytes SDRAM buffer-cache. In addition, a 32-bit wide implementation of this buffer-cache will provide a "120" MB/s maximum buffer bandwidth to the Microhead Array Chip Hard Disk Drive's system. In addition, this increased bandwidth will allow the Resource Controller to have direct access to the buffer; eliminating the need for a separate buffer SDRAM controller. Furthermore, the Buffer Controllers will operate under the direction of a Disk Controller's Resource Controller 62, 78 (FIGS. 4 and 5).

In addition, the PCB Disk Controller with the IDE bus design (FIG. 4) will have a "Resource Controller Interface" built into its Microhead And Disk Controller With IDE Interface 55 (FIGS. 4, 62A, 62B, and 62C). In addition, the PCB Disk Controller with the SCSI bus design (FIG. 5) will have a Resource Controller Interface built into its Microhead And Disk Controller With SCSI Interface 87 (FIG. 5, 63A, 63B, and 63C). Furthermore, the Resource Controller Interface, as illustrated in FIGS. 62A, 63A, 62B, 63B, 62C, and 63C will provide the means for the Resource Controllers to read and to write (Opcode) "Operational Code" and data to the Disk Controller's various modules; either to control their operations or to supply them with needed operational information. In addition, the Resource Controller Interface, as illustrated in FIGS. 62A, 63A, 62B, 63B, 62C, and 63C will consist of both physical and logical components. Moreover, the physical components of the Resource Controller Interface will comprise of a 32-bit Address-bus, a 32-bit Data-bus, a (RS) "Read Strobe" line, a (WS) "Write Strobe" line, a (ALE) "Address Latch Enable" line, and a (WAIT) "Wait" control-line. While the logical components of the Resource Controller Interface comprise of internal control and data registers that are accessible to the Disk Controller's Resource Controller. Furthermore, by writing to and reading from these logical registers a Disk Controller's Resource Controller will control and configure the Buffer Controller and the Disk Controller's Sequencer as well.

In addition, the PCB Disk Controller with the IDE bus design (FIG. 4) will have a "Serial Interface" built into its Microhead And Disk Controller With IDE Interface 55 (FIGS. 4, 62A, 62B, and 62C), and built into its Resource Controller as well 62 (FIGS. 4, 62A, 62B, and 62C). In addition, the PCB Disk Controller with the SCSI bus design (FIG. 5) will also have a Serial Interface built into its Microhead And Disk Controller With SCSI Interface 87 (FIGS. 5, 63A, 63B, and 63C), and built into its Resource Controller as well 78 (FIGS. 5, 63A, 63B, and 63C). Furthermore, these Serial Interfaces, as illustrated in FIGS. 62A, 63A, 62B, 63B, 62C, and 63C, will provide a high-speed interface and pathway for firmware code and data. Moreover, the firmware code and data is to be transferred from the Serial EEPROM component 75, 89 (FIGS. 4 and 5) to the Disk Controller 55, 87 (FIGS. 4 and 5); moreover, all under the direction of the Disk Controller's Resource Controller 62, 78 (FIGS. 4 and 5).

In addition, the PCB Disk Controller with the IDE bus design (FIG. 4) will have a "IDE Interface Controller" built into its Microhead And Disk Controller With IDE Interface 55 (FIGS. 4, 62A, 62B, and 62C). In addition, the PCB Disk Controller with the SCSI bus design (FIG. 5) will also have a "SCSI Interface Controller" built into its Microhead And Disk Controller With SCSI Interface 87 (FIGS. 5, 63A, 63B, and 63C). Furthermore, the "IDE & SCSI Interface Controllers", as illustrated in FIGS. 62A, 63A, 62B, 63B, 62C, and 63C will provide the data handling, the bus control, and the transfer management services to and from the IDE & SCSI interfaces. In addition, the Resource Controller 62, 78 (FIGS. 4 and 5) in both the IDE & SCSI Disk Controller designs will accomplish the configuration and control of their interfaces across a 32-bit address-bus, and 32-bit data-bus. However, in both the IDE & SCSI interface designs a Disk Controller's Buffer Controller module will control all data-transfer operations.

In Addition, for the IDE hard disk drive design, interfacing with a host-system is done through a 40-pin IDE interface-connector 52 (FIGS. 4, 62A, 62B, and 62C). Furthermore, the IDE Disk Controller's 55 (FIG. 4) IDE Interface Controller module, as illustrated in FIGS. 62A, 62B, and 62C, implements the IDE interface-logic, while operating under a Resource Controller's processor control. Furthermore, the IDE Disk Controller will receive and transmit words of data over the IDE bus. The IDE Disk Controller's Buffer Controller writes data to or reads data from the SDRAM buffer cache over thirty-two data lines. Furthermore, while under the Resource Controller's direction the IDE Disk Controller 55 (FIG. 4) controls the transfer of data and handles the addressing of the Microhead Array Chip Hard Disk Drive's cache. Moreover, the internal data transfer-rate to and from the Microhead Array Chip Hard Disk Drive's cache will be at "66.66" MB/s. In addition, these high-speed transfer-rates will allow the IDE Disk Controller to communicate over the IDE interface at a PIO data transfer-rate of "13.34" MB/s without using IOREADY "I/O Ready", at a PIO data transfer-rate up to "33.34" MB/s using IOREADY "I/O Ready", or at a DMA transfer-rate of "66.66" MB/s using Ultra DMA. Furthermore, the IDE Disk Controller simultaneously controls disk-to-buffer RAM transfers and microcontroller access to control-code stored in the buffer SDRAM's 74 (FIG. 4) memory during a data transference across the IDE Interface.

In addition, for the SCSI hard disk drive design, interfacing with a host-system is done through a 50-pin SCSI interface-connector 83 (FIGS. 5, 63A, 63B, and 63C). Furthermore, the SCSI Disk Controller's 87 (FIG. 5) SCSI Interface Controller module, as illustrated in FIGS. 63A, 63B, and 63C, implements the SCSI interface logic, while operating under a Resource Controller's processor control. Furthermore, the SCSI Disk Controller will receive and transmit bytes of data over the SCSI bus. The SCSI Disk Controller's Buffer Controller writes data to or reads data from the SDRAM buffer cache over thirty-two data lines. Furthermore, while under the Resource Controller's direction the SCSI Disk Controller 87 (FIG. 5) controls the transfer of data and handles the addressing of the Microhead Array Chip Hard Disk Drive's cache. Moreover, the internal data transfer rate to and from the Microhead Array Chip Hard Disk Drive's cache is "64" MB/s. In addition, this high-speed transfer-rate will allow the SCSI Disk Controller to communicate over the SCSI interface at an asynchronous data transfer-rate of "12" MB/s, or at a synchronous transfer-rate of up to "40" MB/s. In addition, the SCSI Disk Controller simultaneously controls disk-to-buffer RAM transfers and microcontroller access to control-code stored in the buffer SDRAM's 88 (FIG. 5) memory during a data transference across the SCSI Interface. The Microhead Array Chip Hard Disk Drive design uses a serial connected and code containing Firmware chip, which is comprised of a "Flash EEPROM" chip that contains (Opcode) "Operational Code" 75 (FIGS. 4, 62A, and 62C) 89 (FIGS. 5, 63A, and 63C). In addition, the Firmware chip is connected to a Microhead Array Chip Hard Disk Drive's Resource Controller through a high-speed serial connection. Furthermore, this device is programmable and controls various features like disk caching, track-skewing, cylinderskewing, error detection, and error correction.

In addition, caching for the Microhead Array Chip Hard Disk Drives will enhance hard disk drive performance and significantly improve system throughput. Furthermore, through a dynamic caching scheme, like the one featured in the Microhead Array Chip's hard disk drive designs, will make better use of the buffer SDRAM's memory areas 74 (FIGS. 4 and 62C) 88 (FIGS. 5 and 63C). Moreover, with this dynamic caching feature, the buffer's memory space used during a read-data or write-data disk operation will be dynamically allocated and controlled. In addition, the cache will be flexibly divided into several memory segments under program control, with each memory segment containing one cache-entry. Furthermore, a cache-entry will consist of the requested read-data, plus its corresponding prefetch-data. Consequently, dynamic segmentation will allow Microhead Array Chip Hard Disk Drives to make optimum use of their cache memory buffers. Moreover, by allowing the amount of stored data to be increased or decreased, which ever is required; dynamically the dynamic-cache of Microhead Array Chip Hard Disk Drives will anticipate host-system requests for data, and store that data for faster access. Furthermore, when the host-system requests a particular segment of data the Microhead Array Chip Hard Disk Drives' dynamic caching feature will use a prefetch strategy. Moreover, a prefetch strategy that looks ahead and automatically stores the subsequent data from a disk-platter's data-surface into a high-speed buffer SDRAM memory area of the Microhead Array Chip Hard Disk Drive.

Furthermore, if the host-system requests this subsequent-data, the memory buffer SDRAM 74 (FIGS. 4 and 62C) 88 (FIGS. 5 and 63C) is accessed rather than a disk-platter's data-surface. Since, typically fifty-percent or more of all hard disk drive data requests are sequential there is a high-probability that the subsequent-data requested will be located in the high-speed cache. Furthermore, within the Microhead Array Chip Hard Disk Drive this high-speed and cached data can be retrieved for use in "nanoseconds rather than in milliseconds". Consequently, dynamic-cache can provide substantial timesaving during at least half of all hard disk drive data requests. Furthermore, in these instances, dynamic-cache could save most of the transaction time for a hard disk drive of the Microhead Array Chip design by eliminating the "rotational latency delays" that dominate the typical disk transaction. In addition, buffer cache works by continuing to fill its memory areas with adjacent data while transferring any data requested by the host-system. However, unlike a noncaching controller, the hard disk drive controller of the Microhead Array Chip Hard Disk Drive's design will continue read-operations after the requested-data has been transferred to the host-system. Therefore, the previously mentioned read-operations would terminate after a programmed amount of subsequent-data had been read into the dynamic memory segment of the buffer cache.

In addition, the cache memory will consist of (SDRAM) "Synchronous Dynamic Random Access Memory" 74 (FIGS. 4 and 62C) 88 (FIGS. 5 and 63C), which is allocated to hold data. Moreover, data that can be directly accessed by the host-system, by means of the (RDDATA) "Read Data" and the (WRDATA) "Write Data" commands. Furthermore, the buffer cache memory will function as a group of segments with rollover points at the end of each segment. In addition, the unit of data stored will be a logical block (i.e., a multiple of a 512-byte sector). Therefore, all access to the buffer cache memory must be in multiples of "512" byte size sectors. Furthermore, when a (WRDATA) "Write Data" command is executed Microhead Array Chip Hard Disk Drives will store the data to be written in a SDRAM cache buffer 74 (FIGS. 4 and 62C) 88 (FIGS. 5 and 63C). In addition, the Buffer Controller will immediately send a (GDDATA) "Good Data" status-message to the host-system before the data can actually be written to a disk-platter's data-surface. The host-system will then be free to move on to other tasks, such as preparing data for the next data-transfer, without having to wait for the Microhead Array Chip Hard Disk Drive to switch to a different microhead located above the appropriate track, or rotate the disk-platters to the specified sector. Furthermore, while the host-system is preparing data for the next data-transfer, the Microhead Array Chip Hard Disk Drive will immediately write the cached data to a disk-platter's data-sector. Moreover, this will usually complete the write-operation in less than "20" milliseconds after issuing the (GDDATA) Good Data status-message.

Moreover, when writing to the cache, a single-block random write, for example, would require only "3" milliseconds of host-system processing time to execute. Therefore, without the Disk Controller's ability to write to the cache, the same write-operation would have occupied the host-system for about "20" milliseconds. In addition, writing to cache memory dynamically will allow data to be transferred to a Microhead Array Chip Hard Disk Drive in a continuous flow, rather than as individual blocks of data separated by hard disk drive access delays. Furthermore, this is achieved by taking advantage of a Microhead Array Chip Hard Disk Drive's ability to write blocks of data sequentially to a Microhead Array Chip Hard Disk Drive with data-surfaces that where formatted with a "1:1 hard drive interleave". This means that as the last byte of data is transferred out of the write-cache and the selected microhead passes over the next sector of a disk-platter's data-sector the first byte of the next data-block will be transferred, causing no interruption, or delay in the data-transfer process. In addition, the write to cache algorithm fills the cache buffer with new data from the host-system, while simultaneously transferring any data that the host-system had previously stored in the cache to the Microhead Array Chip Hard Disk Drive.

Furthermore, a Microhead Array Chip Hard Disk Drive without some kind of cache optimization would suffer just like a conventional hard disk drive would, from delays during a sequential read, which occur simply because all hard disk drive designs exhibit a "rotational latency". Moreover, even if the selected microhead within that same Microhead Array Chip's Microhead Array were above the desired data-track to be read "rotational latency" would still be a problem. Therefore, cache optimization eliminates a Microhead Array Chip Hard Disk Drive's rotational latency time (i.e., on the average a "7.50" millisecond time period); moreover, when the requested-data resides in the cache. However, the hard disk drives of today must often service requests from multiple processes in a multitasking or multi-user environment. Furthermore, in these instances, while each process might request-data sequentially, a hard disk drive must time-share among all these processes. Moreover, in conventional hard disk drive designs, the data-heads must move from one-track location to another. Therefore, with cache optimization, even if another process interrupts, the hard disk drive will continue to access the data sequentially from its high-speed cache memory. Therefore, in handling multiple processes, and when the desired data resides in the cache, cache memory optimization will achieve its most impressive performance gains, saving on both seek and latency times.

Furthermore, the cache can be flexibly divided into several memory-segments, under program control, with each memory-segment containing one cache-entry. Moreover, a cache-entry would consist of requested read-data along with any corresponding prefetch-data. The requested read-data will take up a certain amount of space in the cache-segment so the corresponding prefetch-data can essentially occupy the rest of the available space within that memory-segment. Other factors determining prefetch size are the maximum and minimum prefetch settings present in a Disk Controller's circuit design. Furthermore, the Microhead Array Chip Hard Disk Drive's prefetch algorithm will dynamically control the actual prefetch value based on the current demands, with consideration for overhead to subsequent commands.

Another Firmware feature incorporated into the hard disk drive design of the Microhead Array Chip is "Track Skewing". Track Skewing reduces the latency time that results from a hard disk drive's switching of a read or writes data-head to access sequential data. Moreover, a track skew is employed in such a way that the next logical sector of data to be accessed will be under the read or write microhead once the microhead switch has been made and that same data is ready to be accessed. In addition, when sequential-data is on the same cylinder, but on a different disk-surface, a microhead switch would be needed. Since sequential microhead switching times are well defined within the Microhead Array Chip Hard Disk Drive design, the sector being addressed can be optimally positioned across track-boundaries to minimize any latency time accrued during a Microhead Array Chip's microhead switch. Another Firmware feature incorporated into the hard disk drive design of the Microhead Array Chip is "Cylinder Skewing". Cylinder Skewing is also used to help minimize the latency time associated with "single-cylinder seeks". Therefore, a cylinder skew is employed in such a way that the next logical sector of data that crosses a cylinder boundary will be positioned on the hard drive's disk-platter, after a single-cylinder seek is performed. In addition, when the Microhead Array Chip Hard Disk Drive is ready to continue accessing data, the sector to be accessed will be positioned directly under the addressed read or write microhead. Therefore, the cylinder skew can take place between the last-sector of data of a cylinder and the first-sector of data of the hard drive disk-platter's next cylinder.

In addition, the Microhead Array Chip Hard Disk Drive design will also incorporate an "ID-less Format" for tracking sector locations across data-surfaces. Moreover, the ID-Less Format has several advantages over the traditional "ID After Wedge" or "ID Before Sector" methods of sector tracking. For example, the lack of an "ID field" written to the hard drive disk-platter data-surfaces will regain approximately 4% of the overall track real-estate present within the Microhead Array Chip Hard Disk Drive's unit assembly. Furthermore, since no ID's have to be read or corrected in case of an error, the drives overall throughput is also increased. Moreover, in ID-Less Formatting of data-sectors, the ID of each sector is not written onto a hard drive disk-platter's data-surface, instead it is stored in a SDRAM's 74 (FIGS. 4 and 62C) 88 (FIGS. 5 and 63C) buffer memory area, called the "Descriptor". In addition, each data-sector will have an associated Descriptor containing the rotational start-time for each sector's disk location. Subsequently, the Descriptor does not have any defect information stored within its memory areas. In addition, Microhead Array Chip Hard Disk Drives will also store a "Defect Map" within the hard disk drive's SDRAM's 74 (FIGS. 4 and 62C) 88 (FIGS. 5 and 63C) buffer memory, but in a separate memory-location away from the Descriptor. Subsequently, for the Microhead Array Chip Hard Disk Drive design the Sequencer section of the Disk Controller will have access to both the Descriptor and the Defect Map listings through requests made to the buffer-block within the Disk Controller. Therefore, only "end user data" and ECC information are actually written to the Microhead Array Chip Hard Disk Drive's disk-platter data-surfaces.

In addition, error detection and correction for the Microhead Array Chip Hard Disk Drive design will become a concern as the Microhead Array Chip Hard Disk Drive's areal densities continue to increase. Moreover, the obtaining of extremely low error-rates will require sophisticated (ECC) "Error Correction Codes". Furthermore, the Microhead Array Chip Hard Disk Drive implements a Reed-Solomon error correction technique to reduce the uncorrectable read-error rates of any data-bits being read. Therefore, when errors do occur, an automatic retry, a double-burst, and a more rigorous triple-burst correction algorithm will enable the correction of any data-sector with three-bursts of four incorrect-bytes each. Furthermore, before invoking the complex triple-burst ECC algorithm the Microhead Array Chip Hard Disk Drive design will always try to recover from an error by attempting to re-read the data correctly. Therefore, this strategy prevents the invoking of correction, on non-repeatable errors. Moreover, each time a data-sector in error is re-read, a set of ECC syndromes has to be computed, and this is a very wasteful use of processing time. Therefore, if the entire syndrome-values equal zero, the data was read with no errors, and the data-sector is transferred to the host-system. However, if any of the syndrome-values do not equal zero, an error has occurred, the syndrome-values are retained, and another re-read is invoked. Furthermore, Non-repeatable errors are usually related to the signal-to-noise ratio of the system and are not due to media-defects.

Furthermore, when sets of syndromes from two consecutive re-reads are the same, a stable-syndrome has been achieved. This event may be significant depending on whether or not the automatic read-reallocation or early-correction features have been enabled within the Microhead Array Chip Hard Disk Drive's unit assembly. In addition, if an early correction feature has been enabled and a stable-syndrome has been achieved, triple-burst ECC correction is applied, and the appropriate message will be transferred to the host-system (e.g., corrected data, etc.). The ECC bit will enable early ECC triple-burst correction if a stable-syndrome has been achieved before all of the re-reads have been exhausted. Therefore, if the automatic read-reallocation feature is enabled, the drive, when encountering triple-burst errors, will attempt to re-read the data. In addition, the Microhead Array Chip Hard Disk Drive design will be equipped with an automatic read-reallocation feature, so any new defective data-sectors can be easily and automatically reallocated for the end-user.

In addition, to accommodate inline-sparing of defective sectors the Microhead Array Chip Hard Disk Drive design will allocate thousands of extra data-sectors to the end of its physical data storage area. Furthermore, in the factory, the media will be scanned for defects, and if a data-sector is found defective, the address of the defective data-sector is added to Microhead Array Chip Hard Disk Drive's Defect Map listing. In addition, data sectors located physically after the defective data-sector will be assigned logical block addresses, so that a sequential ordering of logical blocks can be maintained. Moreover, the inline-sparing technique will be maintained in an attempt to eliminate any slow data-transfers, which result from a single defective data-sector on a cylinder. Subsequently, all factory defective data-sectors will be inline-spared, but if a defective data-sector is found in the field, inline-sparing is not performed on those sectors. Instead, the data-sector is reallocated to an available spare-sector on a nearby cylinder, while its previous sector location is marked as being bad. In addition, there are two different types of Microhead Array Chip designs present within this art:

(i) The Induction Channel Coil Read and Write Element Microhead Array Chip, (ii) The Magnetoresistor Read Element and the Induction Channel Coil Write Element Microhead Array Chip.

Figure 25:
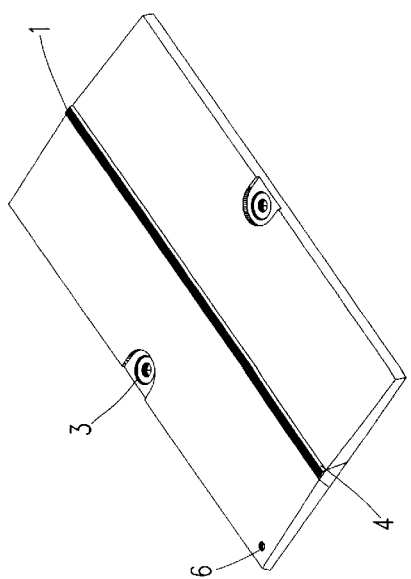
FIG. 25 shows a 3D top-view of a disk-platter's Top Data Surface Microhead Array Chip for a magnetic Microhead Array Chip design.
Figure 28:
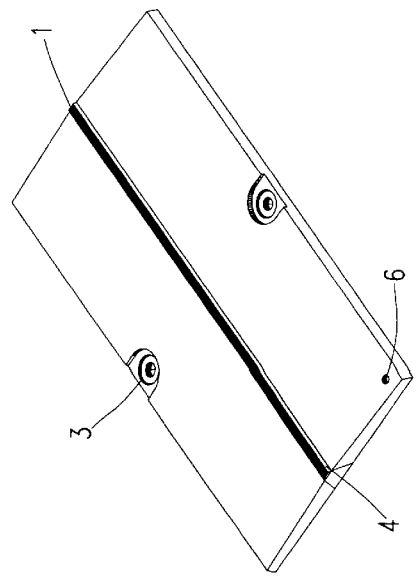
FIG. 28 shows a 3D top-view of a disk-platter's Bottom Data Surface Microhead Array Chip for a magnetic Microhead Array Chip design.
Figure 29:
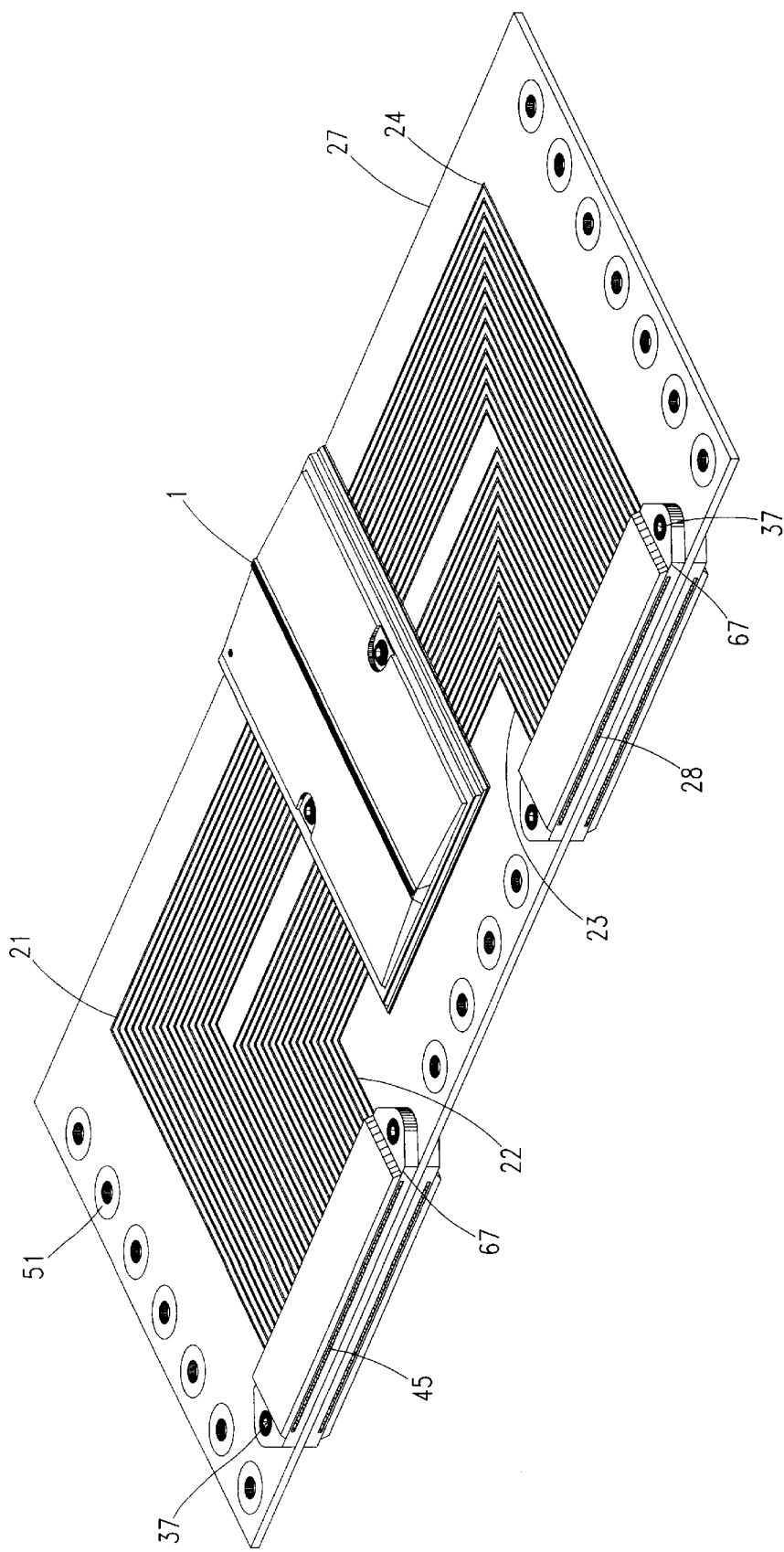
FIG. 29 shows a 3D top back-view of a double chip-positioning circuit board assembly for a magnetic Microhead Array Chip design, illustrated with both Microhead Array Chips as installed.

Moreover, the two main Microhead Array Chip designs will both have a Bottom Data Surface Microhead Array Chip and a Top Data Surface Microhead Array Chip sub-design configuration, where each sub-design has a different surface mounting circuit-contact arrangement. Furthermore, the Bottom Data Surface Microhead Array Chip's circuit-contact outer-shell design arrangement is illustrated by FIGS. 7, 11, 13, 27, and 28. While the Top Data Surface Microhead Array Chip's circuit-contact outer-shell design arrangement is illustrated in FIGS. 8, 12, 14, 25, and 26. In addition, the busing of the Microhead Array Chip Hard Disk Drive and how the bus-cables are connected and laid out will explain why there needs to be two different Microhead Array Chip circuit-contact outer-shell design arrangements. Furthermore, when a Bottom Data Surface Microhead Array Chip, as illustrated in FIGS. 7 and 28, is installed into a chip-positioning circuit board, its Microhead Array is facing up toward an observer looking down through the Cartesian Y-axis. In addition, when installed, the pin-one dot designation of the Bottom Data Surface Microhead Array Chip 6 (FIGS. 7, 11, 13, and 28) is located in the upper-left hand corner of the Microhead Array Chip's outer-shell package. Furthermore, when a Top Data Surface Microhead Array Chip, as illustrated in FIGS. 8 and 25, is installed into a chip-positioning circuit board, its Microhead Array is facing down away from an observer looking down through the Cartesian Y-axis. In addition, when installed, the pin-one designation dot of the Top Data Surface Microhead Array Chip 6 (FIGS. 8, 12, 14, and 25) is located in the upper-left hand corner of the Microhead Array Chip's outer-shell package. Moreover, when the Microhead Array Chips are installed into their chip-positioning circuit boards, and the chip-positioning circuit boards are installed into their Microhead Array Chip Hard Disk Drive's casting-base 12, there should be one Microhead Array Chip positioned for and facing every data-surface of every disk-platter installed into a Microhead Array Chip Hard Disk Drive's unit assembly. Moreover, when installed into a Microhead Array Chip Hard Disk Drive's unit assembly there are at-least two Microhead Arrays (FIGS. 9 and 10) facing one-another with one hard drive disk-platter positioned between them, as if each Microhead Array were dedicated to one data-surface, while Microhead Array Chip in the assembly were looking at a reflection of itself. Furthermore, the main reason for this design approach was to simplify the bus-design for the Microhead Array Chip Hard Disk Drive and its Microhead Array Chips, and to create an ease of connectivity and construction for unit assemblies of the Microhead Array Chip Hard Disk Drive design.

In addition, when being viewed from the top, while looking down at the Microhead Array Chip Hard Disk Drive's unit assembly through a Cartesian Y-axis, we see the Microhead Array Chip Hard Disk Drive positioned in a plan view. Moreover, when viewing the Microhead Array Chip Hard Disk Drive in a plan view, the Polymer flex-cable connectors 34 (FIGS. 1 and 6) 67 (FIGS. 9 and 10), and their Polymer flex-cables 36 (FIGS. 1, 6, 10, and 15), which are located on the right-hand side of the chip-positioning circuit boards that are installed in the Microhead Array Chip Hard Disk Drive, are components dedicated to the Power, the Ground, the Data I/O, and the Control bus-systems of the Microhead Array Chip Hard Disk Drive's design. Moreover, the Polymer flex-cables and their Polymer flex-cable connectors, which are located on the right-hand side of the Microhead Array Chip Hard Disk Drive's unit assembly (FIG. 117) are used to create circuit connections between the chip-connecting contact-points of Microhead Array Chips 7, 8 (FIGS. 7, 8, 26, and 27) and the Disk Controller's PCB. Moreover, the Disk Controller's PCB is located under the Microhead Array Chip Hard Disk Drive's Spindle Motor unit assembly at the bottom of the casting-base 12 (FIGS. 1, 2, and 3).

Furthermore, when being viewed from the top, while looking down at the Microhead Array Chip Hard Disk Drive's unit assembly through a Cartesian Y-axis, we see the Microhead Array Chip Hard Disk Drive positioned in a plan view. Moreover, when viewing the Microhead Array Chip Hard Disk Drive in a plan view, the Polymer flex-cable connectors 40 (FIGS. 1 and 6) 67 (FIGS. 9 and 10), and their Polymer flex-cables 38 (FIGS. 1, 6, 10, and 16), which are located on the left-hand side of the chip-positioning circuit boards that are installed in the Microhead Array Chip Hard Disk Drive, are components dedicated to the 32-bit Address Busing system of the Microhead Array Chip Hard Disk Drive. Moreover, the Polymer flex-cables and their Polymer flex-cable connectors, which are located on the left-hand side of the Microhead Array Chip Hard Disk Drive's unit assembly (FIG. 117) are used to create circuit connections between the chip-connecting contact-points of Microhead Array Chips 9, 10 (FIG. 7, 8, 26, and 27) and the Disk Controller's PCB. Moreover, the Disk Controller's PCB is located under the Microhead Array Chip Hard Disk Drive's Spindle Motor unit assembly at the bottom of the casting-base 12 (FIGS. 1, 2, and 3).

In addition, every Microhead Array Chip installed into a Microhead Array Chip Hard Disk Drive's unit assembly will have a Chip Placement Key 11 located on its outer-shell's bottom-surface area. Moreover, the Chip Placement Key is shaped like a triangle 11 (FIGS. 26 and 27) and located right in the bottom-center of the outer-shell of every Microhead Array Chip. Moreover, when every Microhead Array Chip is installed the Chip Placement Key's triangle-apex will face the front of a Microhead Array Chip's outer-shell's top-edge surface, while facing the Microhead Array Chip Hard Disk Drive's front-end. In addition, the Placement Keys of the Microhead Array Chip design will protrude about "1/16" of an inch out from under the bottom-center surface of the Microhead Array Chip's plastic outer-shell 11 (FIGS. 26 and 27). Furthermore, a Chip Placement Key's sidewalls will form "90" degree angles at the bottom-surface of the plastic outer-shell of its Microhead Array Chip 11 (FIGS. 26 and 27). In addition, the triangular-shaped Chip Placement Keys 11 (FIGS. 26 and 27) will have a corresponding triangular-shaped Chip Placement Keyhole 92 (FIGS. 30, 32, 35, and 37). Moreover, the Chip Placement Keyholes 92 are located at the top-center surface of the bottom-center of every chip-positioning circuit board's surface mounting chip-socket. In addition, the Chip Placement Keyholes are also triangular-shaped, having a machined-out recess of about "1/16" of an inch from the top-surface of the bottom-center of every chip-positioning circuit board's surface mounting chip-socket. Furthermore, a Chip Placement Keyhole's sidewalls will form "270" degree angles at the bottom-center surface of every chip-positioning circuit board's surface mounting chip-socket 92 (FIGS. 30, 32, 35, and 37).

Furthermore, the manufacturing and machining dimensions for the Chip Placement Keys 11 (FIGS. 26 and 27), and Chip Placement Keyholes 92 (FIGS. 30, 32, 35, and 37) are critical and must adhere to a plus or minus "1/1000th" of an inch tolerance. Moreover, this strict dimensional tolerance for the Chip Placement Keys and Keyholes is necessary to insure an accurate, secure, and non-compromizable placement of the Microhead Array Chips into their chip-positioning circuit board's surface mounting chip-sockets. Final installation of the Microhead Array Chips into their chip-positioning circuit board's surface mounting chip-sockets is done using two Microhead Array Chip's chip-mounting hex-screws 2 (FIGS. 1, 6, 7, and 8). Moreover, the two chip-mounting hex-screws will thread into the chip-positioning circuit board surface mounting chip-socket's hex-screw holes 92 (FIGS. 30, 32, 35, and 37). Moreover, this will completely seat and secure the Microhead Array Chips into their chip-positioning circuit board's surface mounting chip-socket bottom-inside mounting surface 92 (FIGS. 30, 32, 35, and 37). Furthermore, the removal or displacement of a Microhead Array Chip after its final installation into a chip-positioning circuit board's surface mounting chip-socket should only occur when a Microhead Array Chip has failed. The failed Microhead Array Chip would then need to be removed and replaced with a new and fully functioning Microhead Array Chip. However, if a Microhead Array Chip were replaced, the newly installed Microhead Array Chip would need to be used to execute a low-level and operating system's reformatting of the disk-platter's data-surface of the replacement chip. After this new low-level and (OS) "Operating System" reformatting of the disk-platter's data-surface of the replacement chip has been executed, the newly installed replacement Microhead Array Chip should never be readjusted or moved in any way, or a new low-level and operating system reformatting of the re-adjusted Microhead Array Chip's disk-platter data-surface, would again be required.

Figure 11:
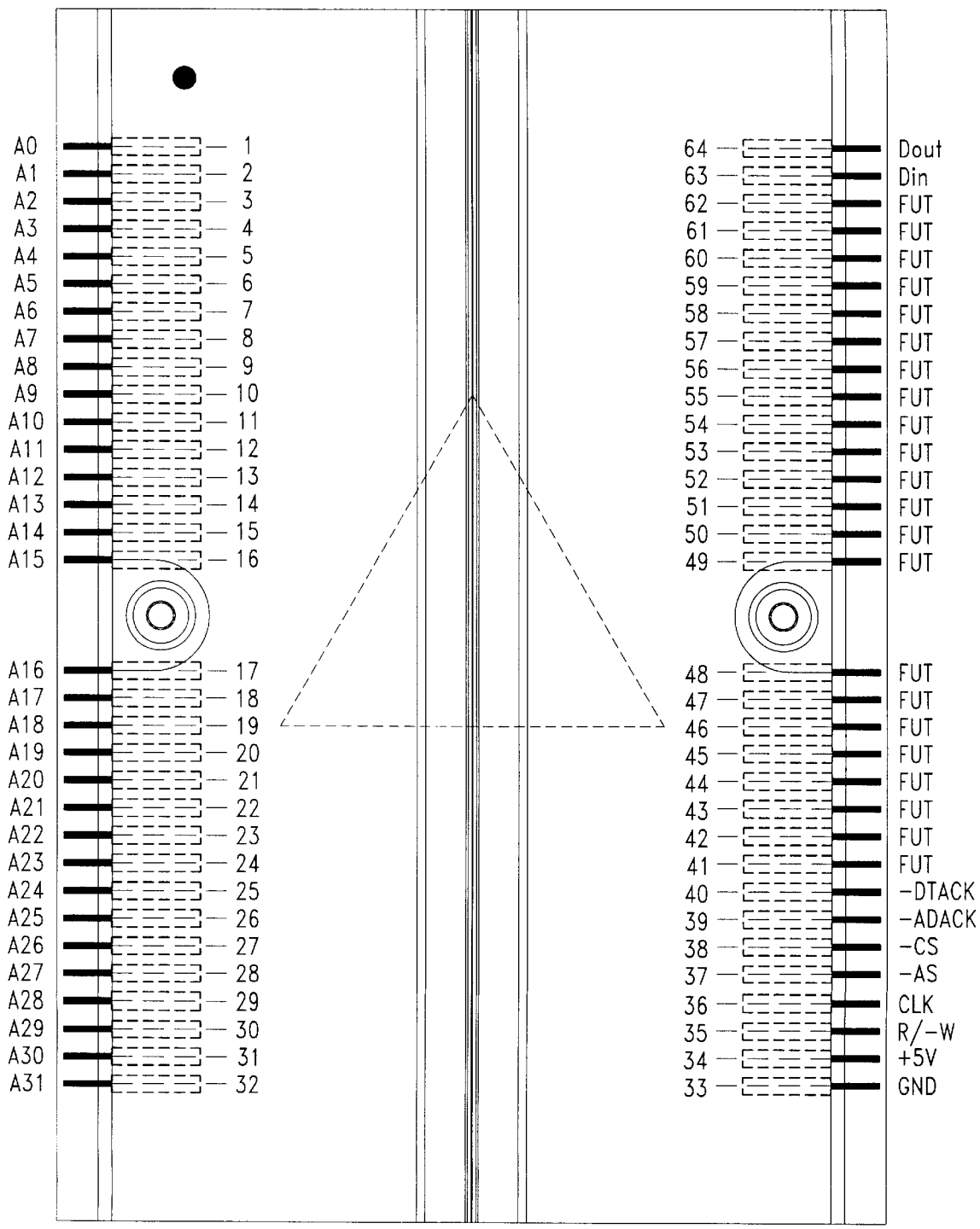
FIG. 11 shows an orthographic plan-view of a Microhead Array Chip installed into a surface mounting chip-socket displaying pin locations, number assignments, and logic function labels for the Bottom Data Surface Microhead Array Chip.
Figure 12:
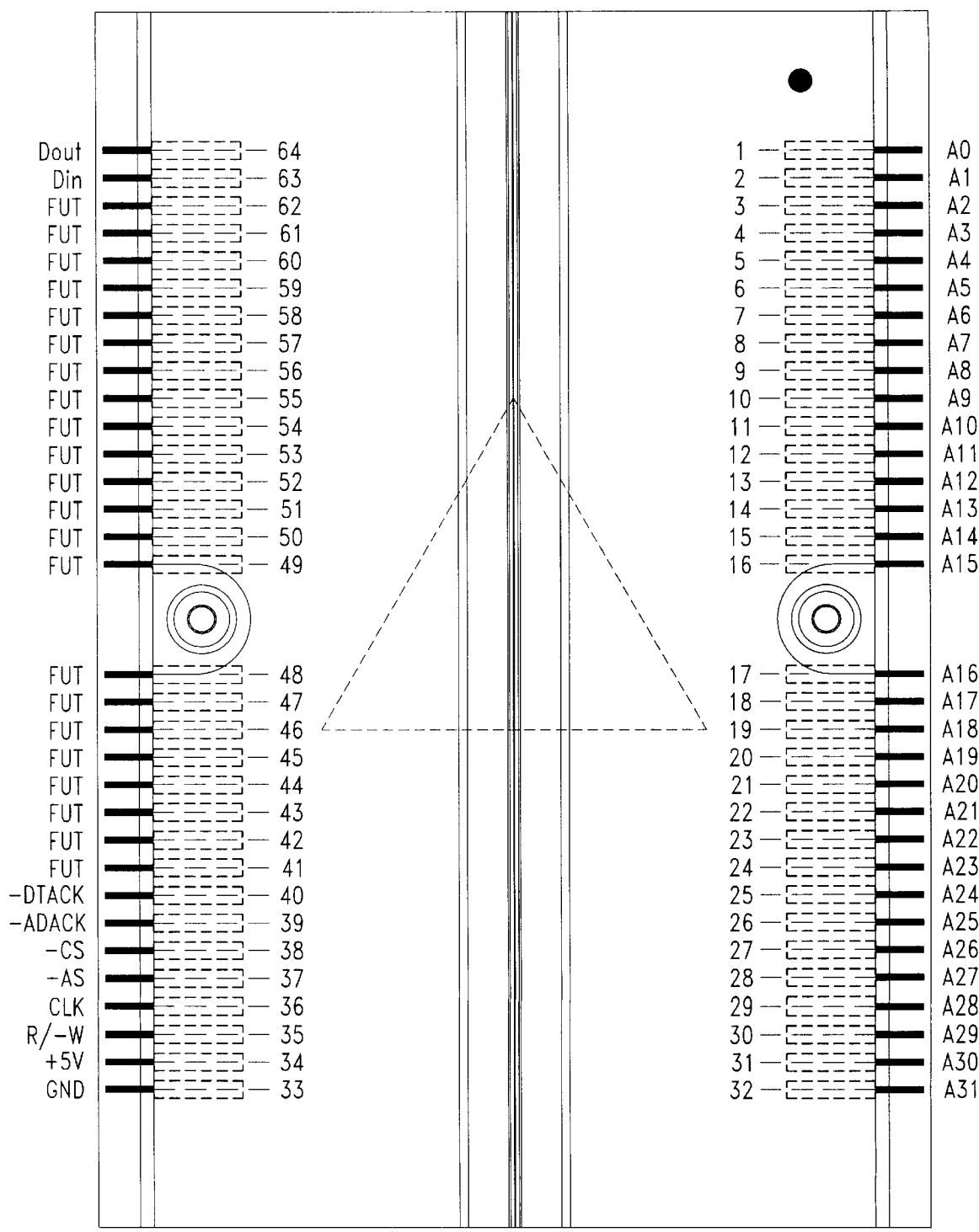
FIG. 12 shows an orthographic plan-view of a Microhead Array Chip installed into a surface mounting chip-socket displaying pin locations, number assignments, and logic function labels for the Top Data Surface Microhead Array Chip.
Figure 13:
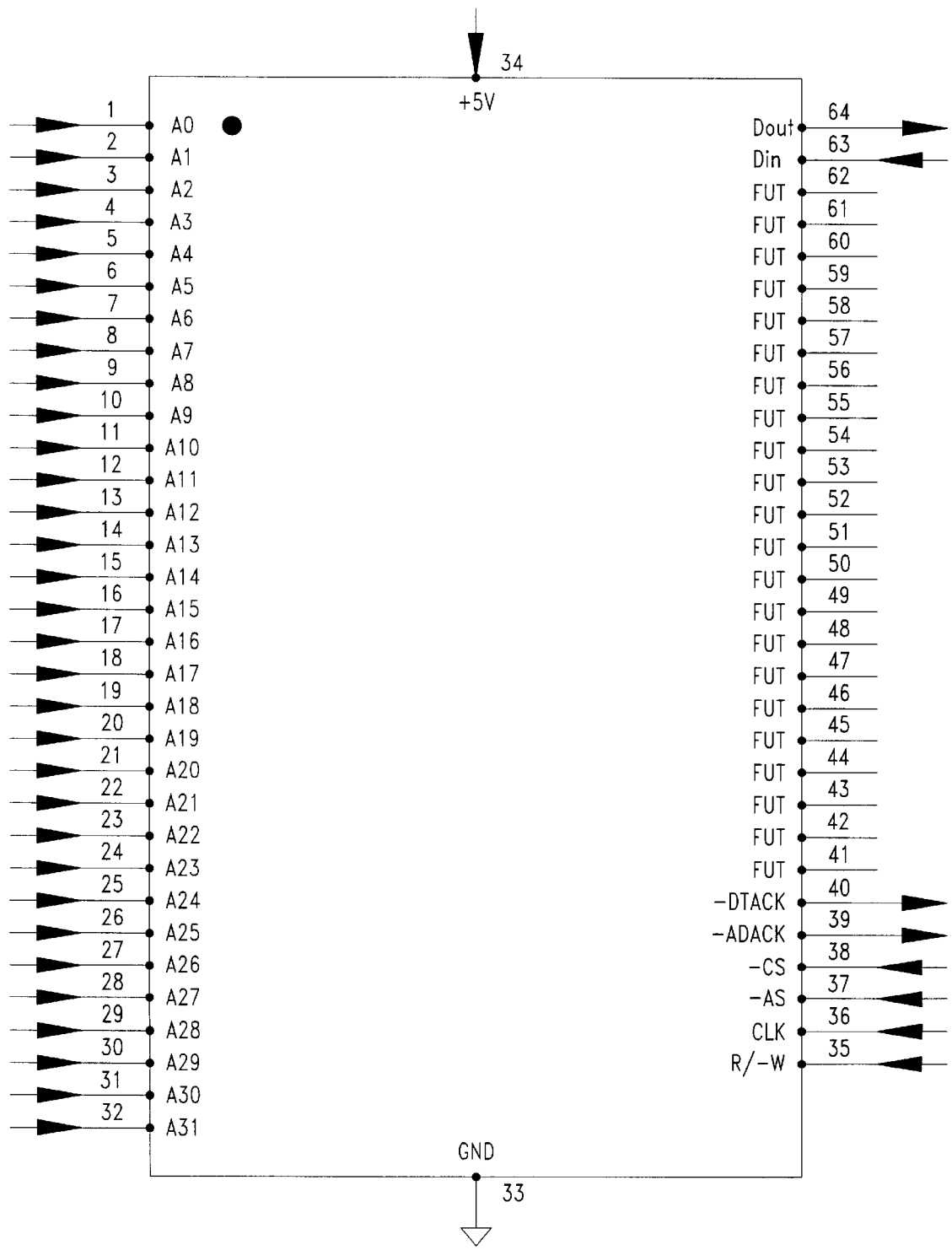
FIG. 13 shows a logic signal flow-schematic for the Bottom Data Surface Microhead Array Chip displaying signal direction, pin assignments, and function labels.
Figure 14:
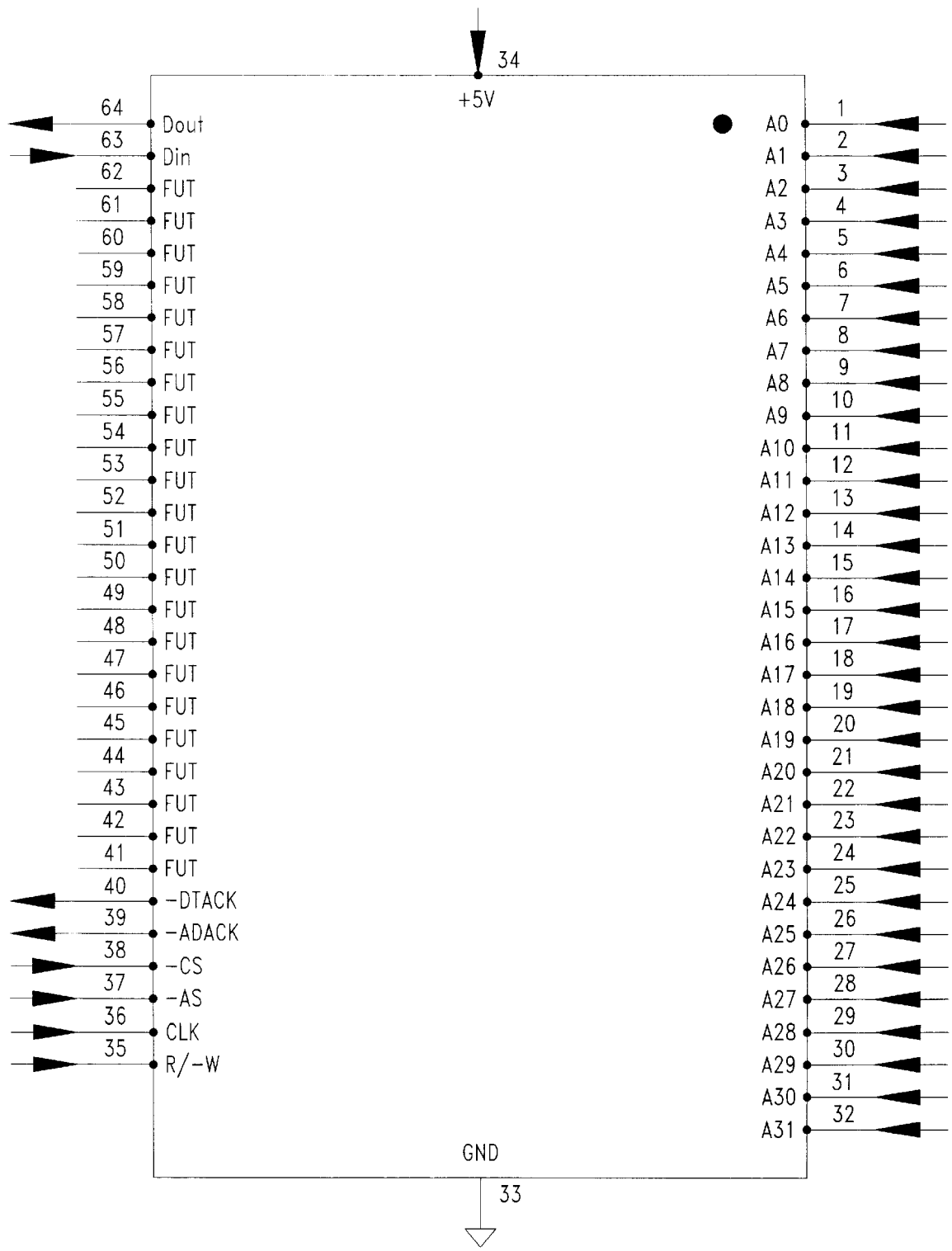
FIG. 14 shows a logic signal flow-schematic for the Top Data Surface Microhead Array Chip displaying signal direction, pin assignments, and function labels.
Figure 16:
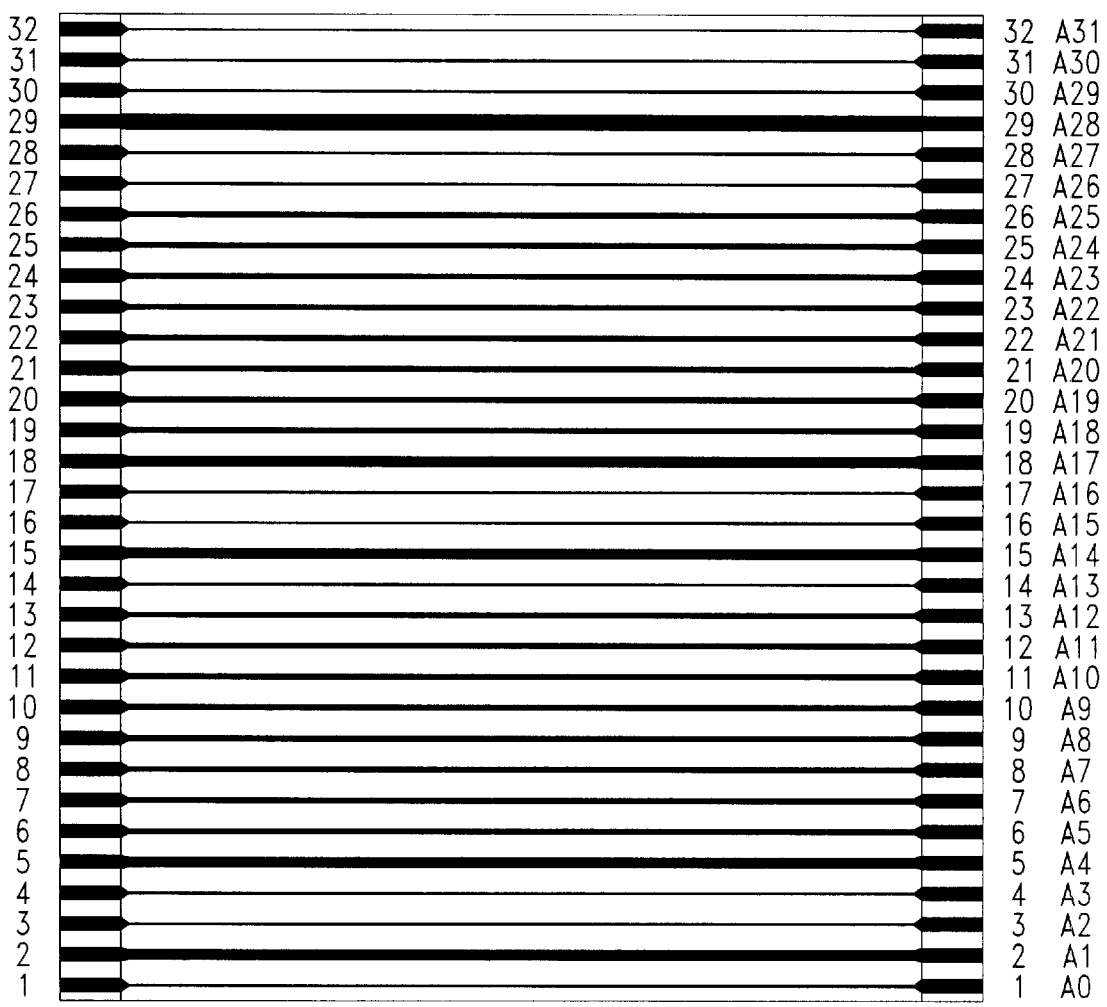
FIG. 16 shows a plan-view of a typical Polymer flex bus cable for the chip-positioning circuit board's left side connector for a magnetic Microhead Array Chip design displaying its 32-bit address assignments.

In addition, every Microhead Array Chip installed into a Microhead Array Chip Hard Disk Drive's unit assembly has a group of sixty-four circuit connecting contacts physically embedded into the bottom-surface 7, 8, 9, 10 (FIGS. 26 and 27) of every Microhead Array Chip's outer-shell. In addition, for every Microhead Array Chip's sixty-four embedded circuit connecting contacts, there is a matching set of sixty-four circuit connecting contacts 92 (FIGS. 30, 32, 35, and 37) physically embedded into the top-surface of the bottom-inside center mounting-plane of every chip-positioning circuit board's surface mounting chip-socket 5 (FIGS. 1, 2, 7, and 8). Furthermore, when viewing a Microhead Array Chip in a plan view, where the location of its pin-one designation dot can be clearly seen 6 (FIGS. 1, 7, 8, 25, and 28). Moreover, the pin-one designation dot of a plan viewed Microhead Array Chip will indicate both its sub-design specification and its orientation to the Microhead Array Chip Hard Disk Drive's bus systems. Therefore, when viewing a Microhead Array Chip in a plan view with its pin-one designation dot located in the upper left-hand corner of the Microhead Array Chip's outer-shell, an indication that this is a Bottom Data Surface Microhead Array Chip. However, when viewing a Microhead Array Chip in a plan view with its pin-one designation dot is located in the upper right-hand corner of the Microhead Array Chip's outer-shell, an indication that this is a Top Data Surface Microhead Array Chip. The pin-one designation dot of a plan viewed Microhead Array Chip, indicates, through reference, the locations, the names, and the number designations of the Microhead Array Chip's sixty-four embedded circuit connecting contacts (FIGS. 11 and 12).

Furthermore, a plan viewed and "un-installed" Bottom Data Surface Microhead Array Chip has its pin-one designation dot located in the upper left-hand corner of the Microhead Array Chip's outer-shell 6 (FIGS. 1, 7, and 28). In addition, a plan viewed and "un-installed" Bottom Data Surface Microhead Array Chip has its address bus circuit connecting input-contacts (FIG. 11) located on the left-hand side of its outer-shell's bottom surface 9, 10 (FIGS. 7 and 27). Furthermore, the thirty-two address-bus circuit-connecting input-contacts are in two groups of sixteen contacts. Moreover, group number one contains input-contacts zero through sixteen 10 (FIGS. 1, 7, and 11), while group number two contains input-contacts seventeen through thirty-one 9 (FIGS. 1, 7, and 11). Furthermore, the two groups of sixteen circuit connecting input-contacts are physically separated from each other by the Microhead Array Chip installation hex-screws 2 (FIGS. 1 and 7) and hex-screw holes 3 (FIGS. 1, 7, and 28), which are used to install the Microhead Array Chips. However, when logically combined, these two groups of sixteen circuit-connecting input-contacts complete a 32-bit address bus-system configuration for the Bottom Data Surface Microhead Array Chip.

Furthermore, a plan viewed and "un-installed" Bottom Data Surface Microhead Array Chip has its control and data I/O circuit connecting contacts (FIG. 11) located on the right-hand side of its outer-shell's bottom surface 7, 8 (FIGS. 1, 7, and 27). Furthermore, the thirty-two controls and data I/O circuit connecting-contacts are in two groups of sixteen contacts. Moreover, group number one contains contacts thirty-two through forty-eight 8 (FIGS. 1, 7, and 11), while group number two contains contacts forty-nine through sixty-four 7 (FIGS. 1, 7, and 11). Furthermore, the two groups of sixteen circuit connecting input-contacts are physically separated from each other by the Microhead Array Chip installation hex-screws 2 (FIGS. 1 and 7) and hex-screw holes 3 (FIGS. 1, 7, and 28), which are used to install the Microhead Array Chips. However, when logically combined, these two groups of sixteen circuit connecting contacts complete a control and a data I/O bus-system configuration for the Bottom Data Surface Microhead Array Chip.

Furthermore, a plan viewed and "un-installed" Top Data Surface Microhead Array Chip has its pin-one designation dot located in the upper right-hand corner of the Microhead Array Chip's outer-shell 6 (FIGS. 8 and 25). In addition, a plan viewed and "un-installed" Top Data Surface Microhead Array Chip has its address bus circuit connecting input-contacts (FIG. 12) located on the right-hand side of its outer-shell's bottom surface 9, 10 (FIGS. 8 and 26). Furthermore, the thirty-two address-bus circuit-connecting input-contacts are in two groups of sixteen contacts. Moreover, group number one contains input-contacts zero through sixteen 10 (FIGS. 8 and 12), while group number two contains input-contacts seventeen through thirty-one 9 (FIGS. 8 and 12). Furthermore, these two groups of sixteen circuit connecting input-contacts are physically separated from each other by the Microhead Array Chip installation hex-screws 2 (FIG. 8) and hex-screw holes 3 (FIG. 8 and 25). However, when logically combined, these two groups of sixteen circuit-connecting input-contacts complete a 32-bit address bus-system configuration for the Top Data Surface Microhead Array Chip.

Furthermore, a plan viewed and "un-installed" Top Data Surface Microhead Array Chip has its control and data I/O circuit connecting contacts (FIG. 12) located on the left-hand side of its outershell's bottom surface 7, 8 (FIGS. 8 and 26). Furthermore, the thirty-two controls and data I/O circuit connecting contacts are in two groups of sixteen contacts. Moreover, group number one contains contacts thirty-two through forty-eight 8 (FIGS. 8 and 12), while group number two contains contacts forty-nine through sixty-four 7 (FIGS. 8 and 12). Furthermore, these two groups of sixteen circuit connecting input-contacts are physically separated from each other by the Microhead Array Chip installation hex-screws 2 (FIG. 8) and hex-screw holes 3 (FIGS. 8 and 25). However, when logically combined these two groups of sixteen circuit connecting contacts complete a control and a data I/O bus-system configuration for the Top Data Surface Microhead Array Chip.

Furthermore, a plan viewed and "installed" Bottom Data Surface Microhead Array Chip has its pin-one designation dot located in the upper left-hand corner of the Microhead Array Chip's outer-shell 6 (FIGS. 1, 7, and 28). Moreover, a plan viewed and "installed" Bottom Data Surface Microhead Array Chip (FIGS. 29 and 34) has its address bus circuit connecting input-contacts (FIG. 11) located on the left-hand side of its outer-shell's bottom surface 9, 10 (FIGS. 7 and 27). In addition, a plan viewed and "installed" Bottom Data Surface Microhead Array Chip (FIGS. 29 and 34) has its input-contacts one through thirty-two (FIG. 11) dedicated to the 32-bit address bus of the Microhead Array Chip. In conclusion, an "installed" Bottom Data Surface Microhead Array Chip connects to the address bus through a surface mounting chip-socket's "A0" through "A31" connection circuit-contacts (FIG. 11).

Furthermore, a plan viewed and "installed" Bottom Data Surface Microhead Array Chip has its pin-one designation dot located in the upper left-hand corner of the Microhead Array Chip's outer-shell 6 (FIGS. 1, 7, and 28). Moreover, a plan viewed and "installed" Bottom Data Surface Microhead Array Chip (FIGS. 29 and 34) has its control and data I/O bus circuit connecting input-contacts (FIG. 11) located on the right-hand side of its outer-shell's bottom surface 7, 8 (FIGS. 7, and 27). In addition, a plan viewed and installed Bottom Data Surface Microhead Array Chip (FIGS. 29 and 34) has its input-contacts thirty-three through thirty-eight (FIG. 11) dedicated to the Microhead Array Chip's (GND) "Ground", (+5) "VDD Power", (R/-W) "Read or Write Enable", (-AS) "Address Strobe", and (-CS) "Chip Select" circuit connecting input-contacts, as illustrated in FIG. 11. In addition, input-contacts thirty-nine through forty (FIG. 11) are dedicated to the Microhead Array Chip's (-ADACK) "Address Acknowledge" and (-DTACK) "Data Acknowledge" circuit connecting output-contacts, as illustrated in FIG. 11. In addition, Input-contacts forty-nine through sixty-two (FIG. 11) are dedicated to the Microhead Array Chip's (FUR) "Future" circuit connecting contacts, as illustrated in FIG. 11. In addition, contacts sixty-three through sixty-four (FIG. 11) are dedicated to the Microhead Array Chip's (Din) "Data-In" circuit connecting input-contact and (Dout) "Data-out" circuit connecting output-contact, as illustrated in FIG. 11. In conclusion, an "installed" Bottom Data Surface Microhead Array Chip connects to the control and data I/O bussystem through the surface mounting chip-socket's connection-contacts as numbered and named above. In addition, the "Signal-Flow" or in-put/out-put logic-flow configurations for the "uninstalled" Bottom Data Surface Microhead Array Chips are also fully illustrated in FIG. 13 as well.

Furthermore, a plan viewed and "installed" Top Data Surface Microhead Array Chip has its pin-one designation dot located in the upper left-hand corner of the outer-shell 6 (FIGS. 8 and 25) of the Top Data Surface Microhead Array Chip. Moreover, a plan viewed and "installed" Top Data Surface Microhead Array Chip (FIGS. 31 and 36) has its address bus circuit connecting input-contacts (FIG. 12) located on the left-hand side of its outer-shell's bottom surface 9, 10 (FIGS. 8, and 26). In addition, a plan viewed and "installed" Top Data Surface Microhead Array Chip (FIGS. 31 and 36) has its input-contacts one through thirty-two (FIG. 12) dedicated to the 32-bit address bus of the Microhead Array Chip. In conclusion, an "installed" Top Data Surface Microhead Array Chip connects to the address bus through a surface mounting chip-socket's "A0" through "A31" connection circuit-contacts (FIG. 12).

Furthermore, a plan viewed and "installed" Top Data Surface Microhead Array Chip has its pin-one designation dot located in the upper left-hand corner of the Microhead Array Chip's outer-shell 6 (FIGS. 8 and 25). Moreover, a plan viewed and "installed" Top Data Surface Microhead Array Chip (FIGS. 31 and 36) has its control and data I/O bus circuit connecting input-contacts (FIG. 12) located on the right-hand side of its outer-shell's bottom surface 7, 8 (FIGS. 7 and 26). In addition, a plan viewed and "installed" Top Data Surface Microhead Array Chip (FIGS. 31 and 36) has its input-contacts thirty-three through thirty-eight (FIG. 12) dedicated to the Microhead Array Chip's (GND) "Ground", (+5) "VDD Power", (R/-W) "Read or Write Enable", (-AS) "Address Strobe", and (-CS) "Chip Select" circuit connecting input-contacts, as illustrate in FIG. 12. In addition, input-contacts thirty-nine through forty (FIG. 12) are dedicated to the Microhead Array Chip's (-ADACK) "Address Acknowledge" and (-DTACK) "Data Acknowledge" circuit connecting output-contacts, as illustrated in FIG. 12. In addition, Input-contacts forty-nine through sixty-two (FIG. 12) are dedicated to the Microhead Array Chip's (FUR) "Future" circuit connecting contacts, as illustrated in FIG. 12. In addition, contacts sixty-three through sixty-four (FIG. 12) are dedicated to the Microhead Array Chip's (Din) "Data-In" circuit connecting input-contact and (Dout) "Data-out" circuit connecting output-contact, as illustrated in FIG. 12. In conclusion, an "installed" Bottom Data Surface Microhead Array Chip connects to the control and data I/O bus-system through the surface mounting chip-socket's connection circuit-contacts as numbered and named above. In addition, the "Signal-Flow" or in-put/out-put logic-flow configurations for the "un-installed" Bottom Data Surface Microhead Array Chips are also fully illustrated in FIG. 14.

Figure 39:
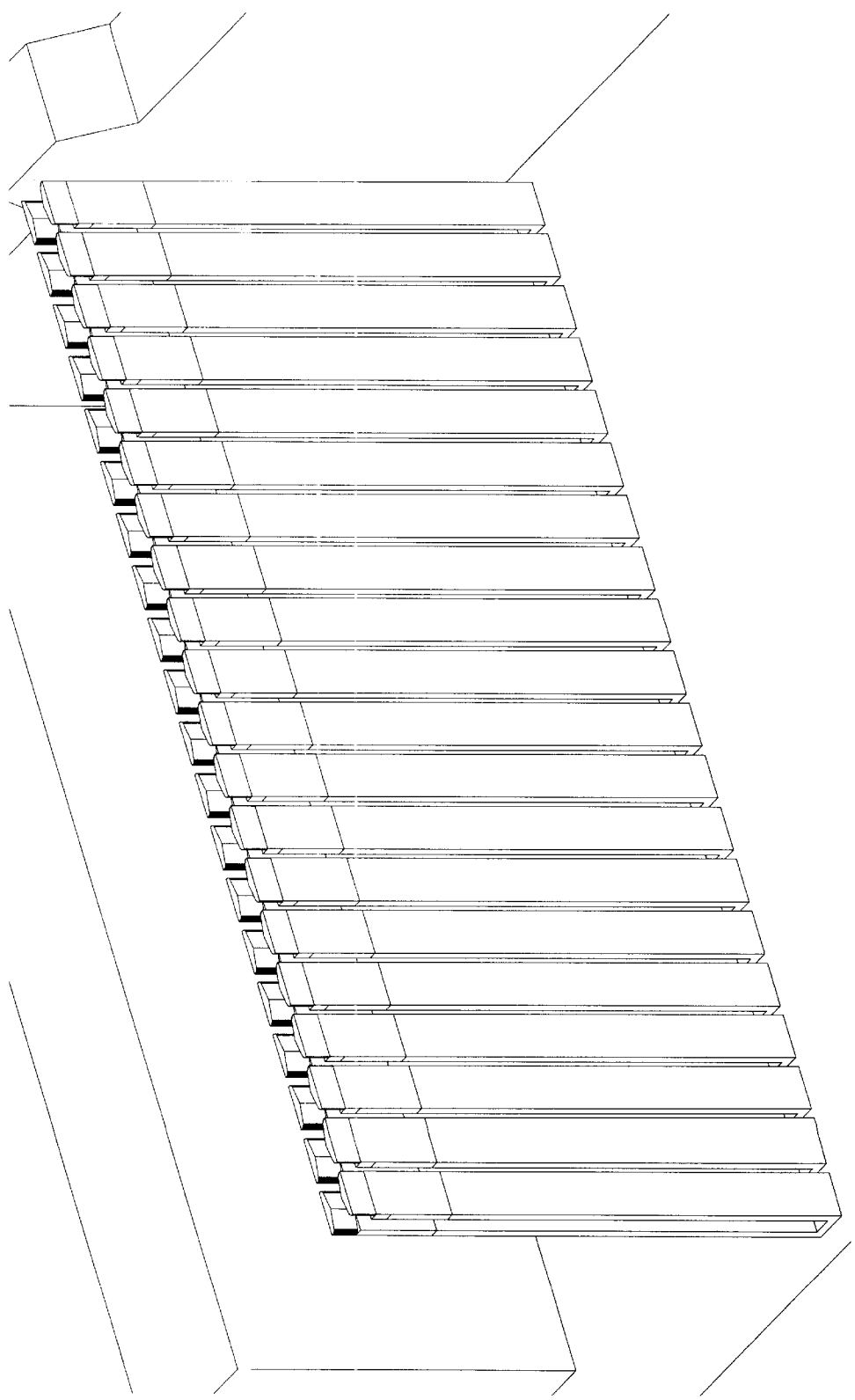
FIG. 39 shows a 3D top front-view of the Read and Write Element Induction Channel Coil configuration for a magnetic Microhead Array Chip design, displaying the head yokes and magnetic flux tips.
Figure 40:
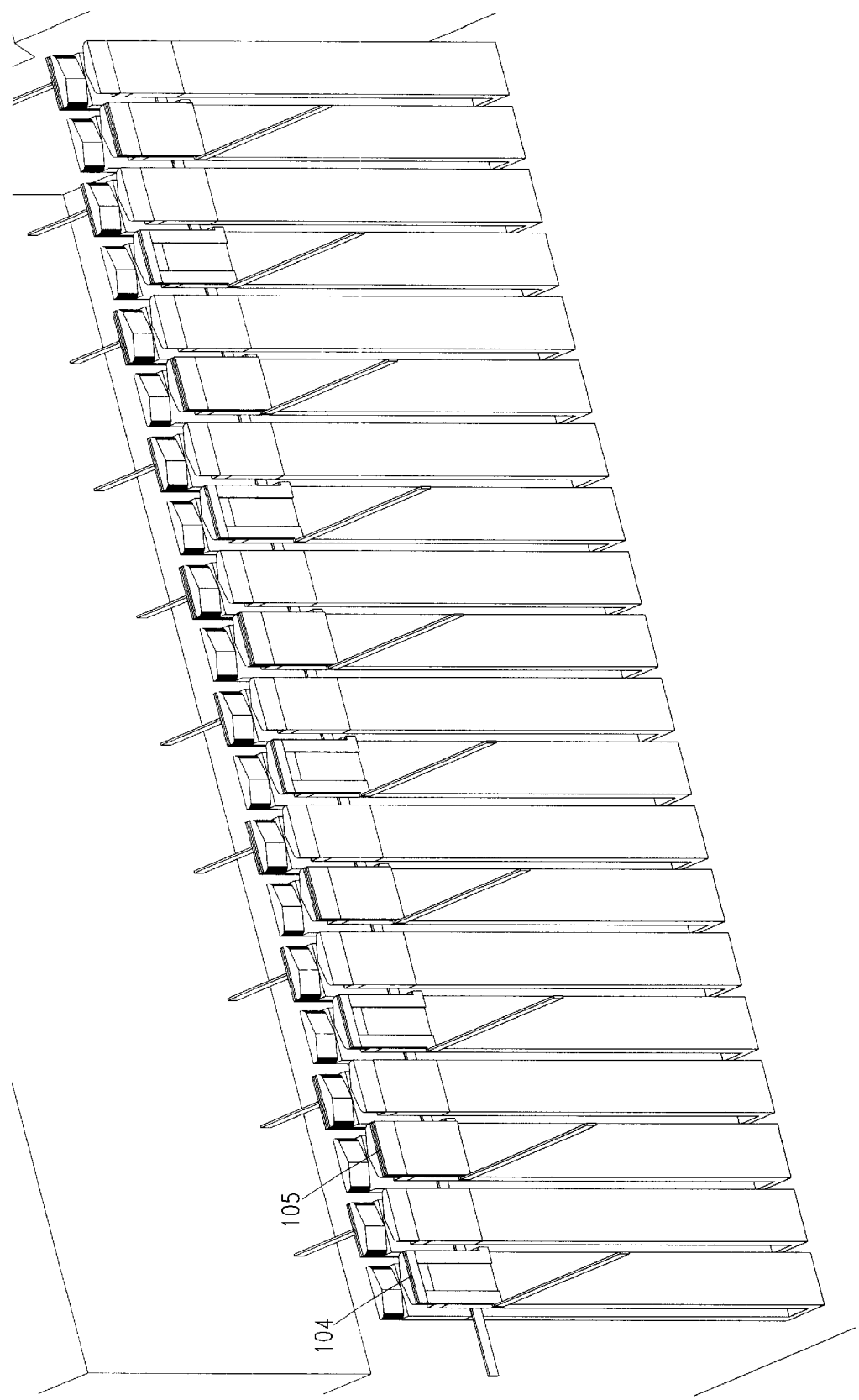
FIG. 40 shows a 3D top front-view of the MR Read Head Element and Induction Channel Coil Write Head Element design configuration for a magnetic Microhead Array Chip design, displaying the Head Yokes Magnetic Flux Concentration Tips, and MR Read Head elements.
Figure 41:
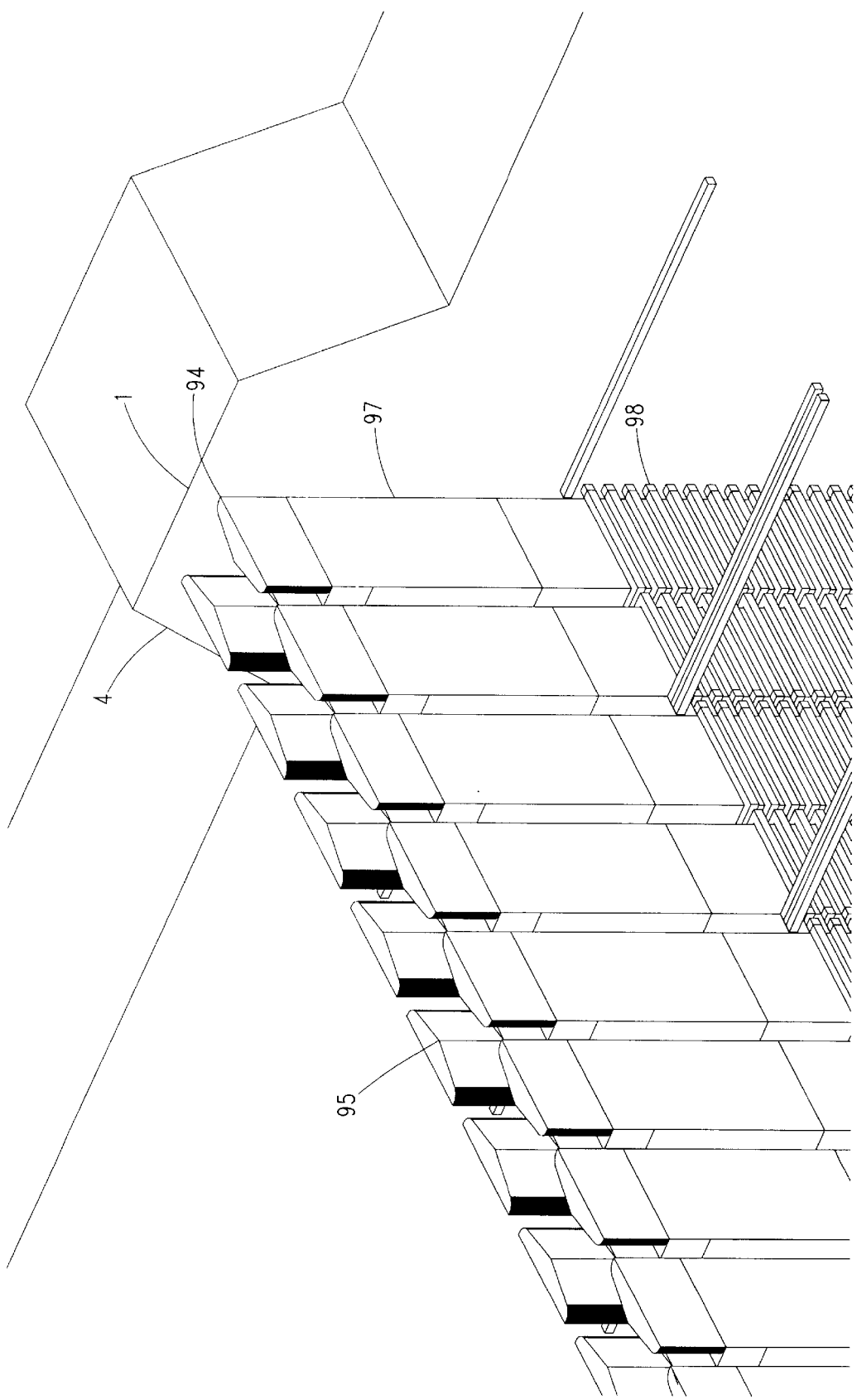
FIG. 41 shows a 3D top back-end view close-up of the Read and Write Element Induction Channel Coil design configuration for a magnetic Microhead Array Chip design, displaying the Head Yokes, Magnetic Flux Concentration Tips, and outer shell IC-package.
Figure 42:
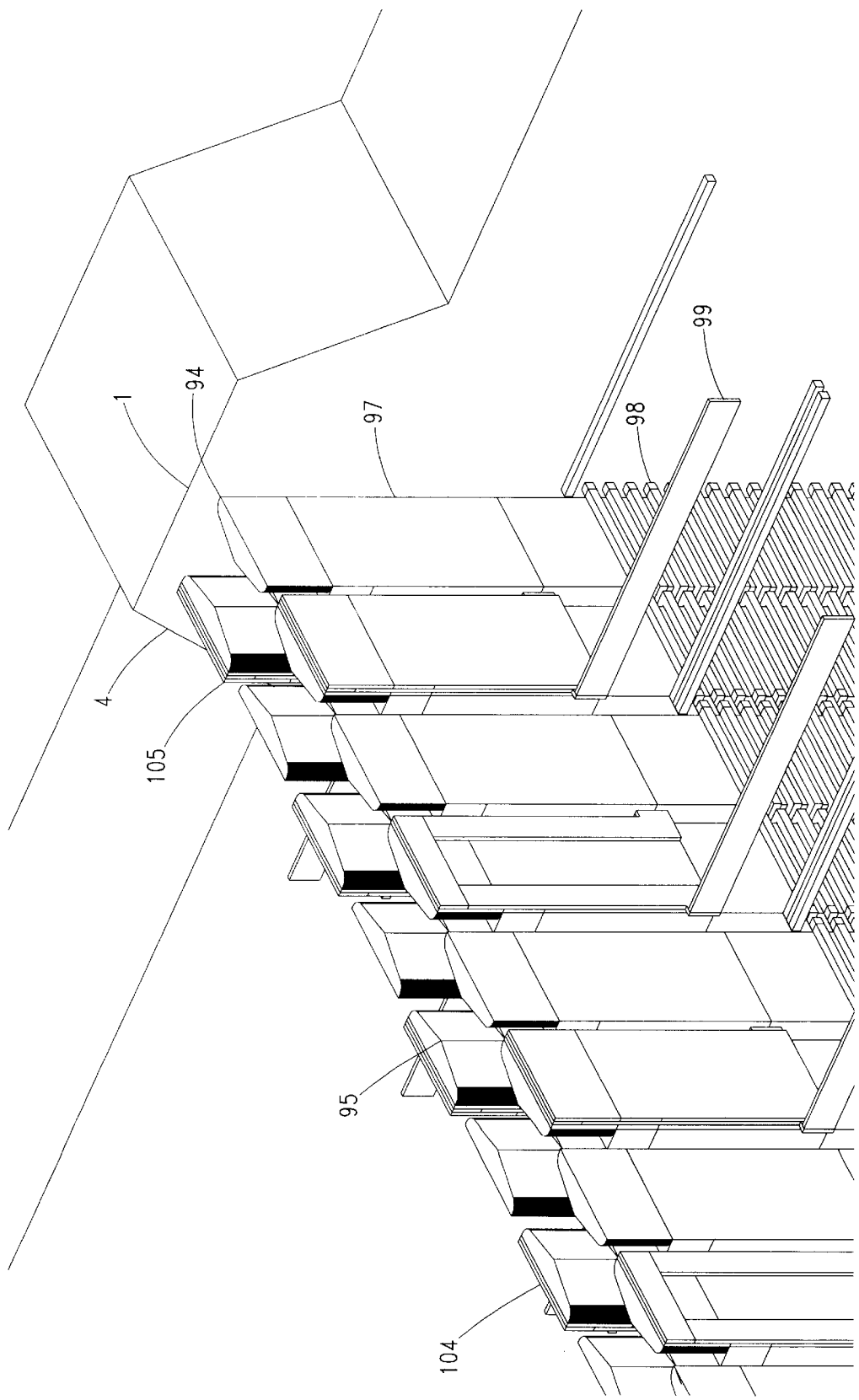
FIG. 42 shows a 3D top back-end view of the MR Read Head Element and Induction Channel Coil Write Head Element design configuration for a magnetic Microhead Array Chip design, displaying the Head Yokes, Magnetic Flux Concentration Tips, MR Read Head elements, and outer shell IC-package.
Figure 43:
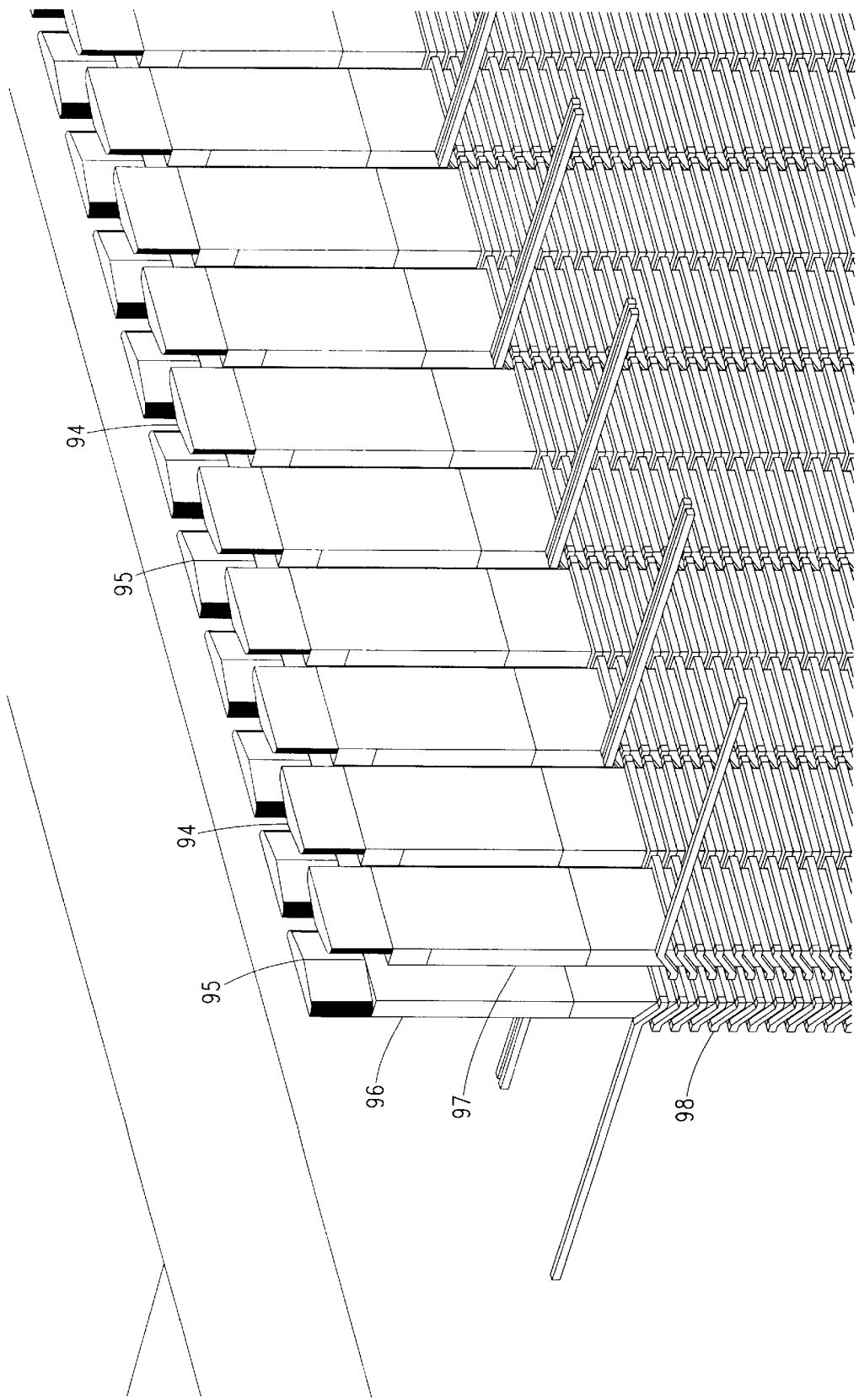
FIG. 43 shows a 3D top front-view close-up of the Read and Write Element Induction Channel Coil design configuration for a magnetic Microhead Array Chip design, displaying the Head Yokes, and Magnetic Flux Concentration Tip details.
Figure 44:
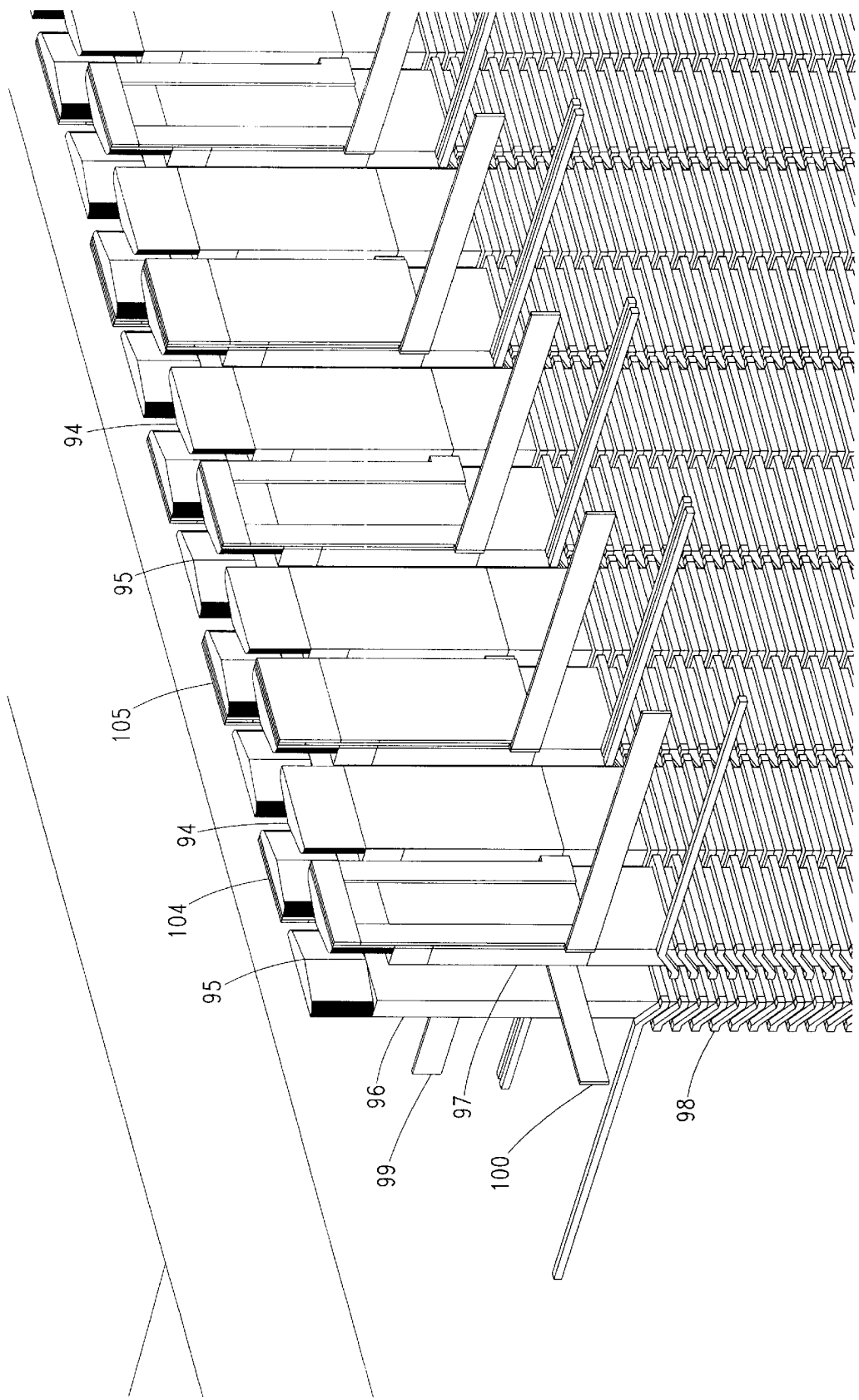
FIG. 44 shows a 3D top front-view close-up of the MR Read Head Element and Induction Channel Coil Write Head Element design configuration for a magnetic Microhead Array Chip design, displaying the Head Yokes, Magnetic Flux Concentration Tips, and MR Read Head element details.
Figure 45:
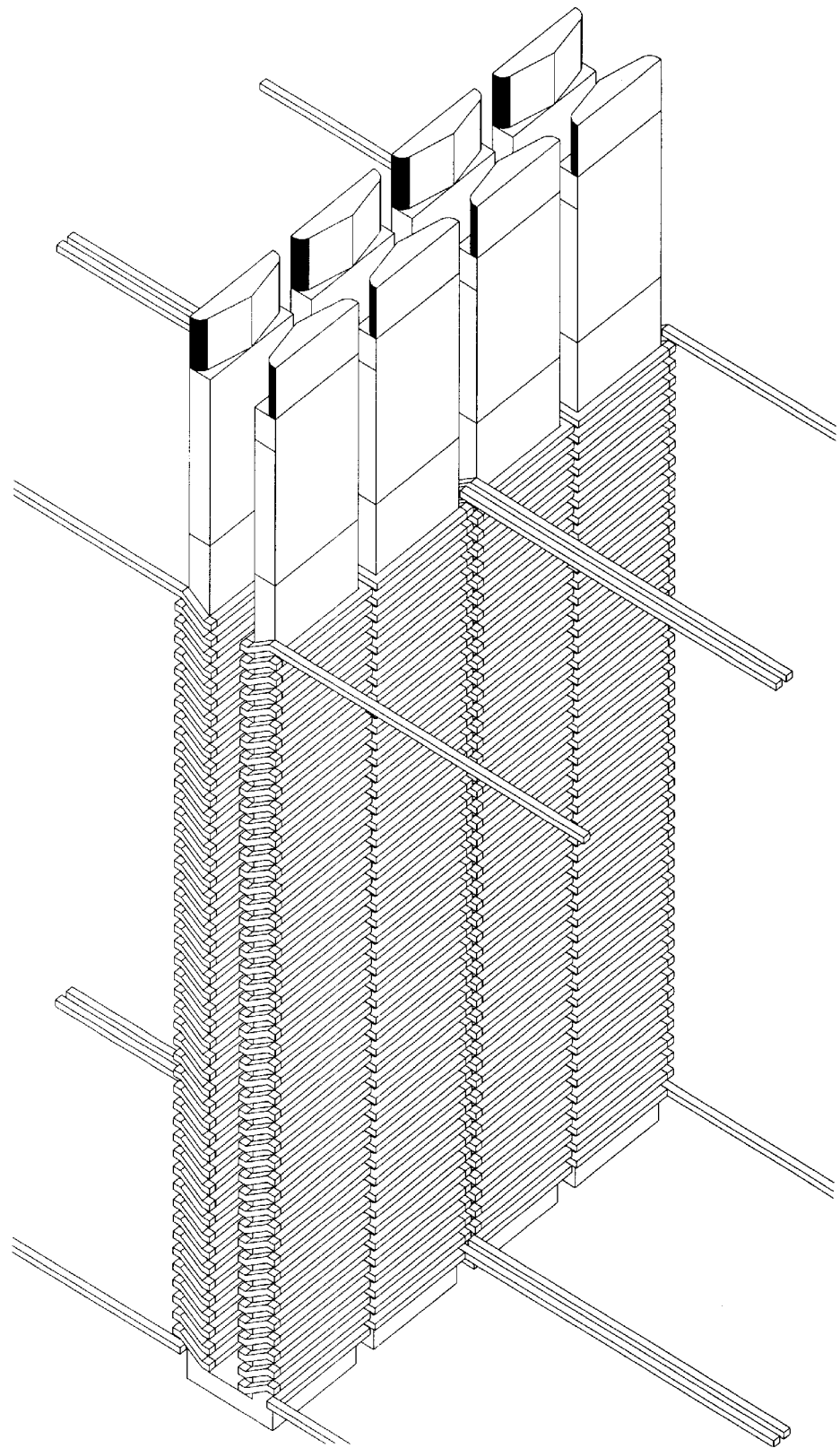
FIG. 45 shows a 3D top front-view close-up of the Read and Write Element Induction Channel Coil design configuration for a magnetic Microhead Array Chip design, displaying the details of four microheads.

In addition, the internal microhead design of the Microhead Array Chip as presented within this art consists of two different Microhead Array Chip design-strategies. Moreover, the first design-strategy consists of a Microhead Array structure that uses Induction Channel Coils for both its read and write microhead elements. While, the second design-strategy consists of a Microhead Array structure that uses a Magnetoresistor microhead element for reading operations and an Induction Channel Coil microhead element for writing operations. The core structures of the first microhead design strategy consists of a u-shaped "Yoke Core" 96, 97 (FIGS. 41 and 43) with two "Magnetic-Flux Concentration Tips" 94, 95 (FIGS. 41 and 43) on the top of each Yoke Core's magnetic-pole ending-tips (FIG. 39). In addition, the Microhead Yoke Core (FIG. 39) structure 96, 97 (FIGS. 41 and 43) is made from a non-permanent magnetic Ferrite material like "Ni—Zn Ferrite". While, the Magnetic-Flux Concentration Tips 94, 95 (FIG. 41) are made from a non-permanent magnetic Ferrite material like "Mn—Zn Ferrite". Moreover, the Microhead Array's Yoke Cores 96, 97 (FIG. 43) have a Magnetic Flux Concentration Tip 94, 95 (FIG. 43) on each of its u-magnet magnetic-pole ending-tips, as illustrated in FIG. 39. In addition, with one complete and independent Induction Channel Coil 98 (FIG. 43) built around each of the magnetic pole arms of the u-shaped Yoke Core 96, 97 (FIG. 43). Furthermore, within the design of the Induction Channel Coil Read and Write Element Microhead Array Chip one complete microhead Induction Channel Coil could have as little as "2" channel coil-turn windings or as many as "500" channel coil-turn windings built into its structure. Subsequently, there are at least two of these Induction Channel Coils built into every microhead (FIG. 45) contained within a Microhead Array of a Microhead Array Chip.

Figure 54:
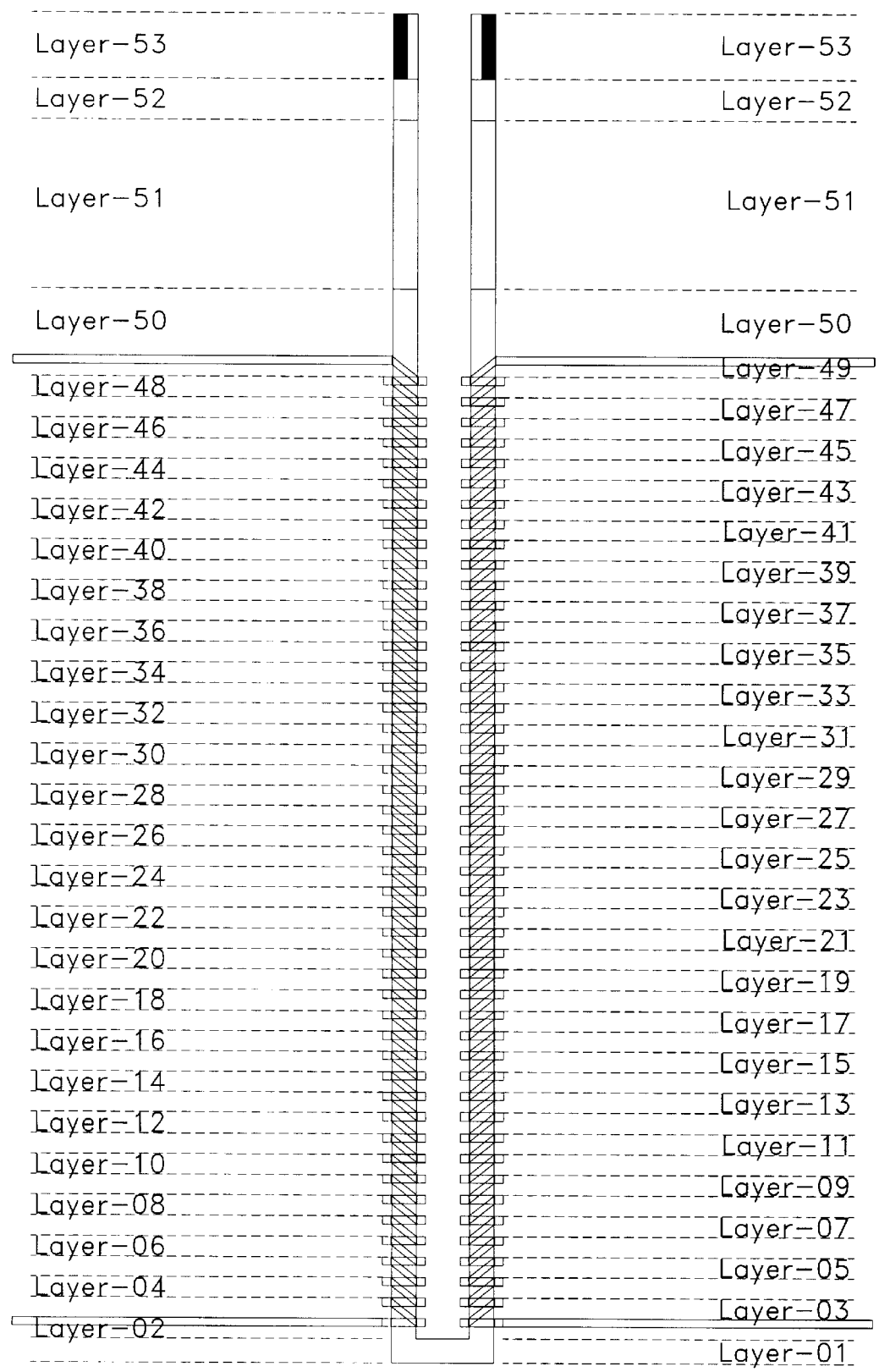
FIG. 54 shows an orthographic front-view of the Read and Write Element Induction Channel Coil Head design configuration for a magnetic Microhead Array Chip design, displaying the microheads CMOS lithographic layering levels.
Figure 55:
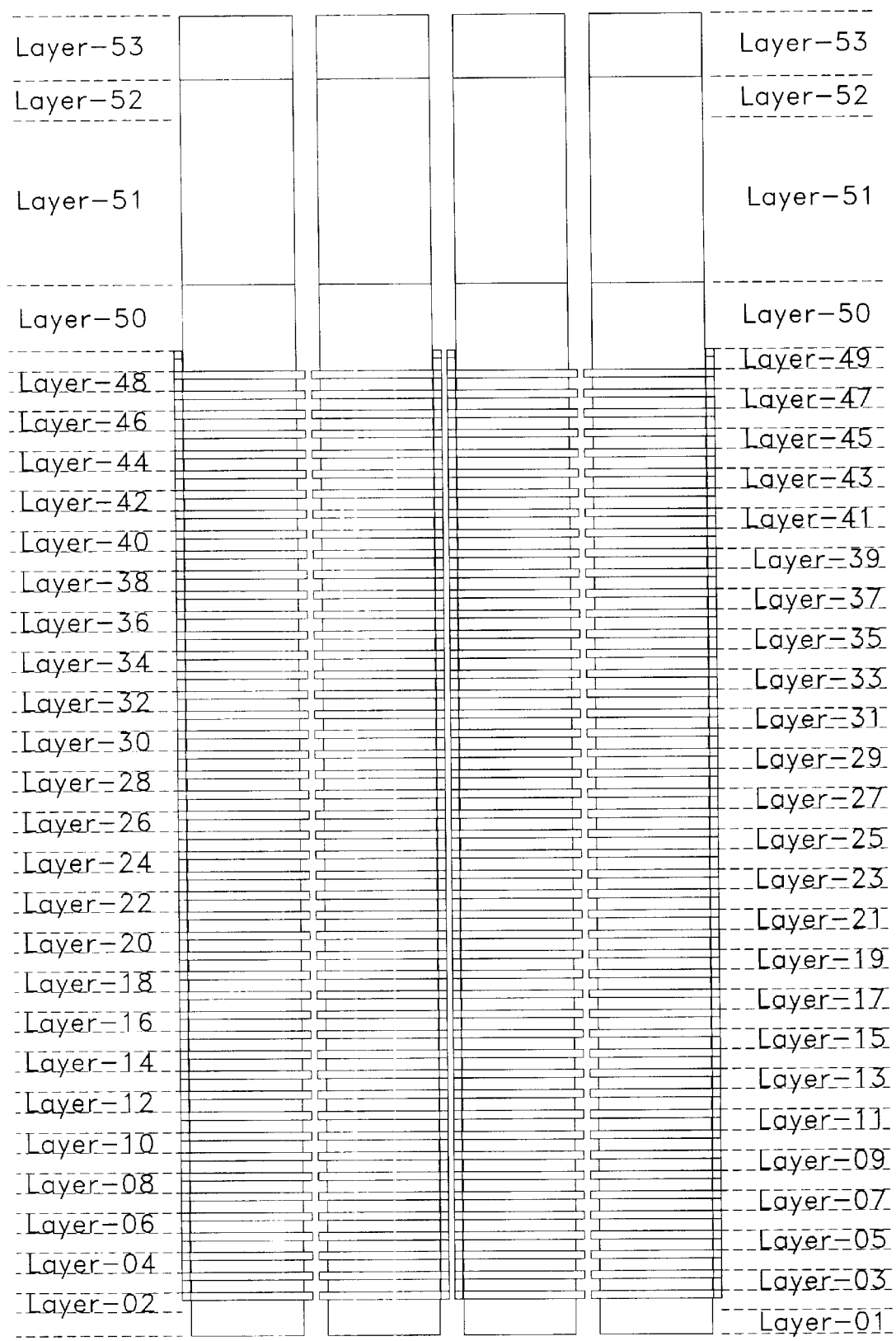
FIG. 55 shows an orthographic side-view of the Read and Write Element Induction Channel Coil Head design configuration for a magnetic Microhead Array Chip design, displaying the microheads CMOS lithographic layering levels.

Moreover, illustrated in FIGS. 1,2,3,7,8,9,10,25,28,29,31, 33,34,36,38,39, and 45 is a Read And Write Element Induction Channel Coil Microhead Array Chip's Microhead Array 1 (FIG. 1), which is made-up of a multitude of individual and micron sized microheads. Furthermore, each individual and micron sized microhead will have a separate and addressable location within the Microhead Array, where each individual microhead is accessible to the Disk Controller. Within each Microhead Array there could be as little as "1,000" individual microheads, or as many as "4" billion individual microheads within its Array. Moreover, because of the Microhead Array's complexity the internal microhead structures of the Microhead Array Chips are to be created using existing CMOS photo-resistant oxide masking, layering, and etching techniques. In conclusion, By using CMOS photo-resistant oxide masking and etching techniques, we can build layer-by-layer all of the Induction Channel Coils, the Microhead Yoke Cores, the Magnetic-Flux Concentration Tips, and the internal circuitry that are necessary in a fully functioning Microhead Array Chip device, as illustrated in FIGS. 54, 55, 54, and 55.

Furthermore, unlike the conventional Ferrite "thin film" data heads, which use copper wires wrapped around an induction head's Yoke Core, the Microhead Array Chips use instead an Induction Channel Coil design. Moreover, the Induction Channel Coils are created layer-upon-layer using CMOS photo-resistant oxide masking and etching techniques. For example, the doped silicon Microhead Array wafer-chip is covered with an oxide material, this first oxide material is covered with a photo-resistant oxide material. By using photo-masking, the doped silicon wafer-chip when exposed to ultraviolet light, will have the photo-resistant oxide areas of the doped silicon wafer-chip not masked to become photo-chemically changed. The photo-resistant oxide areas having been exposed to ultraviolet light are photo-chemically developed to expose the oxide layer beneath the photo-resistant oxide material. The lower layers of oxide are then etched-out chemically to become the microhead's Induction Channel Coil's channel areas. In conclusion, after the etching process is completed the etched-out Induction Channel Coil channel areas are filled-in with an electron conducting material, like "Aluminum" or "Copper".

Furthermore, a Microhead Array's Microhead Yoke Cores are created at the same time and in the same way as the Induction Channel Coils, layer-by-layer using CMOS photo-resistant oxide masking and etching techniques. Moreover, the doped silicon Microhead Array wafer-chip is covered with an oxide material, this first oxide material is covered with a photo-resistant oxide material. By using photo masking, the doped silicon wafer-chip when exposed to ultraviolet light, will have the photo-resistant oxide areas of the doped silicon wafer-chip not masked to become photo-chemically changed. The photo-resistant oxide areas having been exposed to ultraviolet light are photo-chemically developed to expose the oxide layer beneath the photo-resistant oxide material. The lower layers of oxide are then etched-out chemically to become the microhead's Yoke Core areas. In conclusion, after the etching process is completed, the etched-out Yoke Core areas are filled-in with a non-permanent magnetic Ferrite material, like "Ni—Zn Ferrite".

Furthermore, the Magnetic-Flux Concentration Tips are created in the same way as the microhead's Yoke Cores and Induction Channel Coils layer-by-layer using CMOS photoresistant oxide masking and etching techniques. Moreover, the doped silicon Microhead Array wafer-chip is covered with an oxide material, this first oxide material is covered with a photo-resistant oxide material. By using photo masking, the doped silicon wafer-chip when exposed to ultraviolet light, will have the photo-resistant oxide areas of the doped silicon wafer-chip not masked to be photo-chemically changed. The photo-resistant oxide areas having been exposed to ultraviolet light are photo-chemically developed to expose the oxide layer beneath the photo-resistant oxide material. The lower layers of oxide are then etched-out chemically to become the microhead's Magnetic-Flux Concentration Tip areas. In conclusion, after the etching process is completed the etched-out Magnetic-Flux Concentration Tip areas are filled-in with a non-permanent magnetic Ferrite material, like "Mn—Zn Ferrite".

Figure 58:
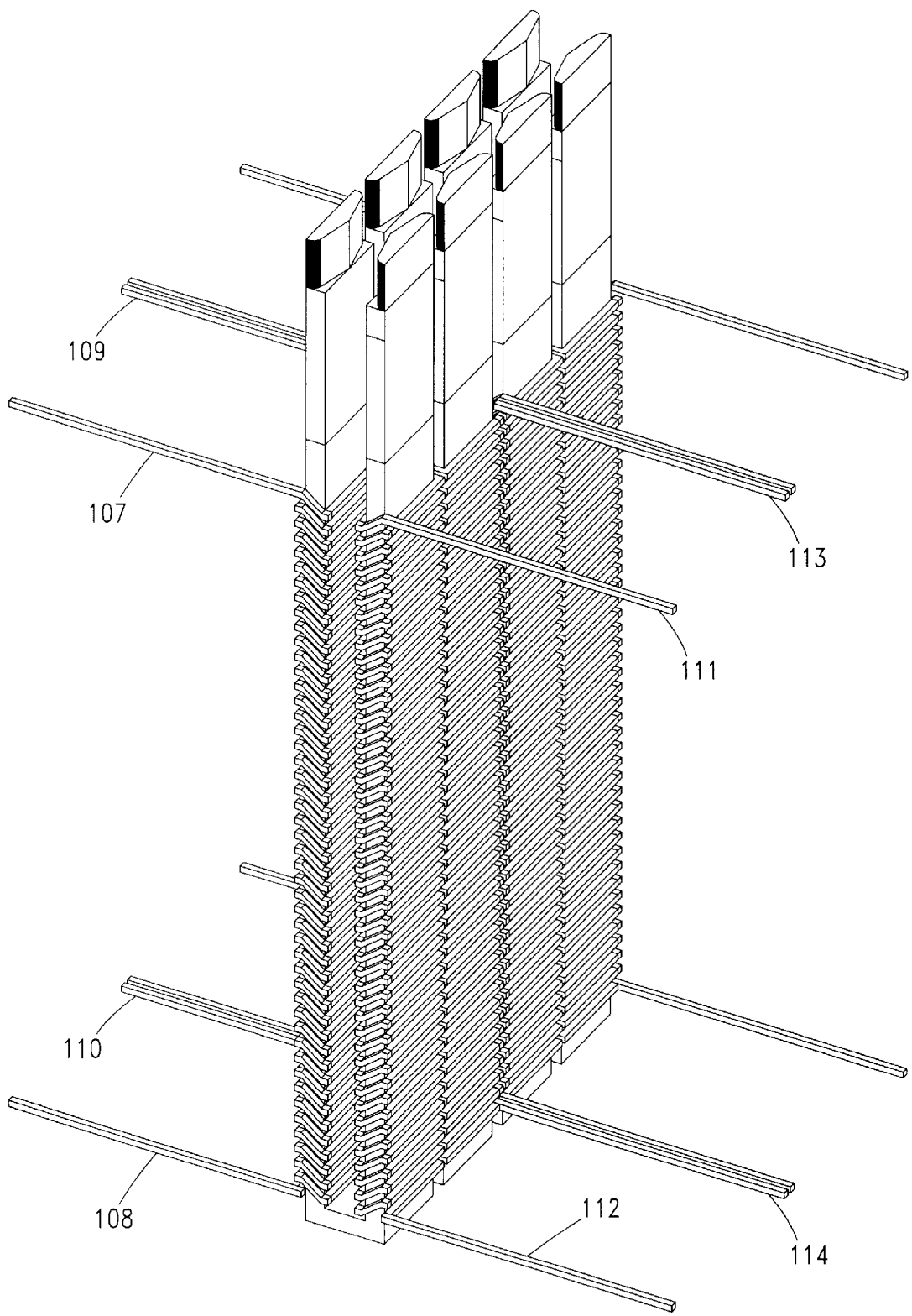
FIG. 58 shows a 3D top front-view of the Read and Write Element Induction Channel Coil Head design configuration for a magnetic Microhead Array Chip design, displaying Induction Channel Coil connector details for four microheads.

Therefore, all of the microheads within a Microhead Array would have their Yoke Cores, their Induction Channel Coils, their Magnetic-Flux Concentration Tips built-up layer-upon-layer. Furthermore, this building process would continue until the exact number of Induction Channel Coil turns had been reached and the proper formation of Microhead Yoke Cores, Magnetic Flux Concentration Tips structures had been achieved. Moreover, as presented in the art, illustrations in FIGS. 54 and 55 are examples of four Induction Channel Coil Read and Write Element Microheads, which display two "50" turn Induction Channel Coils per Microhead Yoke Core. Furthermore, the four Induction Channel Coil Read and Write Element Microhead's (FIGS. 54 and 55) consists of "53" built-up layer levels of CMOS structures. Moreover, the base of the four Microhead Array Yoke Cores (FIG. 54 and 55) will start at layer level "1", while layer level "2" will consist of the first Induction Channel Coil and its beginning contact-conduit structure, as illustrated in FIG. 58. In addition, layer level "3" through layer level "48" will consist of the built-up layer levels of Induction Channel Coils and their coinciding levels of Microhead Yoke Core structures. Where layer level "49" consists of the last Induction Channel Coil structure and its ending contact-conduit structure, as illustrated in FIG. 58. In addition, layer level "50", layer level "51", and layer level "52" are the last of the Microhead Array's Yoke Core layer levels. While, layer level "53" is the Microhead Array's Yoke Core's Magnetic-Flux Concentration Tip layer-level.

Figure 64A:
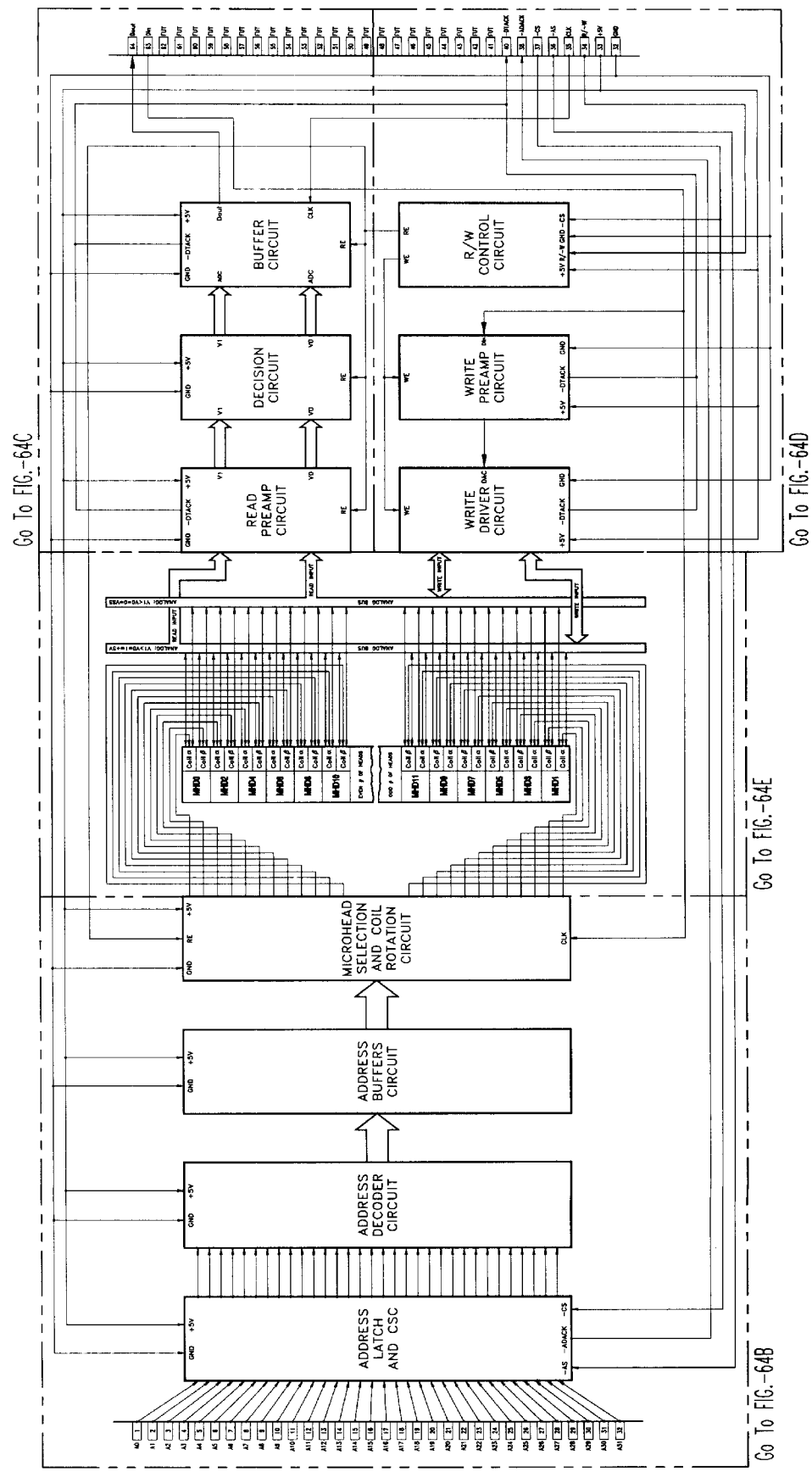
FIG. 64A shows a block-diagram for the magnetic Microhead Array Chip, displaying the location-key for block-diagram details.
Figure 64C:
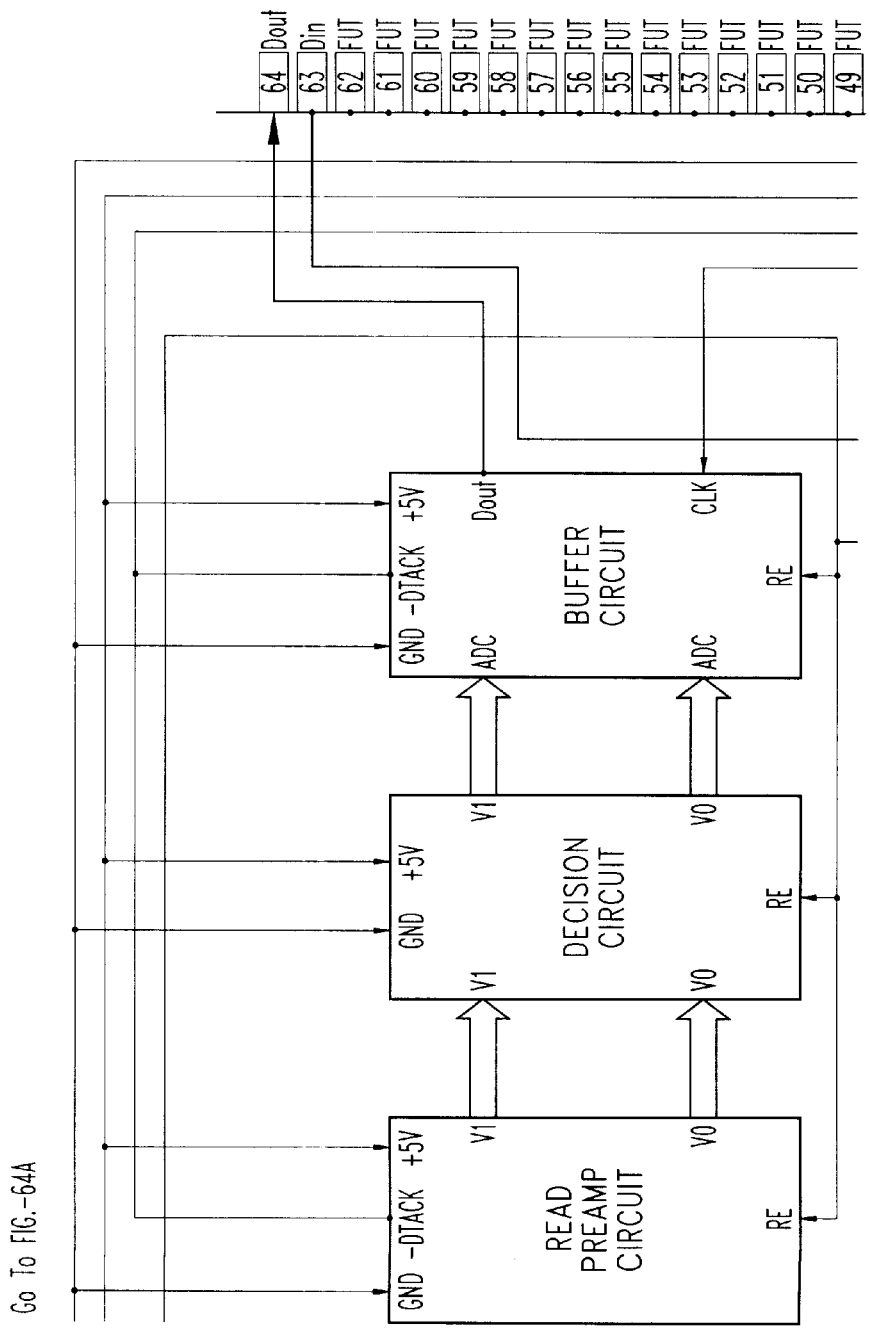
FIG. 64C shows a detailed enlargement block-diagram for the magnetic Microhead Array Chip, displaying the data Read Channels, and the data-acknowledgment control circuits.
Figure 64D:
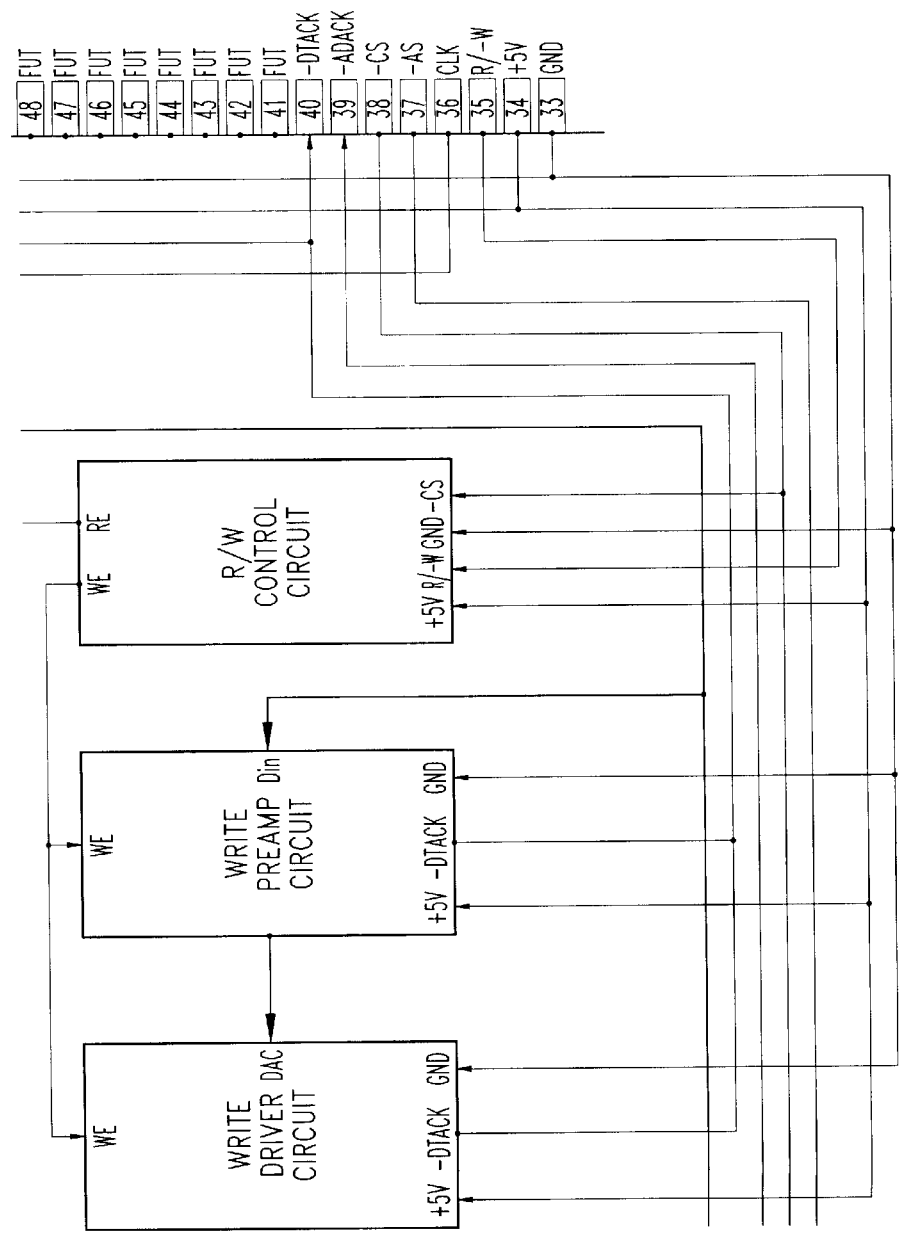
FIG. 64D shows a detailed enlargement block-diagram for the magnetic Microhead Array Chip, displaying the data Write Channels, and the data acknowledgment control circuits.
Figure 64E:
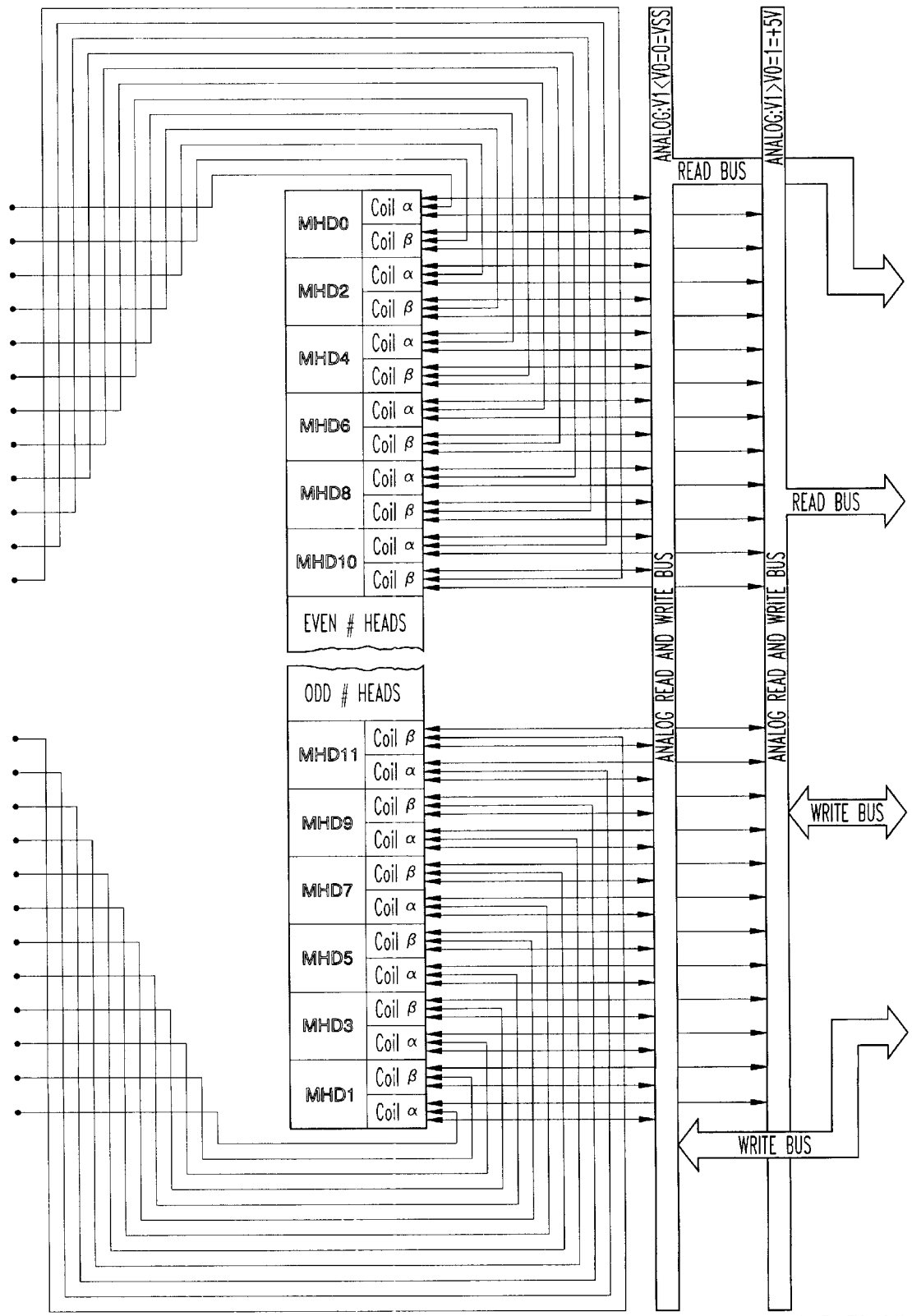
FIG. 64E shows a detailed enlargement block-diagram for the magnetic Microhead Array Chip, displaying the coil control-lines, and the read or write bus-circuits.

Furthermore, one complete Induction Channel Coil is made up of electron conducting channels, which are built around one of two Yoke Core magnetic poles that form a spiral like structure of channels. Moreover, the previously mentioned spiral structure of channels are used to induce magnetic fields through the non-permanent magnetic Ferrite material of the Yoke Cores when an electrical current is applied to the contact conduit-leads of the coils. Furthermore, each Induction Channel Coil has two contact conduit-leads connected to each Induction Channel Coil 107, 108, 109, 110, 111, 112, 113, 114 (FIG. 58). In addition, the contact conduit-leads are built into each end of every Induction Channel Coil used within a Microhead Array, as illustrate in FIG. 58. Moreover, the "A" contact conduit-lead is attached at the beginning or bottom-end of every Induction Channel Coil used within a Microhead Array 108, 110, 112, 114 (FIG. 58). While the "B" contact conduit-lead is attached to the ending or top-end of every Induction Channel Coil used within a Microhead Array 107, 109, 111, 113 (FIG. 58). In addition, the "B" type top contact conduit-leads 107, 109, 111, 113 (FIG. 58), which are closest to the Magnetic-Flux Concentration Tips are attached to the "B" Read or Write Input bus circuit conduit used in the Microhead Array Chip design, as illustrated in FIGS. 64A and 64E. In addition, the "A" type bottom contact conduit-leads 108, 110, 112, 114 (FIG. 58), which are closest to a microheads' Yoke Core bottom u-bends are attached to the "A" Read or Write Input bus circuit conduit used in the Microhead Array Chip design.

Figure 47:
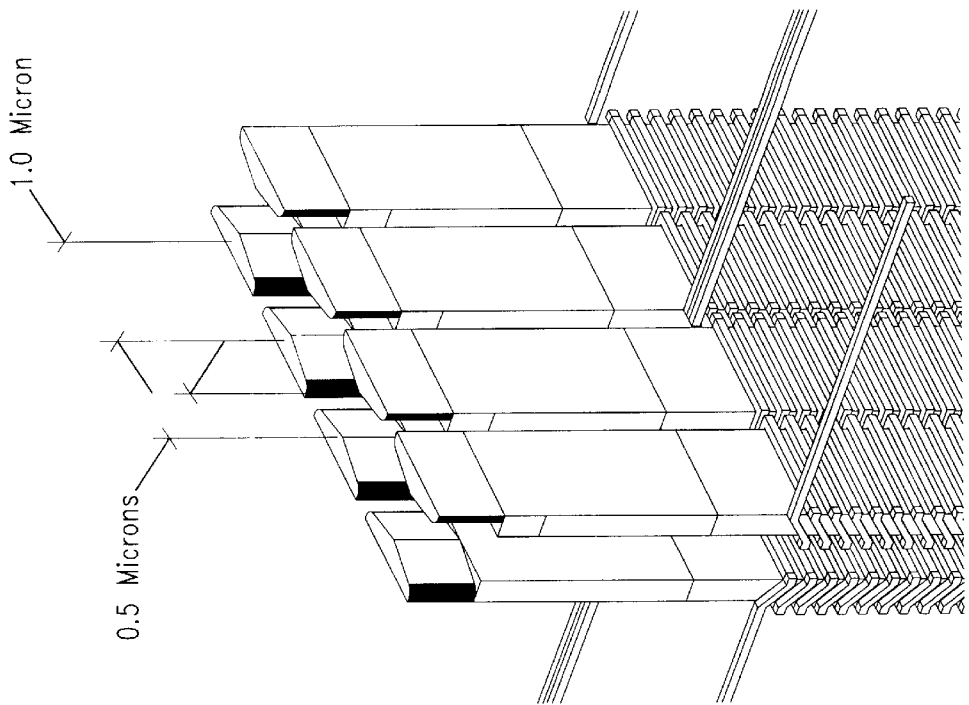
FIG. 47 shows a 3D top side-view close-up of the Read and Write Element Induction Channel Coil design configuration for a magnetic Microhead Array Chip design, displaying the microheads left side tip-gap, tip-centerline to tip-centerline dimensioning details.
Figure 48:
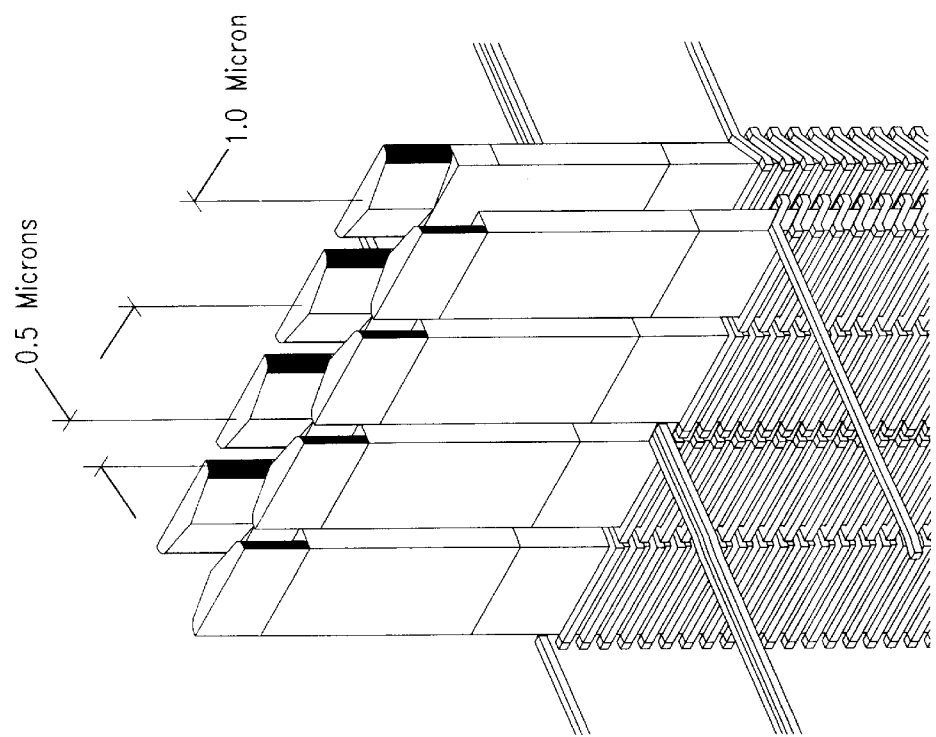
FIG. 48 shows a 3D top side-view close-up MR Read Head Element and Induction Channel Coil Write Head Element design configuration for a magnetic Microhead Array Chip design, displaying the microheads right side tip-gaps, and tip-centerline to tip-centerline dimensioning details.
Figure 53:
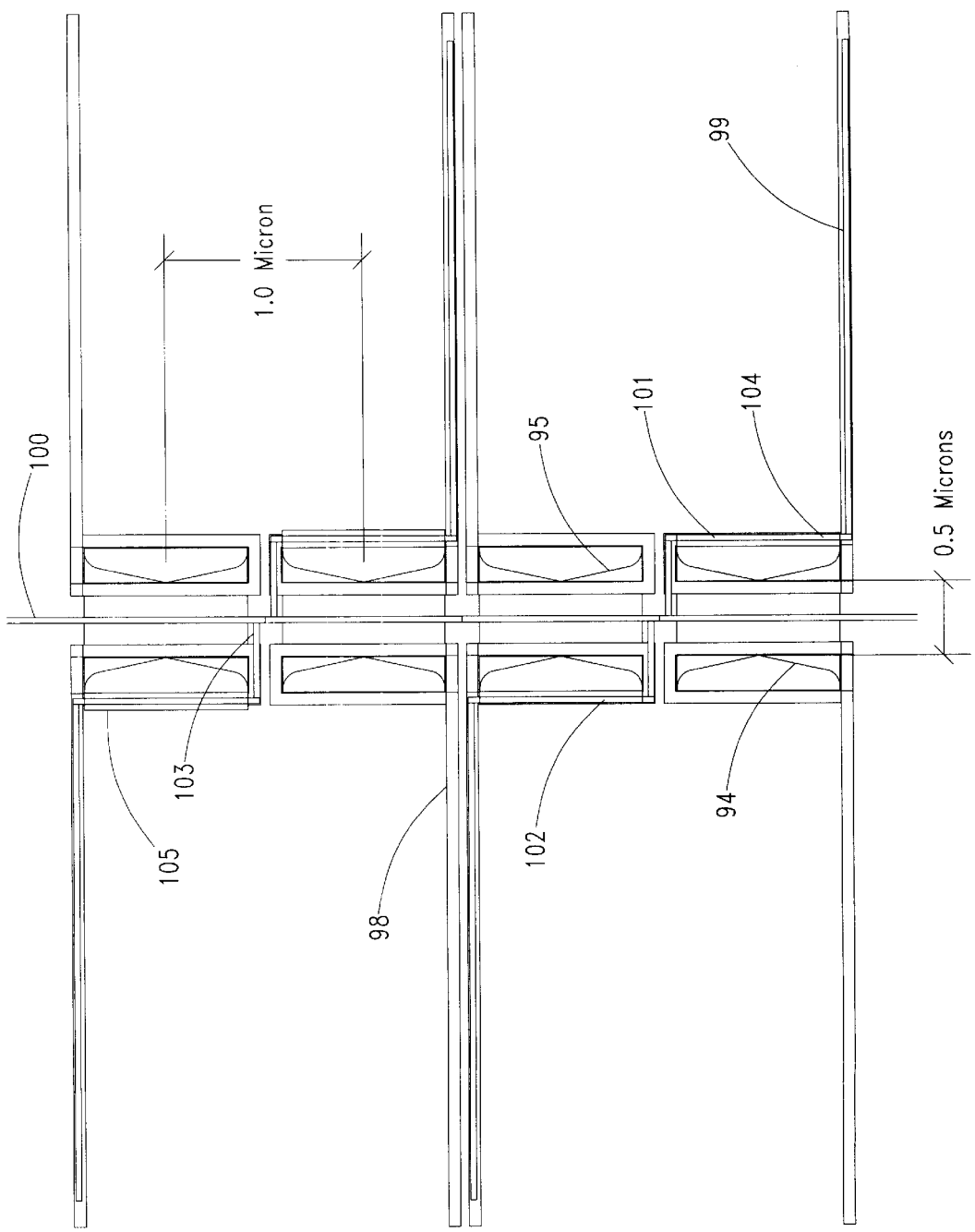
FIG. 53 shows an orthographic plan-view of the MR Read Head Element and Induction Channel Coil Write Head Element design configuration for a magnetic Microhead Array Chip design, displaying tip-gap, and tip-centerline to tip-centerline dimension details for four microheads.

Furthermore, along with the microhead structures of magnetic and conductive materials are layered levels of non-conducting "Silicon Oxide" material, which is used to fill in the non-conducting and insulation areas for all layered levels of CMOS structures built into the Microhead Array Chips. In addition, the non-conducting Silicon Oxide insulating structures are constructed layer-upon-layer at the same time as the CMOS circuit structures. Moreover, layer levels "1" through "5" are to be used for the formation of a Microhead Array's microhead base structures, along with the Microhead Array Chip's fully integrated CMOS control circuitry. Furthermore, this full integration of CMOS circuitry within a Microhead Array Chip will include the Data I/O, the Chip Control, the Chip Select, and the Read and Write Channel's pre-amplifiers, as illustrated in FIGS. 64A, 64B, 64C, 64D, and 64E. Furthermore, a shown but not limited too dimension of "1.0" micron is determined when measured from a Magnetic-Flux Concentration Tip centerline to a Magnetic-Flux Concentration Tip centerline, as illustrated in FIGS. 47, 48, and 53. In addition, a shown but not limited too "head gap" dimension of "0.5" microns is determined when measured from a Microhead Yoke Core's right magnetic-pole Magnetic-Flux Concentration Tip gap-edge centerline to a Microhead Yoke Core's left magnetic-pole Magnetic-Flux Concentration Tip gap-edge centerline, as illustrated in FIGS. 47, 48, and 53.

In addition, the core structures of the second microhead design strategy consists of a u-shaped "Yoke Core" 96, 97 (FIGS. 41 and 43) with two "Magnetic-Flux Concentration Tips" 94, 95 (FIGS. 41, and 43) on the top of each Yoke Core's magnetic-pole ending-tips, as illustrated in FIG. 39. In addition, the Microhead Yoke Core (FIG. 39) structure 96, 97 (FIGS. 41, and 43) is made from a nonpermanent magnetic Ferrite material like "Ni—Zn Ferrite". While, the Magnetic-Flux Concentration Tips 94, 95 (FIG. 41) are made from a non-permanent magnetic Ferrite material like "Mn—Zn Ferrite". The Microhead Array's Yoke Cores 96, 97 (FIG. 43) have a Magnetic Flux Concentration Tip 94, 95 (FIG. 43) on each of its u-magnet magnetic-pole ending-tips, as illustrated in FIG. 39. Moreover, with one complete and independent Induction Channel Coil 98 (FIG. 43) built around each of the u-shaped magnetic pole of the Microhead Array Yoke Core arms 96, 97 (FIG. 43).

Figure 46:
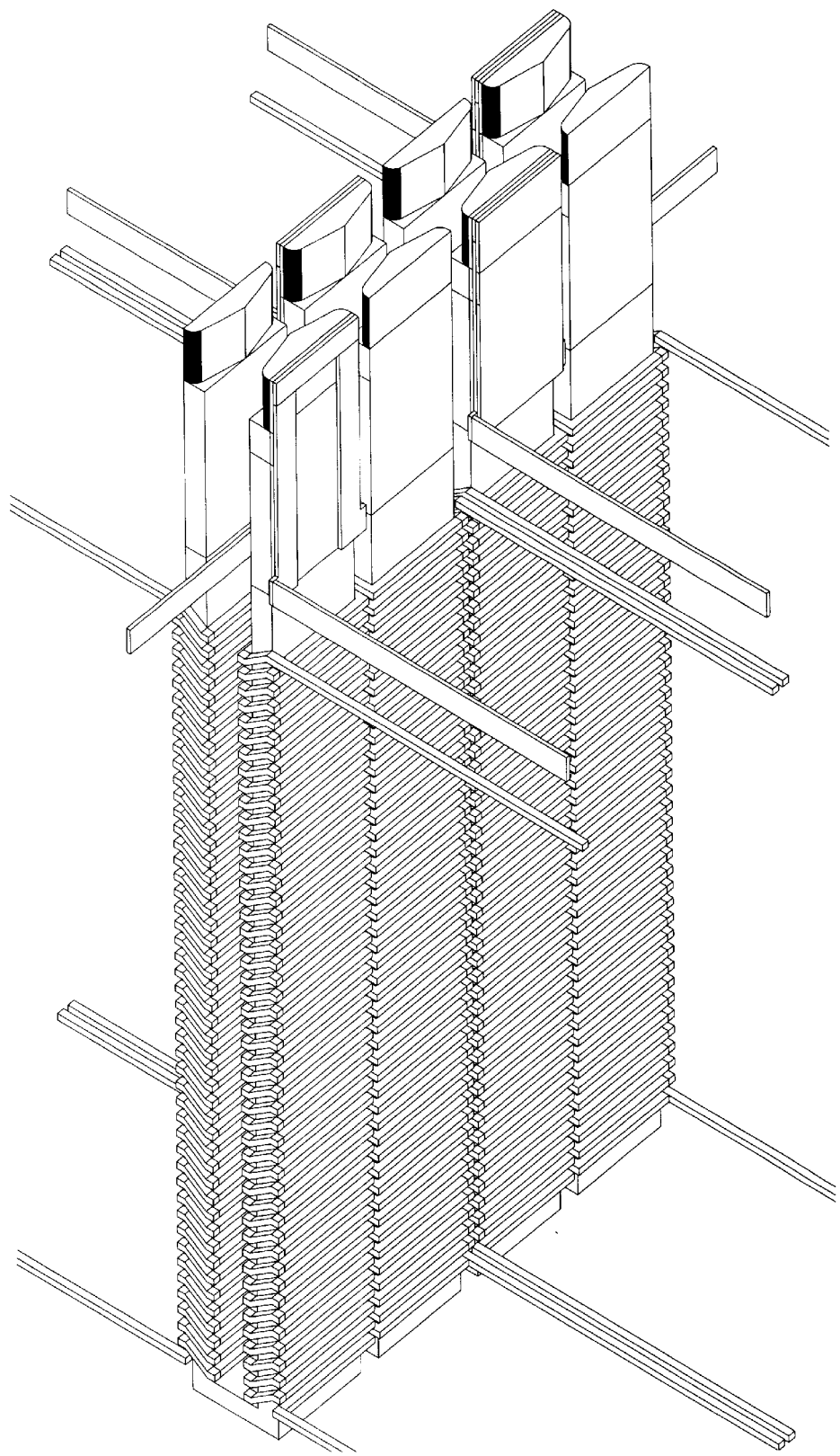
FIG. 46 shows a 3D top front-view close-up of the MR Read Head Element and Induction Channel Coil Write Head Element design configuration for a magnetic Microhead Array Chip design, displaying details of four microheads.
Figure 51:
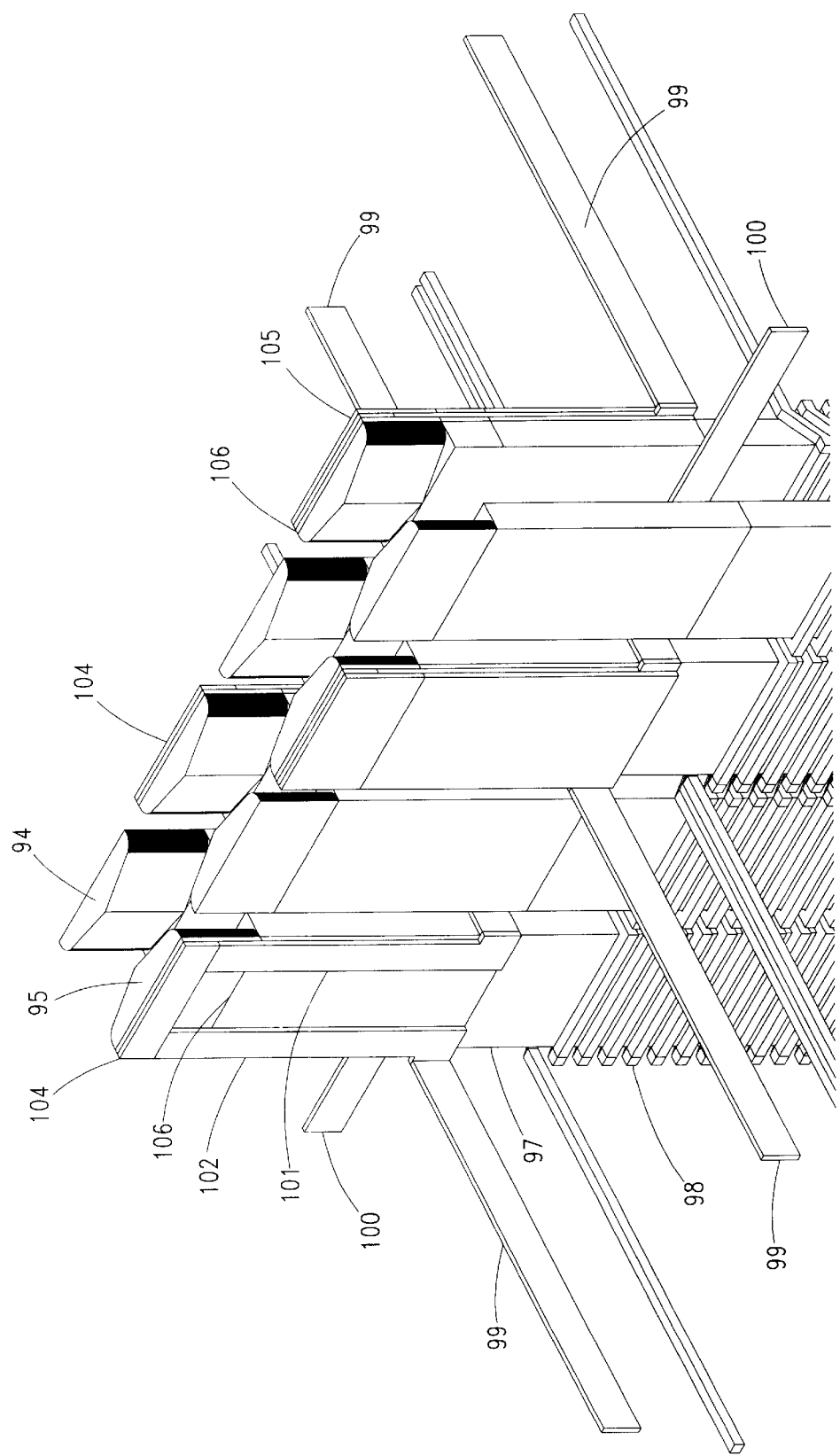
FIG. 51 shows a 3D top side-view close-up MR Read Head Element and Induction Channel Coil Write Head Element design configuration for a magnetic Microhead Array Chip design, displaying details of our microheads.
Figure 52:
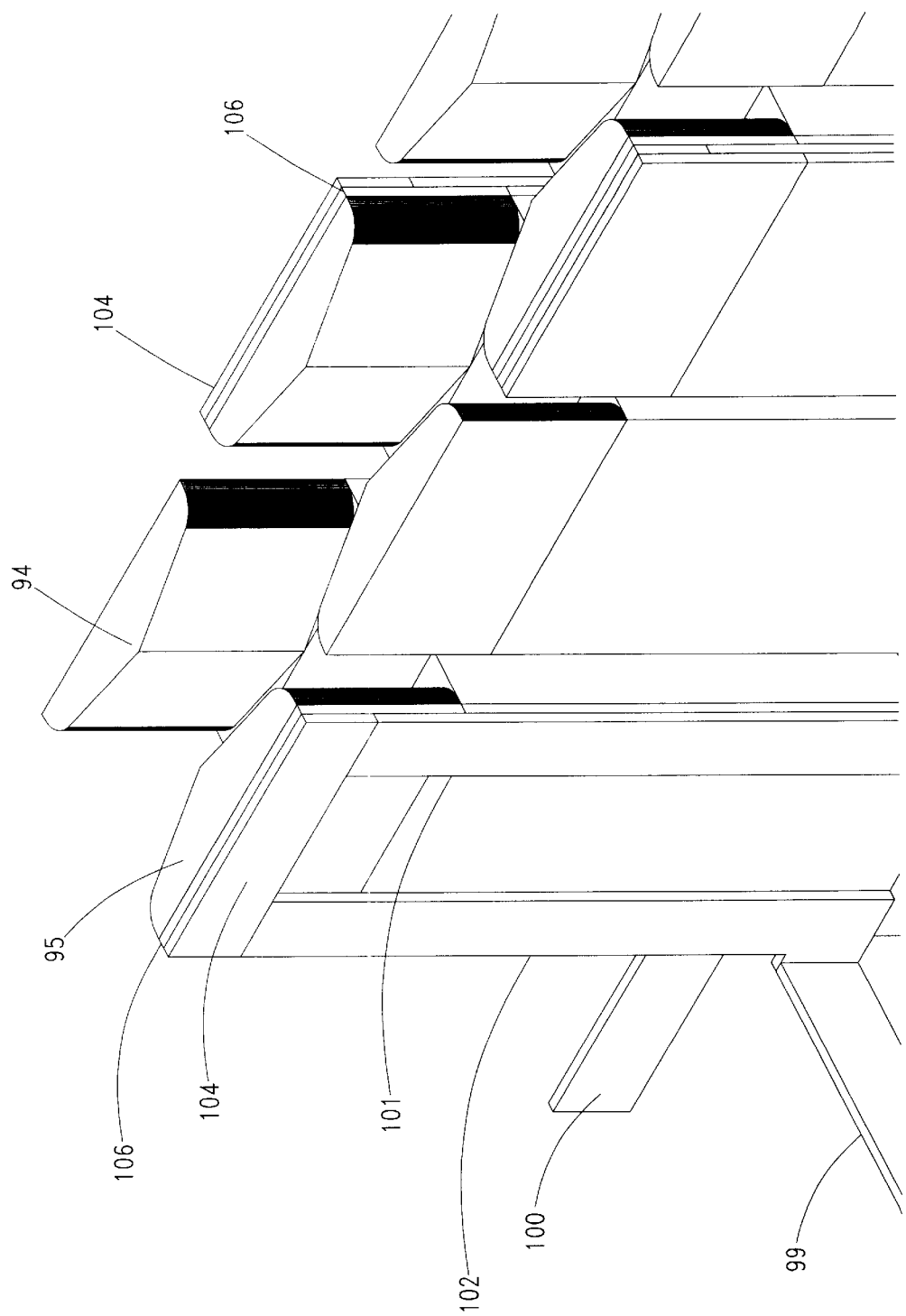
FIG. 52 shows a 3D top side-view zoomed-in close-up MR Read Head Element and Induction Channel Coil Write Head Element design configuration for a magnetic Microhead Array Chip design, displaying details of two microheads.

Moreover, the (MR) "Magnetoresistor" read elements (FIG. 46) are illustrated without the "Permalloy Magnetic Shield" wall 104 in FIGS. 40, 42, 44, 51, 52, and 53. In addition, the (MR) Magnetoresistor read elements are also illustrated with the Permalloy Magnetic Shield wall 105 in FIGS. 40, 42, 44, 51, 52, and 53. Moreover, the components that make up the second microhead design's Magnetoresistor read microheads, as illustrated in FIGS. 51, 52, and 53 comprise:

(i) A (SAL) "Soft Adjacent Layer" structure 106 (FIGS. 51, and 52), (ii) A Magnetoresistor read element 104 (FIGS. 40, 42, 44, 51, 52, and 53), (iii) A Permalloy Magnetic Shield 105 (FIGS. 40, 42, 44, 51, and 53), (iv) "Sense-Current Circuit Contacts" 101 (FIGS. 51, 52, and 53), (v) "Signal-Voltage Circuit Contacts" 102 (FIGS. 51, 52, and 53), (vi) "Signal-Voltage Circuit Contact Leads" 99 (FIGS. 40, 42, 44, 51, 52, and 53), (vii) "Sense-Current Circuit Contact Leads" 103 (FIG. 53), (viii) A "Sense-Current Bus-Conduit" 100 (FIGS. 44, 51, 52, and 53).

Furthermore, a Magnetoresistor Read Element and Induction Channel Coil Write Element Microhead Array Chip's microhead Induction Channel Coil could have as little as "2" channel coil-turn windings or as many as "500" channel coil-turn windings built into its structure. Subsequently, there are at least two of these Induction Channel Coils built into every microhead (FIG. 45) contained within a Microhead Array of its Microhead Array Chip.

Figure 56:
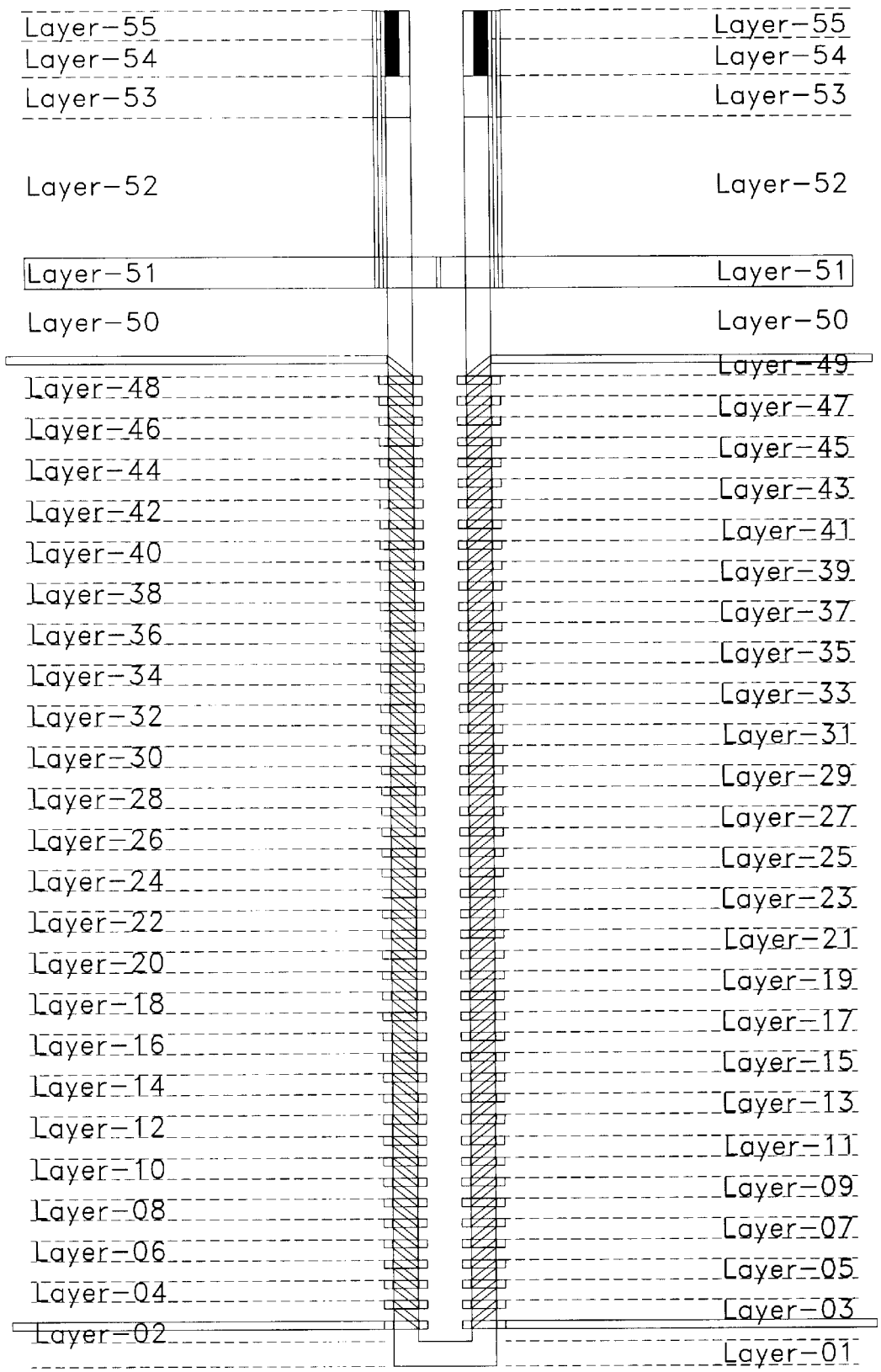
FIG. 56 shows an orthographic front-view of the MR Read Head Element and Induction Channel Coil Write Head Element design configuration for a magnetic Microhead Array Chip design, displaying the microheads CMOS lithographic layering levels.
Figure 57:
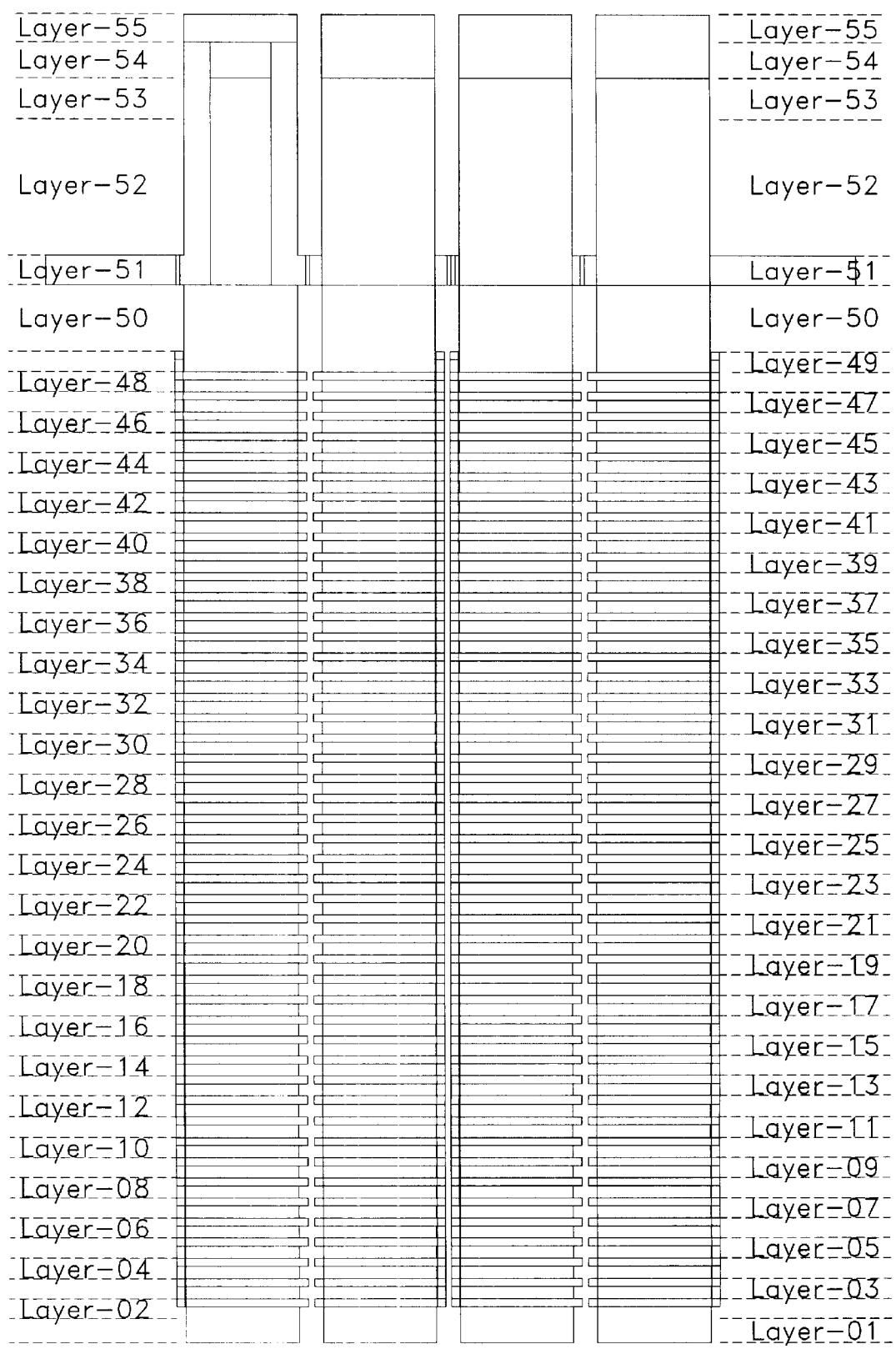
FIG. 57 shows an orthographic side-view of the MR Read Head Element and Induction Channel Coil Write Head Element design configuration for a magnetic Microhead Array Chip design, displaying the microheads CMOS lithographic layering levels.

Moreover, illustrated in FIGS. 1, 2, 3, 7, 8, 9, 10, 25, 28, 29, 31, 33, 34, 36, 38, and 39 is a Magnetoresistor Read Element And Induction Channel Coil Write Element Microhead Array Chip's Microhead Array 1 (FIG. 45), which is made-up of a multitude of individual and micron sized microheads. Furthermore, each individual and micron sized microhead will have a separate and addressable location within the Microhead Array, where each individual microhead is accessible to the Disk Controller. Within each Microhead Array Chip there could be as little as "1,000" individual microheads, or as many as "4" billion individual microheads within its Array. Furthermore, because of the Microhead Array's complexity, the internal microhead structures of the Microhead Array Chips are to be created with existing CMOS photo-resistant oxide masking, layering, and etching techniques. By using CMOS photo-resistant oxide masking and etching techniques we can build layer-by-layer all of the Induction Channel Coils, the Microhead Yoke Cores, the Magnetic-Flux Concentration Tips, the Magnetoresistor Read elements, and the internal circuitry that are necessary in a fully functioning Microhead Array Chip device, as illustrated in FIGS. 56 and 57.

Furthermore, unlike the conventional Ferrite "thin film" data heads, which use copper wires, wrapped around an induction head's Yoke Core, the Microhead Array Chips use instead an Induction Channel Coil design. Moreover, the Induction Channel Coils are created layer-upon-layer using CMOS photo-resistant oxide masking and etching techniques. For example, the doped silicon Microhead Array wafer-chip is covered with an oxide material, this first oxide material is covered with a photo-resistant oxide material. By using photo-masking, the doped silicon wafer-chip when exposed to ultraviolet light, will have the photo-resistant oxide areas of the doped silicon wafer-chip not masked to become photo-chemically changed. The photo-resistant oxide areas having been exposed to ultraviolet light are photo-chemically developed to expose the oxide layer beneath the photo-resistant oxide material. The lower layers of oxide are then etched-out chemically to become the microhead's Induction Channel Coil's channel areas. In conclusion, after the etching process is completed the etched-out Induction Channel Coil channel areas are filled-in with an electron conducting material, like "Aluminum" or "Copper".

Furthermore, a Microhead Array's Microhead Yoke Cores are created at the same time and in the same way as the Induction Channel Coils, layer-by-layer using CMOS photo-resistant oxide masking and etching techniques. Moreover, the doped silicon Microhead Array wafer-chip is covered with an oxide material, this first oxide material is covered with a photo-resistant oxide material. By using photo masking, the doped silicon wafer-chip when exposed to ultraviolet light, will have the photo-resistant oxide areas of the doped silicon wafer-chip not masked to become photo-chemically changed. The photo-resistant oxide areas having been exposed to ultraviolet light are photo-chemically developed to expose the oxide layer beneath the photo-resistant oxide material. The lower layers of oxide are then etched-out chemically to become the microhead's Yoke Core areas. In conclusion, after the etching process is completed, the etched-out Yoke Core areas are filled-in with a non-permanent magnetic Ferrite material, like "Ni—Zn Ferrite".

Furthermore, the Magnetic-Flux Concentration Tips are created in the same way as the microhead's Yoke Cores and Induction Channel Coils layer-by-layer using CMOS photo-resistant oxide masking and etching techniques. Moreover, the doped silicon Microhead Array wafer-chip is covered with an oxide material, this first oxide material is covered with a photo-resistant oxide material. By using photo masking, the doped silicon wafer-chip when exposed to ultraviolet light, will have the photo-resistant oxide areas of the doped silicon wafer-chip not masked to be photo-chemically changed. The photo-resistant oxide areas having been exposed to ultraviolet light are photo-chemically developed to expose the oxide layer beneath the photo-resistant oxide material. The lower layers of oxide are then etched-out chemically to become the microhead's Magnetic-Flux Concentration Tip areas. In conclusion, after the etching process is completed the etched-out Magnetic-Flux Concentration Tip areas are filled-in with a non-permanent magnetic Ferrite material, like "Mn—Zn Ferrite".

In addition, the (MR) Magnetoresistor read elements are created in the same way as the microhead's Yoke Cores, Induction Channel Coils, and Magnetic-Flux Concentration Tips layer-by-layer using CMOS photo-resistant oxide masking and etching techniques. Moreover, the doped silicon Microhead Array wafer-chip is covered with an oxide material, this first oxide material is covered with a photo-resistant oxide material. By using photo masking, the doped silicon wafer-chip when exposed to ultraviolet light, will have the photo-resistant oxide areas of the doped silicon wafer-chip not masked to become photo-chemically changed. The photo-resistant oxide areas having been exposed to ultraviolet light are photo-chemically developed to expose the oxide layer beneath the photo-resistant oxide material. The lower layers of oxide are then etched-out chemically to become the microhead's Magnetoresistor read element areas. Moreover, after the etching process is completed, the next process is to fill in the etched-out Magnetoresistor read element areas with various Permalloy materials. Therefore, all of the microheads within a Microhead Array would have their Yoke Cores, their Induction Channel Coils, their Magnetic-Flux Concentration Tips, and their (MR) Magnetoresistor read elements built-up layer-upon-layer. Furthermore, this building process would continue until the exact number of Induction Channel Coil turns had been reached and the proper formation of Microhead Yoke Cores, Magnetic Flux Concentration Tips, and (MR) Magnetoresistor read element structures had been achieved.

Figure 59:
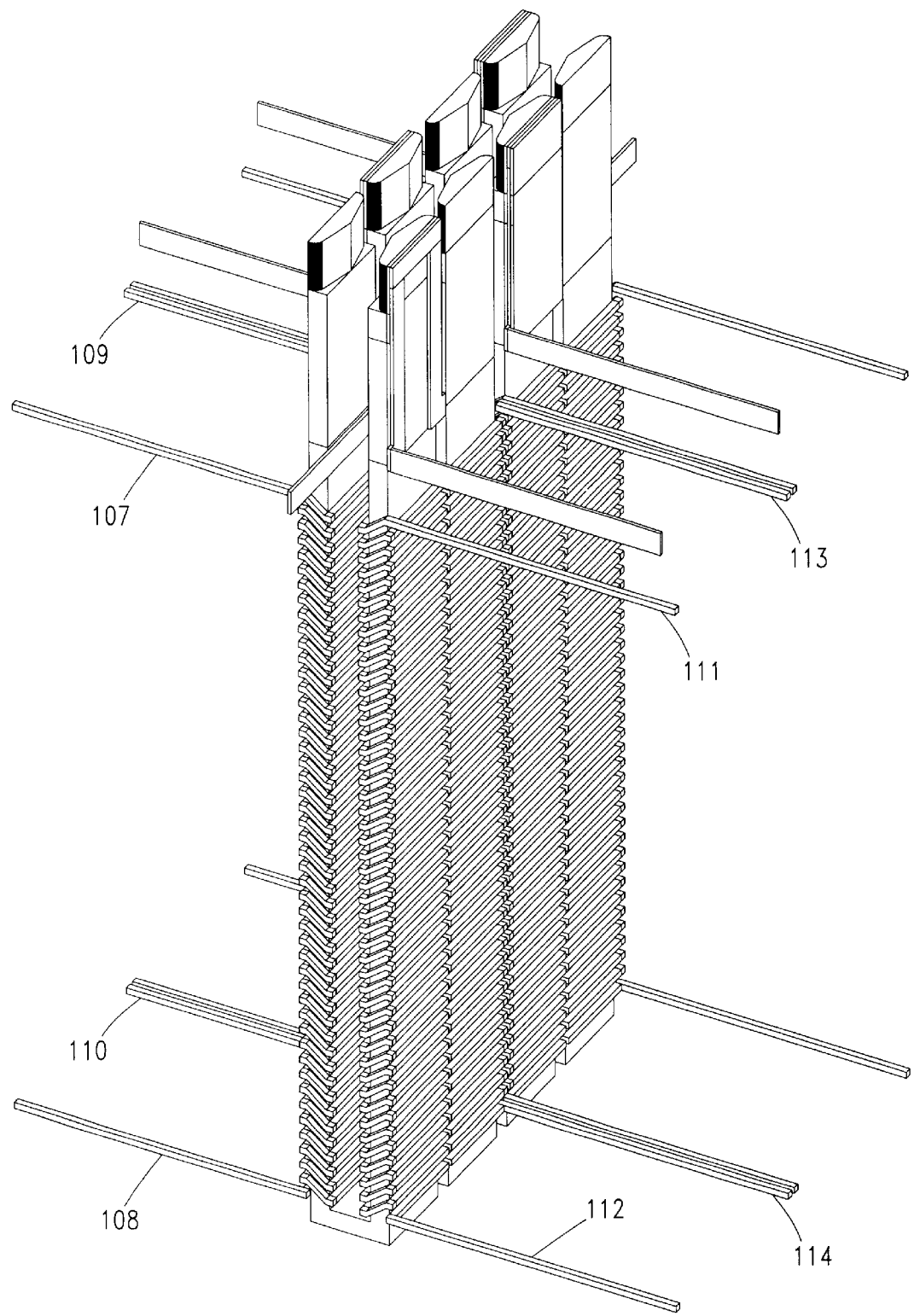
FIG. 59 shows a 3D top front-view of the MR Read Head Element and Induction Channel Coil Write Head Element design configuration for a magnetic Microhead Array Chip design, displaying Induction Channel Coil connector details for four microheads.

Moreover, as presented in the art, illustrations in FIGS. 56 and 57 are examples of four Magnetoresistor Read Element And Induction Channel Coil Write Element Microheads, which display two "50" turn Induction Channel Coils per Microhead Yoke Core. The four Magnetoresistor Read Element And Induction Channel Coil Write Element Microheads (FIGS. 56 and 57) consist of "55" built-up layer levels of CMOS structures. Moreover, the base of the four Microhead Array Yoke Cores (FIGS. 56 and 57) will start at layer level "1", while layer level "2" will consist of the first Induction Channel Coil and its beginning contact-conduit structure, as illustrated in FIG. 59. In addition, layer level "3" through layer level "48" will consist of the built-up layered levels of Induction Channel Coils and their coinciding levels of Microhead Yoke Core structures. Where layer level "49" consists of the last Induction Channel Coil layer level along with its ending contact-conduit. Where layer level "50" is a Magnetoresistor microhead's Yoke Core layer, while layer level "51" is a Magnetoresistor's Sense Current Bus layers. In addition, where layer level "53" is the last Magnetoresistor microhead's Yoke Core layer level. Furthermore, layered levels "51", "52", "53", "54", and "55" are the Magnetoresistor's Permalloy read element levels, where layer level "54" and layer level "55" plays a duel-role as a Magnetoresistor sensor and as a Magnetic-Flux Concentration Tip level.

Figure 65A:
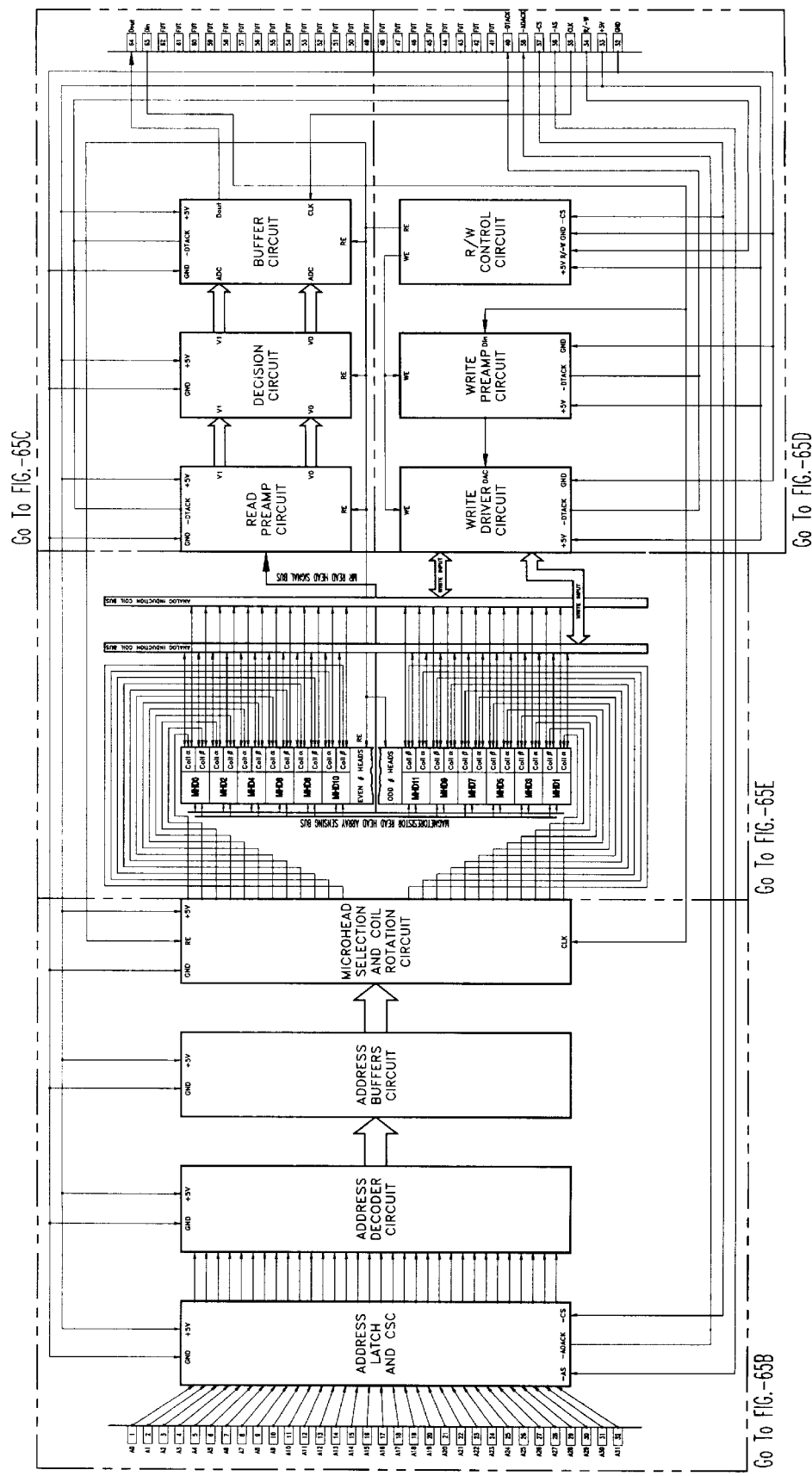
FIG. 65A shows a block-diagram for the Magnetoresistor Microhead Array Chip, displaying the location-key for block-diagram details.

Furthermore, one complete Induction Channel Coil is made up of electron conducting channels, which are built around one of two Yoke Core magnetic poles that will form a spiral like structure of channels. Moreover, the previously mentioned spiral structure of channels will be used to induce magnetic fields through the non-permanent magnetic Ferrite material of the Yoke Core when an electrical current is applied to the contact conduit-leads of the coil. Furthermore, each Induction Channel Coil has two contact conduit-leads connected to each Induction Channel Coil 107, 108, 109, 110, 111, 112, 113, 114 (FIG. 59). In addition, the contact conduit-leads are built into to each end of every Induction Channel Coil used within a Microhead Array, as illustrated in FIG. 59. Moreover, the "A" contact conduit-lead is attached to the beginning or bottom-end of every Induction Channel Coil used within a Microhead Array 108, 110, 112, 114 (FIG. 59). While the "B" contact conduit-lead is attached to the ending or top-end of every Induction Channel Coil used within a Microhead Array 107, 109, 111, 113 (FIG. 59). In addition, the "B" type top contact conduit-leads 107, 109, 111, 113 (FIG. 59), which are closest to the Magnetic-Flux Concentration Tips are attached to the "B" Read or Write Input bus circuit conduit used within a Microhead Array Chip, as illustrated in FIGS. 65A, and 65E. In addition, the "A" type bottom contact conduit-leads 108, 110, 112, 114 (FIG. 59), which are closest to the microhead's Yoke Core bottom u-bend are attached to the "A" Read or Write Input bus circuit conduit used within a Microhead Array Chip.

Figure 49:
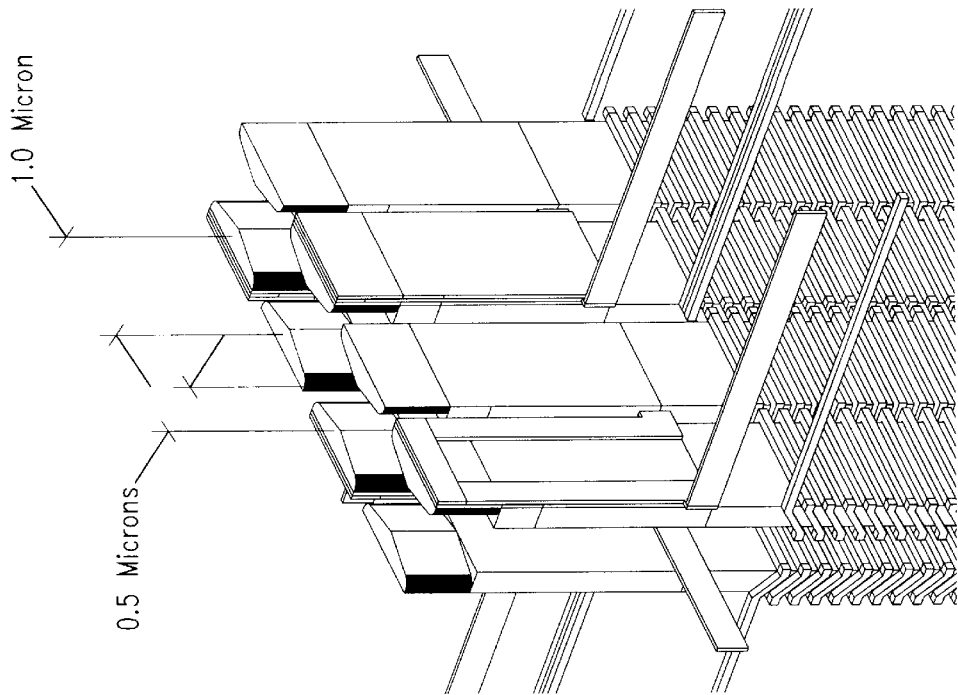
FIG. 49 shows a 3D top side-view close-up MR Read Head Element and Induction Channel Coil Write Head Element design configuration for a magnetic Microhead Array Chip design, displaying the microheads left side tip-gaps, and tip centerline to tip centerline-dimensioning details.
Figure 50:
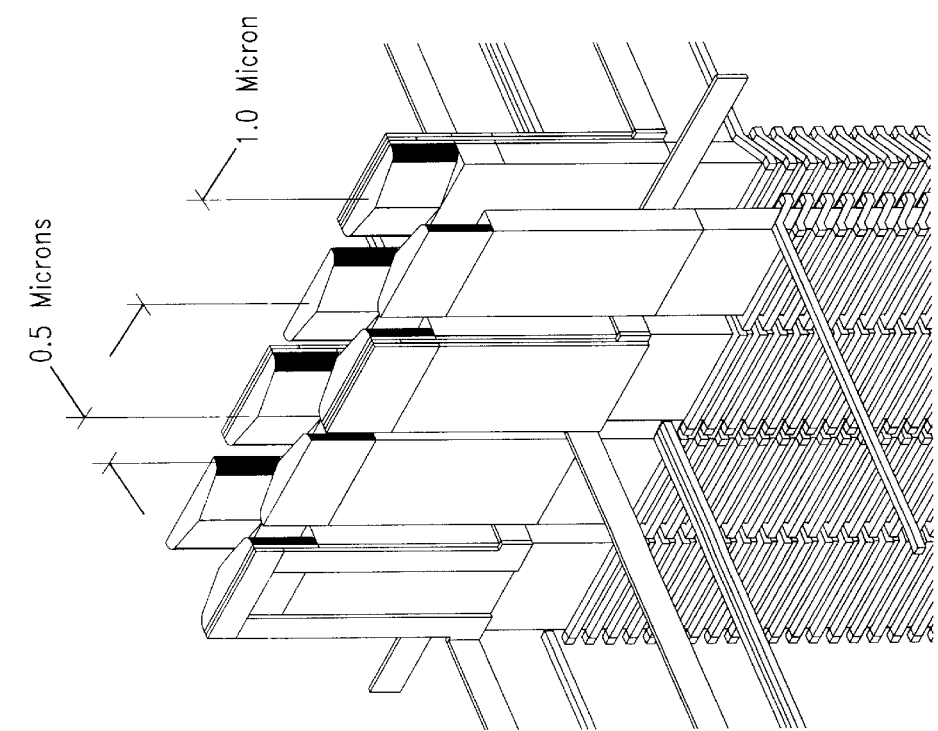
FIG. 50 shows a 3D top side-view close-up MR Read Head Element and Induction Channel Coil Write Head Element design configuration for a magnetic Microhead Array Chip design, displaying the microheads right side tip-gaps, and tip-centerline to tip-centerline dimensioning details.

Furthermore, along with the microhead structures of magnetic and conductive materials are layered levels of non-conducting "Silicon Oxide" material, which is used to fill in the non-conducting and insulation areas for all layered levels of CMOS structures built into the Microhead Array Chips. In addition, these non-conducting Silicon Oxide insulating structures are constructed layer-upon-layer at the same time as the rest of the CMOS circuit structures that are built into the Microhead Array Chips. Moreover, layered levels "1" through "5" are to be used for the formation of a Microhead Array's microhead base structures, along with a Microhead Array Chip's fully integrated CMOS control circuitry. Furthermore, this full integration of CMOS circuitry within a Microhead Array Chip will include the Data I/O, the Chip Control, the Chip Select, and the Read and Write Channel's pre-amplifiers, as illustrated in FIGS. 65A, 65B, 65C, 65D, and 65E. Furthermore, a shown but not limited too dimension of "1.0" micron is determined when measured from a Magnetic-Flux Concentration Tip centerline to a Magnetic-Flux Concentration Tip centerline, as illustrated in FIGS. 49, 50 and 53. In addition, a shown but not limited too "head gap" dimension of "0.5" microns is determined when measured from a Microhead Yoke Core's right magnetic-pole Magnetic-Flux Concentration Tip gap-edge centerline to a Microhead Yoke Core's left magnetic-pole Magnetic-Flux Concentration Tip gap-edge centerline, as illustrated in FIGS. 49, 50, and 53.

In addition, the following paragraphs provide descriptions of the Read Channel, the Write Channel, and their IDE and SCSI interface operational controls, which are all, incorporated into the Microhead Array Chip design. The Microhead Array Chip Hard Disk Drive design will begin a read or a write-data disk operation when the Disk Controller forwards a data-sector and cylinder address location to the Disk Controller's Address Controller, which is located on a Microhead Array Chip Hard Disk Drive's PCB. Once received, the Address Controller translates this request, then stores it in the Address Controller's "Address Unit" translation register. Furthermore, this stored address translation is then used to execute the necessary control and 32-bit address bus-line signals, which are used for executing a Microhead Array Chip's microhead selection and control. Moreover, the Address Controller must first select and enable a Microhead Array Chip, which is the equivalent to the conventional selection of a Flying-Head during a read-data or write-data disk operation.

Moreover, the (-CS) "Chip Select" control-bus signal is one of the two control signals responsible for the selection of a Microhead Array Chip. Furthermore, the Microhead Array Chip to be selected is positioned over a disk-platter data-surface, which contains the track and sector location of data or available data areas being requested by the host-system during a read-data or write-data disk operation. In addition, the Microhead Array Chip selection process is first accomplished through individual (-CS) Chip Select control bus-lines. Moreover, one control line is dedicated to each Microhead Array Chip installed in a Microhead Array Chip Hard Disk Drive's unit assembly (i.e., eight installed Microhead Array Chips as presented in this arm would each, have its own separate (CS) Chip Select control bus-line). Subsequently, these Chip Select signal-lines are each redirected from the control-bus line's flex-cable connectors to the surface mounting chip-socket's input-contact pin-number "38", which is located on all chip-positioning circuit boards installed in a Microhead Array Chip Hard Disk Drive's unit assembly. Furthermore, through a cross-connect circuit that is built into each chip-positioning circuit board's copper circuit-traced architecture, as illustrated in FIGS. 17, 18, 19, 20, 21, 22, 23 and 24, the Microhead Array Chip's chip-positioning circuit board surface mounting chip-socket's input-contact pin-number "38" and the chip-positioning circuit board's Polymer flex-cable connector inputs are cross-connected.

Figure 17:
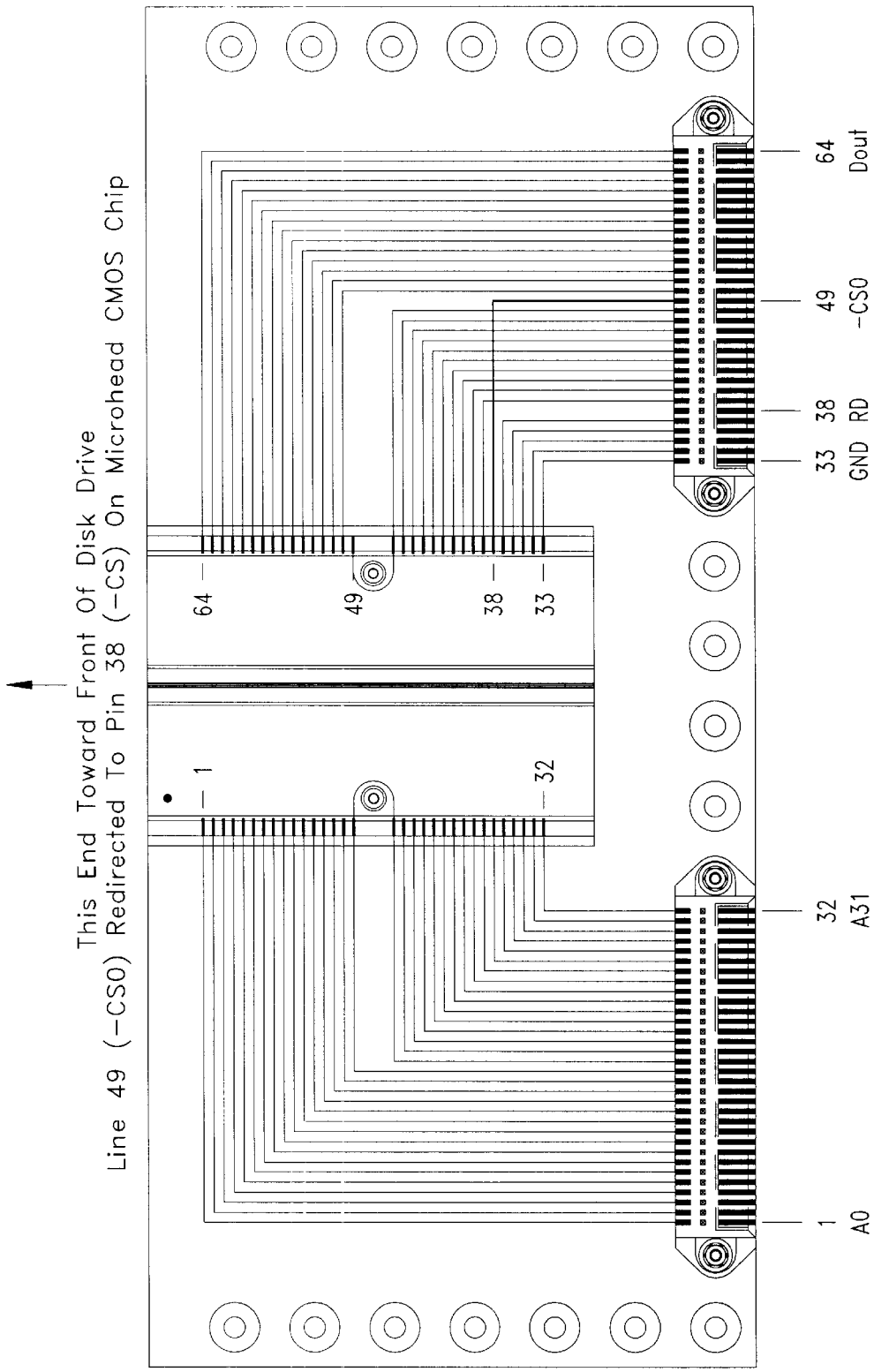
FIG. 17 shows a plan-view of the chip-positioning circuit board displaying a redirection (RD) of the Chip Select (-CS) line for Microhead Array Chip Number-I for a magnetic Microhead Array Chip design, which is to be positioned for disk one's bottom side data-surface one.
Figure 18:
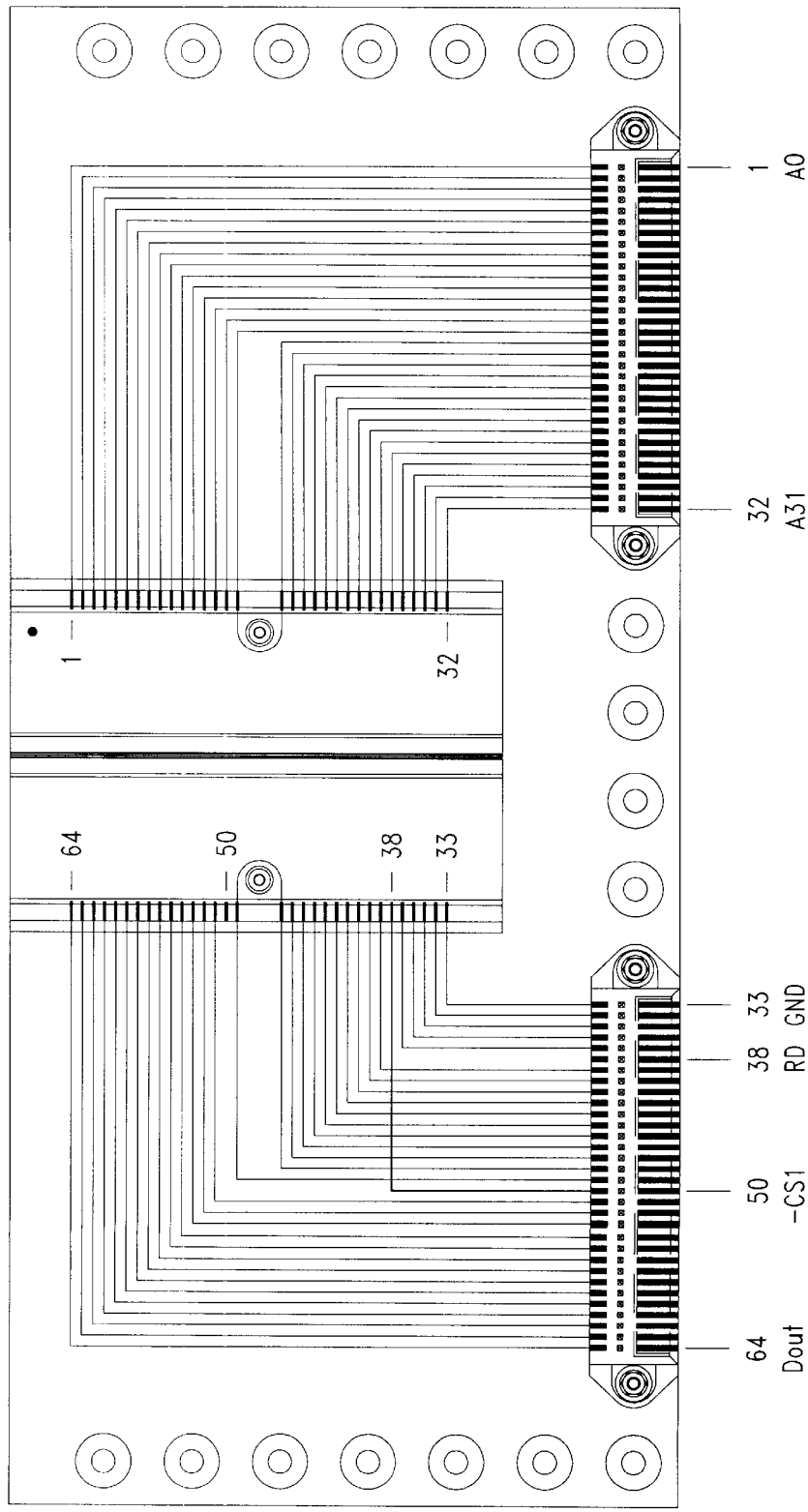
FIG. 18 shows a plan-view of the chip-positioning circuit board displaying a Redirection (RD) of the Chip Select (-CS) line for Microhead Array Chip Number-2 for a magnetic Microhead Array Chip design, which is to be positioned for disk one's top side data-surface two.
Figure 19:
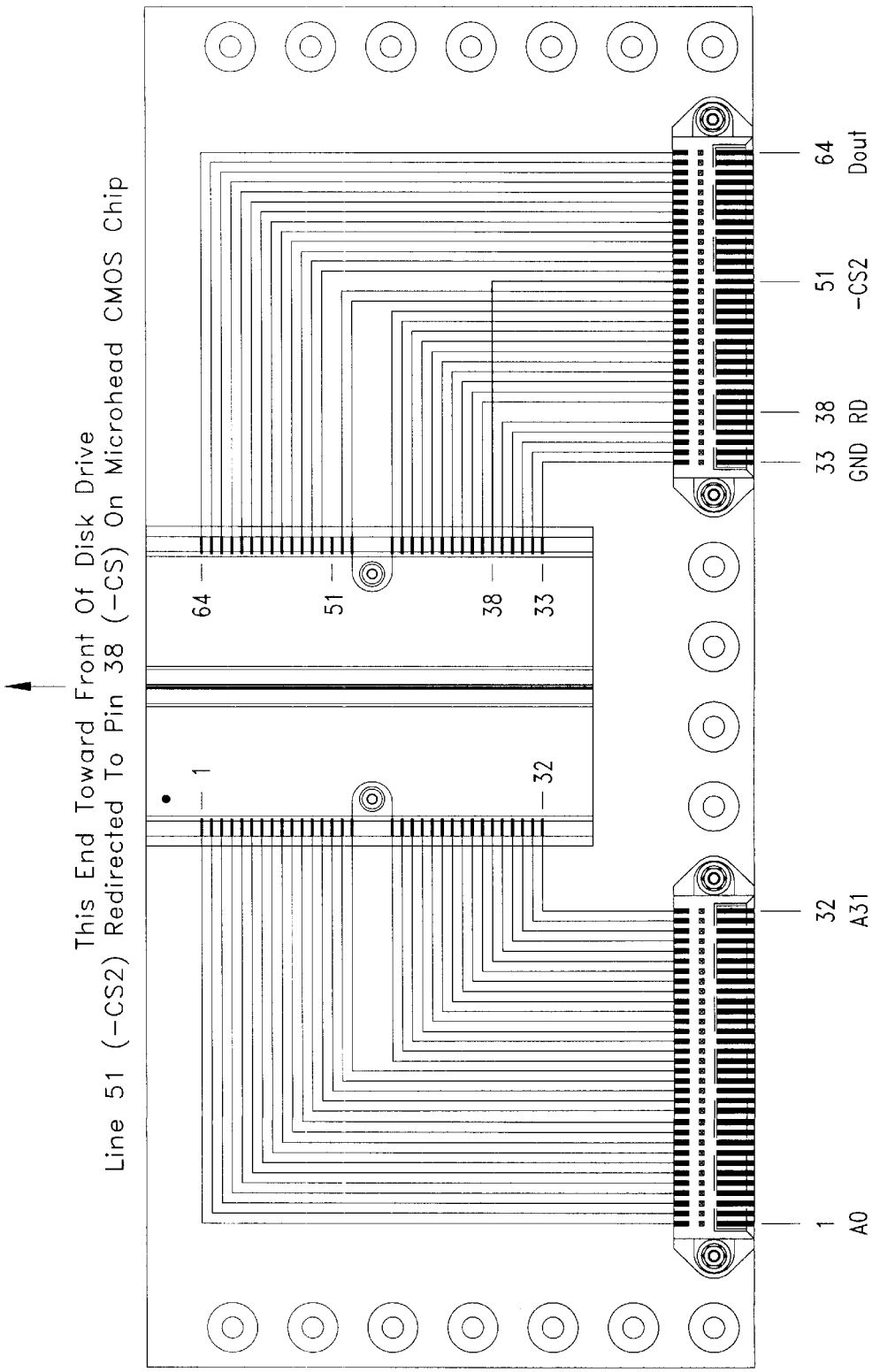
FIG. 19 shows a plan-view of the chip-positioning circuit board displaying a Redirection (RD) of the Chip Select (-CS) line for Microhead Array Chip Number-3 for a magnetic Microhead Array Chip design, which is to be positioned for disk two's bottom side data-surface one.
Figure 20:
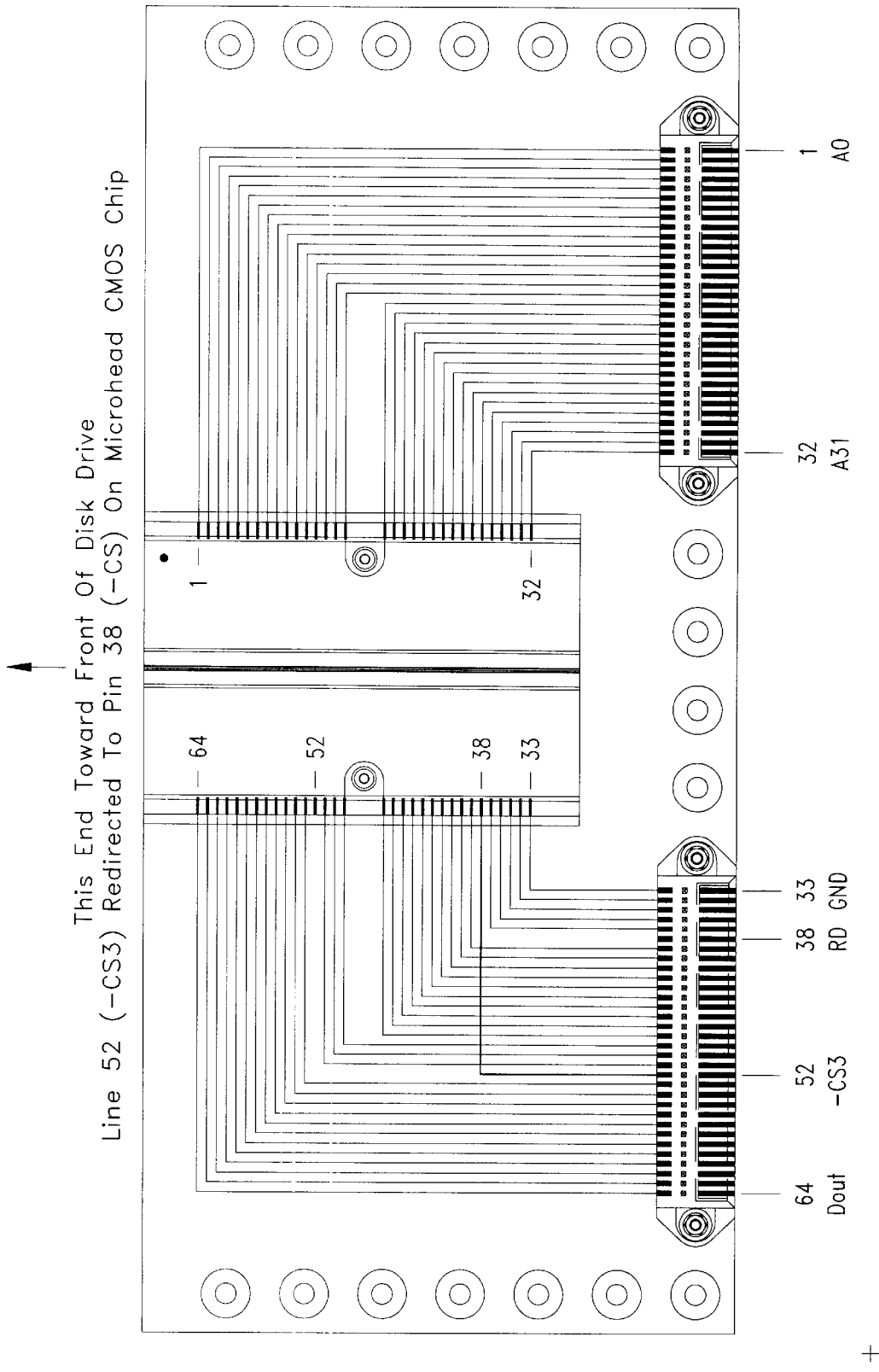
FIG. 20 shows a plan-view of the chip-positioning circuit board displaying a Redirection (RD) of the Chip Select (-CS) line for Microhead Array Chip Number-4 for a magnetic Microhead Array Chip design, which is to be positioned for disk two's top side data-surface two.
Figure 21:
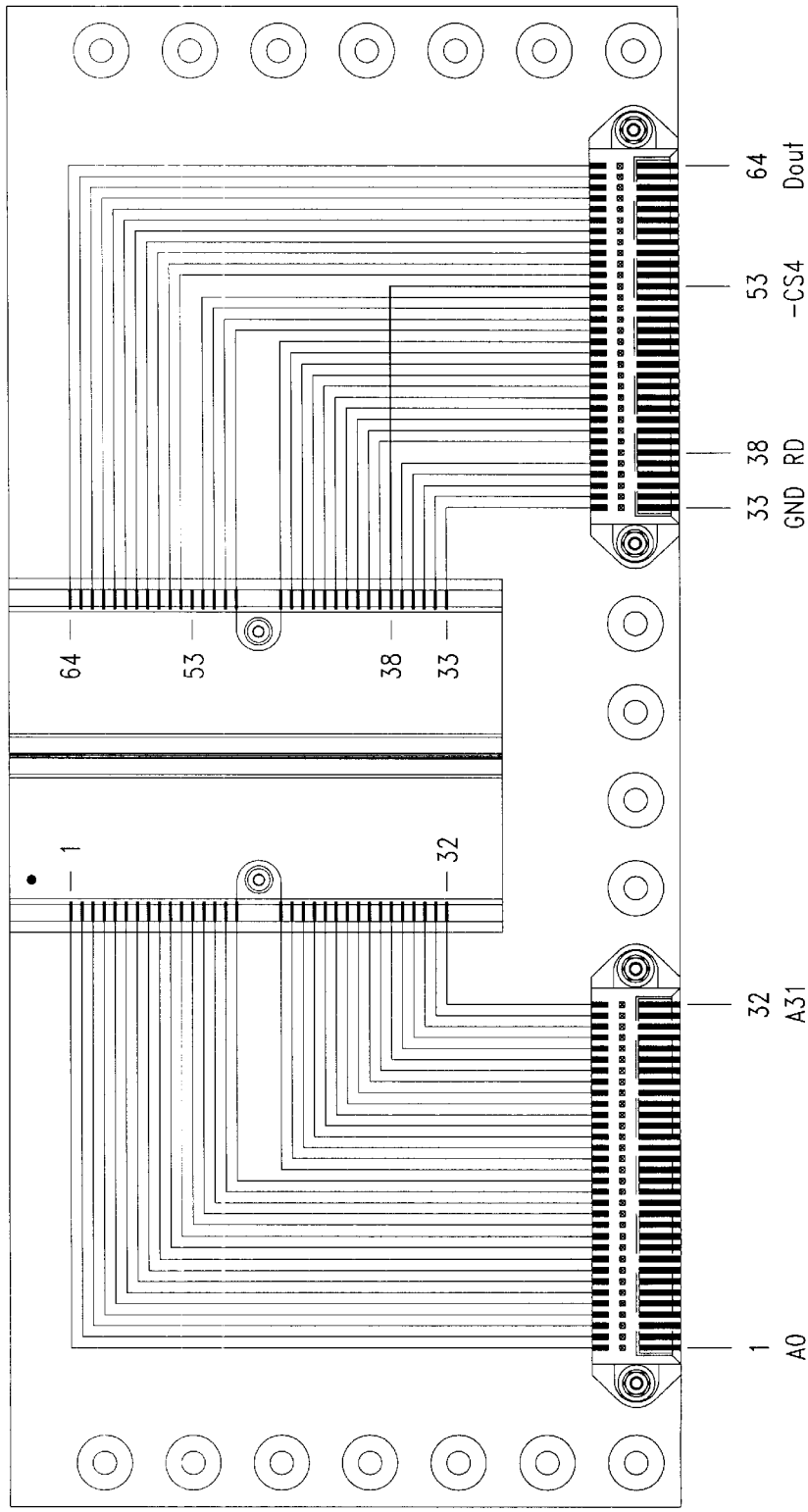
FIG. 21 shows a plan-view of the chip-positioning circuit board displaying a Redirection (RD) of the Chip Select (-CS) line for Microhead Array Chip Number-5 for a magnetic Microhead Array Chip design, which is to be positioned for disk three's bottom side data-surface one.
Figure 22:
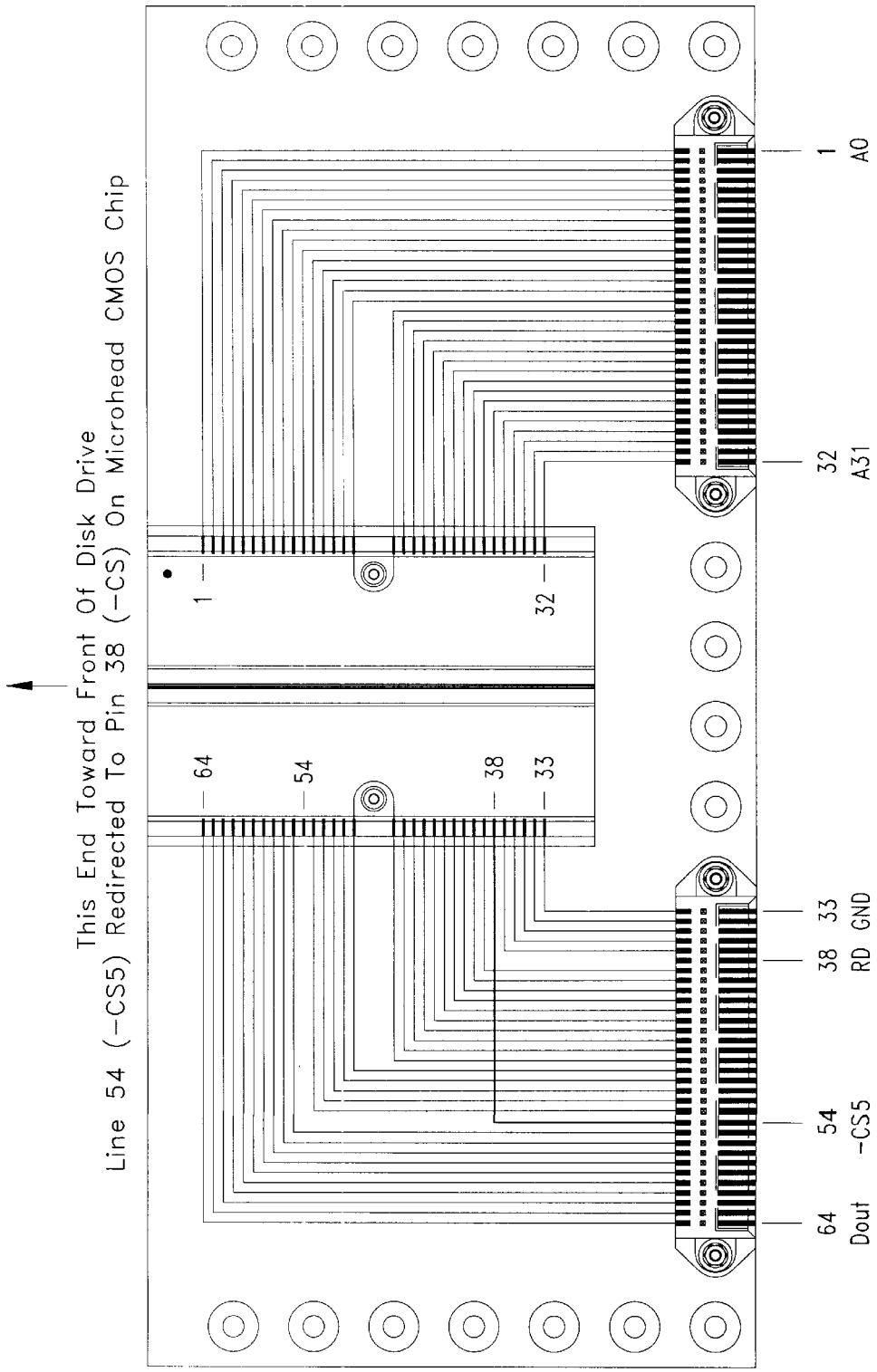
FIG. 22 shows a plan-view of the chip-positioning circuit board displaying a Redirection (RD) of the Chip Select (-CS) line for Microhead Array Chip Number-6 for a magnetic Microhead Array Chip design, which is to be positioned for disk three's top side data-surface two.
Figure 23:
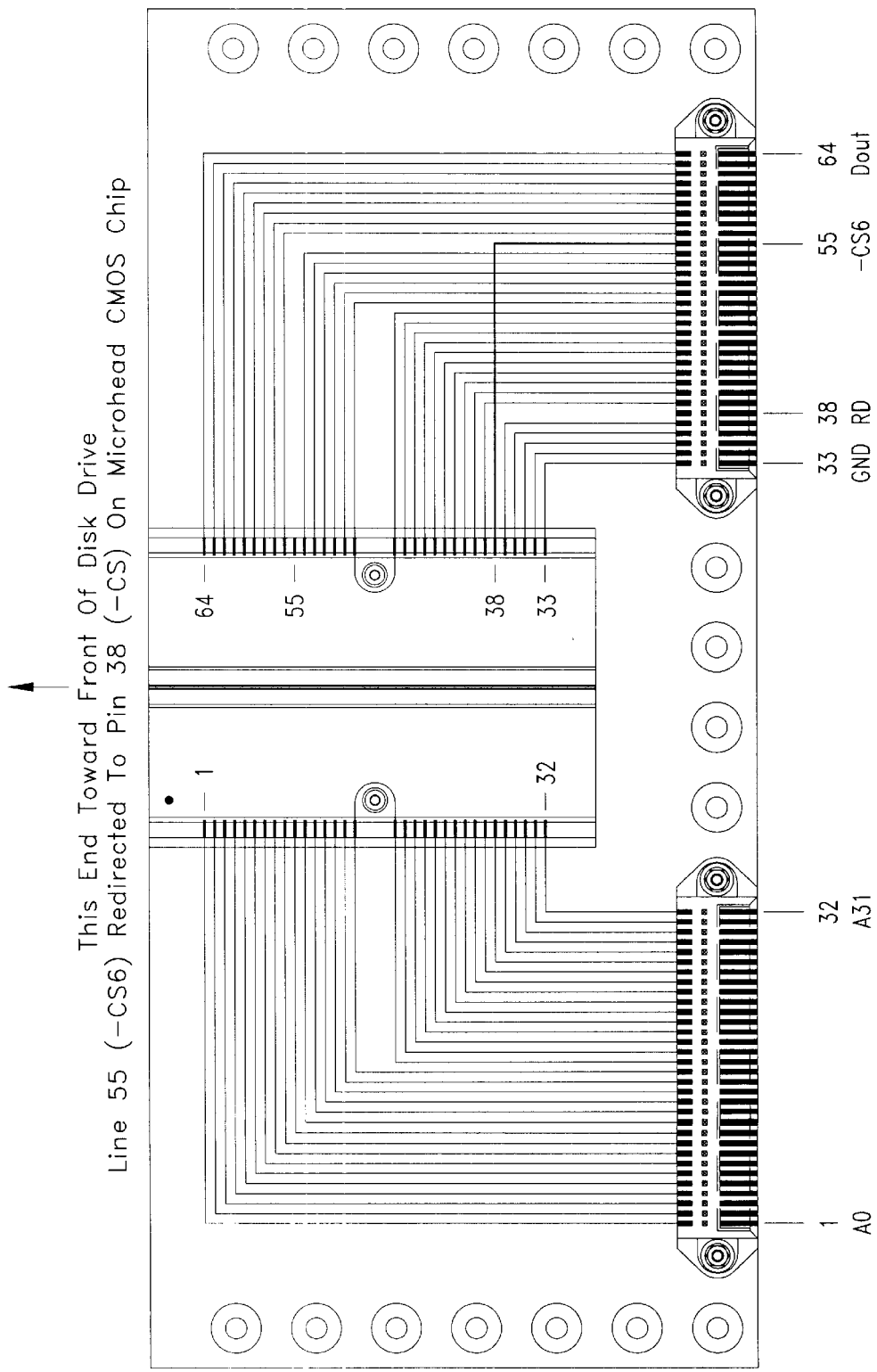
FIG. 23 shows a plan-view of the chip-positioning circuit board displaying a Redirection (RD) of the Chip Select (-CS) line for Microhead Array Chip Number-7 for a magnetic Microhead Array Chip design which is to be positioned for disk four's bottom side data-surface one.
Figure 24:
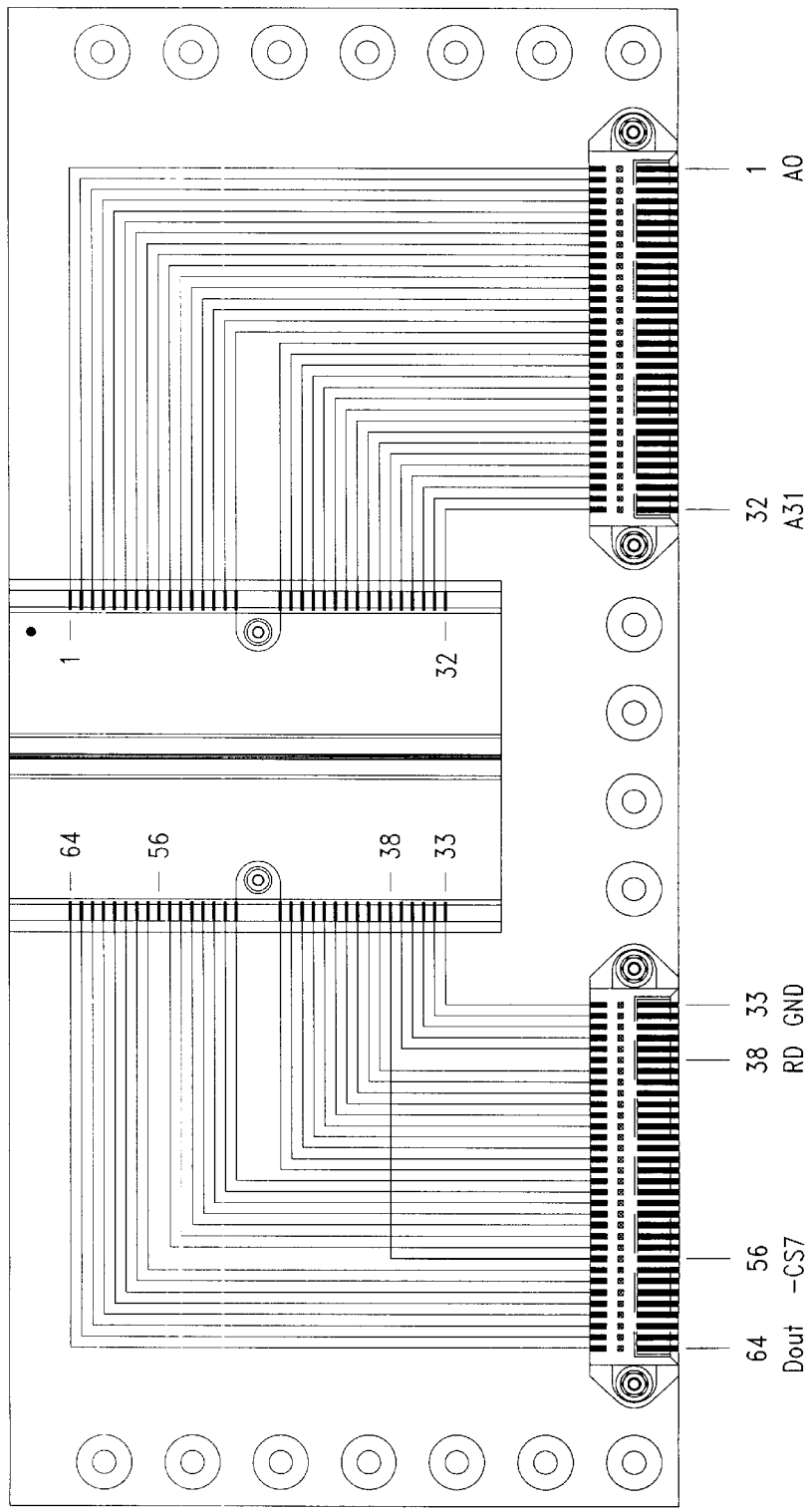
FIG. 24 shows a plan-view of the chip-positioning circuit board displaying a Redirection (RD) of the Chip Select (-CS) line for Microhead Array Chip Number-8 for a magnetic Microhead Array Chip design, which is to be positioned for disk four's top side data-surface two.

Moreover, as presented in this art, there are eight examples of redirected chip selection chip-positioning circuit board cross-connect copper-circuit trace-configurations used in this Microhead Array Chip Hard Disk Drive's Microhead Array Chip design. Moreover, FIG. 17 illustrates the (CS) Chip Select Polymer flex-cable input bus-line "49" or (-CSO) as being redirected to the surface mounting chip-socket's contact-input pin-number "38" or (-CS) Chip Select contact-input (FIGS. 11 and 12) on the Microhead Array Chips. In addition, FIG. 18 illustrates the (-CS) Chip Select Polymer flex-cable input bus-line "50" or (-CS1) as being redirected to the surface mounting chipsocket's contact-input pin-number "38" or (-CS) Chip Select contact-input of the Microhead Array Chips. In addition, FIG. 19 illustrates the (-CS) Chip Select Polymer flex-cable input bus-line "51" or (-CS2) as being redirected to the surface mounting chip-socket's contact-input pin-number "38" or (-CS) Chip Select contact-input (FIGS. 11 and 12) of the Microhead Array Chips. In addition, FIG. 20 illustrates the (-CS) Chip Select Polymer flex-cable input bus-line "52" or (-CS3) as being redirected to the surface mounting chip-socket's contact-input pin-number "38" or (-CS) Chip Select contact-input (FIG. 11, and 12) of the Microhead Array Chips. In addition, FIG. 21 illustrates the (CS) Chip Select Polymer flex-cable input bus-line "53" or (-CS4) as being redirected to the surface mounting chip-socket's contact-input pin-number "38" or (-CS) Chip Select contact-input (FIGS. 11 and 12) of the Microhead Array Chips. In addition, FIG. 22 illustrates the (-CS) Chip Select Polymer flex-cable input bus-line "54" or (-CS5) as being redirected to the surface mounting chip-socket's contact-input pin-number "38" or (-CS) Chip Select contact-input (FIGS. 11 and 12) of the Microhead Array Chips. In addition, FIG. 23 illustrates the (-CS) Chip Select Polymer flex-cable input bus-line "55" or (-CS6) as being redirected to the surface mounting chip-socket's contact-input pin-number "38" or (-CS) Chip Select contact-input (FIGS. 11 and 12) of the Microhead Array Chips. In addition, FIG. 24 illustrates the (-CS) Chip Select Polymer flex-cable input bus-line "56" or (-CS7) as being redirected to the surface mounting chip-socket's contact-input pin-number "38" or (-CS) Chip Select contact-input (FIGS. 11 and 12) of the Microhead Array Chips. Furthermore, since there is one unique (-CS) Chip Select bus-line available for each of the installed "8" Microhead Array Chips in this Microhead Array Chip Hard Disk Drive design. Through cross-connect circuitry each Microhead Array Chip can now be individually selected and controlled during the course of any read-data or write-data disk operation. Whereby, the connectivity of the previously described Microhead Array Chip selection process is illustrated in FIGS. 60A, 61A, 60B, 61B, 60C, and 61C.

Moreover, the signal-path for the Read Channel within an Induction Channel Coil Read And Write Element Microhead Array Chip design begins at the Microhead Array Chip's Induction Channel Coil read element, as illustrated in FIGS. 64A, 64B, 64C, 64D, and 64E. Moreover, as the "magnetic flux transitions" that were previously recorded on a disk-platter's data-surface pass under a selected microhead's Induction Channel Coil read element, the two Induction Channel Coils of the selected microhead will simultaneously generate low-amplitude and differential output-voltages. Furthermore, these read signals will pass from the two microhead Induction Channel Coil's read elements to the "Read-Input" bus conduit. Moreover, the previously mentioned Read Input bus-conduit Read Channel circuitry is fully integrated into the Induction Channel Coil Read And Write Element Microhead Array Chips. Moreover, low-amplitude and differential output-voltages or signals are sent from the Read-Input bus conduit to the Read Channel's "Read Preamp Circuit", connectivity illustrated by FIGS. 64A, 64C, 86, 87, 88, and 89, where, during read-data disk operations, the amplification of the microhead's read signals will next occur.

However, before any data can be read from a disk-platter the correct microhead must first be selected. The selected microhead is within a Microhead Array, which itself is located within one of the available eight Microhead Array Chips installed into the Microhead Array Chip Hard Disk Drive's unit assembly. Furthermore, the process of data reading begins when the Disk Controller has received a read-data request from the host-system for a particular disk-platter's cylinder/track and data-sector location containing host-requested data. For example, a host-system's read-data request might look like this: read-data using head number "5", at track number "4562", at sector number "43". Moreover, the Address Controller, as illustrated in FIGS. 62A, 63A, 62B, 63B, 62C, and 63C would receive this read-data request from the Disk Controller and place it into its "Disk Controller's Interface Register". Moreover, where it would be held while the Address Controller's "Translator" unit translates the request into terms that the Address Controller can use to activate any required Microhead Array Chip addressing and control-bus signals.

Moreover, the Address Controller's Translator unit, as illustrated in FIGS. 62A, 63A, 62C, and 63C would first tell the Address Controller's Address Unit that Microhead Array Chip Number-5 is equivalent to a conventional head, numbered as Head-5. Moreover, the Address Controller's response would be to enable the (-CS4) Chip Select Line Number-4 (i.e., the chip select lines available are CS0, CS1, CS2, CS3, CS4, CS5, CS6, CS7) with a logic-low control-signal, as illustrated in FIGS. 60A, 61A, 60B, 61B, 60C, and 61C. Moreover, the previously mentioned Chip Select signal prepares the Microhead Array Chip Number-5 to be the only Microhead Array Chip on the entire address-bus system able to latch into its Address Latch Circuit, as illustrated in FIGS. 64A, 64B, and 64E, a microhead address number sent down the Microhead Array Chip Hard Disk Drive's thirty-two address-lines, as illustrated in FIGS. 62A, 63A, 62B, 63B, 62C, and 63C.

Figure 70:
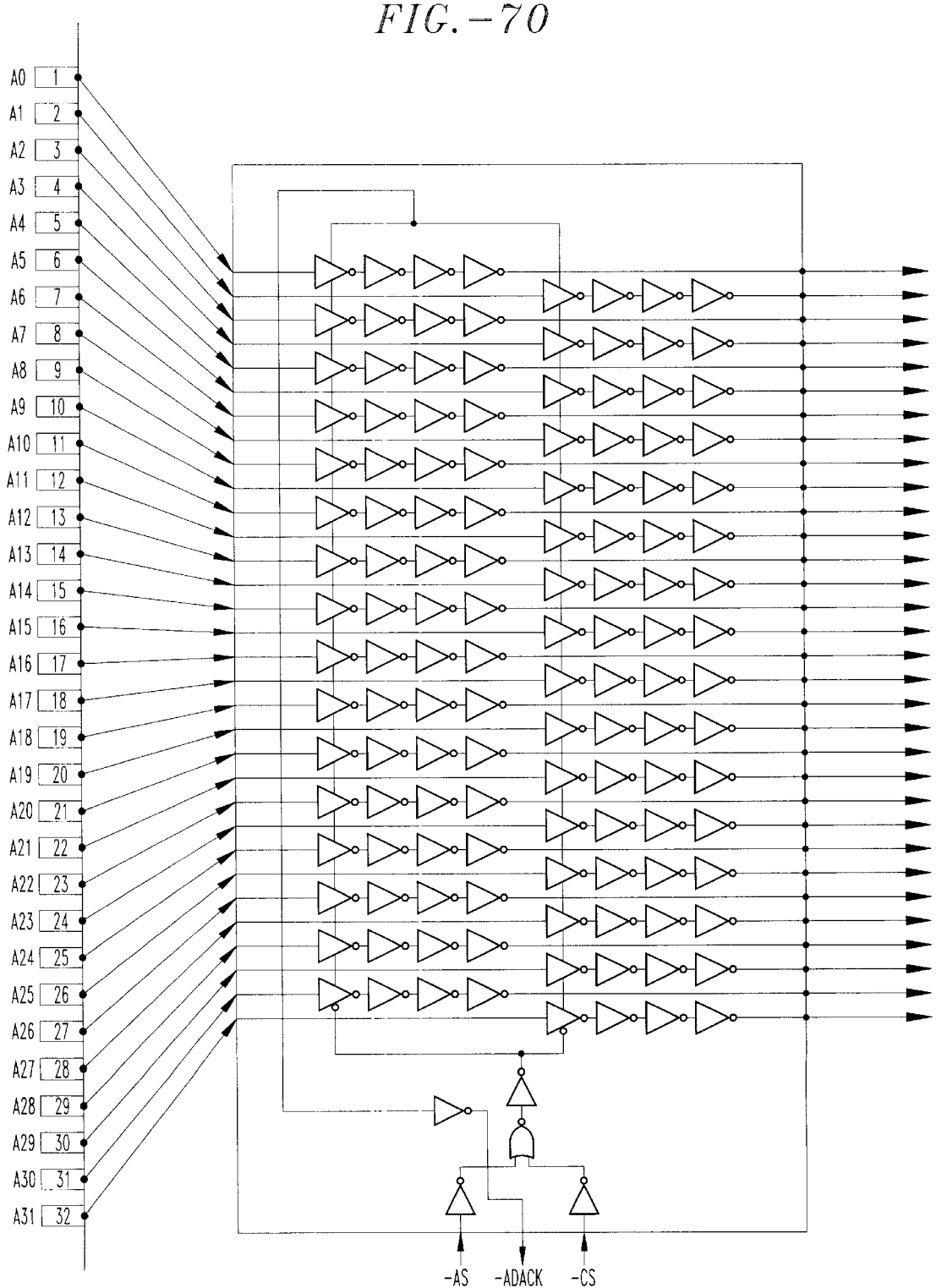
FIG. 70 shows a logic-diagram of the 32-bit Address Latch And CSC for a magnetic Microhead Array Chip design, displaying chip-select circuit connectivity.
Figures 71A, 71B:
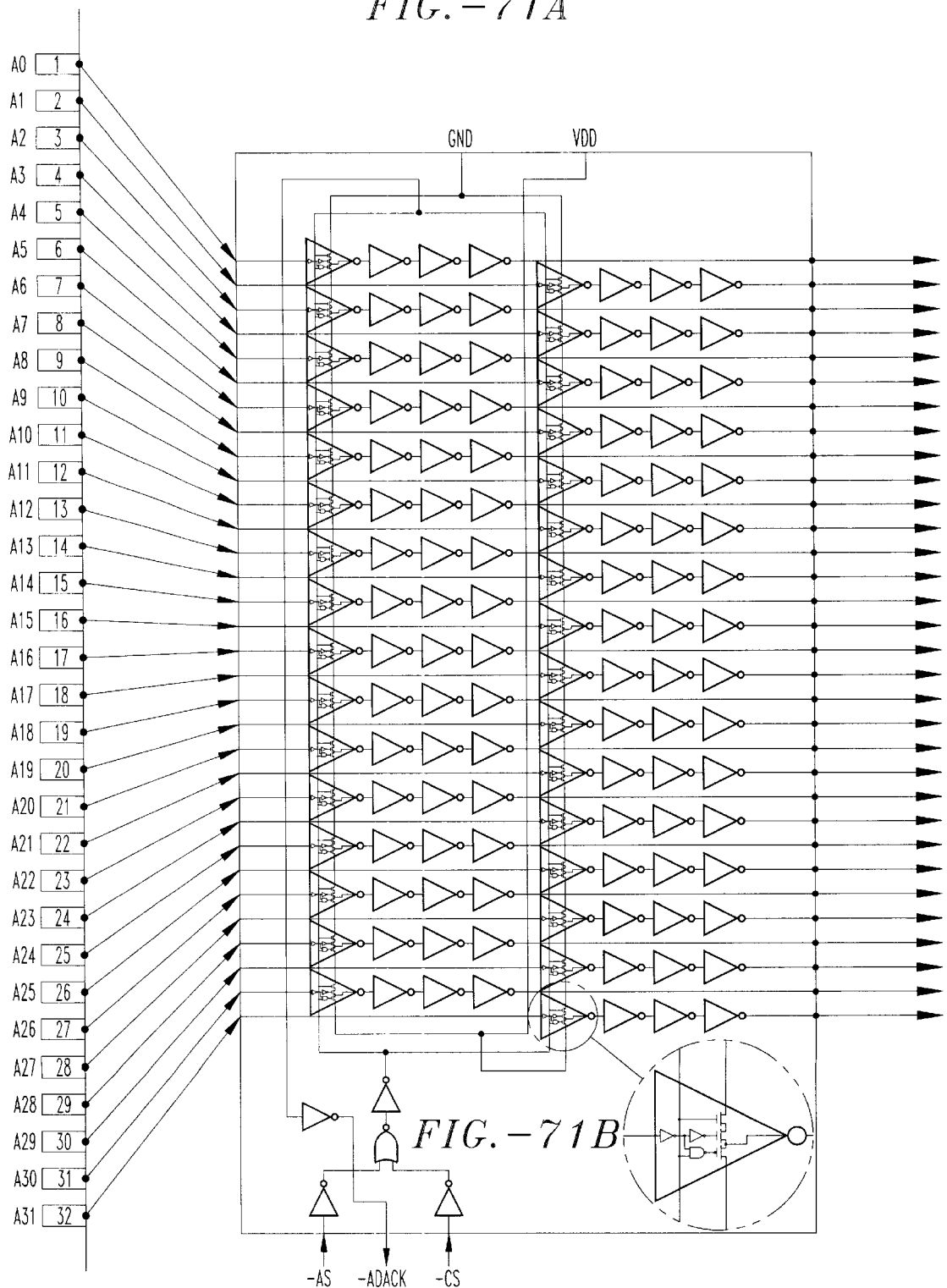
FIG. 71A shows a circuit-diagram of the 32-bit Address Latch And CSC for a magnetic Microhead Array Chip design, displaying chip-select circuit connectivity.
FIG. 71B shows a circuit-diagram of the 32-bit Address Latch And CSC for a magnetic Microhead Array Chip design, displaying internal circuit details of the tri-state inverter-buffers that make up the address latch.
Figure 72:
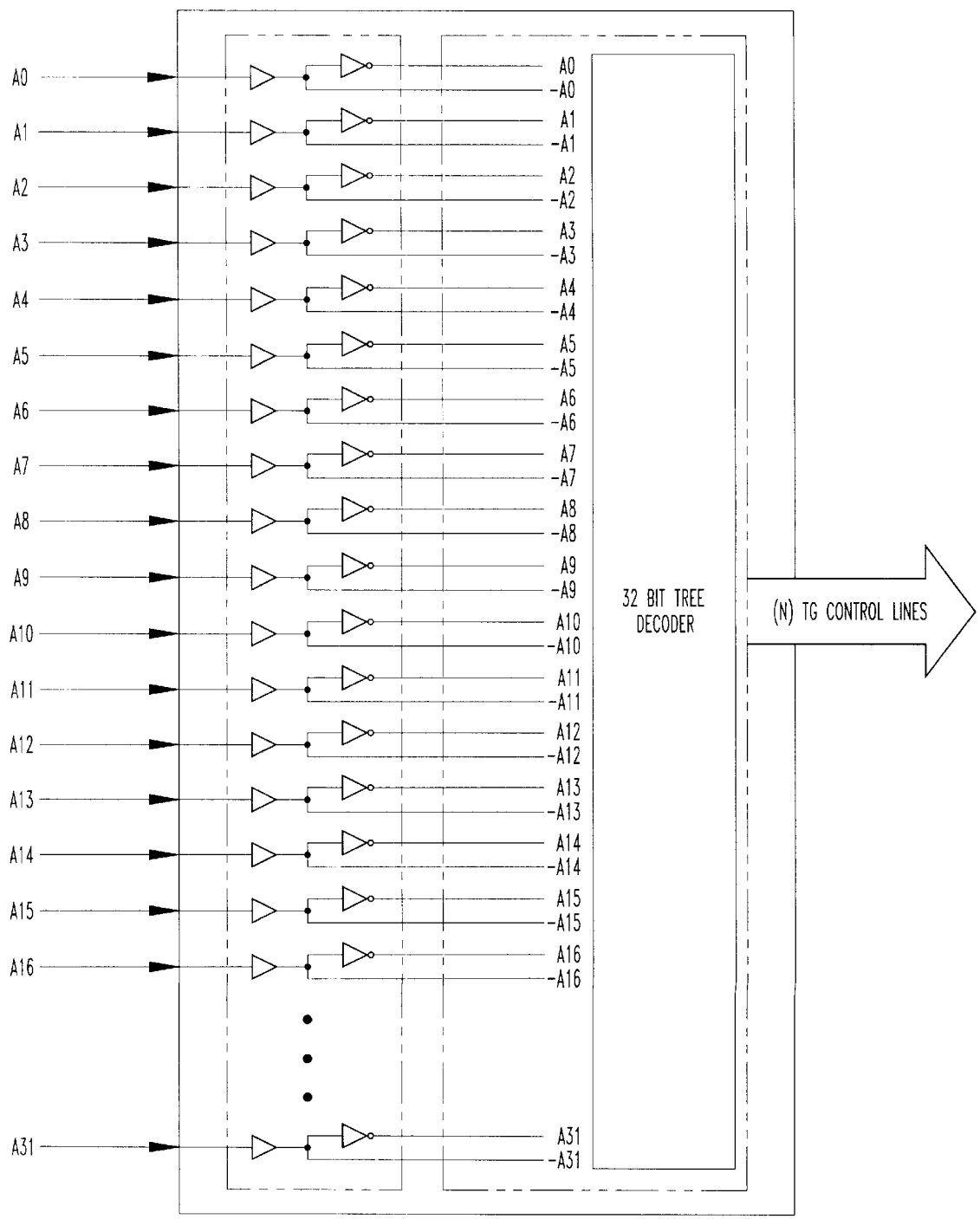
FIG. 72 shows a logic-diagram of the 32-bit Address Decoder Circuit for a magnetic Microhead Array Chip design.
Figure 73:
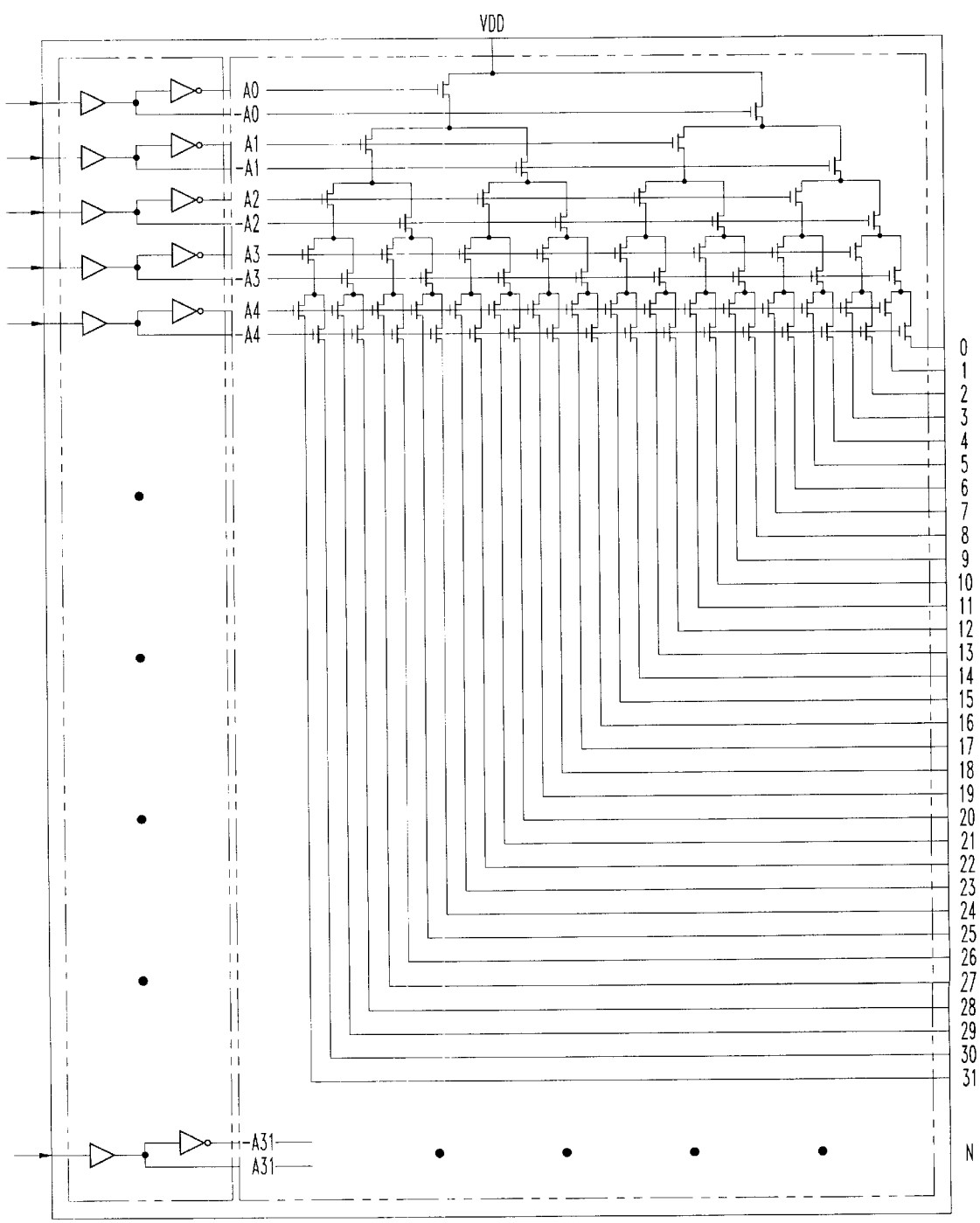
FIG. 73 shows a circuit-diagram of the 32-bit Address Decoder Circuit for a magnetic Microhead Array Chip design.
Figure 74:
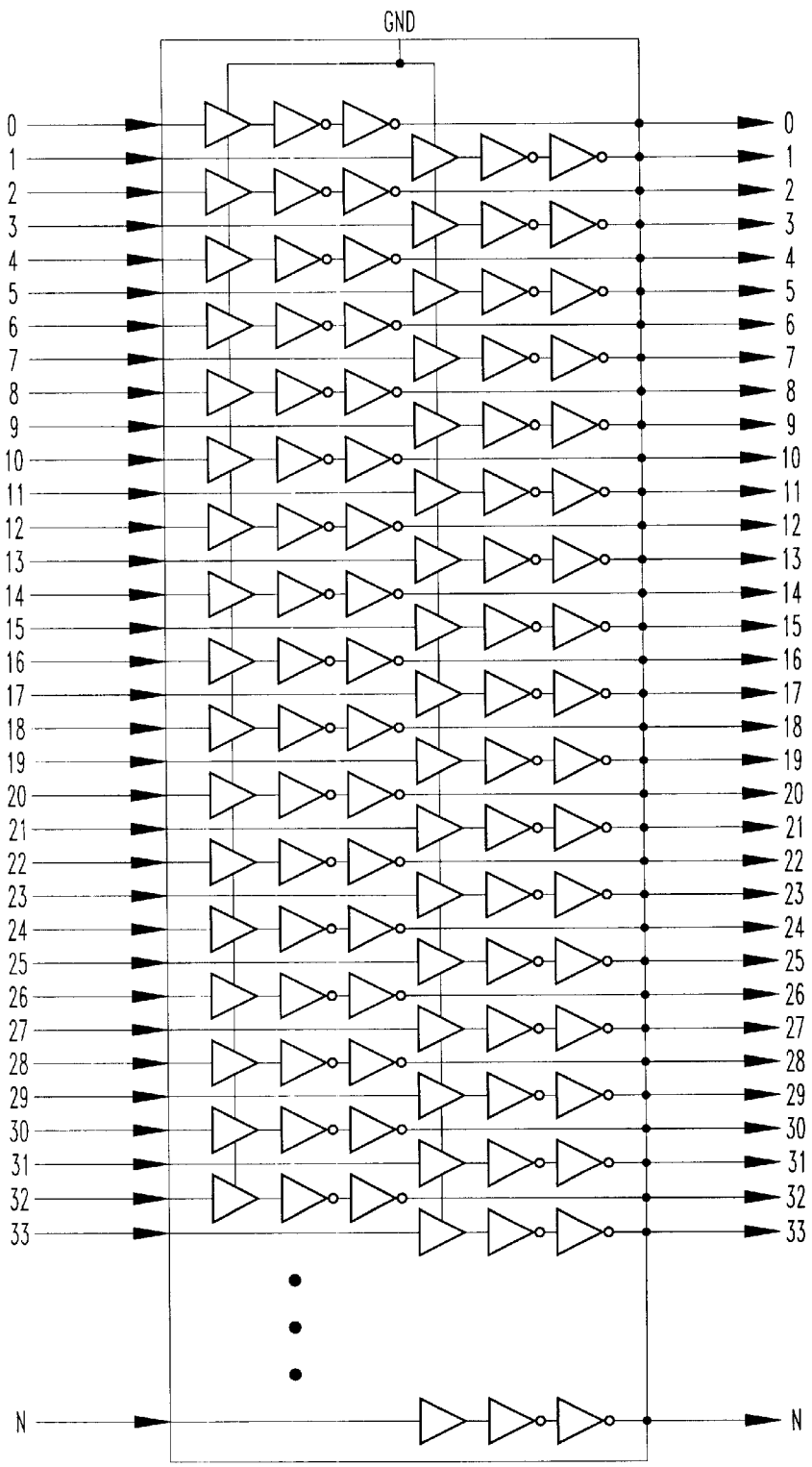
FIG. 74 shows a logic-diagram of the Address Buffers Circuit for a magnetic Microhead Array Chip design, displaying address-decoder selected microhead line buffers.
Figure 75:
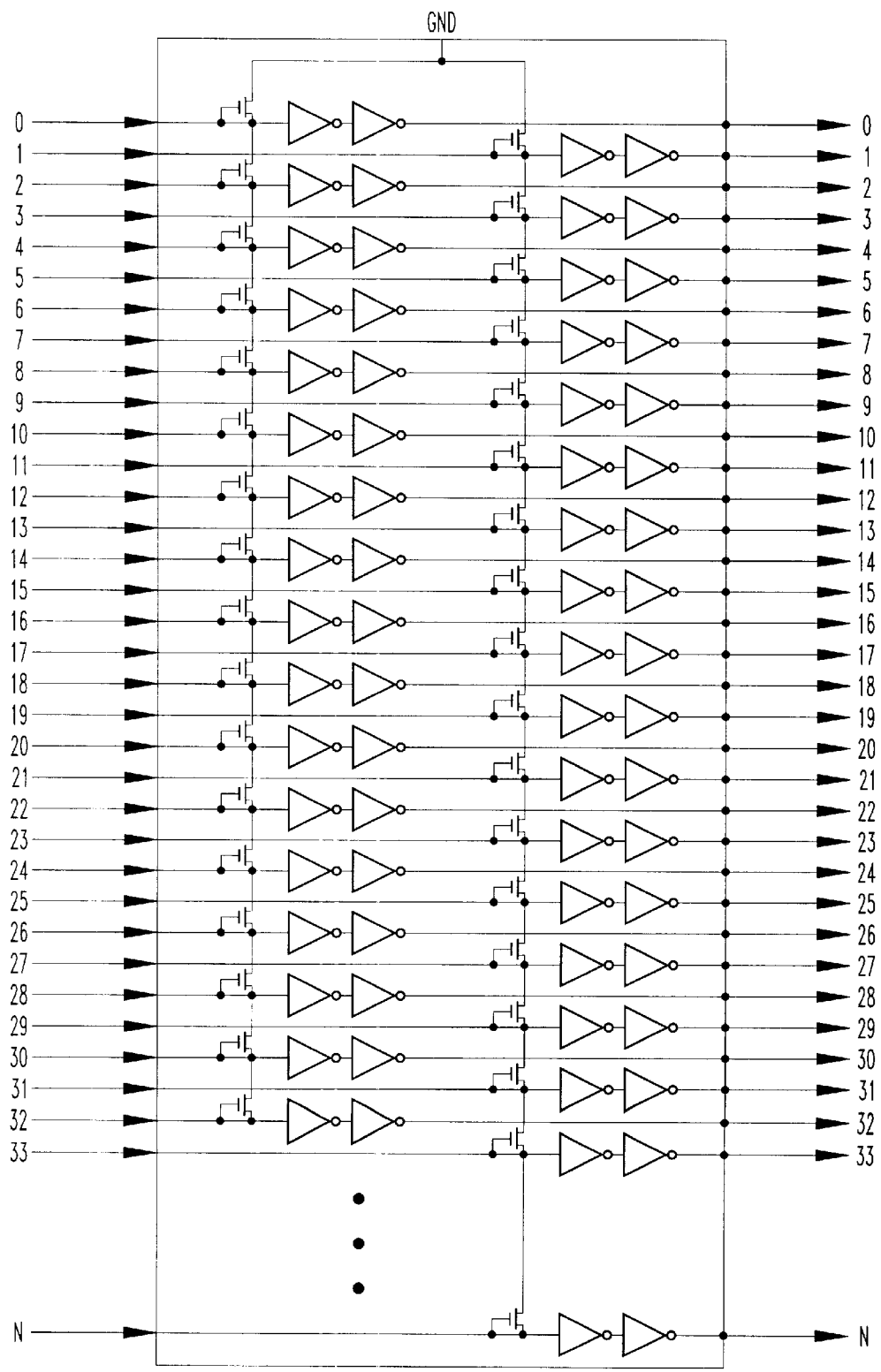
FIG. 75 shows a circuit-diagram of the Address Buffers Circuit with internal address decoder selected microhead line buffers for a magnetic Microhead Array Chip design, displaying the disabled microhead selection-lines pull-to-ground Long-L inverters.

Moreover, at the same time as the 32-bit address bus sends the (track/microhead) address number "4562" down its thirty-two address bus-lines the control bus signal-line (-AS) "Address Strobe" will get sent down its control bus signal-line to the input-contact pin-number "37" of every Microhead Array Chip (FIGS. 11 and 12) installed and connected to the Microhead Array Chip Hard Disk Drive's control bus. Furthermore, only the simultaneous combination of logic-low control-signals for (-CS4) Chip Select Line Number-5 at input-contact pin-number "38" and the (-AS) "Address Strobe" at input-contact pin-number "37", as illustrated in FIGS. 66, 67, 68, and 69, will the Microhead Array Chip Number-5 be selected for the read-data disk operation. Therefore, only the fifth Microhead Array Chip in the daisy-chain bus-system line-up is selected to tri-state latch (FIGS. 65A and 65B) the track-address number "4562" into its Address Latch And Chip Select Circuit, as illustrated in FIGS. 70, 71A, and 71B. Furthermore, the 32-bit address-number "4562" will stay latched in a selected Microhead Array Chip's tri-state Address Latch And Chip Select Circuit as-long-as the (-CS4) and (-AS) bus-lines continue to have logic-low control-signals present on their lines.

Moreover, the address input of the Microhead Array Chips consists of thirty-two input contact-pins; the Microhead Array Chip's address bus inputs "A0" through "A31", as illustrated in FIGS. 11, 12, 13, and 14. Furthermore, after the address number "4562" has been successfully latched the (ADACK) Address Acknowledge circuit will send a logic-low control-signal down its control bus-line. In addition, this (-ADACK) control-signal is generated from the simultaneously enabled (CS4) and (-AS) circuits. Moreover, the (-CS4) and (-AS) circuits are located within the selected Microhead Array Chip's Address Latch And Chip Select Circuit, as illustrated in FIGS. 66, 67, 68, 69, 70, 71A, and 71B. In addition, the (-ADACK) control-signal is sent from a selected Microhead Array Chip's output-contact pin-number "40", which is illustrated by FIGS. 11, 12, 13, and 14, to the (-ADACK) Address Acknowledge input location of the Address Controller, as illustrated in FIGS. 62A, 62B, and 62C, which is located on the Microhead Array Chip Hard Disk Drive's PCB 63 (FIG. 4) 80 (FIG. 5).

Moreover, the logic-low control-signal, which is received at the (-ADACK) input-contact of the Address Controller, tells the Address Controller that the address-number "4562" has been successfully latched into the Address Latch And Chip Select Circuit (FIGS. 70, 71A, and 71B) that is located in the selected Microhead Array Chip Number-5. Furthermore, the successfully latched address signal is next sent from the 32-bit Address Latch And Chip Select Circuit to the Microhead Array Chip's 32-bit "Address Decoder Circuit", as illustrated in FIGS. 64A, 64B, 72, and 73. Subsequently, when the Microhead Array Chip's Address Decoder Circuit receives a 32-bit address signal it will rout it to its internal "address tree decoder" circuit for decoding, as illustrated in FIGS. 64A, 64B, 72, and 73. In addition, the decoding process of the latched address signal by the previously mentioned address tree decoder circuit (FIGS. 72 and 73) will result in the enabling of one microhead selection-line by a logic-high control-signal; moreover, as presented in the art, the microhead selection-line "4562". Furthermore, the "inverter body effect" normally associated with and caused by any circuits containing a large number of CMOS inverters, like the large number of inverters present in an "address tree decoder" circuit, will most likely cause a loss of signal strength. Consequently, the address tree decoder's singularly enabled microhead selection-line will therefore need its logic-high control-signal regenerated by the Microhead Array Chip's Address Buffer Circuit or the previously mentioned signal-loss on the selection line is bound to occur, possibly causing a microhead selection error. Furthermore, when the Microhead Array Chip's Address Decoder Circuit sends the microhead selection-line signals to the Microhead Array Chip's Address Buffer Circuit, as illustrated in FIGS. 64A, 64B, 74, and 75, two very important and simultaneous things will occur:

(i) The signal regeneration of the address tree decoder's only enabled microhead selection-line, by the Microhead Array Chip's Address Buffer Circuit will occur, (ii) The address tree decoder's unsolicited microhead selection output-lines are pulled-down through their Long-L inverters to a ground state, as illustrated in FIGS. 64A, 64B, 74, and 75, moreover pulling the unsolicited microhead selection-lines to ground will also put them into a (Hi-Z) "High Impedance Line State".

Figure 76:
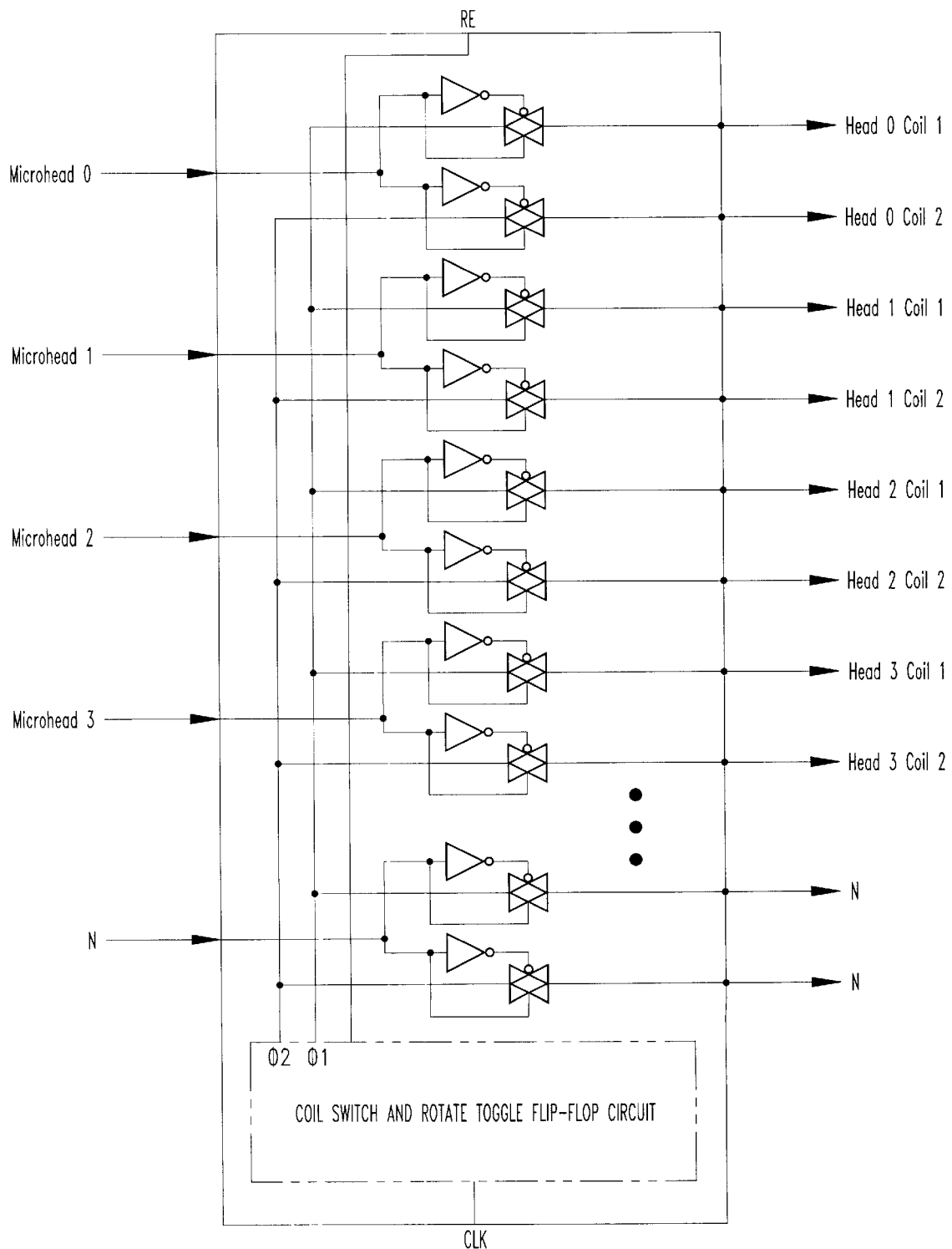
FIG. 76 shows a logic-diagram of the Microhead Selection And Coil Rotation Control Circuit for a magnetic Microhead Array Chip design.
Figure 77:
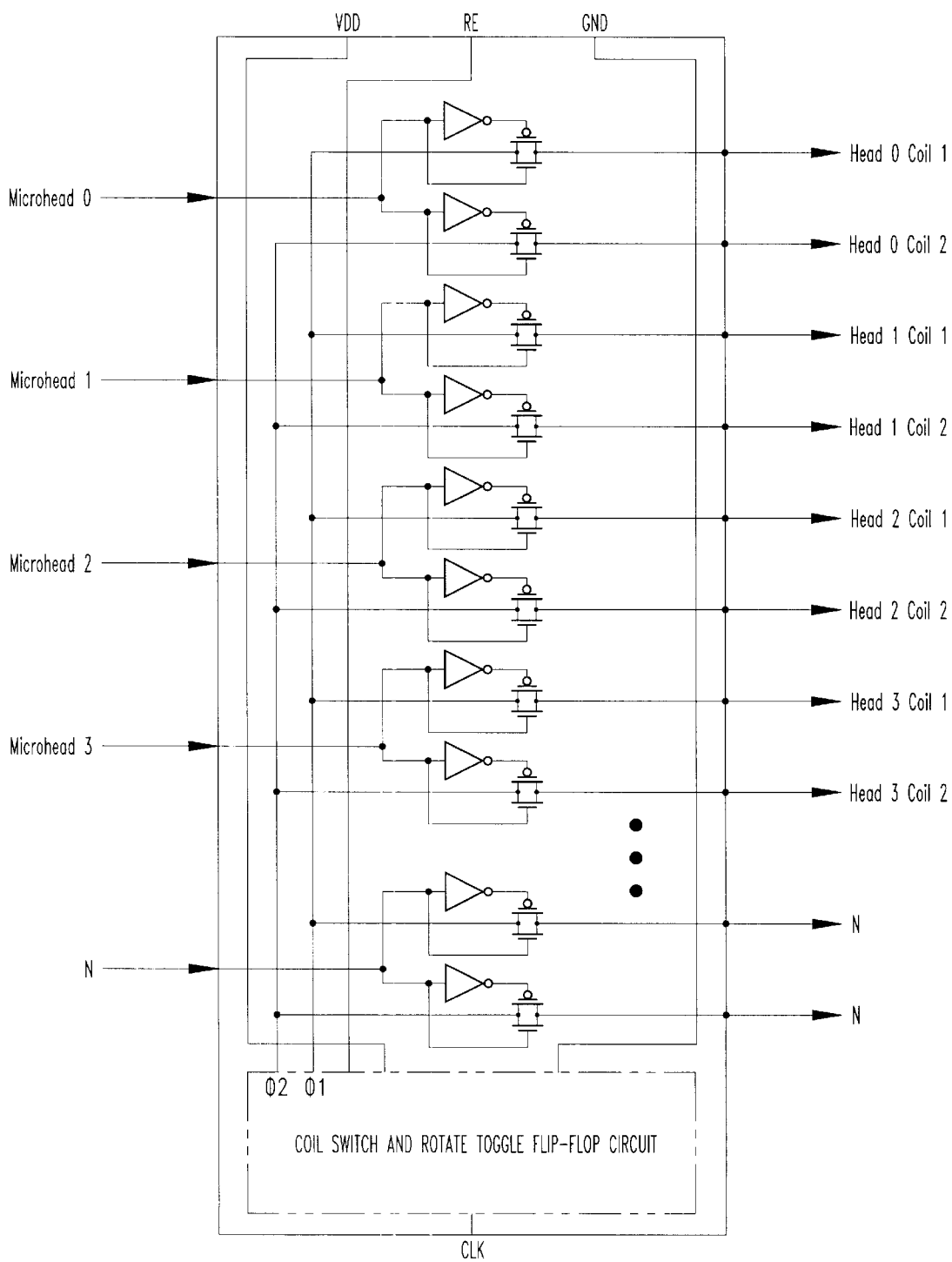
FIG. 77 shows a circuit-diagram of the Microhead Selection And Coil Rotation Control Circuit for a magnet head Array Chip design.

Furthermore, every microhead selection line within a Microhead Array Chip has its start in the Address Decoder Circuit and its finish in the Microhead Selection And Coil Rotation Circuit, where each selection line is terminated by two transmission-gates attached to its end, as illustrated in FIGS. 64A, 64B, 76, and 77. In addition, the two transmission-gates used to terminate every microhead selection line have an auxiliary bus line passing through it. Moreover, the auxiliary bus lines are attached to the Coil Switch And Rotate Toggle Flip-Flop Circuit's two output bus-lines, as illustrated in FIGS. 64A, 64B, 76, and 77. In addition, all of the auxiliary lines that control the selected microhead's Alpha coils are connected to the bus-line "01" of the Coil Switch And Rotate Toggle Flip-Flop Circuit, as illustrated in FIGS. 76 and 77. While, all of the auxiliary lines that control the selected microhead's Beta coils are connected to the bus-line "02" of the Coil Switch And Rotate Toggle Flip-Flop Circuit, as illustrated in FIGS. 76 and 77. Therefore, when microhead selection line "4562" is enabled its two termination transmission-gates are turned on as well; moreover, the only two in the entire Microhead Selection And Coil Rotation Circuit. Moreover, this will redirect the Coil Switch And Rotate Toggle Flip-Flop Circuit's two (FIGS. 76 and 77) output bus-line signals onto the enabled transmission-gates two auxiliary control lines. Moreover, the redirected bus-line signals are used to control the selected microhead's Alpha and Beta Induction Channel Coil's (FIGS. 64A, 64B, 82, and 83) access to the Microhead Array Chip's Read and Write Input bus-conduit, as illustrated in FIGS. 64A and 64B. Moreover, control over the selected microhead's Alpha and Beta Induction Channel Coil's (FIGS. 82 and 83) access to the Microhead Array Chip's Read and Write Input bus-conduit is in reality the same as control over the microhead itself.

Furthermore, during read-data disk operations the Coil Switch And Rotate Toggle Flip-Flop Circuit's two (FIGS. 78 and 79) output bus-lines, which connect to the Alpha and Beta Induction Channel Coils of selected microhead "4562", will simultaneously "Switch Toggle" on, both of the selected microhead's Alpha and Beta Induction Channel Coils. In addition, the Switch Toggling on of the selected microhead's two Induction Channel Coils will enable the selected microhead to read into cache the host-system's requested data from cylinder/track "4562" sector "43", which is located on data-surface "5" of disk-platter "3".

In addition, when the (RE) "Read Enable" input location at the Microhead Selection And Coil Rotation Circuit, illustrated by FIGS. 64A, 64B, 76, and 77, receives a logic-high from the "R/W Control Circuit", as illustrated in FIGS. 94, 95, 96, and 97, the selected microhead "4562" will become enabled for read-data disk operations. Furthermore, upon reception of the Read Enable logic-high control-signal the Coil Switch And Rotate Toggle Flip-Flop Circuit, illustrated by FIGS. 78 and 79, or "Microhead Induction Channel Coil Switch Toggle or Rotate Toggle Circuit", will output two logic-high control-signals onto its two "Induction Channel Coil Toggle Control" bus-lines, illustrated by FIGS. 76 and 77; moreover, one logic-high control-signal onto its "01" Alpha Coil bus-line, and one logic-high signal onto its "02" Beta Coil bus-line. The two Microhead Selection And Coil Rotation Circuit's microhead selection transmission-gates that control signal passage for the Coil Switch And Rotate Toggle Flip-Flop Circuit's output signals are simultaneously turned-on by an enabling logic-high control-signal, which is sent down the microhead selection-line "4562". Moreover, this will enable the two logic-high control-signals input at the Coil Switch And Rotate Toggle Flip-Flop Circuit, which has output control bus-lines connected to the selected microhead's Alpha and Beta Induction Channel Coils. The two control-signals sent from the Coil Switch And Rotate Toggle Flip-Flop Circuit's output control bus-lines will simultaneously enable the selected microhead's Alpha and Beta Induction Channel Coils for use during a host-requested read-data disk operation.

Figure 82:
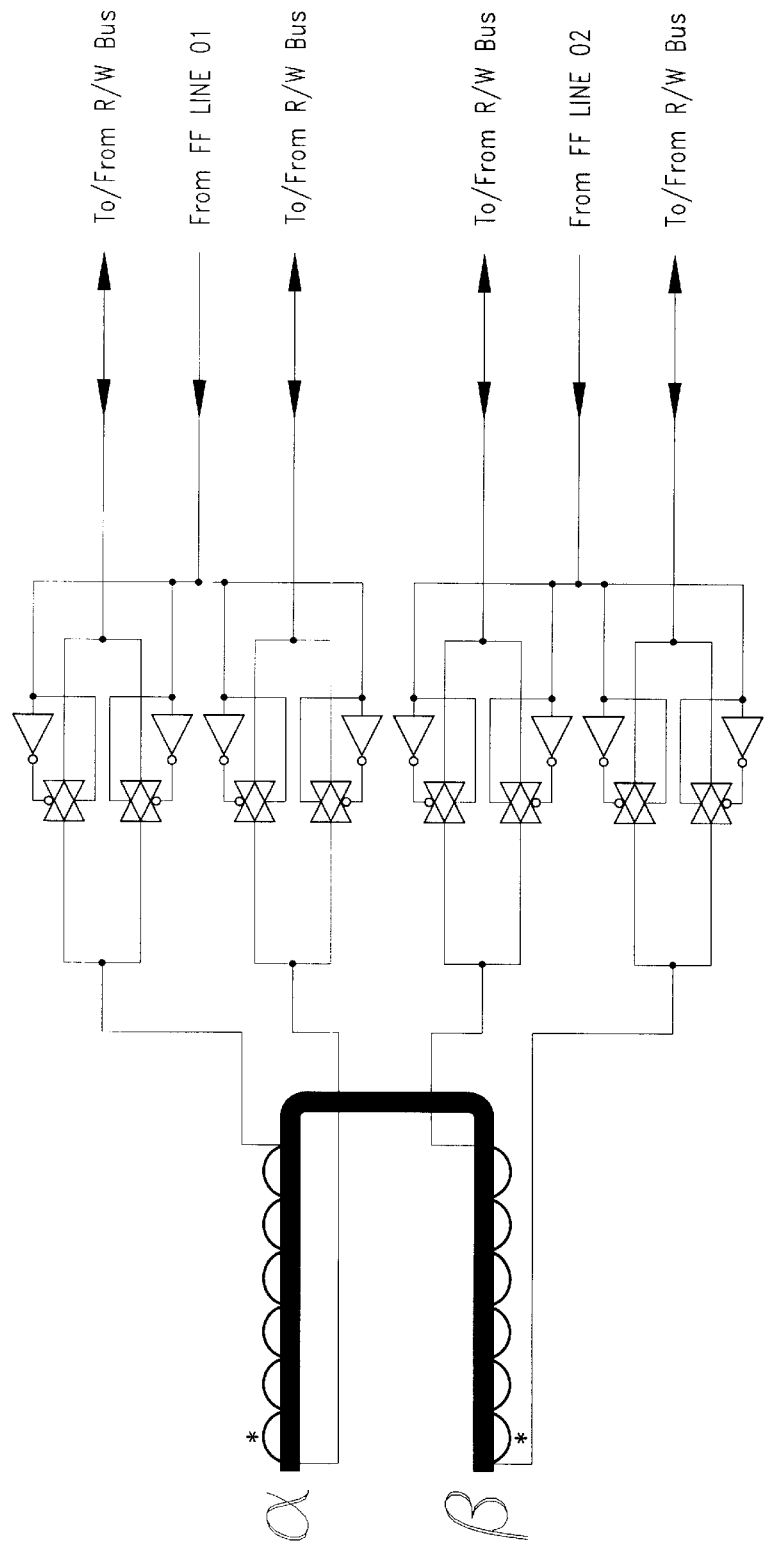
FIG. 82 shows a logic-diagram of the Read and Write Element Induction Channel Coil Head design configuration for a magnetic Microhead Array Chip design, displaying transmission-gate coil selection and control lines.
Figure 83:
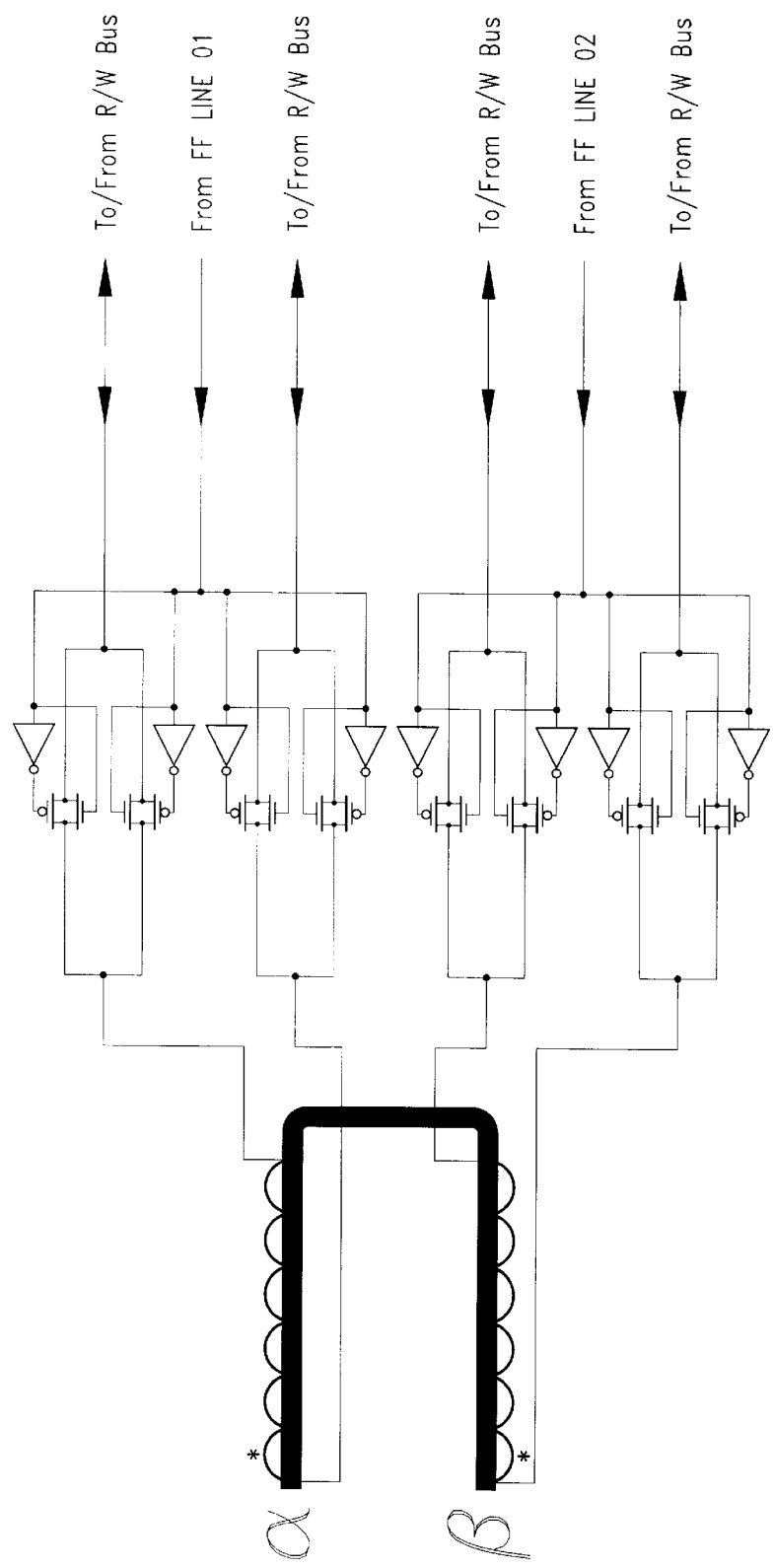
FIG. 83 shows a circuit-diagram of the Read and Write Element Induction Channel Coil Head design configuration for a magnetic Microhead Array Chip design, displaying transmission-gate coil selection and control lines.

Moreover, during a read-data disk operation the simultaneous usage of a selected microhead's two Induction Channel Coils was the chosen design approach for the Microhead Array Chip's Induction Channel Coil Read And Write Element Microhead Array Chip design. Furthermore, the dedicated current coil-rotation or "Rotate Toggle" technique used in solving "reactance-distortion" is necessary only for host-requested writing operations. Therefore, for host-requested read-data disk operations a different Induction Channel Coil circuit design was created. Moreover, the two signals that come from the Coil Switch And Rotate Toggle Flip-Flop Circuit's output control bus-lines for controlling the selected microhead's Alpha and Beta Induction Channel Coils are connected to and control the four transmission-gates that control the "Switch Toggle" and "Rotate Toggle" process for the selected microhead's Alpha and Beta Induction Channel Coils, illustrated by FIGS. 64A, 64E, 82, and 83. Typically, during a read-data disk operation, the selected microhead will have both of its Alpha and Beta Coils simultaneously activated. In addition, a logic-high control-signal from Coil line "01" will enable the four transmission-gates of the selected microhead "4562's" Alpha Coil, as illustrated in FIGS. 82 and 83 (i.e., four transmission-gates per Induction Channel Coil). While a logic-high on Coil line "02" will enable the four transmission-gates of the selected microhead "4562's" Beta Coil, as illustrated in FIGS. 82 and 83 (i.e., four transmission-gates per Induction Channel Coil).

Moreover, for a host-requested read-data disk operation to occur the R/W Control Circuit must first enable the Read Channel of the selected Microhead Array Chip. Wherein, the R/W Control Circuit's default setting after a "Power-On-Restart" or "Power-On-Initialization" is to have the Microhead Array Chip Hard Disk Drive's Read Channel enabled. Furthermore, the Read Channel's control bus consists of three control circuits:

(i) A (R/-W) "Read and Write" control line connected at input-contact pin-number "35" of every Microhead Array Chip, (ii) A (+5V) "VDD" power-line at input-contact pin-number "34" of every Microhead Array Chip, (iii) A (-CS) "Chip Select" selection-line at input-contact pin-number "38" of every Microhead Array Chip.

Moreover, all three circuits are located within every Microhead Array Chip installed in a Microhead Array Chip Hard Disk Drive, as illustrated in FIGS. 64A, 64C, 94, 95, 96, and 97. Furthermore, to enable the Microhead Array Chip's Read Channel located within the selected Microhead Array Chip, there must be a power-signal of 5-volts at its input-contact pin-number "34" (+5V), a logic-low control-signal at its input-contact pin-number "38" (-CS), and a logic-high control-signal at its input-contact pin-number "35" (R/-W).

Moreover, the previously mentioned three control bus-lines must have these three signal conditions present on their lines in order for the Read Channel within the selected Microhead Array Chip to become enabled. For example, to select Microhead Array Chip Number-5, a physical redirection of the Address Controller's (-CS4) Chip Select Line Number-4 must first occur. The Microhead Array Chip's chip-positioning circuit board's copper circuit-trace (FIG. 21) for the Chip Select Line Number-4 is cross-connected from the input-contact pin-number "53" of the chip-positioning circuit board's Polymer flex-cable's spring-contact connector 67 (FIGS. 2, 3, and 10) to the (-CS) Chip Select input-contact pin-number "38" of the Microhead Array Chip and its chip-positioning circuit board's surface mounting chip-socket 5 (FIGS. 7, 8, and 21). Next, the (-CS) input of Microhead Array Chip Number-5 is enabled with a logic-low control-signal. While, a logic-low is sent down the (-AS) Address Strobe control bus-line to all the Microhead Array Chips connected to the system bus. Thereafter, the Microhead Array Chip Number-5 becomes the only Microhead Array Chip installed and connected to the Microhead Array Chip Hard Disk Drive's bus system to have its Read Channel activated. While all the other Microhead Array Chips connected to the system bus of the Microhead Array Chip Hard Disk Drive would have their Read Channels three-stated into a (Hi-Z) "High Impedance Line State".

Figure 86:
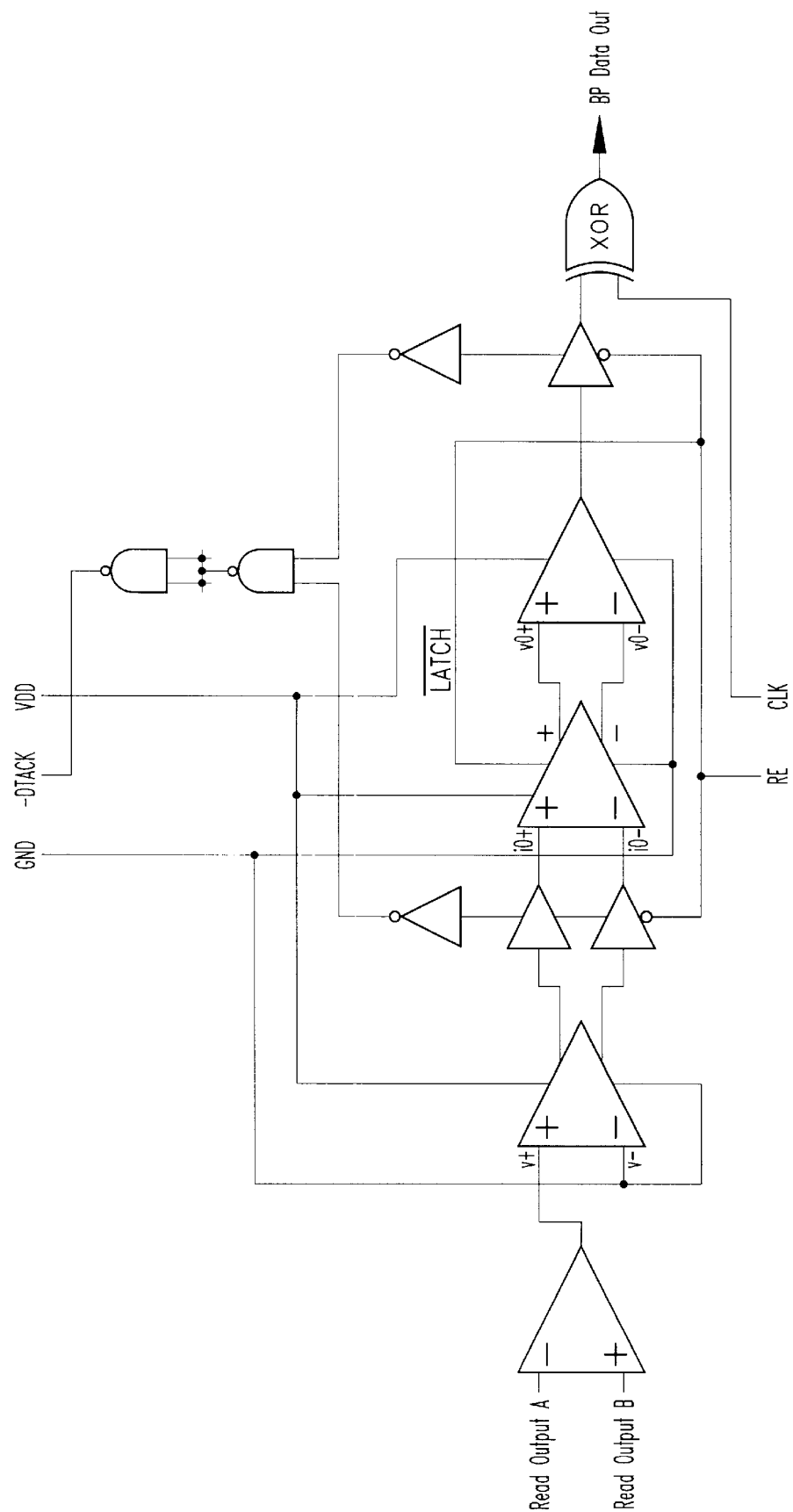
FIG. 86 shows a logic-diagram of the Read and Write Element Induction Channel Coil Head design configuration for a magnetic Microhead Array Chip design, displaying a complete Read Channel with both its analog and digital comparators, pre-amps, and the XOR circuit for bi-phase data encoding.
Figure 87:
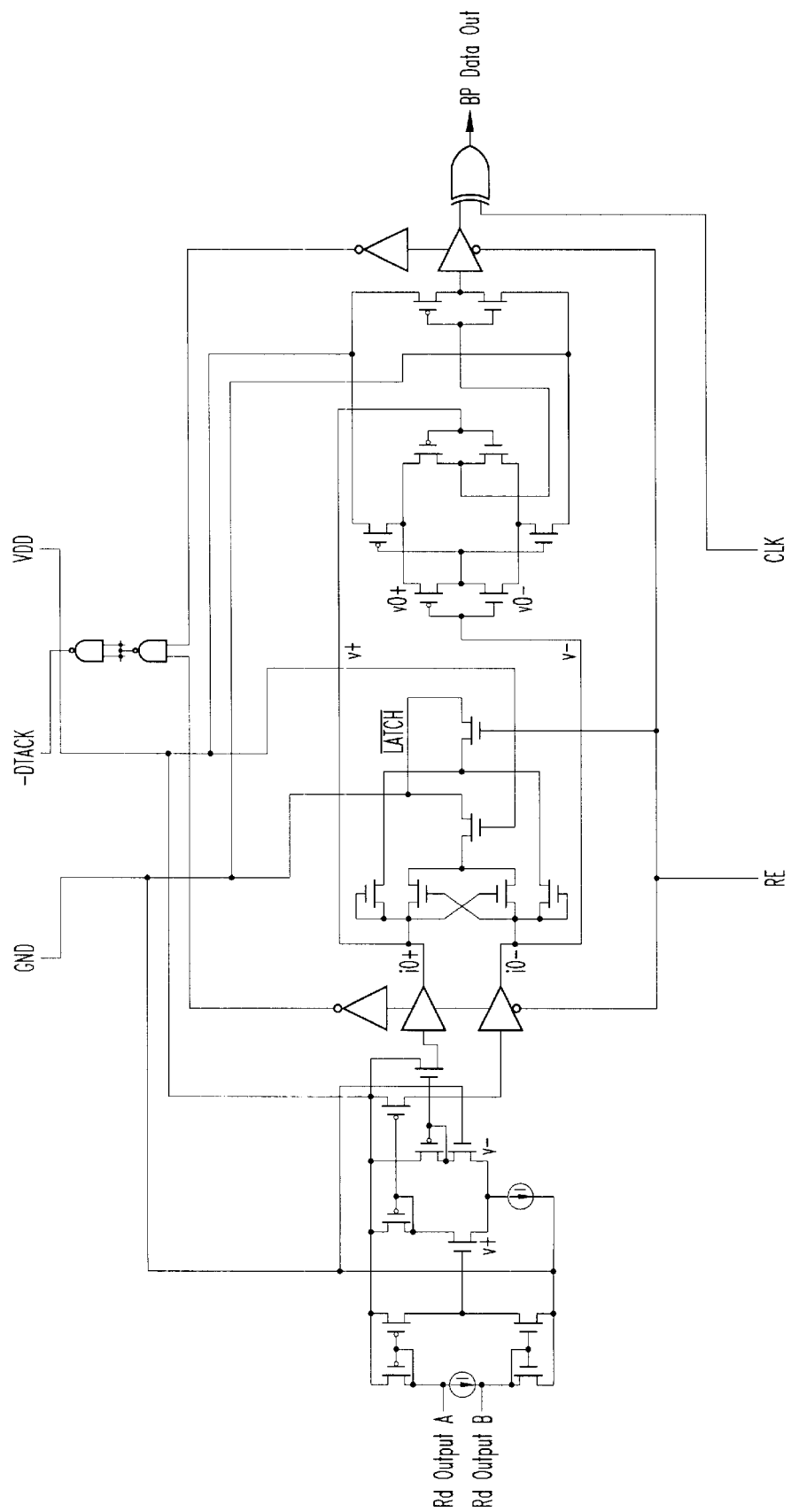
FIG. 87 shows a circuit-diagram of the Read and Write Element Induction Channel Coil Head design configuration for a magnetic Microhead Array Chip design, displaying a complete Read Channel with both its analog and digital comparators, pre-amps, and the XOR circuit for bi-phase data encoding.

Moreover, during the enabling of Microhead Array Chip Number-5's Read Channel three of its Read Channel line-drivers will receive a logic-high signal, this will enable the read channel's comparator output of the selected Microhead Array Chip, as illustrated in FIGS. 86 and 87. Furthermore, two control-signal outputs, which will come from the first-and-last outputs of the three line-driver's for the previously mentioned Read Channel connect to the (A) and (B) inputs of the Read Channel's double NAND control-circuit, as illustrated in FIGS. 60A, 61A, 60B, 61B, 60C, 61 C, 64A, and 64C. Moreover, if both input-terminals (A) and (B) of the Read Channel's double NAND control-circuit, as illustrated in FIGS. 109, 110, 111, and 112, were to received logic-high control-signals, as illustrated in FIGS. 109, 110, 111, and 112, then the double NAND circuit of the Read Channel would output a (-DTACK) "Data Acknowledge" logic-low control-signal onto the (DTACK) bus-line leading to the selected Microhead Array Chip's output-contact pin-number "40" output, illustrated by FIGS. 86 and 87.

Moreover, from the Microhead Array Chip's output-contact pin-number "40" the (-DTACK) logic-low control-signal will travel through the Polymer flex-cable's (-DTACK) bus-line 30, 36 (FIGS. 1 and 6) until it reaches the (-DTACK) input of the Disk Controller, as illustrated in FIGS. 62A, 62C, 63A, and 63C. Furthermore, the Disk Controller will receive the (-DTACK) signal at its (DTACK) input, where it will continue until it reaches the Disk Controller's Sequencer. Furthermore, the Sequencer having received the previously mentioned (-DTACK) logic-low control-signal will now know that the selected Microhead Array Chip's Read Channel is open and ready to read and transmit host-requested data from sector "43" of cylinder/track "4562" using microhead "4562". The data from sector "43" of cylinder/track "4562" is passed on through the selected Microhead Array Chip's Read Channel and XOR phase-detector circuit (FIG. 116), where it is sent to the Sequencer's DPLL circuit. Moreover, at the Sequencer's DPLL circuit the incoming data-stream of the Read Channel will have, its Bi-Phase Encoded Data Stream decoded and its clock signal recovered. The decoded bi-phase data-stream signal is re-encoded into a normal NRZ data-stream signal for transfer to the Disk Controller's Buffer Controller, illustrated in FIGS. 62A, 63A, 62B, and 63B.

Moreover, if we look closer at the selected Microhead Array Chip's Read Channel during a host-requested read-data disk operation, the selected microhead's individual read or write data-stream signal lines, as illustrated in FIGS. 64A, 64E, 82, and 83, are connected to the Microhead Array Chip's analog Read and Write Input-bus lines (FIGS. 64A and 64E). Furthermore, during a host-requested read-data disk operation the analog Read and Write Input bus-lines (FIGS. 64A and 64E) will carry a data-stream signal to the "Read Output A" and "Read Output B" of the Read Channel's "Read Preamp Circuit" (FIGS. 64A and 64C), which are analog class AB differential pre-amplifier inputs for preamplification, as illustrated in FIGS. 86, 87, 88, and 89. Moreover, the Read Channel's "Read Preamp Circuit" (FIGS. 64A and 64C) analog class AB differential pre-amplifier is based on a floating current-source; moreover, the pre-amp's current-source is used to set the DC current flowing into the pre-amp's MOSFET circuits. In addition, the output-voltage of the "Read Preamp Circuit" (FIGS. 64A and 64C) can swing from VDD (+5V) to Vss (O volts) and, therefore, finds extensive use in low-voltage circuit design.

Figure 88:
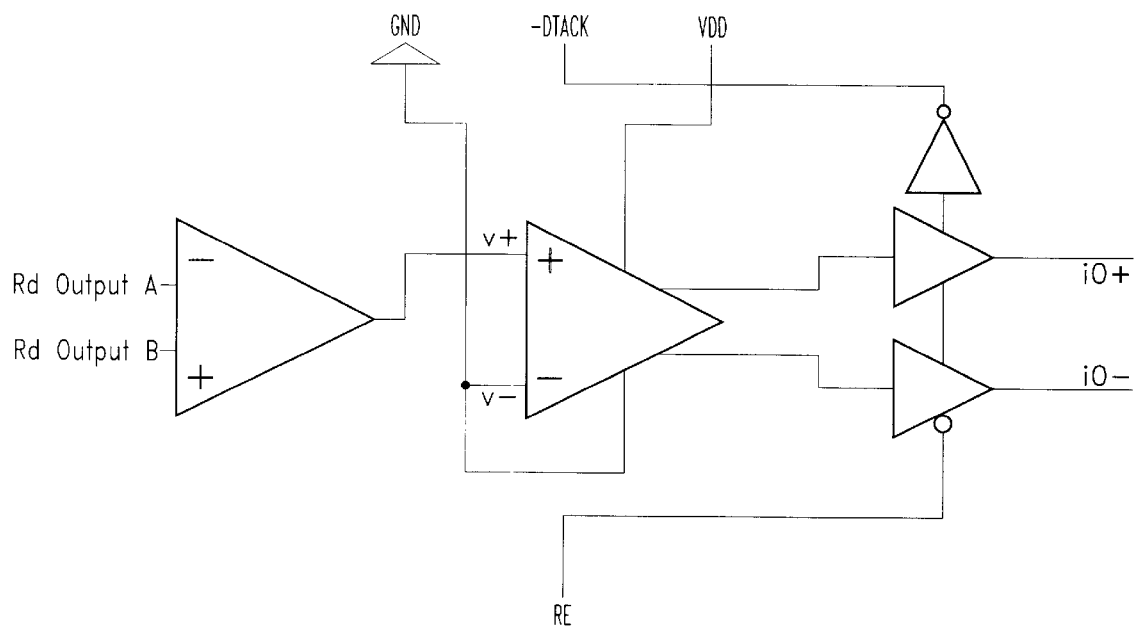
FIG. 88 shows a logic-diagram of the Read and Write Element Induction Channel Coil Head design configuration for a magnetic Microhead Array Chip design, displaying the Read Channel's AC comparator, pre-amp circuits, and (-DTACK) enable circuit.
Figure 89:
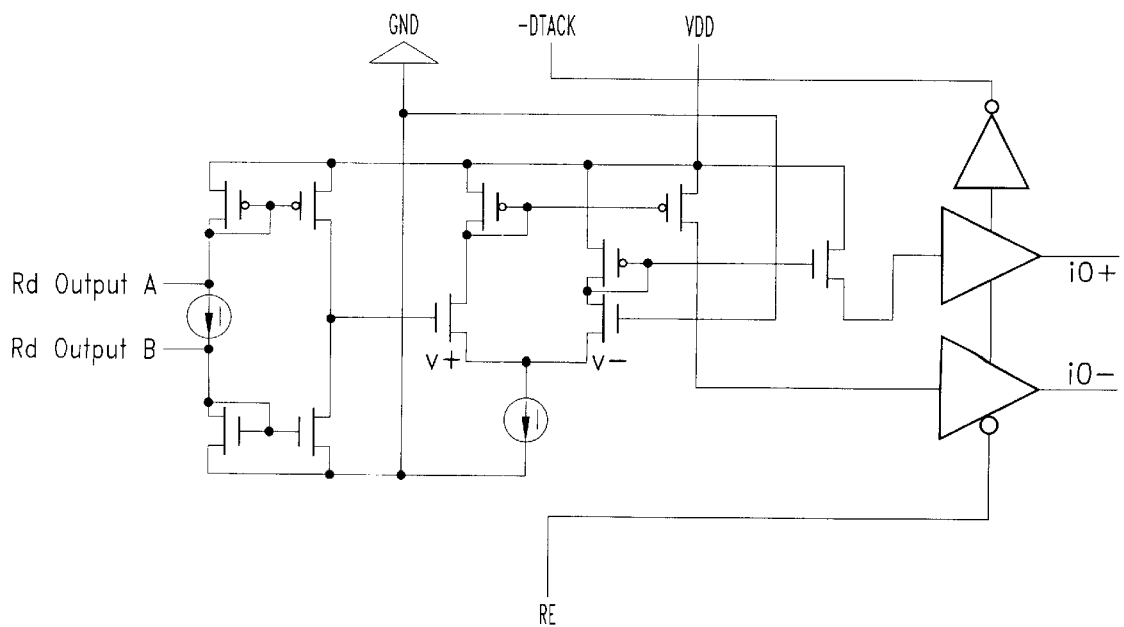
FIG. 89 shows a circuit-diagram of the Read and Write Element Induction Channel Coil Head design configuration for a magnetic Microhead Array Chip design, displaying the Read Channel's AC comparator, pre-amp circuits, and (-DTACK) enable circuit.

Moreover, the pre-amplifier's output signal is next compared by the Read Channel's pre-amp comparator circuit (FIGS. 88 and 89), where the analog class AB differential pre-amplifier output signal inputs at the comparator's (V positive) input, while the comparator's (V negative) input is connected to the Read Channel's ground Vss (FIGS. 88 and 89). The comparator circuit's decision output is based upon a logic formula that states, if (V positive)>(V negative)= (Logic 1)=(VDD) or +5 Volts, or if (V positive)<(V negative)=(Logic 0)=(VSS) or 0 Volts; that is if the (V negative) input is connected to the Read Channel's ground bus. Moreover, if any input voltage coming in from the AB differential pre-amplifier circuit is above the "0" volt divider threshold, the input preamplifier comparator will output a logic "1". However, if any input voltage coming in from the AB differential pre-amplifier circuit is less-than or equal-to the "0" volt divider threshold, the input preamplifier comparator will output a logic "0".

Figure 90:
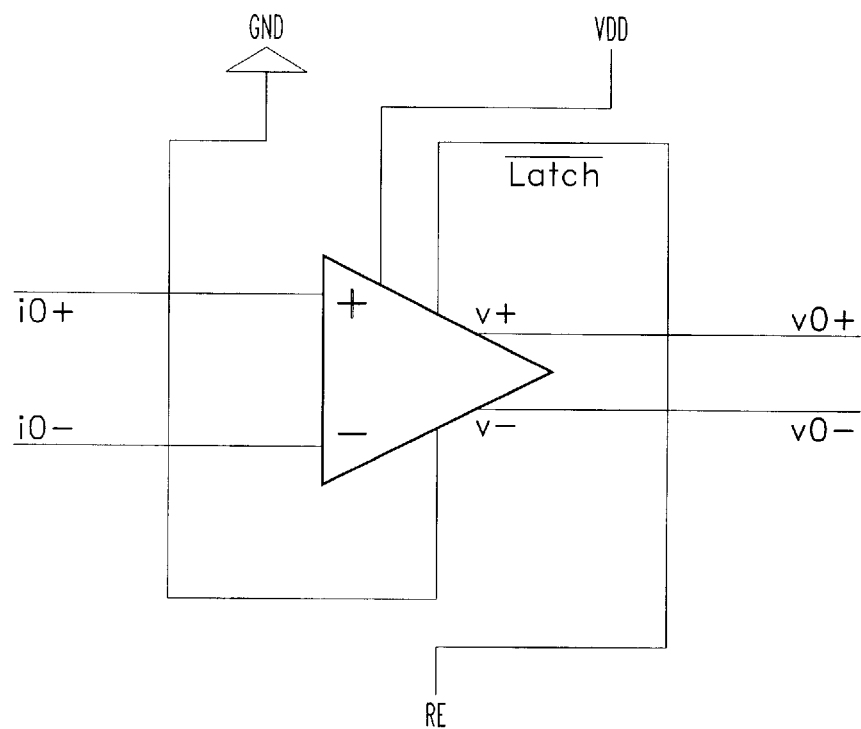
FIG. 90 shows a logic-diagram of the Read and Write Element Induction Channel Coil Head design configuration for a magnetic Microhead Array Chip design, displaying the Read Channel's comparator, decision-circuit and read-enable latch circuit.
Figure 91:
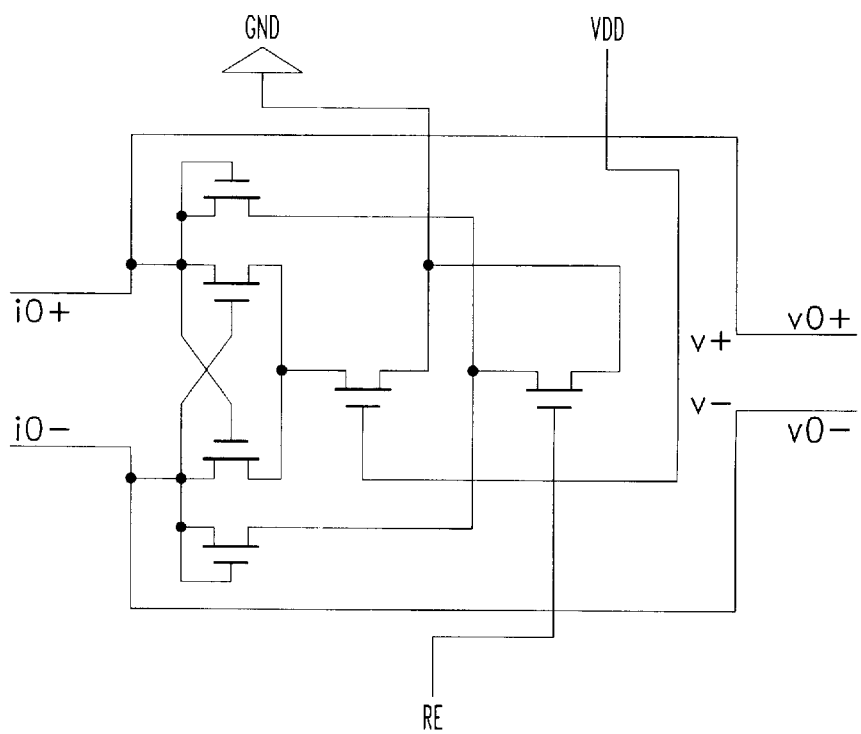
FIG. 91 shows a circuit-diagram of the Read and Write Element Induction Channel Coil Head design configuration for a magnetic Microhead Array Chip design, displaying the Read Channel's comparator decision-circuit and read-enable latch circuit.
Figure 92:
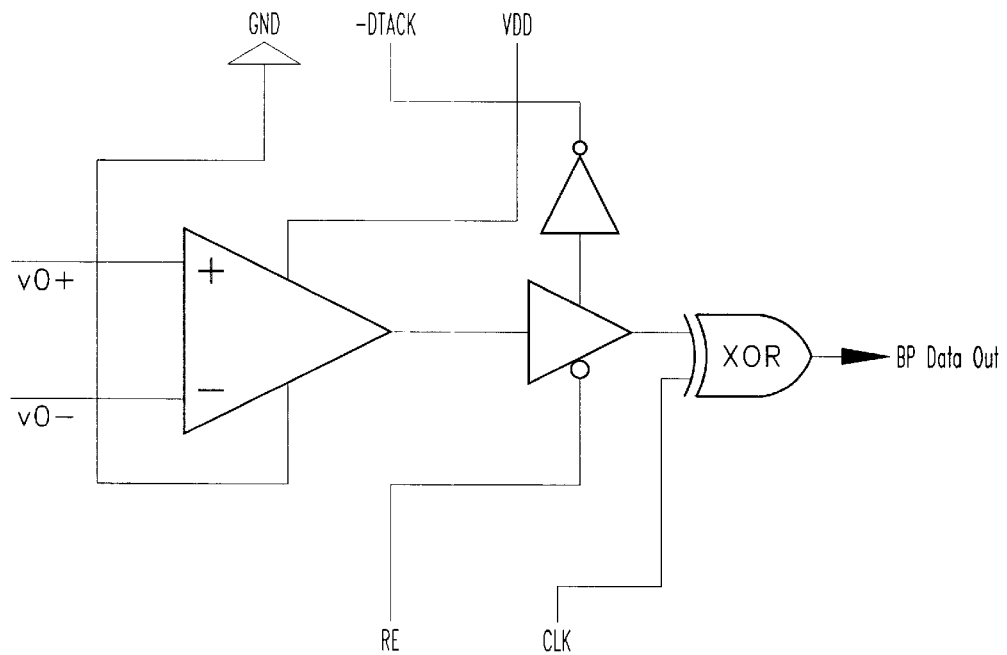
FIG. 92 shows a logic-diagram of the Read and Write Element Induction Channel Coil Head design configuration for a magnetic Microhead Array Chip design, displaying the Read Channel's comparator-buffer post-amp circuits, the (-DTACK), and the XOR bi-phase data encoded data-stream circuit.
Figure 93:
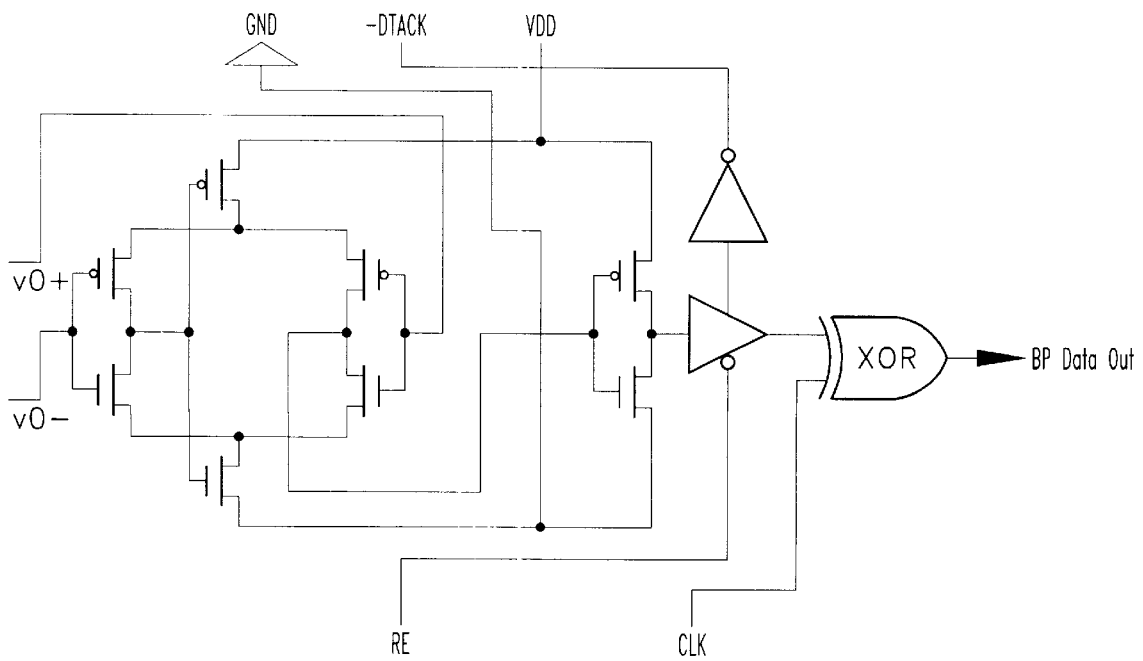
FIG. 93 shows a circuit-diagram of the Read and Write Element Induction Channel Coil Head design configuration for a magnetic Microhead Array Chip design, displaying the Read Channel's comparator-buffer post-amp circuits, the (-DTACK), and the XOR bi-phase data encoded data-stream circuit.

Moreover, the circuit proceeding the AB differential pre-amplifier is the Microhead Array Chips Read Channel's "High Performance Comparator" circuit, illustrated by FIGS. 86, 87, 88, 89, 90, 91, 92, and 93. Moreover, this comparator circuit offers greater accuracy in its "analog-to-digital" output signal conversions, while providing further amplification of the comparators output signals. The Read Channel's High Performance Comparator circuit consists of three-stages:

(i) An input-preamplifier stage, illustrated in FIGS. 88 and 89, (ii) A positive-feedback or decision-stage, illustrated in FIGS. 90 and 91, (iii) An output-buffer stage, as illustrated in FIGS. 92 and 93.

Subsequently, the pre-amp stage will amplify the input-signal to improve the comparators sensitivity (i.e., increases the minimum input signal with which the comparator can make a decision) and isolate the input of the comparator from switching noise coming from the positive-feedback stage (this stage is very important, because of the low signal-to-noise ratio the circuit provides to the read channel's output signal). The positive-feedback stage is used to determine which of the input-signals is larger. The output-buffer stage amplifies this information and outputs a digital-signal to the Read Channel's XOR Phase Detector circuit; moreover, encoding the Read Channel's output data-stream with a frequency-specific Bi-Phase Data Encoding of the Read Channel's signal. Furthermore, when this frequency-specific bi-phase signal enters the Sequencer's (DPLL) "Digital Phased-Locked Loop" circuit it is decoded and its clock signal is recovered, below this process is explained further.

Moreover, the Disk Controller's Sequencer can calculate the optimal transfer frequency-rate for any data-zone needing to be read, and communicates that calculation to the Disk Controller's "Clock Synthesizer" module. Furthermore, the Clock Synthesizer will then generate a divided-by-two dclock signal from calculations it received from the Disk Controller's Sequencer. Moreover, the Disk Controller's Clock Synthesizer module will send this dclock-signal to all of the Microhead Array Chips' (CLK) "Clock" input-contact pin-number "35". Moreover, the previously mentioned dclock-signal will enter the Microhead Array Chip Number-5's input-contact pin-number "35", where it will enter the second entrance of the Read Channel's DPLL circuit, as illustrated in FIGS. 92 and 93. The first entrance to the Microhead Array Chip Read Channel's DPLL circuit (FIGS. 92 and 93) is the clock-input of the Read Channel's XOR Phase Detector circuit, as illustrated in FIGS. 11, 12, 13, and 14. Moreover, the Read Channel's buffered output signals will enter at the data-input (FIG. 116) of the Read Channel's XOR Phase Detector circuit, as illustrated in FIGS. 86, 87, 92, 93, 98, 99, 101, and 102. In addition, later the Read Channel's buffered output signals will enter the DPLL circuit (FIGS. 92 and 93) of the Microhead Array Chip Hard Disk Drive.

Moreover, the resulting output signal is a Bi-Phase Encoded Data Stream (FIG. 100), which is next sent to the Microhead Array Chip's (Dout) "Data out" output-contact pin-number "63". Contiguously, the Bi-Phase Encoded Data Stream signal will next travel onto the data-bus cable, where it is lead to the Disk Controller's Sequencer, as illustrated in FIGS. 62A, 63A, 62C, and 63C. Furthermore, the Disk Controller's Sequencer contains the reception side of the Microhead Array Chip Hard Disk Drive's DPLL or Digital Phased-Locked Loop circuit. In addition, the previously mentioned DPLL circuit (FIG. 116) of a Disk Controller's Sequencer (FIGS. 62A, 63A, 62C, and 63C) will be used to recover the clock signal from the Bi-Phase Encoded Data Stream. Moreover, this recovered clock signal is used to resolve the data transfer-rate of a disk-platter's data-zone being read. After the clock signal is recovered from the Bi-Phase Encoded Data Stream the Sequencer's DPLL will re-encode the data-stream into a regular type of NRZ encoded signal that the Disk Controller's Buffer Controller can receive and use to execute the host-requested data-transfer.

Moreover, the Disk Controller's Sequencer can now make on-the-fly data-rate comparisons for on-the-fly transfer-rate adjustments. Subsequently, the Sequencer does this by analyzing the Spindle-Motor's velocity, the DPLL's recovered clock signal's frequency-rate, and the frequency-rate of the original dclock signals that were sent by the Disk Controller's Clock Synthesizer to the clock-input of the Read Channel's XOR Phase Detector circuit (FIG. 116) at the beginning of the host-requested read-data disk operation, as illustrated in FIGS. 62A, 63A, 62C, 63C. Therefore, when the Sequencer makes on-the-fly comparisons of the previously mentioned signals, an on-the-fly transfer frequency-rate correction can be made to the Sequencer's DPLL, and an on-the-fly Spindle-Motor adjustment can be made to the Spindle-Motor. Consequently, this will offer a more responsive and faster Phased-Locked Loop for the data-stream output of a selected Microhead Array Chip Read Channel during host-requested read-data disk operations. In addition, by encoding the Read Channel's output data-stream with Bi-Phase Data Encoding, an exclusive XOR Phase Detector (FIG. 116) makes possible a clock recovery from the post-amplified Read Channel data-stream, and a data conversion from a Bi-Phase Encoded Data Stream to a regular NRZ encoded data-stream. Furthermore, the Bi-Phase Data Encoding of the Read Channel's post-amplified and buffered data-stream output signal will make it possible to Phase-Locked Loop the data-stream with much greater accuracy, while not having to place an odd-parity bit at the end of every eight-bit word, which is suppose to eliminate the possibility of all eight bits becoming high. Therefore, when using Bi-Phase Data Encoding, parity bits are not needed for data to achieve full transfer synchronization.

Moreover, the Disk Controller, as illustrated in FIGS. 62A, 63A, 62B, 63B, 62C, and 63C, when receiving read-data from a selected microhead manages the flow of that read-data between the selected Microhead Array Chip and the Microhead Array Chip Hard Disk Drive's IDE or SCSI Interface Controller. Furthermore, it also controls data-access to the external SDRAM memory buffers for the Disk Controller of a Microhead Array Chip Hard Disk Drive. In addition, the Disk Controller's DPLL transfer-format is a serial (NRZ) "Non-Return to Zero" bit-stream of encoded-data, which is sent to the Buffer Controller for conversion to a 16-bit data-word that the Sequencer module can identify as belonging to a target sector. Consequently, if the Sequencer makes a positive target-sector identification of the read-data the Buffer Controller will present it to the host-system through the Microhead Array Chip Hard Disk Drive's IDE or SCSI Interface in the form of a 16-bit data-word. In addition, after a full sector is read the Disk Controller's ECC module will check to see if the firmware needs to apply ECC correction to the read data. The Buffer Controller section of the Disk Controller stores the previously mentioned data in the cache and next transmits the data to a Microhead Array Chip Hard Disk Drive's IDE Interface Controller module. Subsequently, the IDE or SCSI Interface Controller module will transmit the read data-sector to the host-system through the IDE or SCSI interface system's bus.

In addition, the signal-path for the Write Channel in the Induction Channel Coil Read And Write Element Microhead Array Chip design almost follows the reverse order of the Read Channel's signal-path. First, the host-system will present a 16-bit data-word to a Microhead Array Chip Hard Disk Drive's unit assembly through the IDE or SCSI system's bus to the Disk Controller's IDE or SCSI Interface Controller. Moreover, the Buffer Controller section of a Microhead Array Chip Hard Disk Drive's Disk Controller stores the data in the Microhead Array Chip Hard Disk Drive's cache. Furthermore, because data can be presented to the drive at a transfer-rate that exceeds the transfer-rate at which the drive can write-data to a disk-platter's data-surface; data is stored temporarily in a Microhead Array Chip Hard Disk Drive's cache. Therefore, the host-system can present data to a Microhead Array Chip Hard Disk Drive at a transfer-rate that is independent of the transfer-rate at which the drive can write-data to a disk-planter's data-surface. Moreover, upon correct identification of the target-address, the data is shifted to the Sequencer where an (ECC) "Error Correcting Code" is generated and appended to the data-packet. In addition, the Sequencer then converts the bytes of data into a NRZ serial bit-stream. Moreover, this bit-stream will be encoded as a Bi-Phase Encoded form of (RLL) "Runtime Length Limited" data (i.e., sometimes called Bi-Phase Mark Encoded Data). Furthermore, this Bi-Phase Mark Encoded Data will be transferred at the calculated and optimal transfer-rate for the Microhead Array Chip Hard Disk Drive's data-zone its being transferred to, as illustrated in FIGS. 62A, 63A, 62B, 63B, 62C, and 63C.

Moreover, the Disk Controller must first select one microhead from a number of Microhead Array Chips using its Address Controller. After a single microhead has been addressed, the Disk Controller will switch the Microhead Array Chip's (R/-W) "Read And Write" bus-line to (WE) "Write Enabled" write-mode, as illustrated in FIGS. 94, 95, 96, and 97, and, moreover at the "precise disk-wedge rotational moment" the Bi-Phase Mark Encoded RLL Data Stream signal is transmitted from the Disk Controller's memory-buffers through the Sequencer (FIGS. 62A, 63A, 62B, 63B, 62C, and 63C) to the selected Microhead Array Chip's (Din) Data-in input-contact pin-number "63", as illustrated in FIGS. 64A, 64B, 64C, 64D, and 64E. Furthermore, when the "Write Driver" receives this Bi-Phase Mark Encoded RLL Data Stream signal, the Write Driver circuit (FIGS. 103, 104, 105, and 106) will use the signal's alternating highs and lows to Rotate Toggle four Write Driver transmission-gates, illustrated in FIGS. 107 and 108. Consequently, the previously mentioned four Write Driver transmission-gates control the directional current flow of a single direct-current (VDD) signal source, as illustrated in FIGS. 107 and 108.

Moreover, the Write Driver alternately switches the current-direction of this direct-current (VDD) signal according to the first "Din" Data-in Bi-Phase Mark Encoded Data Stream signal it receives from the Disk Controller's Sequencer. Furthermore, the alternately switched current-directions of this direct-current (VDD) signal is sent to the Read And Write Input bus-conduit, which is illustrated in FIGS. 64A and 64D. In addition, the Read And Write Input bus-conduit (FIGS. 64A and 64D) passes on the (VDD) signal to the addressed microhead's Rotate Toggled Alpha and Beta Induction Channel Coils through the Read and Write Input bus-conduit. In addition, only an addressed microhead would have its Alpha and Beta Induction Coils connected to the Read And Write Input bus-conduit. Moreover, this will induce magnetic transitions (FIGS. 82 and 83) that represent a Write Channel data-stream's "1s" and "0s", which, in turn, causes the magnetic-domains on a disk-platter's data-surface to respond by rotating in an opposite direction as the magnetic field being produced above the disk-platter's data-surface, as illustrated in FIGS. 64A, 64B, 64C, 64D, and 64E.

However, before any data can be written to a disk-platter the correct microhead must first be selected. The microhead to be selected is located within a Microhead Array, which itself is one of the available eight Microhead Array Chips installed in a Microhead Array Chip Hard Disk Drive's unit assembly. Moreover, the data writing process begins when the Disk Controller has received a write-data request from the host-system for a particular disk-platter's cylinder/track and data-sector location, which contains the host-requested data. For example, a host-system's write-data request might look like this, Write-data using head number "5", at track number "4562", at sector number "43". Moreover, the Address Controller, illustrate in FIGS. 62A, 63A, 62B, 63B, 62C, and 63C, would receive this write-data request from the Disk Controller and place it into its "Interface Register". Moreover, the Disk Controller's Interface Register holds a host-system's write-data request while the Address Controller's "Translator" unit translates the request into terms that the Address Controller can use to activate any required addressing and control-bus signals within a Microhead Array Chip Hard Disk Drive.

Moreover, the Address Controller's Translator unit, illustrated by FIGS. 62A, 63A, 62C, and 63C, would first tell the Address Controller's Address Unit that Microhead Array Chip Number-5, being equivalent to a conventional data-head numbered as Head-5. Wherein, the Address Controller's response would be to enable the (-CS4) Chip Select Line Number-4 (i.e., the chip select lines available are CS0, CS1, CS2, CS3, CS4, CS5, CS6, CS7) with a logic-low control-signal, as illustrated in FIGS. 60A, 61A, 60B, 61B, 60C, and 61C. Moreover, this Chip Select signal prepares the Microhead Array Chip Number-5 to be the only Microhead Array Chip on the address bus able to latch into its Address Latch Circuit (FIGS. 64A, 64B, and 64E) a microhead address number, which is sent down a Microhead Array Chip Hard Disk Drive's thirty-two address-lines, as illustrated in FIGS. 62A, 63A, 62B, 63B, 62C, and 63C. While, at the same time the (-AS) "Address Strobe" control bus signal is sent down its control bus signal line to the input-contact pin-number "37" of every Microhead Array Chip (FIGS. 11 and 12) installed and connected to a Microhead Array Chip Hard Disk Drive's control bus. Furthermore, only the simultaneous transmission of two logic-low control-signals; one for the (-CS4) Chip Select Line Number-5 at input-contact pin-number "38", and one for the (-AS) "Address Strobe" at input-contact pin-number "37" (FIGS. 66, 67, 68, and 69) will the Microhead Array Chip Number-5 be selected for the write-data disk operation. Conclusion, only Microhead Array Chip number "5", which is connected in a daisy-chain bus line-up, is selected to tri-state latch (FIGS. 65A and 65B) the track-address number "4562" into its Address Latch And Chip Select Circuit, as illustrated in FIGS. 70, 71A, and 71B. Furthermore, the 32-bit address-number "4562" will stay latched in a Microhead Array Chip's tri-stated Address Latch And Chip Select Circuit as-long-as the (-CS4) and (-AS) bus-lines continue to have logic-low control-signals present on their lines.

Moreover, the address input of the Microhead Array Chips consists of thirty-two input contactpins "A0" through "A31" the address bus inputs of a Microhead Array Chip, which are illustrated in FIGS. 11, 12, 13, and 14. Furthermore, after the address number "4562" has been successfully latched the (-ADACK) Address Acknowledge circuit will send a logic-low control-signal down its control bus-line. Moreover, the previously mentioned (-ADACK) control-signal is generated from the simultaneously enabling of the (-CS4) and (-AS) circuits. Moreover, the (-CS4) and (-AS) circuits are located within a selected Microhead Array Chip's Address Latch And Chip Select Circuit, as illustrated in FIGS. 66, 67, 68, 69, 70, 71A, and 71B. In addition, the (-ADACK) control-signal is sent from a selected Microhead Array Chip's output-contact pin-number "40", as illustrated in FIGS. 11, 12, 13, and 14, to the (-ADACK) Address Acknowledge input location of the Address Controller (FIGS. 62A, 62B, and 62C), which is located on a Disk Controller's PCB 63 (FIG. 4) 80 (FIG. 5) of a Microhead Array Chip Hard Disk Drive.

Moreover, the logic-low control-signal received at the (-ADACK) input-contact of the Address Controller tells the Address Controller that the address-number "4562" has been successfully latched into the Address Latch And Chip Select Circuit (FIGS. 70, 71A, and 71B), which is located in the selected Microhead Array Chip Number-5. Furthermore, the successfully latched address signal will next be sent from the 32-bit Address Latch And Chip Select Circuit on down to the Microhead Array Chip's 32-bit "Address Decoder Circuit", as illustrated in FIGS. 64A, 64B, 72, and 73. Subsequently, when the Microhead Array Chip's Address Decoder Circuit receives a 32-bit address signal it will reroute it to its internal "address tree decoder" circuit for decoding, as illustrated in FIGS. 64A, 64B, 72, and 73. In addition, the decoding process of the latched address signal by the address tree decoder circuit (FIGS. 72 and 73) will result in the enabling of one microhead selection-line by a logic-high control-signal, for example the selection-line for microhead "4562".

In addition, the "inverter body effect", which is normally associated with and caused by any circuits containing large numbers of CMOS inverters, like the large number of inverters present in an "address tree decoder", a loss of signal strength is bound to occur. Consequently, the address tree decoder's singularly enabled microhead selection-line will need its logic-high control-signal regenerated by the Microhead Array Chip's Address Buffer Circuit, or signal-loss on that line is bound to occur, possibly causing a microhead selection error. Furthermore, when a Microhead Array Chip's Address Decoder Circuit sends the microhead selection-line signals to the Microhead Array Chip's Address Buffer Circuit, as illustrated in FIGS. 64A, 64B, 74, and 75, two very important and simultaneous things will occur:

(i) Signal regeneration of the address tree decoder's only enabled microhead selection-line, by the Microhead Array Chip's Address Buffer Circuit will occur, (ii) The address tree decoder's unsolicited microhead selection output-lines are pulled-down through their Long-L inverters to ground (FIGS. 64A, 64B, 74, and 75); whereby, the pulling of the unsolicited microhead selection-lines to ground will also put them into a (Hi-Z) "High Impedance Line State".

Furthermore, every microhead selection line within a Microhead Array Chip has its start in the Address Decoder Circuit and its finish in the Microhead Selection And Coil Rotation Circuit, where each selection line is terminated by two transmission-gates attached to its finish, as illustrated in FIGS. 64A, 64B, 76, and 77. In addition, the previously mentioned two transmission-gates used to terminate every microhead selection line has an auxiliary bus line passing through it. Moreover, the previously mentioned auxiliary bus lines are attached to the Coil Switch And Rotate Toggle Flip-Flop Circuit's two output bus-lines, as illustrated in FIGS. 64A, 64B, 76, and 77. In addition, all of the auxiliary lines that control the selected microhead's Alpha coils are connected to bus-line "01" of the Coil Switch And Rotate Toggle Flip-Flop Circuit, as illustrated in FIGS. 76 and 77. While, all of the auxiliary lines that control the selected microhead's Beta coils are connected to bus-line "02" of the Coil Switch And Rotate Toggle Flip-Flop Circuit, as illustrated in FIGS. 76 and 77. Moreover, when microhead selection line "4562" is enabled its two termination transmission-gates are turned on as well, the only two in the entire Microhead Selection And Coil Rotation Circuit. Moreover, this will redirect the Coil Switch And Rotate Toggle Flip-Flop Circuit's two (FIGS. 76 and 77) output bus-line signals onto the enabled transmission-gates two auxiliary control lines. The redirected bus-line signals are used to control the selected microhead "4563's" Alpha and Beta Induction Channel Coil's (FIGS. 64A, 64B, 82, and 83) access to the Microhead Array Chip's Read And Write Input bus-conduit, which is illustrated in FIGS. 64A and 64B. Moreover, control over the selected microhead's Alpha and Beta Induction Channel Coil's (FIGS. 82 and 83) access to the Microhead Array Chip's Read And Write Input bus-conduit is in reality the same as control over the microhead itself.

Furthermore, the Coil Switch And Rotate Toggle Flip-Flop Circuit's (FIGS. 78 and 79) two output bus-lines, which connect to the Alpha and Beta Coil of selected microhead "4562", will Rotate Toggle the selected microhead's Alpha and Beta Induction Channel Coils during any write-data disk operation. The Rotate Toggling on-and-off of a selected microhead's Induction Channel Coils will enable the selected microhead to write cached host-system data to cylinder/track "4562", at sector "43", which is located on data-surface "5" of disk-platter "3"; moreover, a disk-platter installed in the Microhead Array Chip Hard Disk Drive's unit assembly, as presented in the art.

Figure 78:
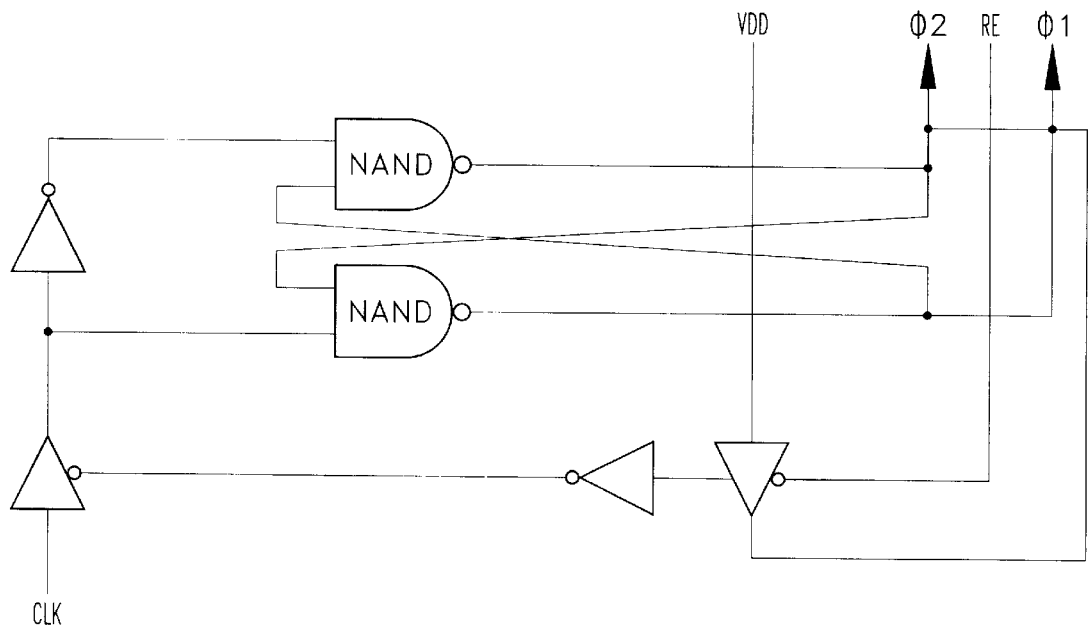
FIG. 78 shows a logic-diagram of the Read and Write Element Induction Channel Coil Head design configuration for a magnetic Microhead Array Chip design, displaying the Microhead Selection And Coil Rotation Control Circuit Flip Flop, coil selection, and rotation control circuits.
Figure 79:
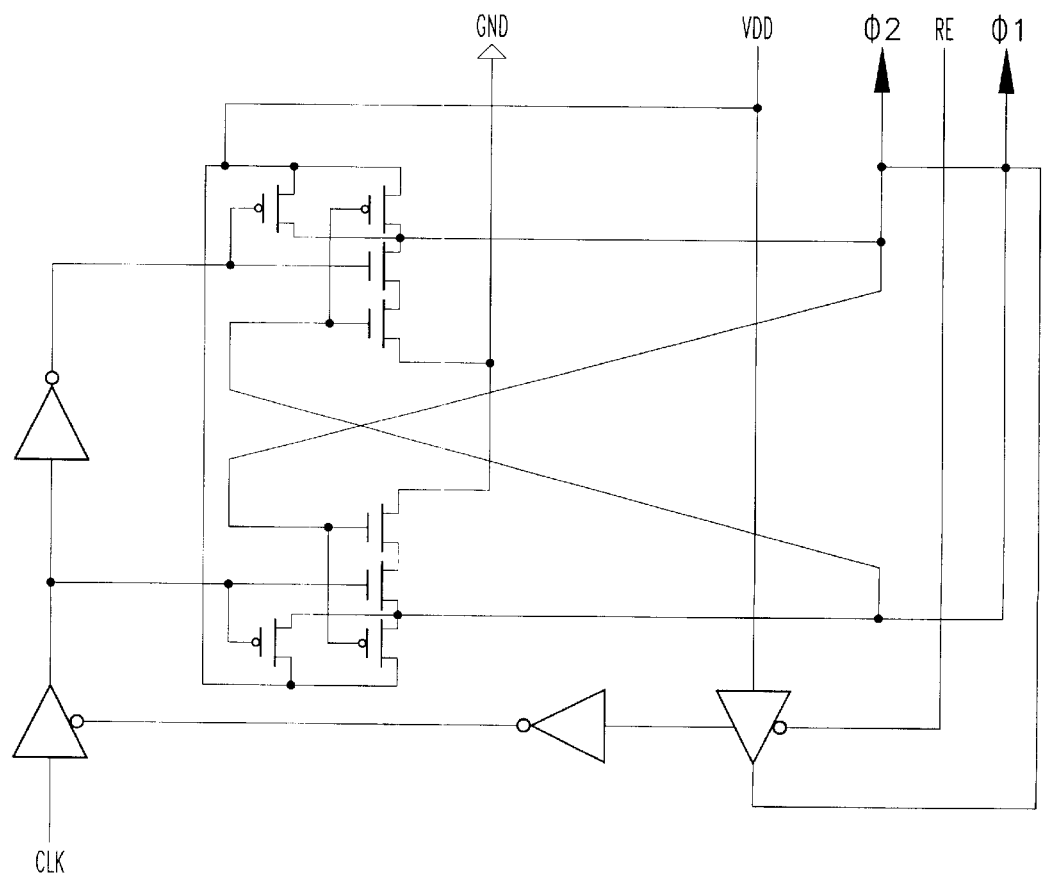
FIG. 79 shows a circuit-diagram of the Read and Write Element Induction Channel Coil Head design configuration for a magnetic Microhead Array Chip design, displaying the Microhead Selection And Coil Rotation Circuit Flip Flop, coil selection, and rotation control circuits.

In addition, when the (RE) Read Enable input at the Microhead Selection And Coil Rotation Circuit (FIGS. 64A, 64B, 76, and 77) receives a logic-low control-signal from the R/W Control Circuit, as illustrated in FIGS. 94, 95, 96, and 97, the selected microhead "4562" will become enabled for write-data disk operations. Furthermore, during a write-data disk operation the Coil Switch And Rotate Toggle Flip-Flop Circuit (FIGS. 78 and 79), Coil Switch Toggle Circuit, or Coil Rotate Toggle Circuit will output two alternating control signals onto the circuit's two bus-lines, illustrated in FIGS. 76 and 77. In addition, the previously mentioned bus-lines that transport two signals of alternating highs and lows signals are created from a second (Din) Data-in rerouted Bi-Phase Mark Encoded Data Stream signal. Moreover, the previously mentioned Bi-Phase Mark Encoded Data Stream signal comes from the Disk Controller's Sequencer, where it enters a control bus-line until it reaches input-contact pin-number "63", as illustrated in FIGS. 64A, 64B, 76, and 77, or the (Din) "Data-in" data-input of Microhead Array Chip Number-5, where it takes two different routs. Furthermore, route "1" for this signal leads to a Microhead Array Chip's Write Driver Circuit, while rout "2" leads to the Microhead Array Chip's Coil Switch And Rotate Toggle Flip-Flop Circuit's input, as illustrated in FIGS. 78 and 79.

Moreover, the two Microhead Selection And Coil Rotation Circuit's transmission-gates controlling the Alpha and Beta Coils of microhead "4562" are simultaneously turned on by an enabling logic-high signal, which was received from microhead selection-line "4562". Furthermore, this will allow the passage of the two alternating bus-line control-signals outputted by the Coil Switch And Rotate Toggle Flip-Flop Circuit's output bus, as illustrated in FIGS. 76 and 77. Moreover, the previously mentioned two alternating bus-line control-signals, which are pass through to the four transmission-gates of selected microhead "4562", will Rotate Toggle access of the selected microhead's Alpha and Beta Induction Channel Coils to the Microhead Array Chip's Read And Write Input bus-circuit. During a write-data disk operation the two alternating bus-line control-signals, which come from a Coil Switch And Rotate Toggle Flip-Flop Circuit's outputted bus-lines, will "simultaneously alternate" or "Rotate Toggle" access of the Alpha and Beta Coils (FIGS. 64A, 64E, 82, and 83) of microhead "4562" to the Read And Write Input bus-line. Furthermore, the alternated usage between a selected microhead's Alpha and Beta Induction Channel Coil will occur for each data-bit period, which is derived from a Bi-Phase Mark Encoded Data Stream signal received by a selected Microhead Array Chip's Write Driver circuit, as illustrated in FIGS. 64A, 64E, 107, and 108.

Moreover, the "Data Bit Stream Controlled Induction Channel Coil's Usage Rotation" design approach for write-data disk operations was chosen because it solves the reactance-distortion problem associated with high-turn induction coil write-head data systems. Therefore, lets examine in detail the use of "Switch toggling" or "Rotate Toggling" of a selected microhead's two Induction Channel Coils. Moreover, the selected microhead's two Induction Channel Coils are either simultaneously or alternately used during an inputted Bi-Phase Mark Encoded Data Stream signal's data-bit period, as illustrated in FIGS. 64A, 64E, 82, 83, 103, 107, and 108. While conventional induction coil, write-head designs use a single induction coil and current-reversals to induce the magnetic-reversals of magnetic cell-domains, which are contained and pre-recorded across the disk-platter data-surfaces of a hard disk drive.

Moreover, during all write-data disk operations a selected microhead, for example microhead "4562", will Rotate Toggle or "alternatively" use its Alpha and Beta Induction Channel Coils for each occurring magnetic reversal, when a magnetic reversal is necessary. A selected microhead's Alpha Induction Channel Coil is used exclusively for all inputted logic-highs or "1s", while a selected microhead's Beta Induction Channel Coil is used exclusively for all inputted logic-lows or "0s". Furthermore, when the Coil Switch And Rotate Toggle Flip-Flop Circuit receives a logic-high at its flip-flop circuit's input, it will output a logic-high onto its bus-line "01", which moreover leads to coil-line "01", as illustrated in FIGS. 76 and 77. Moreover, this logic-high control-signal, which is placed on coil-line "01" to enable the four transmission-gates that control a selected microhead's Alpha Induction Channel Coil's "Rotating Toggle" (FIGS. 82 and 83) (i.e., four transmission-gates per Induction Channel Coil), will moreover activate for use the Alpha Induction Channel Coil of microhead "4562". In addition, and at the same time, when the Coil Switch And Rotate Toggle Flip-Flop Circuit receives a logic-high at its flip-flop circuit's input it will output a logic-low onto its bus-line "02", which moreover leads to coil-line "02", as illustrated in FIGS. 76 and 77. Moreover, this logic-low control-signal, which is placed on coil-line "02" to enable the four transmission-gates that control a selected microhead's Beta Induction Channel Coil's "Rotating Toggle" (FIGS. 82 and 83) (i.e., four transmission-gates per Induction Channel Coil), will moreover de-activate for use the Beta Induction Channel Coil of microhead "4562".

Furthermore, when the Coil Switch And Rotate Toggle Flip-Flop Circuit receives a logic-low at its flip-flop circuit's input it will output a logic-low onto its bus-line "01", which moreover leads to coil-line "01", as illustrated in FIGS. 76 and 77. Moreover, this logic-low control-signal, which is placed on coil-line "01" to disable the four transmission-gates that control a selected microhead's Alpha Induction Channel Coil's "Rotating Toggle" (FIGS. 82 and 83) (i.e., four transmission-gates per Induction Channel Coil), will moreover de-activate for use the Alpha Induction Channel Coil of microhead "4562". In addition, and at the same time, when the Coil Switch And Rotate Toggle Flip-Flop Circuit receives a logic-low at its flip-flop circuit's input, it outputs a logic-high onto its bus-line "02", which moreover leads to coil-line "02", as illustrated in FIGS. 76 and 77. Moreover, this logic-high control-signal, which is placed on coil-line "02" to enable the four transmission-gates that control a selected microhead's Beta Induction Channel Coil's "Rotating Toggle" (FIGS. 82 and 83) (i.e., four transmission-gates per Induction Channel Coil), will moreover activate for use the Beta Induction Channel Coil of microhead "4562".

Moreover, for a write-data disk operation to occur the R/W Control Circuit must first enable the Write Channel of a selected Microhead Array Chip. Furthermore, the Write Channel's control-bus consists of a (R/-W) "Read And Write" control line connected at input-contact pin-number "35", a (+5V) "VDD" power-line at input-contact pin-number "34", and a (-CS) "Chip Select" selection-line at input-contact pin-number "38"; for all of the installed Microhead Array Chips, as illustrated in FIGS. 64A, 64C, 94, 95, 96, and 97. In addition, to enable a Write Channel within a selected Microhead Array Chip, there must be a power-signal at input-contact pin-number "34" (+5V), a logic-low control-signal at input-contact pin-number "38" (-CS), and a logic-low control-signal at input-contact pin-number "35" (R/-W). Furthermore, these three control-lines must have these signal conditions present on their bus-lines in order for the Write Channel located within a selected Microhead Array Chip to become enabled, as illustrated in FIGS. 64A, 64C, 94, 95, 96, and 97. For example, to select Microhead Array Chip Number-5 a physical re-direction of the Address Controller's (-CS4) Chip Select Line Number-4 must occur. Therein, the Microhead Array Chip's chip-positioning circuit board's copper circuit-trace (FIG. 21) for Chip Select must be cross-connected from the input-contact pin-number "53" of the chip-positioning circuit board's Polymer flex-cable's spring-contact connector 67 (FIGS. 2, 3, and 10) to the (-CS) Chip Select input-contact pin-number "38" of a chip-positioning circuit board's surface mounting chip-socket 5 (FIGS. 7, 8, and 21). Thereafter, the Microhead Array Chip Number-5 will become the only Microhead Array Chip connected to the Microhead Array Chip Hard Disk Drive's bus system to have its Write Channel activated. While all of the other Microhead Array Chips connected to the bus system of the Microhead Array Chip Hard Disk Drive would have, their Write Channels three-stated into a (Hi-Z) "High Impedance Line State".

Figure 103:
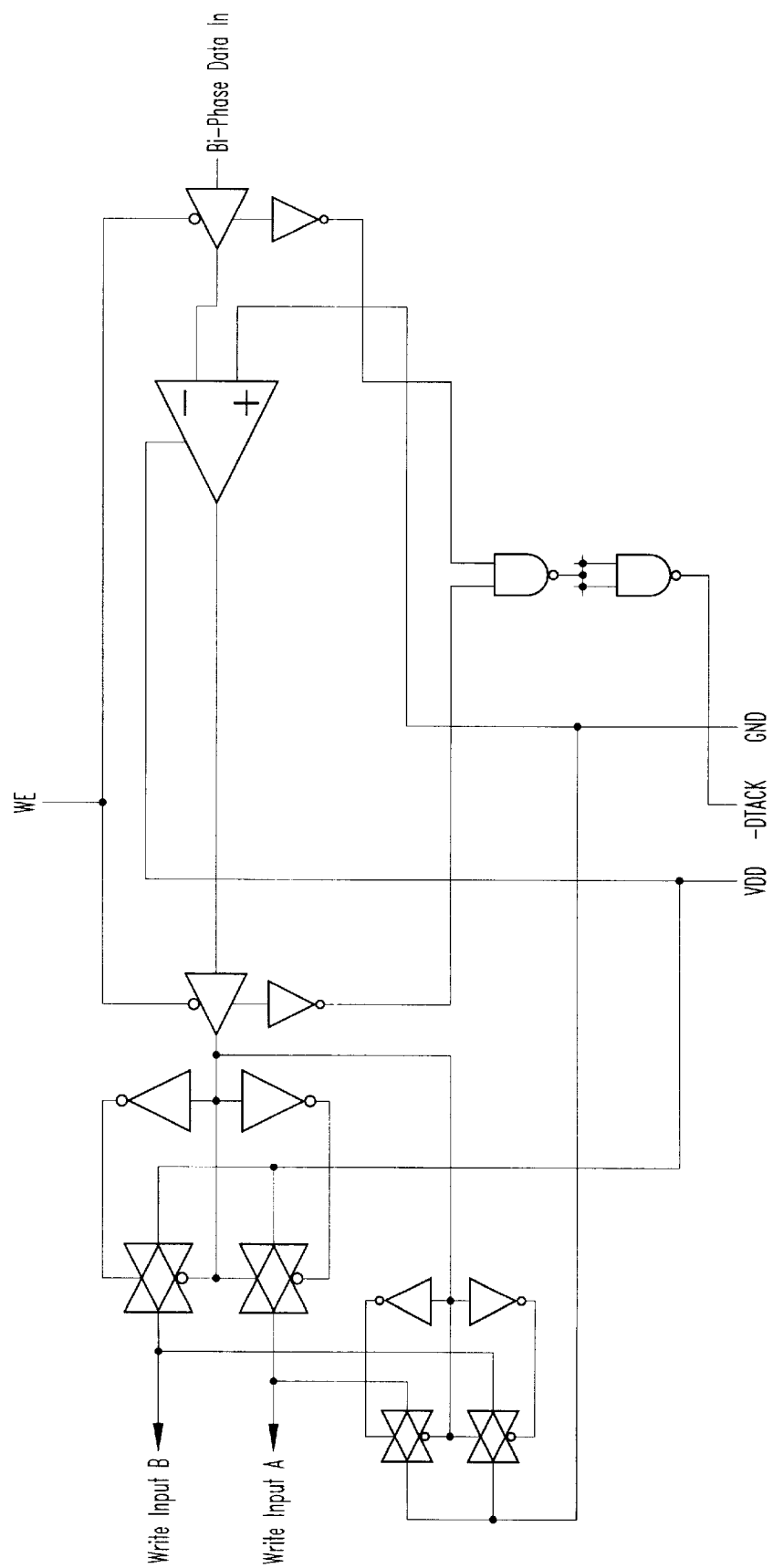
FIG. 103 shows a logic-diagram of the Write Channel pre-amp and write driver circuits for a magnetic Microhead Array Chip design, displaying the NAND (-DTACK) output and bi-phase encoded data-input circuits.
Figure 104:
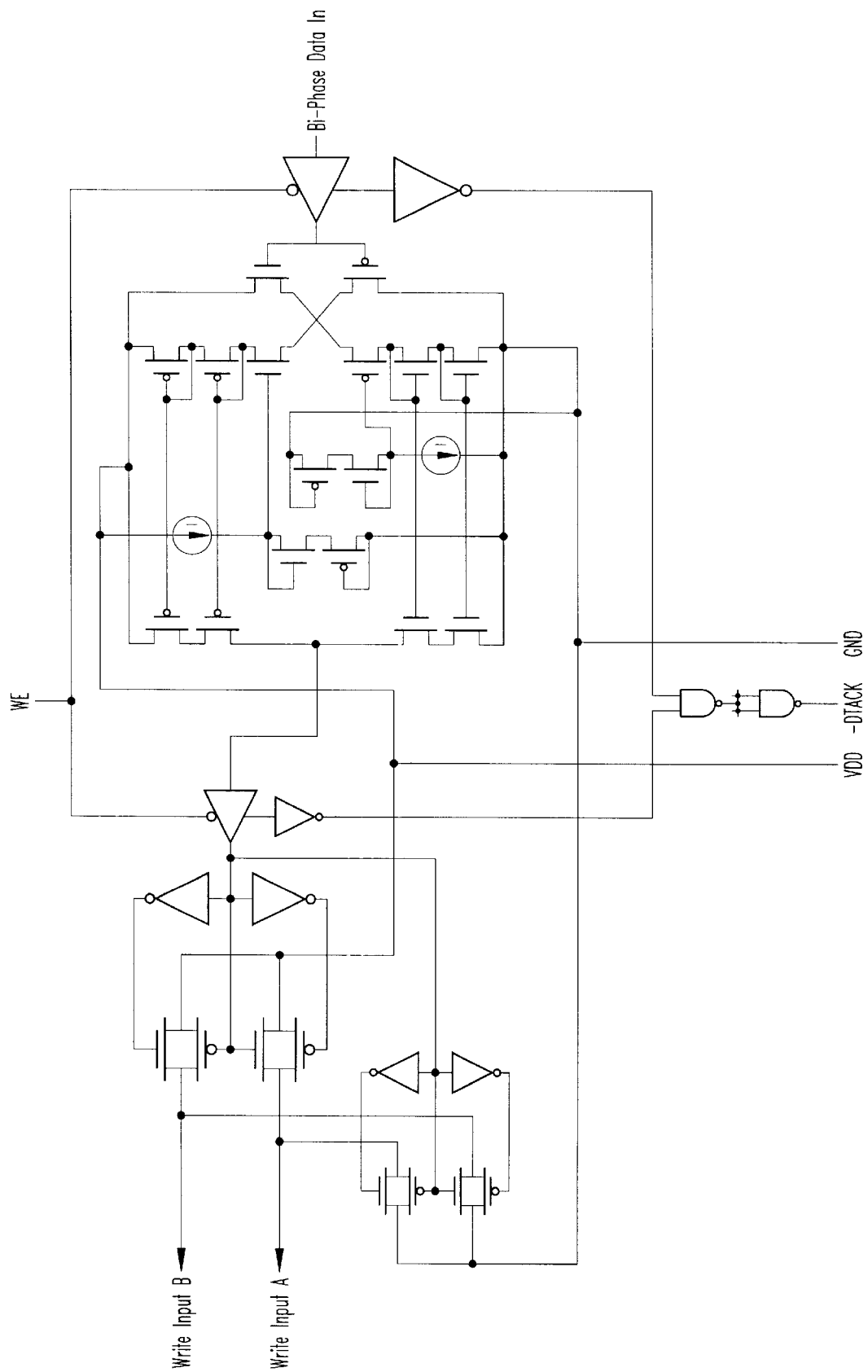
FIG. 104 shows a circuit-diagram of the Write Channel pre-amp and write driver circuits for a magnetic Microhead Array Chip design, displaying the NAND (-DTACK) output and bi-phase encoded data-input circuits.
Figure 105:
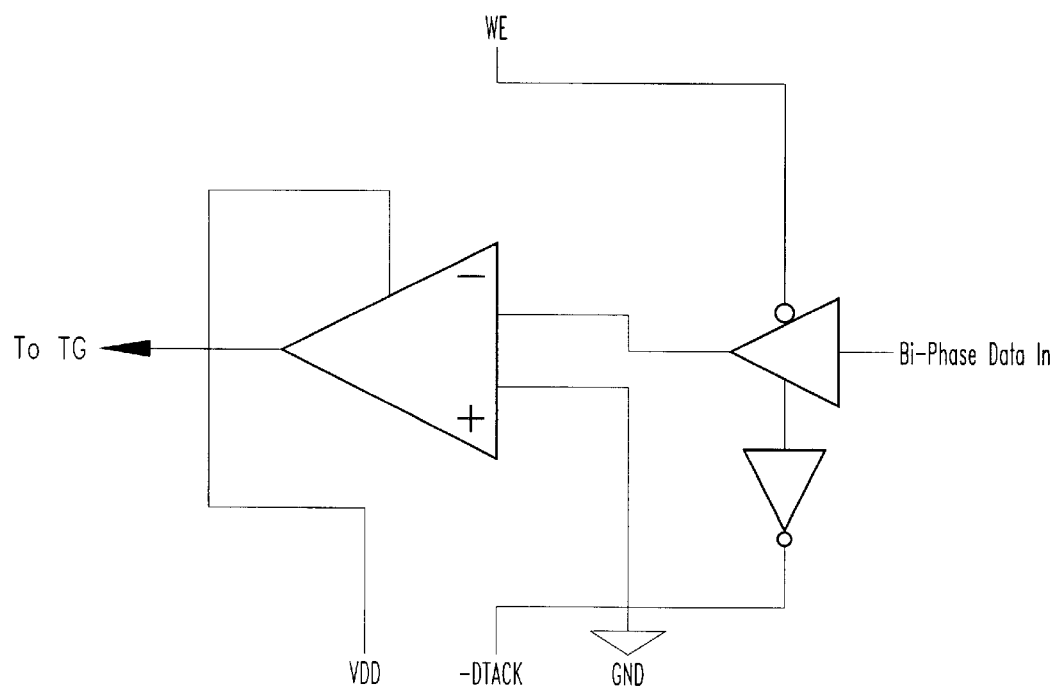
FIG. 105 shows a logic-diagram of the Write Channel pre-amp (AB Class) circuit for a magnetic Microhead Array Chip design, displaying bi-phase encoded data-in and NAND (-DTACK) output circuit connectivity.
Figure 106:
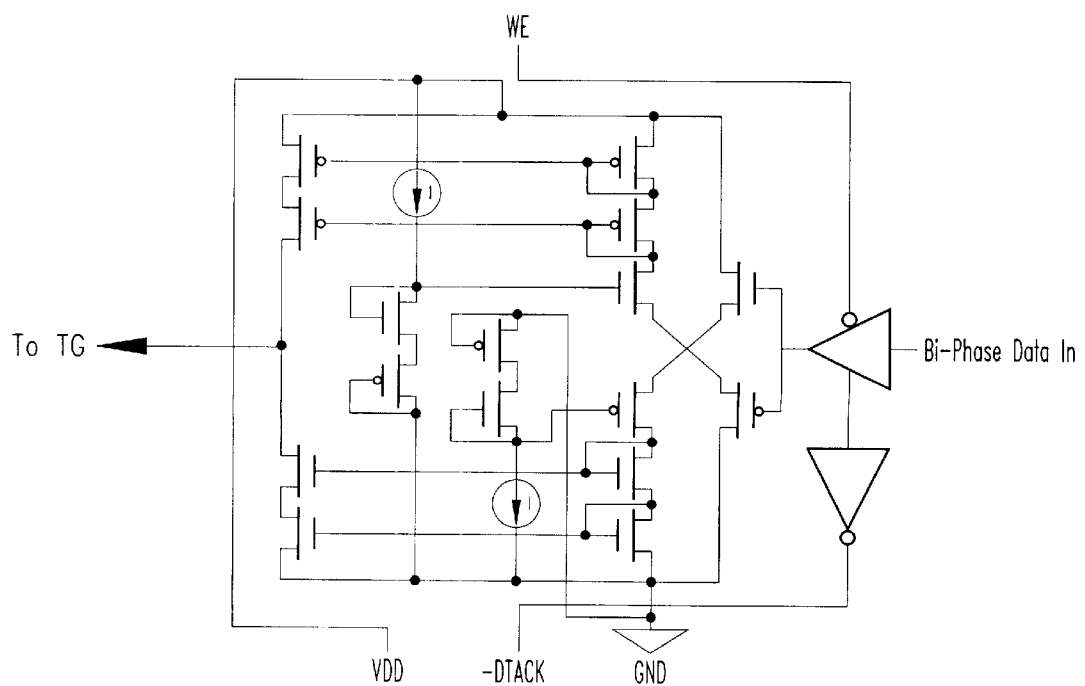
FIG. 106 shows a circuit-diagram of the Write Channel pre-amp (AB Class) circuit for a magnetic Microhead Array Chip design, displaying bi-phase encoded data-in and NAND (-DTACK) output circuit connectivity.
Figure 107:
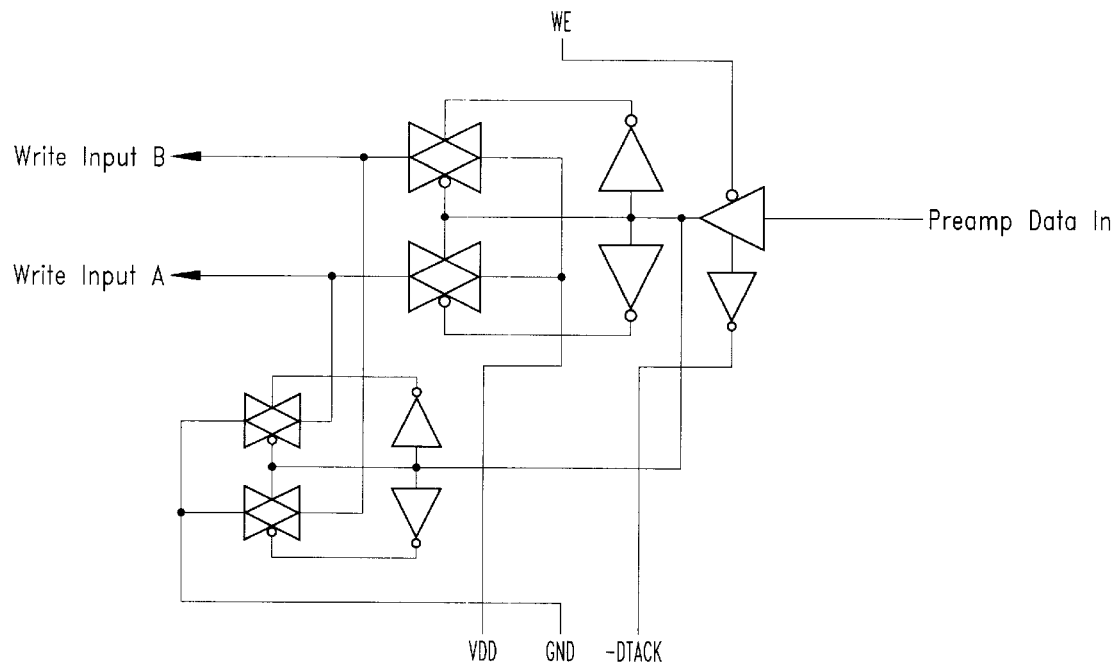
FIG. 107 shows a logic-diagram of the Write Channel demodulation and Write Driver Circuit for a magnetic Microhead Array Chip design, displaying NAND (-DTACK) output circuit connectivity.
Figure 108:
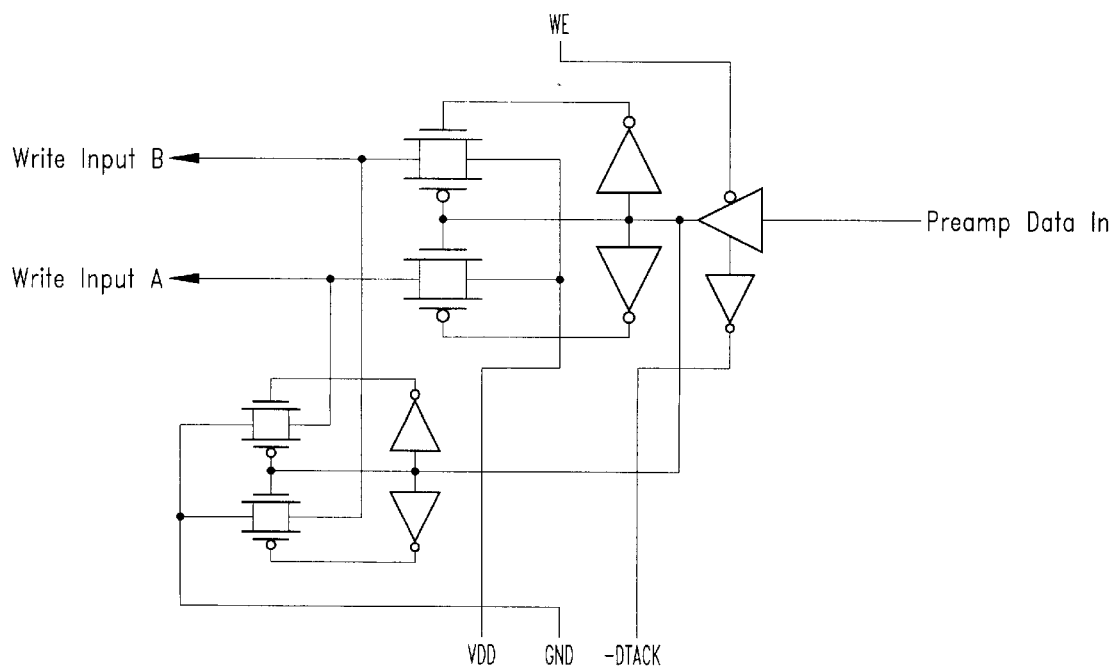
FIG. 108 shows a circuit-diagram of the Write Channel demodulation and Write Driver Circuit for a magnetic Microhead Array Chip design, displaying NAND (-DTACK) output circuit connectivity.

Moreover, during a (WE) "Write Enable" (FIGS. 103 and 104) enabling of Microhead Array Chip Number-5's Write Channel, as illustrated in FIGS. 64A and 64D, the Write Channel's two line-drivers will receive logic-high signals, this will enable the Write Channel's "Write Pre-amp Circuit", as illustrated in FIGS. 105 and 106, and the Write Channel's "Write Driver Circuit", as illustrated in FIGS. 107 and 108. Furthermore, two control-signal outputs leading from the two line-drivers of the Write Channel will connect to the (A) and (B) inputs of a double NAND control-circuit, as illustrated in FIGS. 109, 110, 111, and 112. Moreover, if both input-terminals (A) and (B) of the Write Channel's double NAND control-circuit (FIGS. 109, 110, 111, and 112) receives a logic-high control-signal, the double NAND control-circuit of the Write Channel will output a (-DTACK) Data Acknowledge logic-low control-signal onto the (-DTACK) bus-line, which leads to the Microhead Array Chip's output-contact pin-number "40" output, as illustrated in FIGS. 103 and 104.

Moreover, a (-DTACK) Data Acknowledge logic-low control-signal will travel from a Microhead Array Chip's output-contact pin-number "40" through a Polymer flex-cable's (DTACK) bus-lines 30, 36 (FIGS. 1 and 6) until it reaches the (-DTACK) input of the Disk Controller, as illustrated in FIGS. 62A, 63A, 62C, and 63C. Next, the Disk Controller will receive the (-DTACK) signal at its (-DTACK) input where it will continue until it reaches the Disk Controller's Sequencer. Furthermore, the Sequencer having received the previously mentioned (DTACK) logic-low control-signal now knows that the selected Microhead Array Chip's Write Channel is open and ready to write data to sector "43", of cylinder/track "4562", while using microhead "4562". Furthermore, when the (RE) Read Enable input at the Microhead Array Chip's Selection And Coil Rotation Circuit (FIGS. 64A, 64B, 76, and 77) receives a logic-low from the R/W Control Circuit (FIGS. 94, 95, 96, and 97) it becomes enabled for write-data disk operations. Furthermore, during a write-data disk operation a Bi-Phase Mark Encoded Data Stream's signal will enter a Microhead Array Chip's (Din) "Data In" input-contact pin-number "63", where this signal is rerouted to two different circuit areas within a selected Microhead Array Chip. Moreover, the first Bi-Phase Mark Encoded Data Stream signal goes to the Write Channel's "Write Pre-amp Circuit", as illustrated in FIGS. 64A, 64B, 64C, 64D, 64E, 103, 104, 105, and 106, where it is regenerated and amplified. Next, the first Bi-Phase Mark Encoded Data Stream signal is rerouted to the Write Driver Circuit, as illustrated in FIGS. 64A, 64B, 64C, 64D, 64E, 103, 104, 107, 108, where it Rotate Toggles on-and-off the two main transmission-gates within the circuit, as illustrated in FIGS. 107 and 108. Moreover, there are four transmission-gates in the Write Channel's Write Driver Circuit. In addition, the Write Driver Circuit's four transmission-gates control the flow of a direct VDD current, which is lead through the Write-Input bus to the Alpha and Beta Induction Channel Coils of selected microhead "4562". Moreover, this being the only microhead open to the Write-Input bus (FIGS. 64A and 64E), the signal is free to travel from the Write-Input bus through the selected Induction Channel Coil where the data-storing magnetic-reversals will occur (FIGS. 82 and 83) according to data-stream controlled transmission-gate switching.

For example, when the two transmission-gates, which control the Write Driver's Write Input (A) are turned on by a data-stream logic-high bit-input, as illustrated in FIGS. 107 and 108, the two transmission-gates, which control the Write Driver's Write Input (B) are turned off, allowing the Write Driver's direct current VDD signal to flow from the Write Driver's Write Input (A) through to the Alpha Coil of microhead "4562" and then out to the Write Driver's Write Input (B), which is turned off, causing a re-routing of the Write Driver's direct current VDD signal to ground, as illustrated in FIGS. 107 and 108. In addition, when the two transmission-gates, which control the Write Driver's Write Input (B) are turned on by a data-stream logic-low bit-input, as illustrated in FIGS. 107 and 108, the two transmission-gates, which control the Write Driver's Write Input (A) are turned off, allowing the Write Driver's direct current VDD signal to flow from the Write Driver's Write Input (B) through to the Beta Coil of microhead "4562" and then out to the Write Driver's Write Input (A), which is turned off, causing a re-routing of the Write Driver's direct current VDD signal to ground, as illustrated in FIGS. 107 and 108. Furthermore, there are four other transmission-gates in the Write Driver Circuit, which control the Write Driver's VDD direct current's Induction Channel Coil signal re-routed output to ground, as illustrated in FIGS. 103, 104, 107, and 108.

Moreover, During write-data disk operations the second Bi-Phase Mark Encoded Data Stream signal is routed to (FIG. 64A) the Microhead Selection And Coil Rotation Circuit input circuit, as illustrated in FIG. 64A, 64B, 76, 77, 78, and 79. Moreover, when the second Bi-Phase Mark Encoded Data Stream signal enters the input of the Coil Switch And Rotate Toggle Flip-Flop Circuit its data-stream bit reversals are used to create and Rotate Toggle the Coil Switch And Rotate Toggle Flip-Flop Circuit's two output signals, which, after creation are output onto a Coil Switch And Rotate Toggle Flip-Flop Circuit's two bus-lines (FIG. 78 and 79), which is built into every Microhead Selection And Coil Rotation Circuit. Furthermore, when a logic-high bit-input enters the input of the Coil Switch And Rotate Toggle Flip-Flop Circuit, the circuit's flip-flop will generate two control signals, a logic-high control-signal, which is sent to its output bus-line "01" and a logic-low control-signal, which is sent to its output bus-line "02", as illustrated in FIGS. 78 and 79. In addition, when the second Bi-Phase Mark Encoded Data Stream's signal enters a logic-low bit-input into the input of the Coil Switch And Rotate Toggle Flip-Flop Circuit, the circuit's flip-flop will again generate two control signals, a logic-low control-signal, which is sent to its output bus-line "01" and a logic-high control-signal, which is sent to its output bus-line "02", as illustrated in FIGS. 78 and 79. Therefore, the previously mentioned two flip-flop output signals "01", and "02" are really two opposite but concurrent control signals, which are derived from a single Bi-Phase Mark Encoded Data Stream signal; moreover, the same Bi-Phase Mark Encoded Data Stream signal used to control the Rotate Toggling of the Write Driver Circuit's transmission-gates. Moreover, the transmission-gates used to select a current direction for the Write Driver's direct current VDD signal, which is being sent through the Alpha and Beta Induction Channel Coils (FIGS. 78 and 79) of a selected microhead, for example microhead "4562", during a write-data disk operation. Moreover, each input-bit representing a binary "1" in the Bi-Phase Mark Encoded Data Stream will have logic highto-low or low-to-high bit-reversal (i.e., sometimes called a data edge) occurring in the middle of its data-bit square-wave's time period. While each input-bit representing a binary "0" in the Bi-Phase Mark Encoded Data Stream will have no bit-reversal (i.e., sometimes called a data edge) occurring in the middle of its data-bit square-wave's time period, but will always happen at the end of the previous data-bit's time period. For example, if the circuit receives a binary "1" bit, the produced RLL bit is going to change to a logic-low exactly in the middle of its square-wave's time period. Furthermore, the produced RLL bit would create on a disk-platter's data-surface a magnetic cell-domain with a magnetic orientation of either (South/North,North/South) or (North/South,South/North). Subsequently, the square-wave combination, which represents a binary "1" has a data-edge that occurs at the end of the previous square wave's time period, while having another data-edge that occurs in the middle of its own square wave's time period.

Moreover, if the circuit receives a binary "1" bit after a binary "0" bit, then the RLL bit produced is going to change to a logic-high bit exactly at the end of the previous square-wave's time period, and then change to a logic-low bit exactly in the middle of its own time period. Furthermore, the RLL bit produced would create on a disk-platter's data-surface a magnetic cell-domain with a magnetic orientation of (North/South,South/North), a magnetic combination representing a binary "0", with its data edge occurring at the end of the previous square wave's time period and also in the middle of its own square wave's time period. Moreover, if the circuit receives a binary "0" bit after a binary "0" bit, and depending upon the previous binary bit's square wave shape, the RLL bit produced is going to change to either a logic-high bit or logic-low bit and exactly at the end of the previous square-wave's time period. While, the RLL bit produced would create on a disk-platter's data-surface a magnetic cell-domain with a magnetic orientation of either (South/North) or (North/South); moreover, two different magnetic combinations representing a binary "0", with their data edges always occurring at the end of the previous square wave's time period.

Moreover, if the circuit receives a binary "0" bit after a binary "1" bit, then the RLL bit produced is going to change to a logic-high bit exactly at the end of the previous square-wave's time period. Moreover, the RLL bit produced would create on a disk-platter's data-surface a magnetic cell-domain with a magnetic orientation of (North/South); moreover, a magnetic combination representing a binary "0", with its data edges always occurring at the end of the previous square wave's time period. Furthermore, the Sequencer will be encoding the Write Channel's Bi-Phase Mark Encoded Data Stream with a RLL compression code, which is really nothing more than a algorithm used to recombine a NRZ data stream into a new group of data patterns that best utilizes the space on a magnetic data-surface.

Moreover, the RLL encoding of the Bi-Phase Mark Encoded Data Stream will compress the data stored on disk-platter data-surfaces of the Microhead Array Chip Hard Disk Drive. Furthermore, the RLL compression of the Bi-Phase Mark Encoded Data Stream will create more end-user storage space, while providing faster hard disk drive throughput. The generation of a strong read signal will come from a double-combination of two magnetic domain-cells used to represent binary "1s". Moreover, domain-cell combinations are two magnetic domain-cells when combined on a diskplatter's data-surface will have the same magnetic pole facing each other.

For example, if a (South/North,North/South) domain-cell combination were used they would produce a strong positive-voltage read-signal when being read. If, however, a (North/South,South/North) domain-cell combination were used they would produce a strong negative-voltage read-signal when being read. Moreover, these positive and negative voltage-peaks will always represent binary "1s" when they are read. While, a null voltage-peak signal within a data-bit's time-period will always represent binary "0s" when they are read. For example, a (South/North,South/North) or (North/South,North/South) magnetic domain-cell combination would create a negative-voltage read-signal within the Read Channel's High Performance Comparator, which would translate into a binary "0" data-bit time-period. Furthermore, during a write-data disk operation the Coil Switch And Rotate Toggle Flip-Flop Circuit's two output bus-line signals, "01" and "02" (FIGS. 76 and 77) will control the Alpha and Beta Induction Channel Coil's Rotate Toggling of the selected microhead "4562". Furthermore, Rotate Toggling will occur between the Alpha Induction Channel Coil of selected microhead "4562", the microhead coil used for all (South/North) magnetic domain-cells, and the Beta Induction Channel Coil of selected microhead "4562", the microhead coil used for all (North/South) magnetic domain-cells. In addition, during a write-data disk operation these magnetic domain-cell reversals are written to a disk-platter's data-surface within a Microhead Array Chip Hard Disk Drive's unit assembly. Furthermore, the write-data disk operation example, as presented in the art, uses the Microhead Array Chip Hard Disk Drive's disk-platter number "3", data-surface number "1" (i.e., or what is in reality data-surface number "5"), sector "43", of cylinder/track "4562"; moreover, the host-requested data-location, which has been used throughout the write-data disk operation examples, as presented in the art.

Additional Embodiments

In addition, the signal-path for the Read Channel in the Magnetoresistor Read Element and Induction Channel Coil Write Element Microhead Array Chip design begins at the microhead's (MR) "Magnetoresistor" read element, as illustrated in FIGS. 65A, 65B, 65C, 65D, and 65E. Furthermore, as the magnetic flux transitions recorded on a disk-platter pass under a microhead's Magnetoresistor read element, the Magnetoresistor read element will generate low-amplitude and differential output-voltages. Moreover, these Magnetoresistor read signals will travel from the Magnetoresistor read element to the Read Input bus-circuit of a selected Microhead Array Chip, as illustrated in FIG. 65A, to a selected Microhead Array Chip Read Channel's "Peak Detector Digital Decision-circuit" (FIGS. 65A, 65C, and 113), where the Magnetoresistor's analog read-signal is converted into a digital data-stream of binary "1s" and "0's". In addition, the data-stream of "1s" and "0s" are next sent to the Read Channel's High Performance Comparator circuit, as illustrated in FIGS. 86, 87, 88, 89, 90, 91, 92, and 93. Furthermore, this comparator circuit offers greater conversion accuracy and the further amplification of the analog to digital data-stream signal and consists of three-stages, which are:

(i) An input-preamplifier, as illustrated in FIGS. 88 and 89, (ii) A positive-feedback or decision-stage, as illustrated in FIGS. 90 and 91, (iii) An output-buffer, as illustrated in FIGS. 92 and 93.

However, before any data can be read from a disk-platter the correct microhead must first be selected. The selected microhead is located within a Microhead Array, which is itself located within one of the available eight Microhead Array Chips that are installed into a Microhead Array Chip Hard Disk Drive's unit assembly. Moreover, the process of reading data begins when the Disk Controller has received a read-data request from the host-system for a particular disk-platter, a particular cylinder/track, and a particular data-sector location that contains the host-requested data. For example, a host-system's read-data request might look like this, Read-data using head number "5", at track number "4562", at sector number "43". Moreover, the Address Controller, as illustrated in FIGS. 62A, 63A, 62B, 63B, 62C, and 63C, would receive this read-data request from the Disk Controller and place it into its "Interface Register". Moreover, while the Disk Controller's Interface Register holds the host-system's read-data request the Address Controller's "Translator" unit translates the request into terms that the Address Controller can use to activate any required addressing and control-bus signals within the selected Microhead Array Chip.

Moreover, the Address Controller's Translator unit (FIGS. 62A, 63A, 62C, and 63C) would first tell the Address Controller's Address Unit that Microhead Array Chip Number-5 is equivalent to a conventional head numbered as data head "5". Moreover, the Address Controller's response would be to enable the (-CS4) Chip Select Line Number-4 (i.e., the chip select lines available are CS0, CS1, CS2, CS3, CS4, CS5, CS6, CS7) with a logic-low control-signal, as illustrated in FIGS. 60A, 61A, 60B, 61B, 60C, and 61C. Moreover, this Chip Select signal will prepare the Microhead Array Chip Number-5 to be the only Microhead Array Chip connected to the entire address bus that is able to latch into its Address Latch Circuit (FIGS. 65A, 65B, and 65E) a microhead address number, which is sent down the Microhead Array Chip Hard Disk Drive's thirty-two address-lines, as illustrated in FIGS. 62A, 63A, 62B, 63B, 62C, and 63C. However, at the same time a control bus signal-line (-AS) "Address Strobe" is sent down its control bus signal-line to the input-contact pin-number "37" (FIGS. 11 and 12) of every Microhead Array Chip installed and connected to the Microhead Array Chip Hard Disk Drive's control bus. Furthermore, only the simultaneous combination of logic-low control-signals for (-CS4) "Chip Select" Line Number-5 at input-contact pin-number "38", and the (-AS) "Address Strobe" at input-contact pin-number "37" (FIGS. 66, 67, 68, and 69) will Microhead Array Chip Number-5 be selected for the read-data disk operation. Only a Microhead Array Chip numbered as "5" in the daisy-chained bus line-up is selected to tri-state latch (FIGS. 65A and 65B) the track-address number "4562" into its Address Latch And Chip Select Circuit, as illustrated in FIGS. 70, 71A, and 71B. Furthermore, the 32-bit address-number "4562" will stay latched in the Microhead Array Chip's tri-state Address Latch And Chip Select Circuit as-long-as the (-CS4) and the (-AS) bus-lines continue to have logic-low control-signals present on their lines.

Moreover, the address input of the Microhead Array Chips consists of thirty-two input contact-pins; the Microhead Array Chip's address bus inputs "A0" through "A31", as illustrated in FIGS. 11, 12, 13, and 14. Furthermore, after the address number "4562" has been successfully latched the (ADACK) Address Acknowledge circuit will send a logic-low control-signal down its control bus-line.

Moreover, the (-ADACK) control-signal is generated from the simultaneously enabled (-CS4) and (-AS) circuits. Moreover, the (-CS4) and (-AS) circuits are located within the selected Microhead Array Chip's Address Latch And Chip Select Circuit, as illustrated in FIGS. 66, 67, 68, 69, 70, 71A, and 71B. In addition, the (-ADACK) control-signal is sent from the selected Microhead Array Chip's output-contact pin-number "40" (FIGS. 11, 12, 13, and 14) to the (ADACK) Address Acknowledge input location of the Address Controller (FIGS. 62A, 62B, and 62C), which is located on the Microhead Array Chip Hard Disk Drive's PCB 63 (FIG. 4) 80 (FIG. 5).

Moreover, the logic-low control-signal received at the (-ADACK) input-contact of the Address Controller tells the Address Controller that the address-number "4562" has been successfully latched into the Address Latch And Chip Select Circuit (FIGS. 70, 71A, and 71B), which is located in the selected Microhead Array Chip Number-5. Furthermore, the successfully latched address signal will next be sent from the 32-bit Address Latch And Chip Select Circuit on down to the Microhead Array Chip's 32-bit "Address Decoder Circuit", as illustrated in FIGS. 65A, 65B, 72, and 73. Subsequently, when the Microhead Array Chip's Address Decoder Circuit receives a 32-bit address signal it will reroute it to its internal "address tree decoder" circuit for decoding, as illustrated in FIGS. 65A, 65B, 72, and 73. In addition, the decoding process of the latched address signal by the address tree decoder circuit (FIGS. 72 and 73) will result in the enabling of one microhead selection-line by a logic-high control-signal, for example the selection-line for microhead "4562".

In addition, the "inverter body effect", which is normally associated with and caused by any circuits containing large numbers of CMOS inverters, like the large number of inverters present in an "address tree decoder", a loss of signal strength is bound to occur. Consequently, the address tree decoder's singularly enabled microhead selection-line will need its logic-high control-signal regenerated by the Microhead Array Chip's Address Buffer Circuit, or signal-loss on that line is bound to occur, possibly causing a microhead selection error. Furthermore, when a Microhead Array Chip's Address Decoder Circuit sends the microhead selection-line signals to the Microhead Array Chip's Address Buffer Circuit, as illustrated in FIGS. 65A, 65B, 74, and 75, two very important and simultaneous things will occur:

(i) Signal regeneration of the address tree decoder's only enabled microhead selection-line, by the Microhead Array Chip's Address Buffer Circuit will occur, (ii) The address tree decoder's unsolicited microhead selection output-lines are pulled-down through their Long-L inverters to ground (FIGS. 65A, 65B, 74, and 75); whereby, the pulling of the unsolicited microhead selection-lines to ground will also put them into a (Hi-Z) "High Impedance Line State".

Figure 65B:
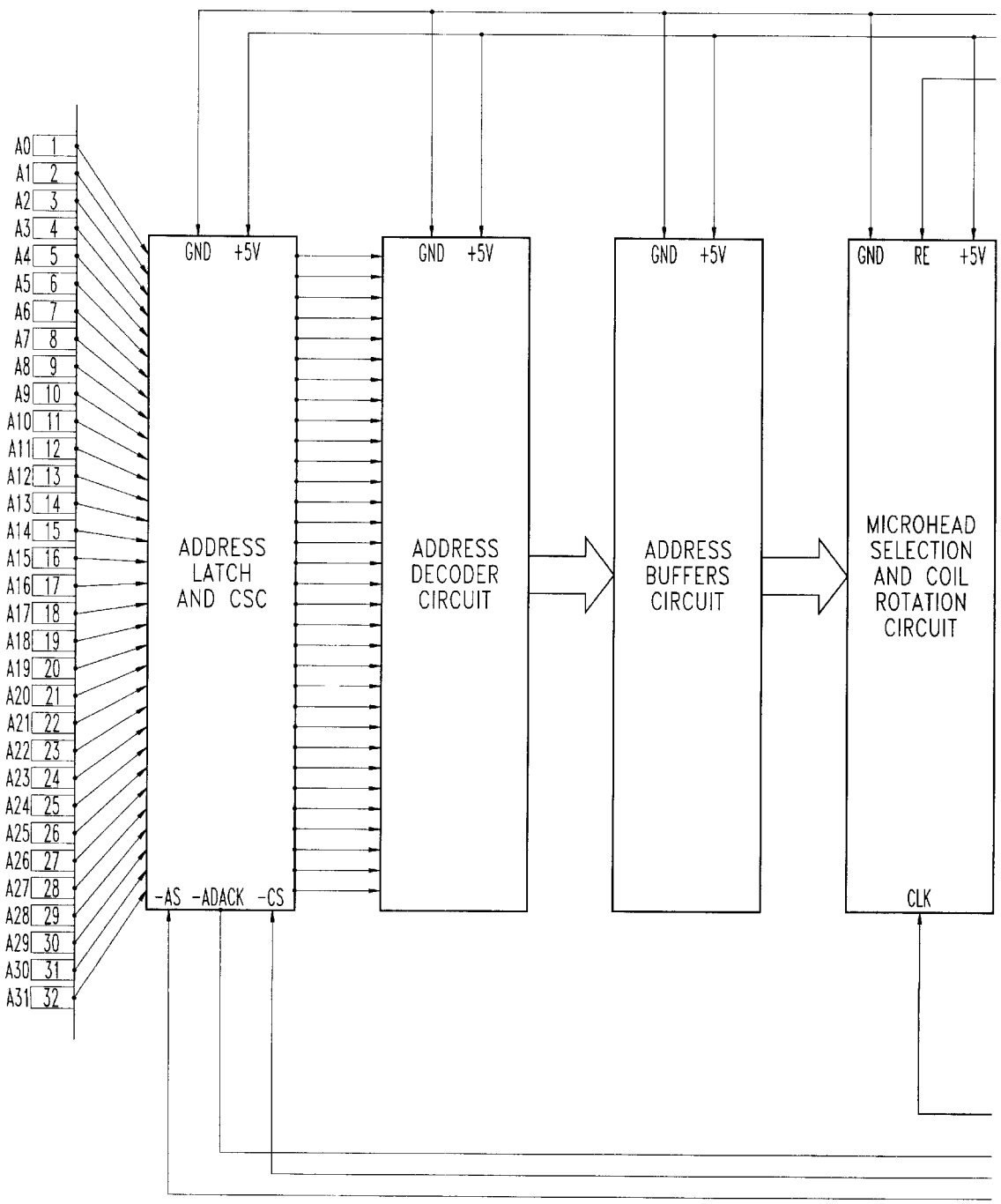
FIG. 65B shows a detailed enlargement block-diagram for the Magnetoresistor Microhead Array Chip, displaying microhead addressing, coil rotation, and chip-select circuits.
Figure 65C:
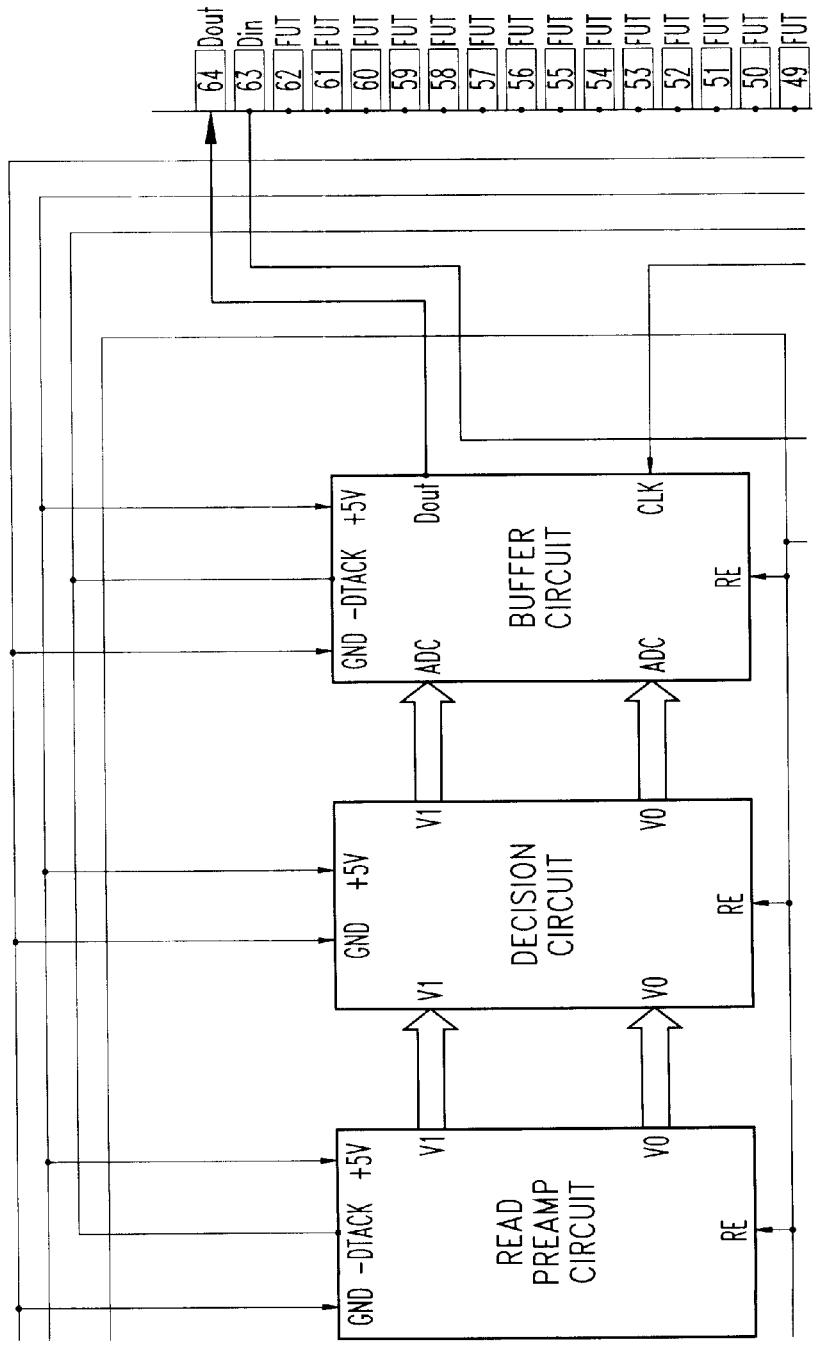
FIG. 65C shows a detailed enlargement block-diagram for the Magnetoresistor Microhead Array Chip, displaying the data Read Channels, and the data-acknowledgment control circuits.
Figure 65E:
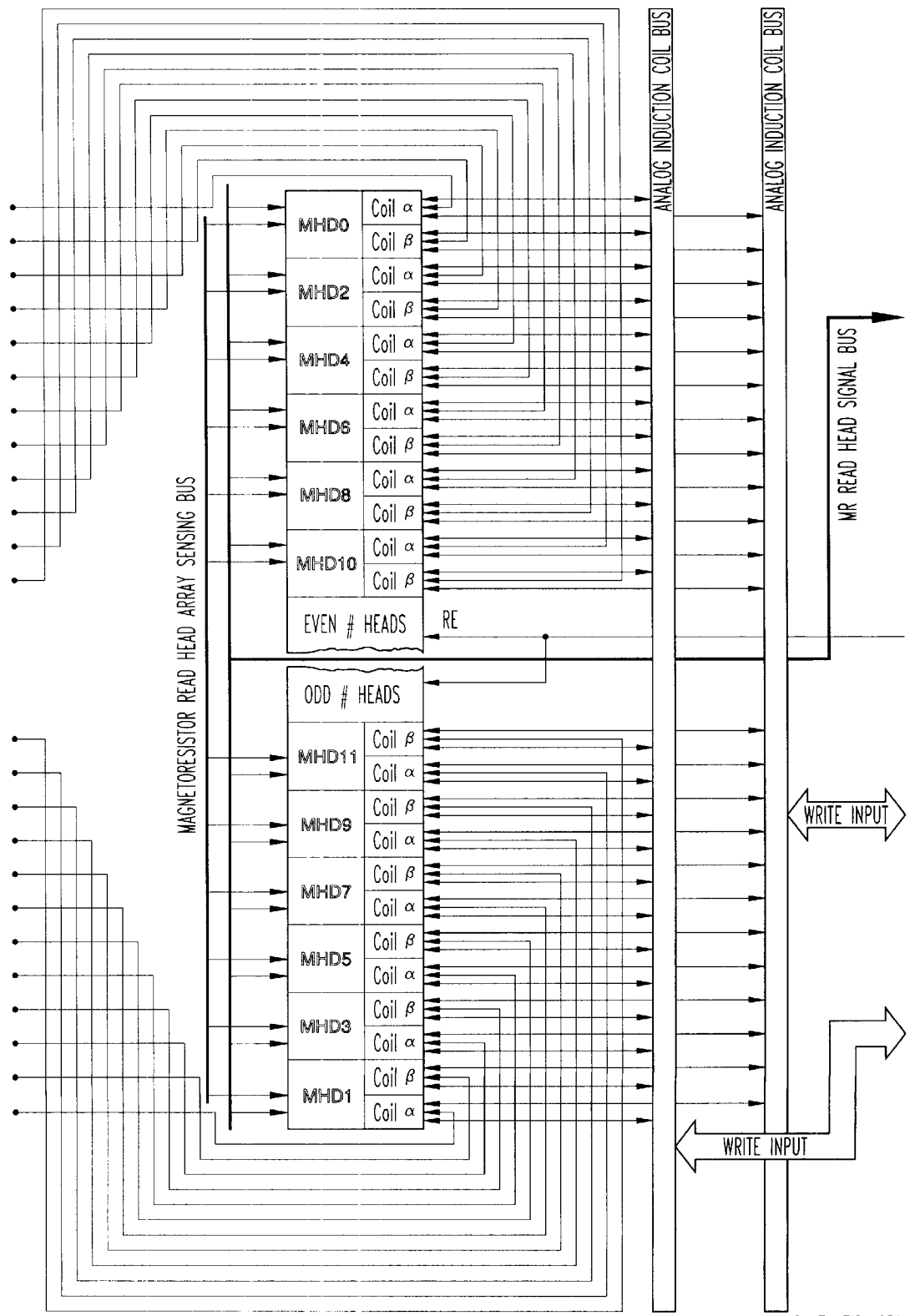
FIG. 65E shows a detailed enlargement block-diagram for the Magnetoresistor Microhead Array Chip, displaying the coil control-lines, and the read or write bus circuits.

Furthermore, every microhead selection line within a Microhead Array Chip has its start in the Address Decoder Circuit and its finish in the Microhead Selection And Coil Rotation Circuit, where each selection line is terminated by two transmission-gates attached to its finish, as illustrated in FIGS. 65A, 65B, 76, and 77. In addition, the previously mentioned two transmission-gates used to terminate every microhead selection line has an auxiliary bus line passing through it. Moreover, the previously mentioned auxiliary bus lines are attached to the Coil Switch And Rotate Toggle Flip-Flop Circuit's two output bus-lines, as illustrated in FIGS. 65A, 65B, 76, and 77. In addition, all of the auxiliary lines that control the selected microhead's Alpha coils are connected to bus-line "01" of the Coil Switch And Rotate Toggle Flip-Flop Circuit, as illustrated in FIGS. 76 and 77. While, all of the auxiliary lines that control the selected microhead's Beta coils are connected to bus-line "02" of the Coil Switch And Rotate Toggle Flip-Flop Circuit, as illustrated in FIGS. 76 and 77. Therefore, when microhead selection line "4562" is enabled its two termination transmission-gates are turned on as well, the only two in the entire Microhead Selection And Coil Rotation Circuit. Moreover, this will redirect the Coil Switch And Rotate Toggle Flip-Flop Circuit's two (FIGS. 76 and 77) output bus-line signals onto the enabled transmission-gates two auxiliary control lines. The redirected bus-line signals are used to control the selected microhead "4563's" Alpha and Beta Induction Channel Coil's (FIGS. 65A, 65B, 84, and 85) access to the Microhead Array Chip's Read And Write Input bus-conduit, which is illustrated in FIGS. 65A and 65B. Moreover, control over the selected microhead's Alpha and Beta Induction Channel Coil's (FIGS. 84 and 85) access to the Microhead Array Chip's Read And Write Input bus-conduit is in reality the same as control over the microhead itself.

Furthermore, the Coil Switch And Rotate Toggle Flip-Flop Circuit's (FIGS. 80 and 81) two output bus-lines, which connect to the Alpha and Beta Induction Channel Coils of selected microhead "4562" will "Switch Toggle" on the selected microhead's Magnetoresistor read element and Switch Toggle off the selected microhead's Induction Channel Coils during read-data disk operations. The Switch Toggling on of the Magnetoresistor read element for selected microhead "4562" will enable the selected microhead to read into cache the host-system's requested data, which will come from cylinder/track "4562", at sector "43", data-surface "5" of disk-platter "3".

In addition, when the (RE) "Read Enable" input location at the Microhead Selection And Coil Rotation Circuit (FIGS. 65A, 65B, 76, 77, 80, and 81) receives a logic-high from the R/W Control Circuit (FIGS. 94, 95, 96, and 97) the selected microhead "4562" becomes enabled for read-data disk operations. Moreover, upon reception of the (RE) Read Enable logic-high control-signal the Coil Switch And Rotate Toggle Flip-Flop Circuit (FIGS. 80 and 81) or Microhead Induction Channel Coil Switch Toggle or Rotate Toggle Circuit will simultaneously output a logic-high control-signal onto its "01" Alpha Coil bus-line and a logic-high signal onto its "02" Beta Coil bus-line. The control-signals from the Coil Switch And Rotate Toggle Flip-Flop Circuit's output bus-lines will simultaneously enable microhead "4562's" Magnetoresistor read elements, while disabling the selected microhead's Induction Channel Coils during host-requested read-data disk operations. Furthermore, when the (RE) "Read Enable" input location at the line driver for the Sensing Bus, as illustrated in FIGS. 65A, 65D, 65E, 80, 81, 84, and 85, receives a logic-high from the R/W Control Circuit, a Sensing Current will be allowed to enter the Sensing Bus during a read-data disk operation. However during a write-data disk operation, when a logic-low is received at the line driver for the Sensing Bus, as illustrated in FIGS. 65A, 65D, 65E, 80, 81, 84, 85, the Sensing Current will not be allowed to enter the Sensing Bus conduit, and therefore a read signal will never be produced on the Magnetoresistor read element's Signal Bus conduit.

Figure 84:
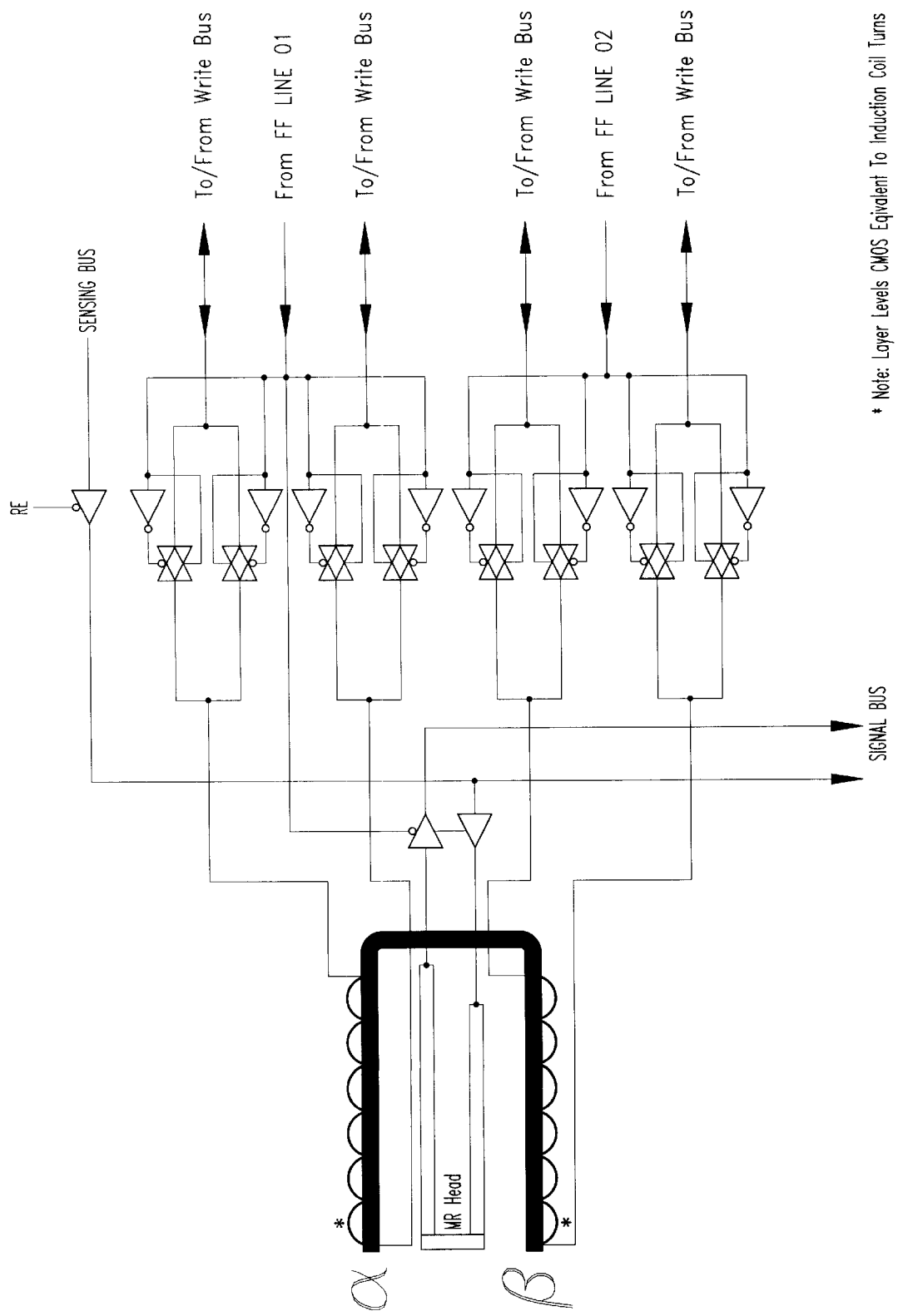
FIG. 84 shows a logic-diagram of the MR Read Head Element and Induction Channel Coil Write Head Element design configuration, displaying transmission-gate coil selection and control lines.
Figure 85:
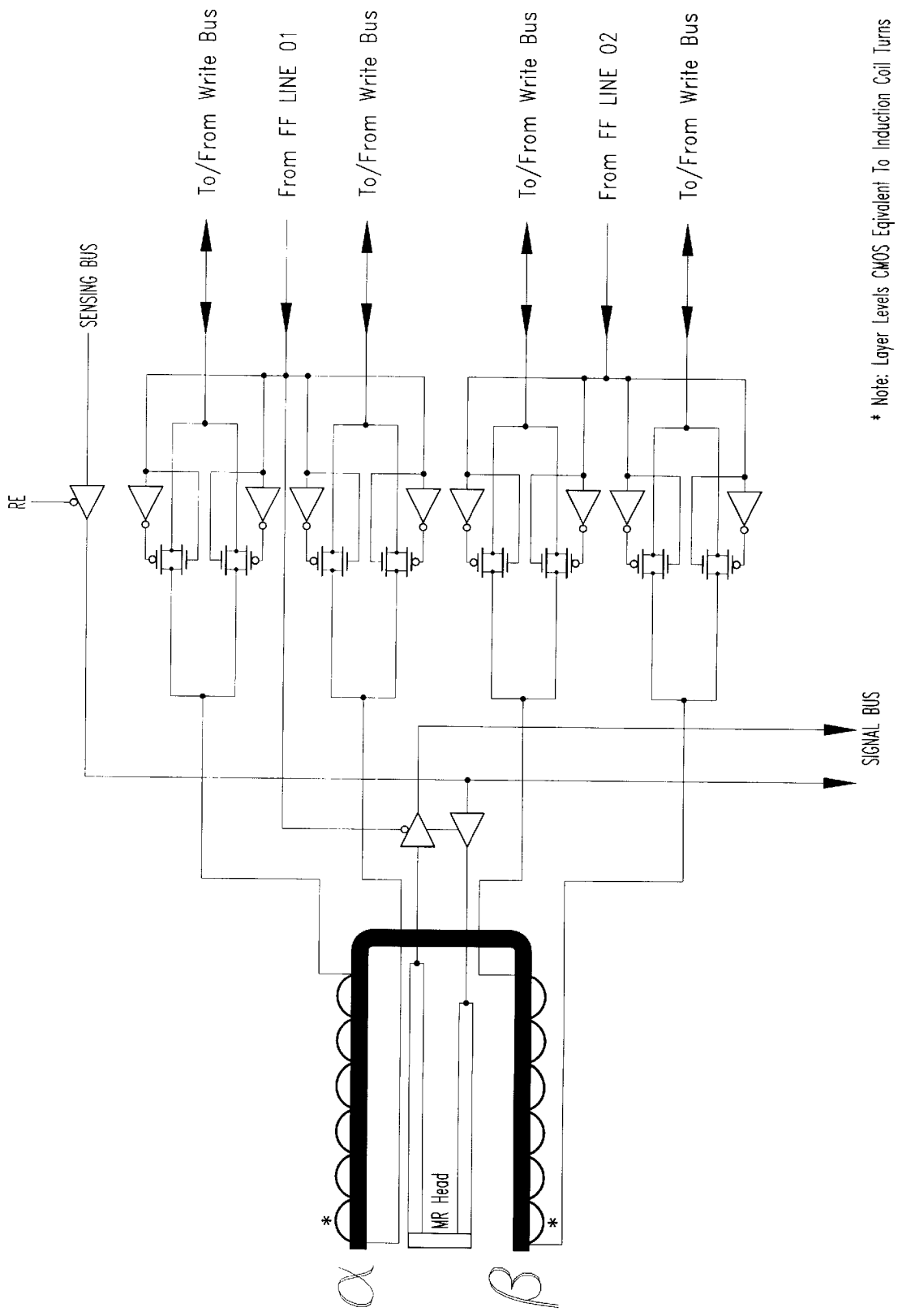
FIG. 85 shows a circuit-diagram of the MR Read Head Element and Induction Channel Coil Write Head Element design configuration for a magnetic Microhead Array Chip design, displaying transmission-gate coil selection and control lines.

Furthermore, usage of a selected microhead's Magnetoresistor read element during a read-data disk operation was the chosen design approach for the Microhead Array Magnetoresistor Read and Induction Channel Coil Write Microhead Array Chip design, because the dedicated-current coil-rotation or Rotate Toggle technique used in solving "reactance-distortion" is only necessary during write-data disk operations. Therefore, for data reading operations a different circuit design was created. Moreover, during a read-data disk operation a selected microhead "4562" will pass a logic-high control-signal, which was placed upon Coil line "01" through the four transmission-gates of the Alpha Coil (FIGS. 84 and 85) of microhead "4562" and connect to a line driver for the enabling or disabling of the Magnetoresistor read element. Furthermore, when this line drive receives a logic-high control-signal from bus-line "01" it will become enabled and allow the passing of the bias Sensing Signal to the input of the selected microhead's Magnetoresistor read element (FIGS. 84 and 85). Moreover, while a logic-low on Coil line "02" will disable the four transmission-gates of the Beta Coil (FIGS. 84 and 85) of microhead "4562" (i.e., four transmission-gates per Induction Channel Coil). Furthermore, during a read-data disk operation a selected microhead's auxiliary line "01" will pass a logic-high control-signal to both Alpha Induction Coil and Magnetoresistor read element Sensing Signal's line driver of the selected microhead, while simultaneously activating both elements. In addition, during a read-data disk operation only the Read Input bus-line and Read Channel circuits are activated and allowed to receive any read-data signals. Therefore, only the Magnetoresistor read element of selected microhead "4562" will have its generated signal sent to the Read Input bus-line, as illustrated in FIGS. 65A, 65B, 65C, 65D, and 65E.

Furthermore, in order for a read-data disk operation to occur the R/W Control Circuit must first enable a Microhead Array Chip's Read Channel. Moreover, the Read Channel's control-bus consists of a (R/-W) "Read and Write" enable control-line connected at input-contact pin-number "35", a (+5V) "VDD" power-line at input-contact pin-number "34", and a (-CS) "Chip Select" selection-line at input-contact pin-number "38", as illustrated in FIGS. 65A, 65C, 94, 95, 96, and 97. Moreover, in order to enable a Microhead Array Chip's Read Channel that is located within a selected Microhead Array Chip, there must be a logic-high power-signal at input-contact pin-number "34" (+5V), a logic-low control-signal at input-contact pin-number "38" (-CS), and a logic-high control-signal at input-contact pin-number "35" (R/-W). Therefore, the previously mentioned three control-lines must have the previously mentioned signal conditions present on their bus-lines in order for the Read Channel located within a selected Microhead Array Chip to become enabled.

For example, to select Microhead Array Chip Number-5 a physical re-direction of the (-CS4) Chip Select bus-line "4" must occur. Therefore, one of the chip-positioning circuit board's copper circuit-traces (FIG. 21) for the Chip Select line must be cross-connected from the input-contact pin-number "53" of the chip-positioning circuit board's Polymer flex-cable spring-contact connector 67 (FIGS. 2, 3, and 10) to the (-CS) Chip Select input-contact pin-number "38" of the Microhead Array Chip and its surface mounting chip-socket 5 (FIGS. 7, 8, 21). Together, with the (-CS4) Chip Select Line-4 for Microhead Array Chip Number-5 is enabled with a logic-low control-signal and the (-AS) Address Strobe bus line is enabled with a logic-low would the Microhead Array Chip Number-5 become enabled. Furthermore, not only would Microhead Array Chip Number-5 be the only chip connected to bus to have its Read Channel activated, but all the other Microhead Array Chips connected to the bus would have their Read Channels three-stated into a (Hi-Z) "High Impedance Line State".

Figure 113:
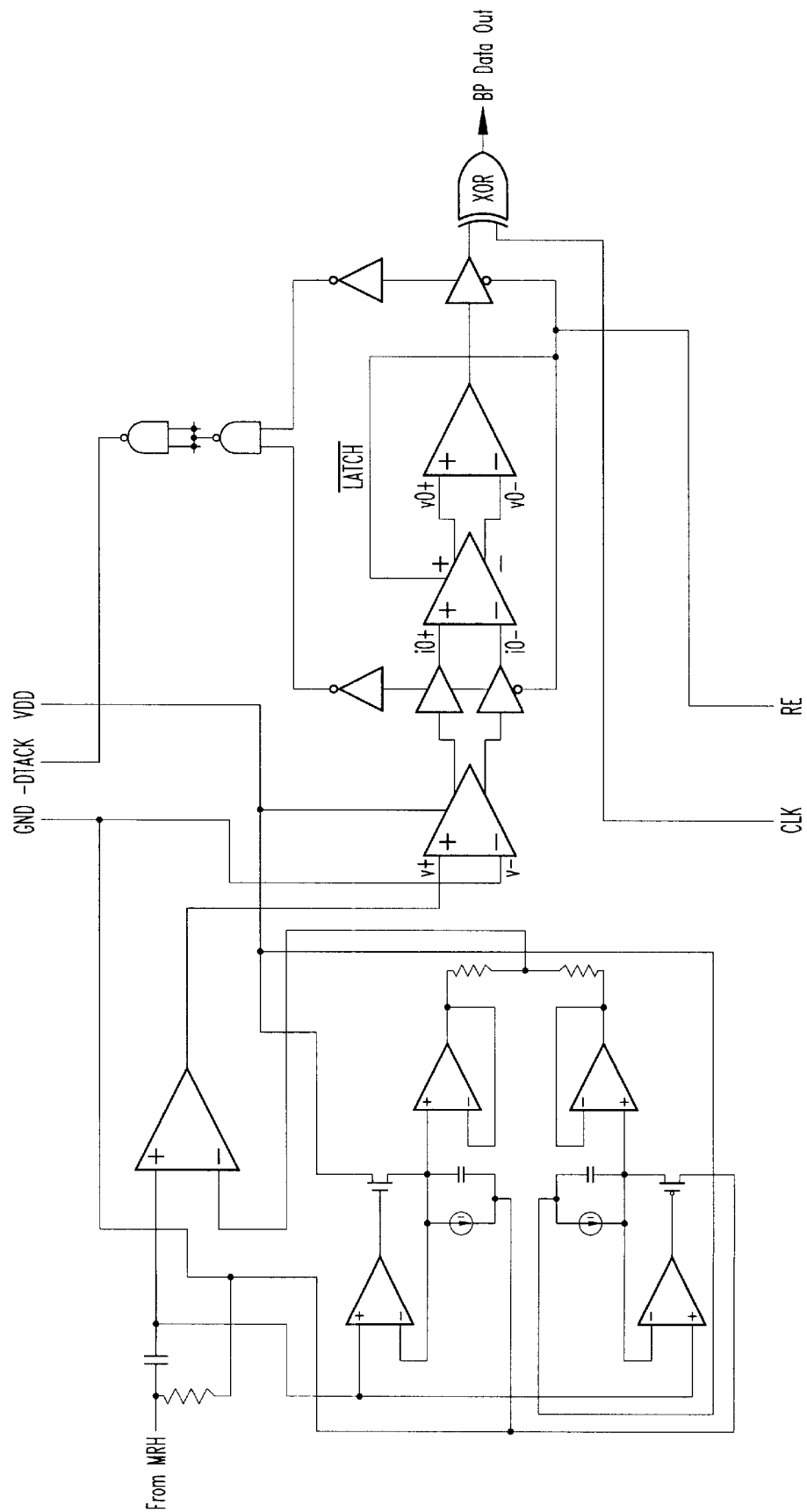
FIG. 113 shows a logic-diagram of the MR Read Head Element and Induction Channel Coil Write Head Element configuration for a magnetic Microhead Array Chip design, displaying the Read Channel's analog signal-decision and comparator-buffer post-amp circuits, while showing the (DTACK) and the XOR bi-phase encoded data dclock-circuits connectivity to the Read Channel.
Figure 114:
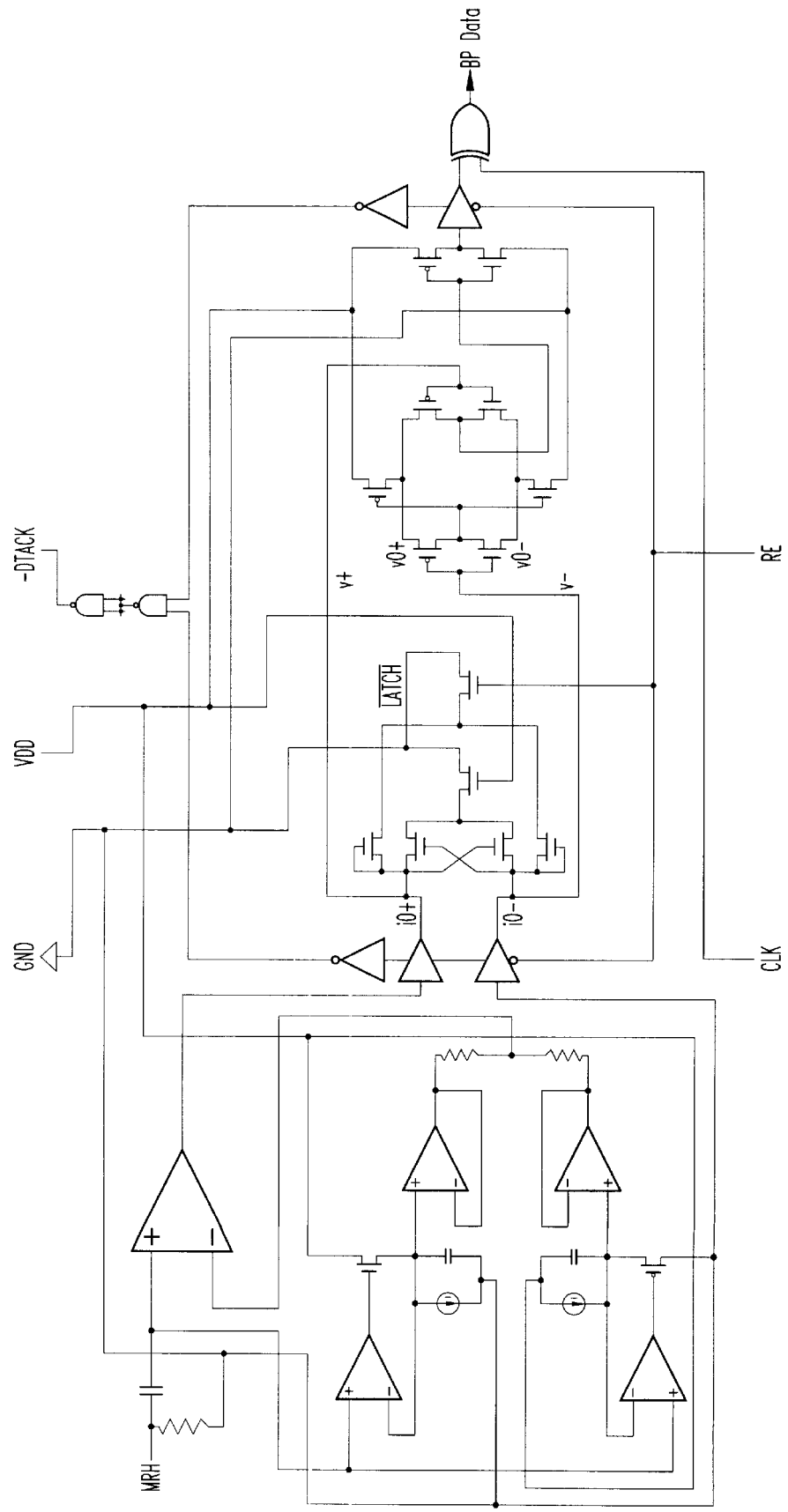
FIG. 114 shows a circuit-diagram of the MR Read Head Element and Induction Channel Coil Write Head Element configuration for a magnetic Microhead Array Chip design, displaying the Read Channel's analog signal-decision and comparator-buffer post-amp circuits, while showing the (DTACK XOR bi-phase encoded data dclock-circuits connectivity to the Read Channel.

Furthermore, when the Read Channel of Microhead Array Chip Number-5 becomes enabled two of its line-drivers will receive a logic-high signal, this will enable the read channel's Peak Detector Digital Decision-circuit (FIG. 65A, 65C, and 113) and High Performance Comparator output line (FIGS. 113 and 114). In addition, the control-signal outputs from two of the Read Channel's line-drivers will connect to the (A) and (B) inputs of a double NAND control-circuit, as illustrated in FIGS. 109, 110, 111, and 112. In addition, if both input-terminals (A) and (B) of the Read Channel's double NAND control-circuit (FIGS. 109, 110, 111, and 112) receives a logic-high control-signal. The double NAND circuit (FIGS. 109, 110, 111, and 112) will output a (-DTACK) Data Acknowledge logic-low control-signal onto the (-DTACK) bus-line leading to the selected Microhead Array Chip's output-contact pin-number "40", as illustrated in FIGS. 113 and 114.

In addition, the (-DTACK) logic-low control-signal will travel out from the selected Microhead Array Chip's output-contact pin-number "40", and through a Polymer flex-cable's (-DTACK) bus-line 30 (FIG. 1) 36 (FIG. 6) till it reaches the (-DTACK) input of the Disk Controller, as illustrated FIGS. 62A, 63A, 62B, 63B, 62C, and 63C. Moreover, the Disk Controller will receive the (DTACK) signal at its (-DTACK) input where it will continue until it reaches the Disk Controller's Sequencer. Moreover, the Sequencer having received the previously mentioned (-DTACK) logic-low control-signal now knows that the selected Microhead Array Chip's Read Channel is open and ready to read and transmit data from sector "43" of cylinder/track "4562" using microhead "4562".

Moreover, the data being read from sector "43" of cylinder/track "4562" is next passed through the selected Microhead Array Chip's Read Channel and XOR phase-detector circuit (FIG. 116), where it is sent to the Sequencer's DPLL circuit for further processing. Moreover, the Read Channel's incoming data-stream, which is now encoded as a Bi-Phase Encoded Data Stream, will have its clock signal recovered and its bi-phase data-stream decoded at the Sequencer's DPLL circuit. In addition, the decoded bi-phase data-stream is re-encoded as normal NRZ data-stream signal for transfer to the Buffer Controller, as illustrated FIGS. 62A, 63A, 62B, 63B, 62C, and 63C.

Figure 115:
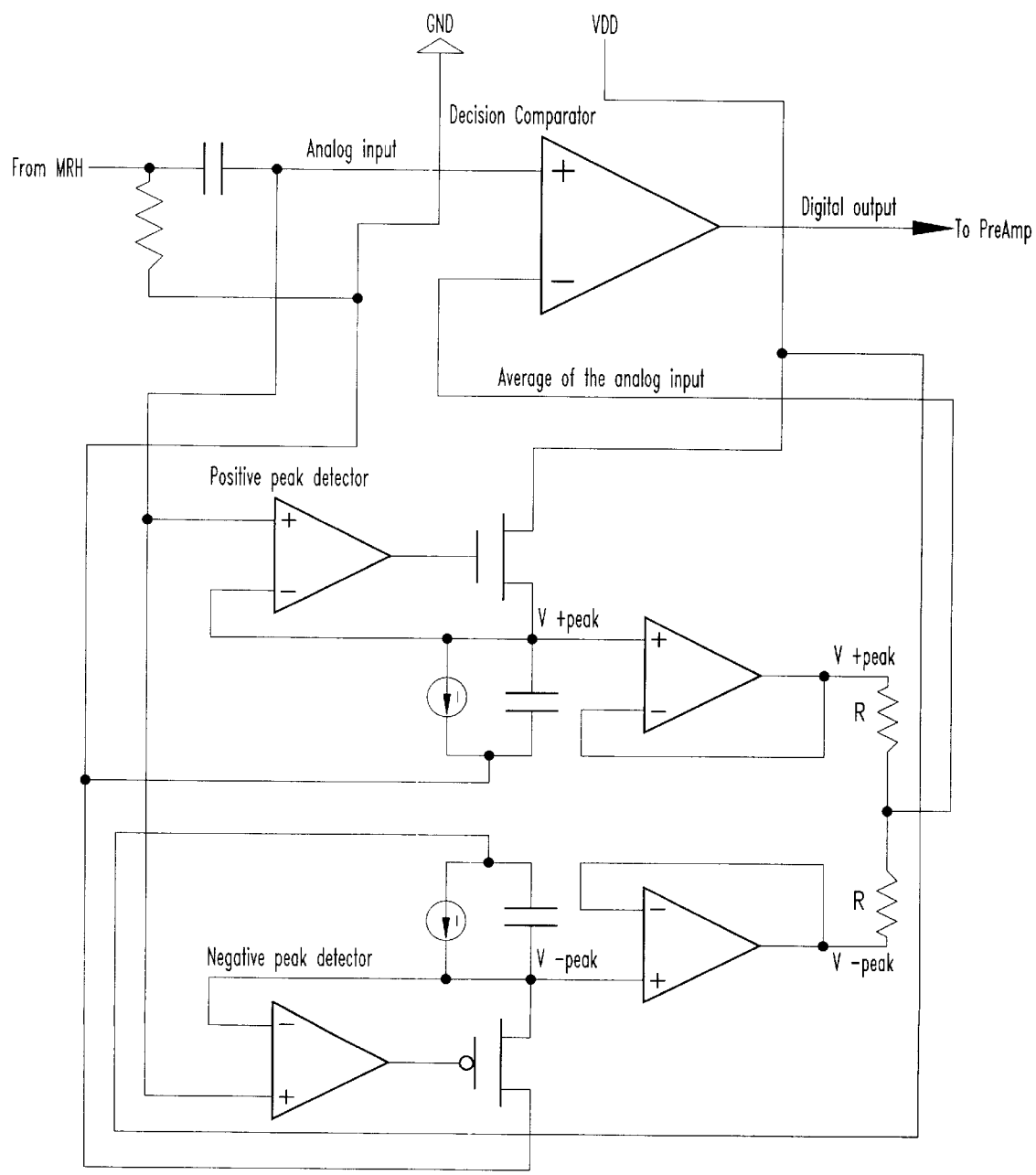
FIG. 115 shows a logic-diagram of the MR Read Head Element and Induction Channel Coil Write Head Element design configuration for a magnetic Microhead Array Chip design, displaying the Read Channel's decision and analog-signal averaging-circuit.

Furthermore, if we look closer at the Read Channel during a read-data disk operation, we will see that individual (MR) Magnetoresistor read elements generate low-amplitude and differential output-voltages, which are later converted into digital read-signals. Moreover, that the Magnetoresistor generated read-signals are passed from the Magnetoresistor's read elements to the Read Input bus-conduit within the selected Microhead Array Chip. In addition, after passing from the Read Input bus-conduit into the Read Channel's Peak Detector Digital Decision circuit (FIGS. 65A, 65C, and 113) the analog read-signal is converted into a digital data-stream of binary "1s" and "0s", as illustrated in FIGS. 113, 114, and 115. Wherein, the previously mentioned Peak Detector Digital Decision circuit consists of two peak-detectors, a decision-circuit, two-buffers, and two-resistors. Moreover, the previously mentioned peak detectors along with their buffers will perform an averaging of the analog input-signal. Consequently, when the previously mentioned input-signal goes to the negative-input of a decision-comparator, while the decision-comparator's positive-input is from the original analog-signal of the Magnetoresistor, these two-signals will be compared and the resulting output will be a digital data-stream signal, as illustrated in FIGS. 113 and 114.

Moreover, the peak detectors that are used in the digital decision-circuit (FIG. 115) will all have current-sources of small values. Moreover, the previously mentioned current-sources are added to the basic decision-circuit to make their peak-detectors "lossy". This is necessary so that the decision-circuit can follow the input-signal's amplitude and variations. In addition, the buffers shown in the circuit also isolate the peak-detectors from one another, while the two resistors perform the averaging-function. Moreover, the average of the analog-input is a response to the inverting-input of the comparator; moreover, this scheme forces the data to be sliced in the middle, eliminating the output-signal's timing-errors. The Peak Detector Digital Decision circuit's digital data-stream output is next sent to the Read Channels High Performance Comparator circuit, as illustrated in FIGS. 86, 87, 88, 89, 90, 91, 92, and 93. Moreover, the preamplifier's output-signal is then compared by the Read Channel's pre-amp comparator circuit (FIGS. 88 and 89), where the Peak Detector Digital Decision circuit's output-signal inputs at the comparators (V positive) input, while the comparators (V negative) input is connected to the Read Channel's ground (Vss), as illustrated in FIGS. 88 and 89. Furthermore, the comparator circuit's decision output is based upon a logic formula that states, if (V positive)>(V negative)=(Logic 1)=(VDD) or +5 Volts, or if (V positive) <(V negative)=(Logic 0)=(VSS) or 0 Volts; that is if the (V negative) input is connected to the Read Channel's ground bus. Moreover, if any input voltage coming in from the AB differential pre-amplifier circuit is above the "0" volt divider threshold, the input-preamplifier comparator will output a logic "1". However, if any input voltage coming in from the AB differential pre-amplifier circuit is less-than or equal-to the "0" volt divider threshold, then the input-preamplifier comparator will output a logic "0".

Furthermore, the circuit proceeding the AB differential pre-amplifier is a Read Channel's High Performance Comparator circuit, which is located within a selected Microhead Array Chip, as illustrated in FIGS. 86, 87, 88, 89, 90, 91, 92, and 93. Moreover, the previously mentioned comparator circuit offers greater accuracy in its "analog-to-digital" read-signal conversions, while providing further amplification of its data-stream signal output. Moreover, the Read Channel's High Performance Comparator circuit consists of three-stages:

(i) An input-preamplifier stage, as illustrated in FIGS. 88 and 89, (ii) A positive-feedback or decision-stage, as illustrated in FIGS. 90 and 91, (iii) An output-buffer stage, as illustrated in FIGS. 92 and 93.

Furthermore, the pre-amp stage amplifies the input-signal to improve the comparators sensitivity (i.e., increases the minimum input signal with which the comparator can make a decision) and also isolates the input of the comparator from switching noise coming from the positive-feedback stage (this stage is very important, because of the low signal-to-noise ratio it provides to the read channel's output signal). In addition, the positive-feedback stage is used to determine which of the input-signals is larger. The output-buffer stage amplifies this information and outputs a digital-signal to the Read Channel's XOR Phase Detector circuit, where the encoding the Read Channel's output data-stream with a frequency-specific Bi-Phase Data Encoding occurs. Furthermore, when this frequency-specific Bi-Phase Data Encoding signal enters the Sequencer's (DPLL) Digital Phased-Locked Loop circuit it is decoded and its clock signal is recovered, below this process is explained further.

Moreover, the Disk Controller's Sequencer can calculate the optimal transfer frequency-rate for any data-zone needing to be read, and communicates that calculation to the Disk Controller's "Clock Synthesizer" module. Furthermore, the Clock Synthesizer then generates a divided-by-two dclock signal based on calculations it received from the Disk Controller's Sequencer. Moreover, the Disk Controller's Clock Synthesizer module will next send this dclock-signal to all of the Microhead Array Chips (CLK) "Clock" input-contacts pin-number "35". Moreover, while being inputted at input-contact pin-number "35" of Microhead Array Chip Number-5 the dclock-signal is also feedback to the Read Channel's DPLL circuit (FIGS. 92 and 93). Moreover, the feedback input entrance of the Read Channel's DPLL circuit (FIGS. 92 and 93) is for the feedback clock-input of the Read Channel's XOR Phase Detector circuit, as illustrated in FIGS. 11, 12, 13, and 14. Moreover, this is also where a Read Channel's buffered output signals enter the DPLL circuit from the Microhead Array Chip (FIGS. 92 and 93). But first the Read Channel's buffered output signals will enter the data-input (FIG. 116) of the Read Channel's XOR Phase Detector circuit for encoding, as illustrated in FIG. 86, 87, 92, 93, 98, 99, 101, and 102.

Moreover, the resulting output signal is a Bi-Phase Encoded Data Stream (FIG. 100), which, after being encoded, is sent to a selected Microhead Array Chip's (Dout) "Data out" output-contact pin-number "63" for export. Contiguously, the Bi-Phase Encoded Data Stream data-signal will travel through the data-bus cable where it is lead to the Disk Controller's Sequencer for further processing, as illustrated in FIGS. 62A, 63A, 62C, and 63C. Furthermore, the Disk Controller's Sequencer, which contains the reception side of the Sequencer's DPLL or "Digital Phased-Locked Loop" circuit. In addition, the DPLL (FIG. 116) circuit of the Disk Controller's Sequencer (FIGS. 62A, 63A, 62C, and 63C) will next recover the clock signal from the Bi-Phase Encoded Data Stream, which it has received from the selected Microhead Array Chip's XOR circuit. Moreover, this recovered clock signal is used to resolve the data transfer-rate of the disk-platter's data-zone being read for data retrieval. After, the clock signal is recovered from the Bi-Phase Encoded Data Stream the Sequencer's DPLL will re-encode the data-stream with a regular type of NRZ encoded signal, which is a signal code the Disk Controller's Buffer Controller can receive and use during a host-requested data-transfer.

Moreover, the Disk Controller's Sequencer can now make on-the-fly data-rate comparisons for on-the-fly transfer-rate adjustments. Subsequently, the Sequencer does this by analyzing the Spindle-Motor's velocity, the DPLL's recovered clock signal's frequency-rate, and the frequency-rate of the original dclock signals that were sent by the Disk Controller's Clock Synthesizer to the clock-input of the Read Channel's XOR Phase Detector circuit (FIG. 116) at the beginning of the host-requested read-data disk operation, as illustrated in FIGS. 62A, 63A, 62C, 63C. Therefore, when the Sequencer makes on-the-fly comparisons of the previously mentioned signals, an on-the-fly transfer frequency-rate correction can be made to the Sequencer's DPLL, and an on-the-fly Spindle-Motor adjustment can be made to the Spindle-Motor. Consequently, this will offer a more responsive and faster Phased-Locked Loop for the data-stream output of a selected Microhead Array Chip Read Channel during host-requested read-data disk operations. In addition, by encoding the Read Channel's output data-stream with Bi-Phase Data Encoding, an exclusive XOR Phase Detector (FIG. 116) makes possible a clock recovery from the post-amplified Read Channel data-stream, and a data conversion from a Bi-Phase Encoded Data Stream to a regular NRZ encoded data-stream. Furthermore, the Bi-Phase Data Encoding of the Read Channel's post-amplified and buffered data-stream output signal will make it possible to Phase-Locked Loop the data-stream with much greater accuracy, while not having to place an odd-parity bit at the end of every eight-bit word, which is suppose to eliminate the possibility of all eight bits becoming high. Therefore, when using Bi-Phase Data Encoding, parity bits are not needed for data to achieve full transfer synchronization.

Moreover, the Disk Controller, as illustrated in FIGS. 62A, 63A, 62B, 63B, 62C, and 63C, when receiving read-data from a selected microhead manages the flow of that read-data between the selected Microhead Array Chip and the Microhead Array Chip Hard Disk Drive's IDE or SCSI Interface Controller. Furthermore, it also controls data-access to the external SDRAM memory buffers for the Disk Controller of a Microhead Array Chip Hard Disk Drive. In addition, the Disk Controller's DPLL transfer-format is a serial (NRZ) "Non-Return to Zero" bit-stream of encoded-data, which is sent to the Buffer Controller for conversion to a 16-bit data-word that the Sequencer module can identify as belonging to a target sector. Consequently, if the Sequencer makes a positive target-sector identification of the read-data the Buffer Controller will present it to the host-system through the Microhead Array Chip Hard Disk Drive's IDE or SCSI Interface in the form of a 16-bit data-word. In addition, after a full sector is read the Disk Controller's ECC module will check to see if the firmware needs to apply ECC correction to the read data. The Buffer Controller section of the Disk Controller stores the previously mentioned data in the cache and next transmits the data to a Microhead Array Chip Hard Disk Drive's IDE Interface Controller module. Subsequently, the IDE or SCSI Interface Controller module will transmit the read data-sector to the host-system through the IDE or SCSI interface system's bus.

In addition, the signal-path for the Write Channel in the Magnetoresistor Read Element and Induction Channel Coil Write Element Microhead Array Chip design almost follows the reverse order of the Read Channel's signal-path. First, the host-system will present a 16-bit data-word to a Microhead Array Chip Hard Disk Drive's unit assembly through the IDE or SCSI system's bus to the Disk Controller's IDE or SCSI Interface Controller. Moreover, the Buffer Controller section of a Microhead Array Chip Hard Disk Drive's Disk Controller stores the data in the Microhead Array Chip Hard Disk Drive's cache. Furthermore, because data can be presented to the drive at a transfer-rate that exceeds the transfer-rate at which the drive can write-data to a disk-platter's data-surface; data is stored temporarily in a Microhead Array Chip Hard Disk Drive's cache. Therefore, the host-system can present data to a Microhead Array Chip Hard Disk Drive at a transfer-rate that is independent of the transfer-rate at which the drive can write-data to a disk-platter's data-surface. Moreover, upon correct identification of the target-address, the data is shifted to the Sequencer where an (ECC) "Error Correcting Code" is generated and appended to the data-packet. In addition, the Sequencer then converts the bytes of data into a NRZ serial bit-stream. Moreover, this bit-stream will be encoded as a Bi-Phase Encoded form of (RLL) "Runtime Length Limited" data (i.e., sometimes called Bi-Phase Mark Encoded Data). Furthermore, this Bi-Phase Mark Encoded Data will be transferred at the calculated and optimal transfer-rate for the Microhead Array Chip Hard Disk Drive's data-zone its being transferred to, as illustrated in FIGS. 62A, 63A, 62B, 63B, 62C, and 63C.

Moreover, the Disk Controller must first select one microhead from a number of Microhead Array Chips using its Address Controller. After a single microhead has been addressed, the Disk Controller will switch the Microhead Array Chip's (R/-W) "Read And Write" bus-line to (WE) "Write Enabled" write-mode, as illustrated in FIGS. 94, 95, 96, and 97, and, moreover at the "precise disk-wedge rotational moment" the Bi-Phase Mark Encoded RLL Data Stream signal is transmitted from the Disk Controller's memory-buffers through the Sequencer (FIGS. 62A, 63A, 62B, 63B, 62C, and 63C) to the selected Microhead Array Chip's (Din) Data-in input-contact pin-number "63", as illustrated in FIGS. 65A, 65B, 65C, 65D, and 65E. Furthermore, when the "Write Driver" receives this Bi-Phase Mark Encoded RLL Data Stream signal, the Write Driver circuit (FIGS. 103, 104, 105, and 106) will use the signal's alternating highs and lows to Rotate Toggle four Write Driver transmission-gates, illustrated in FIGS. 107 and 108. Consequently, the previously mentioned four Write Driver transmission-gates control the directional current flow of a single direct-current (VDD) signal source, as illustrated in FIGS. 107 and 108.

Moreover, the Write Driver alternately switches the current-direction of this direct-current (VDD) signal according to the first "Din" Data-in Bi-Phase Mark Encoded Data Stream signal it receives from the Disk Controller's Sequencer. Furthermore, the alternately switched current-directions of this direct-current (VDD) signal is sent to the Read And Write Input bus-conduit, which is illustrated in FIGS. 65A and 65D. In addition, the Read And Write Input bus-conduit (FIGS. 65A and 64D) passes on the (VDD) signal to the addressed microhead's Rotate Toggled Alpha and Beta Induction Channel Coils through the Read and Write Input bus-conduit. In addition, only an addressed microhead would have its Alpha and Beta Induction Coils connected to the Read And Write Input bus-conduit. Moreover, this will induce magnetic transitions (FIGS. 84 and 85) that represent a Write Channel data-stream's "1s" and "0s", which, in turn, causes the magnetic-domains on a disk-platter's data-surface to respond by rotating in an opposite direction as the magnetic field being produced above the disk-platter's data-surface, as illustrated in FIGS. 65A, 65B, 65C, 65D, and 65E.

However, before any data can be written to a disk-platter the correct microhead must first be selected. The microhead to be selected is located within a Microhead Array, which itself is one of the available eight Microhead Array Chips installed in a Microhead Array Chip Hard Disk Drive's unit assembly. Moreover, the data writing process begins when the Disk Controller has received a write-data request from the host-system for a particular disk-platter's cylinder/track and data-sector location, which contains the host-requested data. For example, a host-system's write-data request might look like this, Write-data using head number "5", at track number "4562", at sector number "43". Moreover, the Address Controller, illustrate in FIGS. 62A, 63A, 62B, 63B, 62C, and 63C, would receive this write-data request from the Disk Controller and place it into its "Interface Register". Moreover, the Disk Controller's Interface Register holds a host-system's write-data request while the Address Controller's "Translator" unit translates the request into terms that the Address Controller can use to activate any required addressing and control-bus signals within a Microhead Array Chip Hard Disk Drive.

Moreover, the Address Controller's Translator unit, illustrated by FIGS. 62A, 63A, 62C, and 63C, would first tell the Address Controller's Address Unit that Microhead Array Chip Number-5, being equivalent to a conventional data-head numbered as Head-5. Wherein, the Address Controller's response would be to enable the (-CS4) Chip Select Line Number-4 (i.e., the chip select lines available are CS0, CS1, CS2, CS3, CS4, CS5, CS6, CS7) with a logic-low control-signal, as illustrated in FIGS. 60A, 61A, 60B, 61B, 60C, and 61C. Moreover, this Chip Select signal prepares the Microhead Array Chip Number-5 to be the only Microhead Array Chip on the address bus able to latch into its Address Latch Circuit (FIGS. 64A, 64B, and 64E) a microhead address number, which is sent down a Microhead Array Chip Hard Disk Drive's thirty-two address-lines, as illustrated in FIGS. 62A, 63A, 62B, 63B, 62C, and 63C. While, at the same time the (-AS) "Address Strobe" control bus signal is sent down its control bus signal line to the input-contact pin-number "37" of every Microhead Array Chip (FIGS. 11 and 12) installed and connected to a Microhead Array Chip Hard Disk Drive's control bus. Furthermore, only the simultaneous transmission of two logic-low control-signals; one for the (-CS4) Chip Select Line Number-5 at input-contact pin-number "38", and one for the (-AS) "Address Strobe" at input-contact pin-number "37" (FIGS. 66, 67, 68, and 69) will the Microhead Array Chip Number-5 be selected for the write-data disk operation. Conclusion, only Microhead Array Chip number "5", which is connected in a daisy-chain bus line-up, is selected to tri-state latch (FIGS. 65A and 65B) the track-address number "4562" into its Address Latch And Chip Select Circuit, as illustrated in FIGS. 70, 71A, and 71B. Furthermore, the 32-bit address-number "4562" will stay latched in a Microhead Array Chip's tri-stated Address Latch And Chip Select Circuit as-long-as the (-CS4) and (-AS) bus-lines continue to have logic-low control-signals present on their lines.

Moreover, the address input of the Microhead Array Chips consists of thirty-two input contact-pins "A0" through "A31", the address bus inputs of a Microhead Array Chip, which are illustrated in FIGS. 11, 12, 13, and 14. Furthermore, after the address number "4562" has been successfully latched the (-ADACK) Address Acknowledge circuit will send a logic-low control-signal down its control bus-line. Moreover, the previously mentioned (-ADACK) control-signal is generated from the simultaneously enabling of the (-CS4) and (-AS) circuits. Moreover, the (-CS4) and (-AS) circuits are located within a selected Microhead Array Chip's Address Latch And Chip Select Circuit, as illustrated in FIGS. 66, 67, 68, 69, 70, 71A, and 71B. In addition, the (-ADACK) control-signal is sent from a selected Microhead Array Chip's output-contact pin-number "40", as illustrated in FIGS. 11, 12, 13, and 14, to the (-ADACK) Address Acknowledge input location of the Address Controller (FIGS. 62A, 62B, and 62C), which is located on a Disk Controller's PCB 63 (FIG. 4) 80 (FIG. 5) of a Microhead Array Chip Hard Disk Drive. Moreover, the logic-low control-signal received at the (-ADACK) input-contact of the Address Controller tells the Address Controller that the address-number "4562" has been successfully latched into the Address Latch And Chip Select Circuit (FIGS. 70, 71A, and 71B), which is located in the selected Microhead Array Chip Number-5. Furthermore, the successfully latched address signal will next be sent from the 32-bit Address Latch And Chip Select Circuit on down to the Microhead Array Chip's 32-bit "Address Decoder Circuit", as illustrated in FIGS. 65A, 65B, 72, and 73. Subsequently, when the Microhead Array Chip's Address Decoder Circuit receives a 32-bit address signal it will reroute it to its internal "address tree decoder" circuit for decoding, as illustrated in FIGS. 65A, 65B, 72, and 73. In addition, the decoding process of the latched address signal by the address tree decoder circuit (FIGS. 72 and 73) will result in the enabling of one microhead selection-line by a logic-high control-signal, for example the selection-line for microhead "4562".

In addition, the "inverter body effect", which is normally associated with and caused by any circuits containing large numbers of CMOS inverters, like the large number of inverters present in an "address tree decoder", a loss of signal strength is bound to occur. Consequently, the address tree decoder's singularly enabled microhead selection-line will need its logic-high control-signal regenerated by the Microhead Array Chip's Address Buffer Circuit, or signal-loss on that line is bound to occur, possibly causing a microhead selection error. Furthermore, when a Microhead Array Chip's Address Decoder Circuit sends the microhead selection-line signals to the Microhead Array Chip's Address Buffer Circuit, as illustrated in FIGS. 65A, 65B, 74, and 75, two very important and simultaneous things will occur:

(i) Signal regeneration of the address tree decoder's only enabled microhead selection-line, by the Microhead Array Chip's Address Buffer Circuit will occur, (ii) The address tree decoder's unsolicited microhead selection output-lines are pulled-down through their Long-L inverters to ground (FIGS. 65A, 65B, 74, and 75); whereby, the pulling of the unsolicited microhead selection-lines to ground will also put them into a (Hi-Z) "High Impedance Line State".

Furthermore, every microhead selection line within a Microhead Array Chip has its start in the Address Decoder Circuit and its finish in the Microhead Selection And Coil Rotation Circuit, where each selection line is terminated by two transmission-gates attached to its finish, as illustrated in FIGS. 65A, 65B, 76, and 77. In addition, the previously mentioned two transmission-gates used to terminate every microhead selection line has an auxiliary bus line passing through it. Moreover, the previously mentioned auxiliary bus lines are attached to the Coil Switch And Rotate Toggle Flip-Flop Circuit's two output bus-lines, as illustrated in FIGS. 65A, 65B, 76, and 77. In addition, all of the auxiliary lines that control the selected microhead's Alpha coils are connected to bus-line "01" of the Coil Switch And Rotate Toggle Flip-Flop Circuit, as illustrated in FIGS. 76 and 77. While, all of the auxiliary lines that control the selected microhead's Beta coils are connected to bus-line "02" of the Coil Switch And Rotate Toggle Flip-Flop Circuit, as illustrated in FIGS. 76 and 77. Moreover, when microhead selection line "4562" is enabled its two termination transmission-gates are turned on as well, the only two in the entire Microhead Selection And Coil Rotation Circuit. Moreover, this will redirect the Coil Switch And Rotate Toggle Flip-Flop Circuit's two (FIGS. 76 and 77) output bus-line signals onto the enabled transmission-gates two auxiliary control lines. The redirected bus-line signals are used to control the selected microhead "4563's" Alpha and Beta Induction Channel Coil's (FIGS. 65A, 65B, 84, and 85) access to the Microhead Array Chip's Read And Write Input bus-conduit, which is illustrated in FIGS. 65A and 65B. Moreover, control over the selected microhead's Alpha and Beta Induction Channel Coil's (FIGS. 84 and 85) access to the Microhead Array Chip's Read And Write Input bus-conduit is in reality the same as control over the microhead itself.

Furthermore, the Coil Switch And Rotate Toggle Flip-Flop Circuit's (FIGS. 80 and 81) two output bus-lines, which connect to the Alpha and Beta Coil of selected microhead "4562", will Rotate Toggle the selected microhead's Alpha and Beta Induction Channel Coils during any write-data disk operation. The Rotate Toggling on-and-off of a selected microhead's Induction Channel Coils will enable the selected microhead to write cached host-system data to cylinder/track "4562", at sector "43", which is located on data-surface "5" of disk-platter "3"; moreover, a disk-platter installed in the Microhead Array Chip Hard Disk Drive's unit assembly, as presented in the art.

Figure 80:
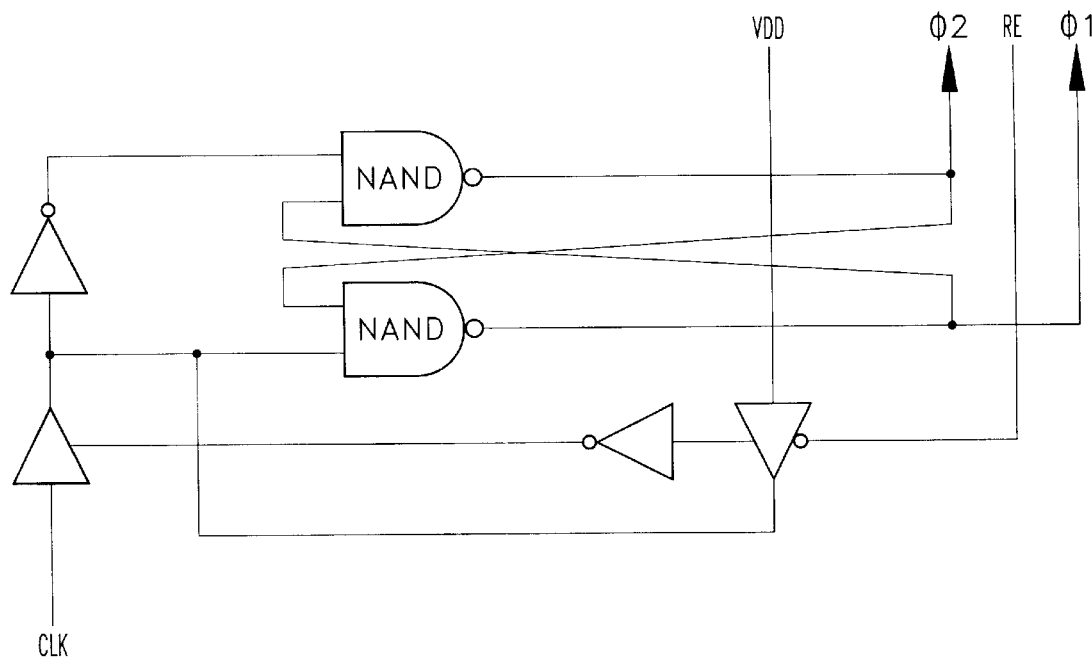
FIG. 80 shows a logic-diagram of the MR Read Head Element and Induction Channel Coil Write Head Element design configuration for a magnetic Microhead Array Chip design, displaying the Microhead Selection And Coil Rotation Control Circuit Flip Flop, coil selection, and rotation control circuits.
Figure 81:
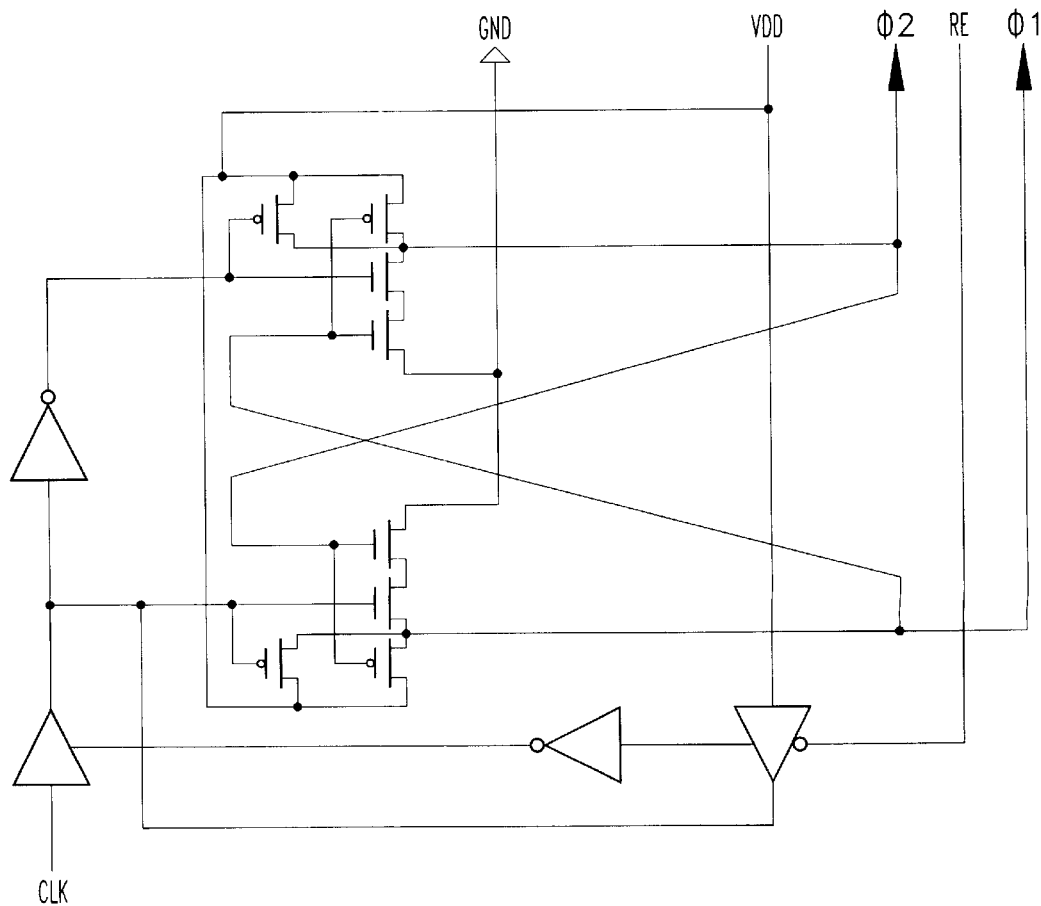
FIG. 81 shows a circuit-diagram of the MR Read Head Element and Induction Channel Coil Write Head Element design configuration for a magnetic Microhead Array Chip design, displaying the Microhead Selection And Coil Rotation Control Circuit Flip Flop, coil selection, and rotation control circuits.

In addition, when the (RE) Read Enable input at the Microhead Selection And Coil Rotation Circuit (FIGS. 65A, 65B, 76, and 77) receives a logic-low control-signal from the R/W Control Circuit, as illustrated in FIGS. 94, 95, 96, and 97, the selected microhead "4562" will become enabled for write-data disk operations. Furthermore, during a write-data disk operation the Coil Switch And Rotate Toggle Flip-Flop Circuit (FIGS. 80 and 81), Coil Switch Toggle Circuit, or Coil Rotate Toggle Circuit will output two alternating control signals onto the circuit's two bus-lines, illustrated in FIGS. 76 and 77. In addition, the previously mentioned bus-lines that transport two signals of alternating highs and lows signals are created from a second (Din) Data-in rerouted Bi-Phase Mark Encoded Data Stream signal. Moreover, the previously mentioned Bi-Phase Mark Encoded Data Stream signal comes from the Disk Controller's Sequencer, where it enters a control bus-line until it reaches input-contact pin-number "63", as illustrated in FIGS. 65A, 65B, 76, and 77, or the (Din) "Data-in" data-input of Microhead Array Chip Number-5, where it takes two different routs. Furthermore, route "1" for this signal leads to a Microhead Array Chip's Write Driver Circuit, while rout "2" leads to the Microhead Array Chip's Coil Switch And Rotate Toggle Flip-Flop Circuit's input, as illustrated in FIGS. 80 and 81.

Moreover, the two Microhead Selection And Coil Rotation Circuit's transmission-gates controlling the Alpha and Beta Coils of microhead "4562" are simultaneously turned on by an enabling logic-high signal, which was received from microhead selection-line "4562". Furthermore, this will allow the passage of the two alternating bus-line control-signals outputted by the Coil Switch And Rotate Toggle Flip-Flop Circuit's output bus, as illustrated in FIGS. 76 and 77. Moreover, the previously mentioned two alternating bus-line control-signals, which are pass through to the four transmission-gates of selected microhead "4562", will Rotate Toggle access of the selected microhead's Alpha and Beta Induction Channel Coils to the Microhead Array Chip's Read And Write Input bus-circuit. During a write-data disk operation the two alternating bus-line control-signals, which come from a Coil Switch And Rotate Toggle Flip-Flop Circuit's outputted bus-lines, will "simultaneously alternate" or "Rotate Toggle" access of the Alpha and Beta Coils (FIGS. 65A, 65E, 84, and 85) of microhead "4562" to the Read And Write Input bus-line. Furthermore, the alternated usage between a selected microhead's Alpha and Beta Induction Channel Coil will occur for each data-bit period, which is derived from a Bi-Phase Mark Encoded Data Stream signal received by a selected Microhead Array Chip's Write Driver circuit, as illustrated in FIGS. 65A, 65E, 107, and 108.

Moreover, the "Data Bit Stream Controlled Induction Channel Coil's Usage Rotation" design approach for write-data disk operations was chosen because it solves the reactance-distortion problem associated with high-turn induction coil write-head data systems. Therefore, lets examine in detail the use of "Switch toggling" or "Rotate Toggling" of a selected microhead's two Induction Channel Coils. Moreover, the selected microhead's two Induction Channel Coils are either simultaneously or alternately used during an inputted Bi-Phase Mark Encoded Data Stream signal's data-bit period, as illustrated in FIGS. 65A, 65E, 84, 85, 103, 107, and 108. While conventional induction coil, write-head designs use a single induction coil and current-reversals to induce the magnetic-reversals of magnetic cell-domains, which are contained and pre-recorded across the disk-platter data-surfaces of a hard disk drive.

Moreover, during all write-data disk operations a selected microhead, for example microhead "4562", will Rotate Toggle or "alternatively" use its Alpha and Beta Induction Channel Coils for each occurring magnetic reversal, when a magnetic reversal is necessary. A selected microhead's Alpha Induction Channel Coil is used exclusively for all inputted logic-highs or "1s", while a selected microhead's Beta Induction Channel Coil is used exclusively for all inputted logic-lows or "0s". Furthermore, when the Coil Switch And Rotate Toggle Flip-Flop Circuit receives a logic-high at its flip-flop circuit's input, it will output a logic-high onto its bus-line "01", which moreover leads to coil-line "01", as illustrated in FIGS. 76 and 77. Moreover, this logic-high control-signal, which is placed on coil-line "01" to enable the four transmission-gates that control a selected microhead's Alpha Induction Channel Coil's "Rotating Toggle" (FIGS. 84 and 85) (i.e., four transmission-gates per Induction Channel Coil), will moreover activate for use the Alpha Induction Channel Coil of microhead "4562". In addition, and at the same time, when the Coil Switch And Rotate Toggle Flip-Flop Circuit receives a logic-high at its flip-flop circuit's input it will output a logic-low onto its bus-line "02", which moreover leads to coil-line "02", as illustrated in FIGS. 76 and 77. Moreover, this logic-low control-signal, which is placed on coil-line "02" to enable the four transmission-gates that control a selected microhead's Beta Induction Channel Coil's "Rotating Toggle" (FIGS. 84 and 85) (i.e., four transmission-gates per Induction Channel Coil), will moreover de-activate for use the Beta Induction Channel Coil of microhead "4562".

Moreover, for a write-data disk operation to occur the R/W Control Circuit must first enable the Write Channel of a selected Microhead Array Chip. Furthermore, the Write Channel's control-bus consists of a (R/-W) "Read And Write" control line connected at input-contact pin-number "35", a (+5V) "VDD" power-line at input-contact pin-number "34", and a (-CS) "Chip Select" selection-line at input-contact pin-number "38"; for all of the installed Microhead Array Chips, as illustrated in FIGS. 65A, 65C, 94, 95, 96, and 97. In addition, to enable a Write Channel within a selected Microhead Array Chip, there must be a power-signal at input-contact pin-number "34" (+5V), a logic-low control-signal at input-contact pin-number "38" (-CS), and a logic-low control-signal at input-contact pin-number "35" (R/-W). Furthermore, these three control-lines must have these signal conditions present on their bus-lines in order for the Write Channel located within a selected Microhead Array Chip to become enabled, as illustrated in FIGS. 65A, 65C, 94, 95, 96, and 97.

For example, to select Microhead Array Chip Number-5 a physical re-direction of the Address Controller's (-CS4) Chip Select Line Number-4 must occur. Therein, the Microhead Array Chip's chip-positioning circuit board's copper circuit-trace (FIG. 21) for Chip Select must be cross-connected from the input-contact pin-number "53" of the chip-positioning circuit board's Polymer flex-cable's spring-contact connector 67 (FIGS. 2, 3, and 10) to the (-CS) Chip Select input-contact pin-number "38" of a chip-positioning circuit board's surface mounting chip-socket 5 (FIGS. 7, 8, and 21). Thereafter, the Microhead Array Chip Number-5 will become the only Microhead Array Chip connected to the Microhead Array Chip Hard Disk Drive's bus system to have its Write Channel activated. While all of the other Microhead Array Chips connected to the bus system of the Microhead Array Chip Hard Disk Drive would have, their Write Channels three-stated into a (Hi-Z) "High Impedance Line State".

Moreover, during a (WE) "Write Enable" (FIGS. 103 and 104) enabling of Microhead Array Chip Number-5's Write Channel, as illustrated in FIGS. 65A and 65D, the Write Channel's two line-drivers will receive logic-high signals, this will enable the Write Channel's "Write Pre-amp Circuit", as illustrated in FIGS. 105 and 106, and the Write Channel's "Write Driver Circuit", as illustrated in FIGS. 107 and 108. Furthermore, two control-signal outputs leading from the two line-drivers of the Write Channel will connect to the (A) and (B) inputs of a double NAND control-circuit, as illustrated in FIGS. 109, 110, 111, and 112. Moreover, if both input-terminals (A) and (B) of the Write Channel's double NAND control-circuit (FIGS. 109, 110, 111, and 112) receives a logic-high control-signal, the double NAND control-circuit of the Write Channel will output a (-DTACK) Data Acknowledge logic-low control-signal onto the (-DTACK) bus-line, which leads to the Microhead Array Chip's output-contact pin-number "40" output, as illustrated in FIGS. 103 and 104.

Moreover, a (-DTACK) Data Acknowledge logic-low control-signal will travel from a Microhead Array Chip's output-contact pin-number "40" through a Polymer flex-cable's (DTACK) bus-lines 30, 36 (FIGS. 1 and 6) until it reaches the (-DTACK) input of the Disk Controller, as illustrated in FIGS. 62A, 63A, 62C, and 63C. The Disk Controller will receive the (DTACK) signal at its (-DTACK) input where it will continue until it reaches the Disk Controller's Sequencer. Furthermore, the Sequencer having received the previously mentioned (-DTACK) logiclow control-signal now knows that the selected Microhead Array Chip's Write Channel is open and ready to write data to sector "43", of cylinder/track "4562", while using microhead "4562". Furthermore, when the (RE) Read Enable input at the Microhead Array Chip's Selection And Coil Rotation Circuit (FIGS. 65A, 65B, 76, and 77) receives a logic-low from the R/W Control Circuit (FIGS. 94, 95, 96, and 97) it becomes enabled for write-data disk operations. Furthermore, during a write-data disk operation a Bi-Phase Mark Encoded Data Stream's signal will enter a Microhead Array Chip's (Din) "Data In" input-contact pin-number "63", where this signal is rerouted to two different circuit areas within a selected Microhead Array Chip. Moreover, the first Bi-Phase Mark Encoded Data Stream signal goes to the Write Channel's "Write Pre-amp Circuit", as illustrated in FIGS. 65A, 65B, 65C, 65D, 65E, 103, 104, 105, and 106, where it is regenerated and amplified. Next, the first Bi-Phase Mark Encoded Data Stream signal is rerouted to the Write Driver Circuit, as illustrated in FIGS. 65A, 65B, 65C, 65D, 65E, 103, 104, 107, 108, where it Rotate Toggles on-and-off the two main transmission-gates within the circuit, as illustrated in FIGS. 107 and 108. Moreover, there are four transmission-gates in the Write Channel's Write Driver Circuit. In addition, the Write Driver Circuit's four transmission-gates control the flow of a direct VDD current, which is lead through the Write-Input bus to the Alpha and Beta Induction Channel Coils of selected microhead "4562". Moreover, this being the only microhead open to the Write-Input bus (FIGS. 65A and 65E), the signal is free to travel from the Write-Input bus through the selected Induction Channel Coil where the data-storing magnetic-reversals will occur (FIGS. 84 and 85) according to data-stream controlled transmission-gate switching.

For example, when the two transmission-gates, which control the Write Driver's Write Input (A) are turned on by a data-stream logic-high bit-input, as illustrated in FIGS. 107 and 108, the two transmission-gates, which control the Write Driver's Write Input (B) are turned off, allowing the Write Driver's direct current VDD signal to flow from the Write Driver's Write Input (A) through to the Alpha Coil of microhead "4562" and then out to the Write Driver's Write Input (B), which is turned off, causing a re-routing of the Write Driver's direct current VDD signal to ground, as illustrated in FIGS. 107 and 108. In addition, when the two transmission-gates, which control the Write Driver's Write Input (B) are turned on by a data-stream logic-low bit-input, as illustrated in FIGS. 107 and 108, the two transmission-gates, which control the Write Driver's Write Input (A) are turned off, allowing the Write Driver's direct current VDD signal to flow from the Write Driver's Write Input (B) through to the Beta Coil of microhead "4562" and then out to the Write Driver's Write Input (A), which is turned off, causing a re-routing of the Write Driver's direct current VDD signal to ground, as illustrated in FIGS. 107 and 108. Furthermore, there are four other transmission-gates in the Write Driver Circuit, which control the Write Driver's VDD direct current's Induction Channel Coil signal re-routed output to ground, as illustrated in FIGS. 103, 104, 107, and 108.

Moreover, During write-data disk operations the second Bi-Phase Mark Encoded Data Stream signal is routed to (FIG. 65A) the Microhead Selection And Coil Rotation Circuit input circuit, as illustrated in FIG. 65A, 65B, 76, 77, 80, and 81. Moreover, when the second Bi-Phase Mark Encoded Data Stream signal enters the input of the Coil Switch And Rotate Toggle Flip-Flop Circuit its data-stream bit reversals are used to create and Rotate Toggle the Coil Switch And Rotate Toggle Flip-Flop Circuit's two output signals, which, after creation are output onto a Coil Switch And Rotate Toggle Flip-Flop Circuit's two bus-lines (FIG. 80 and 81), which is built into every Microhead Selection And Coil Rotation Circuit. Furthermore, when a logic-high bit-input enters the input of the Coil Switch And Rotate Toggle Flip-Flop Circuit, the circuit's flip-flop will generate two control signals, a logic-high control-signal, which is sent to its output bus-line "01" and a logic-low control-signal, which is sent to its output bus-line "02", as illustrated in FIGS. 80 and 81. In addition, when the second Bi-Phase Mark Encoded Data Stream's signal enters a logic-low bit-input into the input of the Coil Switch And Rotate Toggle Flip-Flop Circuit, the circuit's flip-flop will again generate two control signals, a logic-low control-signal, which is sent to its output bus-line "01" and a logic-high control-signal, which is sent to its output bus-line "02", as illustrated in FIGS. 80 and 81. Therefore, the previously mentioned two flip-flop output signals "01" and "02" are really two opposite but concurrent control signals, which are derived from a single Bi-Phase Mark Encoded Data Stream signal; moreover, the same Bi-Phase Mark Encoded Data Stream signal used to control the Rotate Toggling of the Write Driver Circuit's transmission-gates. Moreover, the transmission-gates used to select a current direction for the Write Driver's direct current VDD signal, which is being sent through the Alpha and Beta Induction Channel Coils (FIGS. 80 and 81) of a selected microhead, for example microhead "4562", during a write-data disk operation.

Moreover, each input-bit representing a binary "1" in the Bi-Phase Mark Encoded Data Stream will have logic high-to-low or low-to-high bit-reversal (i.e., sometimes called a data edge) occurring in the middle of its data-bit square-wave's time period. While each input-bit representing a binary "0" in the Bi-Phase Mark Encoded Data Stream will have no bit-reversal (i.e., sometimes called a data edge) occurring in the middle of its data-bit square-wave's time period, but will always happen at the end of the previous data-bit's time period.

For example, if the circuit receives a binary "1" bit, the produced RLL bit is going to change to a logic-low exactly in the middle of its square-wave's time period. Furthermore, the produced RLL bit would create on a disk-platter's data-surface a magnetic cell-domain with a magnetic orientation of either (South/North,North/South) or (North/South, South/North). Subsequently, the square-wave combination, which represents a binary "1" has a data-edge that occurs at the end of the previous square wave's time period, while having another data-edge that occurs in the middle of its own square wave's time period.

Moreover, if the circuit receives a binary "1" bit after a binary "0" bit, then the RLL bit produced is going to change to a logic-high bit exactly at the end of the previous square-wave's time period, and then change to a logic-low bit exactly in the middle of its own time period. Furthermore, the RLL bit produced would create on a disk-platter's data-surface a magnetic cell-domain with a magnetic orientation of (North/South,South/North), a magnetic combination representing a binary "0", with its data edge occurring at the end of the previous square wave's time period and also in the middle of its own square wave's time period. Moreover, if the circuit receives a binary "0" bit after a binary "0" bit, and depending upon the previous binary bit's square wave shape, the RLL bit produced is going to change to either a logic-high bit or logic-low bit and exactly at the end of the previous square-wave's time period. While, the RLL bit produced would create on a disk-platter's data-surface a magnetic cell-domain with a magnetic orientation of either (South/North) or (North/South); moreover, two different magnetic combinations representing a binary "0", with their data edges always occurring at the end of the previous square wave's time period.

Moreover, if the circuit receives a binary "0" bit after a binary "0" bit. Furthermore, and depending upon the previous binary bit's square wave shape, the RLL bit produced is going to change to either a logic-high bit or logic-low bit and exactly at the end of the previous square-wave's time period. Furthermore, the RLL bit produced would create on the hard drive disk-platter's data-surface a magnetic cell domain with a magnetic orientation of either (South/North) or (North/South). In addition, two different magnetic combinations representing a binary "0", with their data edges always occurring at the end of the previous square wave's time period.

Moreover, if the circuit receives a binary "0" bit after a binary "1" bit. Furthermore, the RLL bit produced is going to change to a logic-high bit exactly at the end of the previous square-wave's time period. Moreover, the RLL bit produced would create on the hard drive disk-platter's data-surface a magnetic cell domain with a magnetic orientation of (North/South), a magnetic combination representing a binary "0", with its data edges always occurring at the end of the previous square wave's time period. Furthermore, with the Sequencer encoding the Write Channel's Bi-Phase Mark Encoded Data Stream with a RLL compression code, which is really nothing more than a algorithm used to recombine a NRZ data stream into a new group of data patterns that best utilizes the space on a magnetic data-surface.

This RLL encoding of the Bi-Phase Mark Encoded Data Stream will compress the data stored on the hard drive disk-platter's data-surfaces. Furthermore, the RLL compression of the Bi-Phase Mark Encoded Data Stream will create more end-user storage space, while providing faster hard disk drive throughput. Furthermore, the generation of a strong read signal will come from this double-combination of two magnetic domain-cells to represent binary "1s". In addition, domain-cell combinations are two magnetic domain-cells have the same magnetic pole facing each other on a hard drive disk-platter's data-surface. For example, as in a (South/North,North/South) magnetic domain-cell combination, a strong positive-voltage read-signal would result. In addition, when a (North/South,South/North) magnetic domain-cell combination occurs, a strong negative-voltage read-signal will result. Therefore, these positive and negative voltage-peaks always represent binary "1s". While, a null voltage-peak signal within a data-bit's time-period will always represent binary "0s".

For example, in a (South/North,South/North) or (North/South,North/South) magnetic domain cell combination creating a negative-voltage read-signal, which the Read Channel's High Performance Comparator will translate and create a binary "0" data-bit time-period. Furthermore, during a write-data disk operation the Coil Switch And Rotate Toggle Flip-Flop Circuit's two output bus-line signals, "01" and "02" (FIG. 76 and 77) will control the selected microhead "4562's" Alpha and Beta Induction Channel Coil's Rotate Toggling. Furthermore, Rotate Toggling will occur between the selected microhead "4562's" Alpha Induction Channel Coil, the microhead coil used for all (South/North) magnetic domain-cells, and microhead "4562's" Beta Induction Channel Coil, the microhead coil used for all (North/South) magnetic domain-cells. In addition, during a write-data disk operation these magnetic domain-cell reversals are written to a disk-platter's data-surface within a Microhead Array Chip Hard Disk Drive's unit assembly. Furthermore, the write-data disk operation example as presented in the art, uses the Microhead Array Chip Hard Disk Drive's disk-platter number "3", data-surface number "1" (i.e., or what is in reality data-surface number-5), sector "43", of cylinder/track "4562", which moreover is the host-requested data-location used in the write-data disk operation examples, as presented in the art.

What is claimed is:

1. A magnetic data-storage hard disk drive that stores or retrieves digital information magnetically using stationary microhead array chips instead of conventional flying-heads and rotary voice-coil actuators, comprising:
   a) a hard disk drive enclosure,
   b) a hard disk drive controller,
   c) a spindle-motor,
   d) at least one statically positioned microhead array chip, and
   e) at least one disk-platter coated with a magnetic storage medium and rotated at a substantially constant angular velocity.
   whereby, said magnetic data-storage hard disk drive successfully replaces a non-stationary flying-head technology with a stationary technology, which, during catastrophic disk failure is non-destructive to said digital information previously transcribed onto said disk platter.

2. The magnetic data-storage hard disk drive according to claim 1 further including a chip-positioning circuit board providing means for installing a top-installed bottom data-surface microhead array chip, comprising:
   a) a rigid material core,
   b) several layers of circuit insulation,
   c) sixty-four circuit traces,
   d) a surface mounting chip-socket,
   e) two top-surface flex-cable connectors,
   f) two flex-cables,
   g) two bottom-surface flex-cable connectors,
   h) two bridge system flex-cables, and
   i) a top-installed bottom data-surface microhead array chip.

3. The magnetic data-storage hard disk drive according to claim 1 further including a chip-positioning circuit board providing means for installing a bottom-installed top data-surface microhead array chip, comprising:
   a) a rigid material core,
   b) several layers of circuit insulation,
   c) sixty-four circuit traces.
   d) a surface mounting chip-socket,
   e) two flex-cable connector termination caps,
   f) two flex-cables,
   g) two bottom-surface flex-cable connectors, and
   h) a bottom-installed top data-surface microhead array chip.

4. The magnetic data-storage hard disk drive according to claim 1 further including a chip-positioning circuit board providing means for installing and simultaneously positioning one top-installed bottom data-surface microhead array chip and one bottom-installed top data-surface microhead array chip comprising:
   a) a rigid material core,
   b) several layers of circuit insulation,
   c) one hundred twenty-eight circuit traces,
   d) two surface mounting chip-sockets,
   e) two top-surface flex-cable connectors,
   f) four flex-cables,
   g) two bottom-surface flex-cable connectors,
   h) a top-installed bottom data-surface microhead array chip, and
   i) a bottom-installed top data-surface microhead array chip.

5. The magnetic data-storage hard disk drive according to claim 1 further including a scsi or an ide disk controller providing means for control-system, memory-system, and host-system interfacing electronics that locate and give access to used or unused data-areas of said disk-platter, comprising:
   a) a printed circuit board with circuit traces,
   b) a fifty-pin scsi or a forty-pin ide interface connector,
   c) a serial eprom memory,
   d) a synchronous dynamic random access buffer memory,
   e) a microhead and disk controller with a scsi or an ide interface,
   f) a spindle and power controller,
   g) an asynchronous microhead address controller, and
   h) a synchronous microhead resource controller.

6. A dedicated head-to-track data-storage fixed disk drive that uses a multitude of stationary microheads instead of conventional flying-heads, flying-head rotary voice-coil actuators, or flying-head rotary positioners to store or retrieve data magnetically to or from disk-platter data-surfaces, comprising:
   a) an enclosure providing for the installation of the components used in said fixed disk drive, b) at least one parallel circuit allowing transference of electrical impulses to or from at least one connected plurality of microscopic microhead transducers and at least one integrated circuit comprising a system controlling central processing unit, c) an arrangement of coils and magnets that convert electric current into mechanical power providing for rotation of at least one non-volatile data-storage memory medium, d) at least one rotatable non-volatile data-storage memory medium having at least one data-surface used in the transcription or retrieval of said digital information to or from said disk-platter data-surfaces, and e) a plurality of microhead data-transducers positioned into stationary locations above said disk-platter data-surfaces of said rotatable non-volatile data-storage memory medium, whereby, a stationary microhead positioned above a host requested cylinder-track location is switched on, while a different stationary microhead positioned above a previously requested cylinder-track location is simultaneously switched off, and whereby, average-seek-times of said dedicated head-to-track data-storage fixed disk drive is greatly decreased over said average-seek-times of flying-head magnetic or flying-head optical hard disk drives.

7. The dedicated head-to-track data-storage fixed disk drive according to claim 6 further including a bi-phase data encoding providing means for resolving a data transfer-rate for any particular data-zone needing to be read during a read-data disk operation.

8. The dedicated head-to-track data-storage fixed drive according to claim 6 further including a data-sequencer providing means for calculating the optimal data transfer-rate for said data-zone needing to be read during said read-data disk operation.

9. The dedicated head-to-track data-storage fixed disk drive according to claim 8 wherein said data-sequencer comprises means for communicating previously calculated data transfer-rate calculations to a clock synthesizer, where said clock synthesizer will use said data transfer-rate calculations to generate a frequency specific synthesized clock signal.

10. The dedicated head-to-track data-storage fixed disk drive according to claim 9 wherein said clock synthesizer comprises means for sending said frequency specific synthesized clock signal to a selected microhead array chip positioned over the disk-platter data-surface containing host-requested data said data-sequencer had made said data transfer-rate calculations for at the beginning of said read-data disk operation.

11. The dedicated head-to-track data-storage fixed disk drive according to claim 10 wherein said selected microhead array chip simultaneously receives said frequency specific synthesized clock signal and a post-amplified nrz data-stream signal at a xor circuit, where an average between these two input signals is calculated and used to create a bi-phase encoded data stream signal output, which is sent to a read-data input of said hard disk drive controller, where said signal output is re-routed to said data-sequencer for further signal processing by a dp11 circuit located therein.

12. A microhead array chip hard disk drive that stores data magnetically using stationary microhead array chips instead of conventional flying-heads and rotary positioners, comprising:

a) an enclosure comprising a casting-base, a gasket, and a cover, b) a printed circuit board disk controller, c) a spindle-motor unit assembly, d) at least one stationary positioned microhead array chip comprising a multitude of stationary microheads, and e) at least one ferrite coated disk-platter comprising two data-surfaces having a multiplicity of concentric data-tracks, which are used for data-storage, while being rotated at a substantially constant angular velocity.

whereby, advantages of a plurality of stationary microheads positioned above dedicated cylinder-track locations is clearly seen, and whereby, said average-seek-times occurring within said microhead array chip hard disk drive are so fast they are measured in nanoseconds, a time-scale three orders of magnitude faster than a millisecond time-scale normally used to measure said average-seek-times occurring within flying-head hard disk drives.

13. The microhead array chip hard disk drive according to claim 12 further including said dp11 circuit providing means for recovery of said frequency specific synthesized clock signal from said bi-phase encoded data stream output, where a recovered clock signal is used to resolve said data-transfer rate for said data-zone said data-sequencer had made said data transfer-rate calculations for at the beginning of said read-data disk operation.

14. The microhead array chip hard disk drive according to claim 12 further including said data-sequencer providing means for an on-the-fly frequency-rate comparison between said recovered clock signal and the original frequency specific synthesized clock signal sent to said xor circuit of said selected microhead array chip at the beginning of said read-data disk operation, where said data-sequencer will use said comparison to perform on-the-fly adjustments to said frequency specific synthesized clock signal, which in turn is used to provide data-signal synchronization between said selected microhead array chip and said dp11 circuit, comprising:

a) an active pi loop filter circuit, b) a vco circuit, and c) a divider beta circuit.

15. The microhead array chip hard disk drive according to claim 12 further including a cmos construction method providing means for creating fully integrated top-installed bottom data-surface microhead array chips and fully integrated bottom-installed top data-surface microhead array chips, comprising:

a) a microhead array comprising a multitude of microheads, b) a thirty-two bit address latch and chip select circuit, c) a thirty-two bit address decoder circuit, d) a thirty-two bit address buffer circuit, e) a microhead selection and coil rotation circuit, f) a read and write analog input and output signal bus, g) a read pre-amplifier circuit, h) a read decision circuit, i) a read buffer circuit, j) a write driver circuit, k) a write pre-amplifier circuit, and l) a read and write control circuit.

16. The microhead array chip hard disk drive according to claim 15 wherein a photo-resistant oxide masking, etching, and lithography comprises means for creating the microheads and the circuitry comprising components used within said top-installed bottom-surface microhead array chips and said bottom-installed top-surface microhead array chips 17. The microhead array chip hard disk drive according to claim 16 wherein said photo-resistant oxide masking, etching, and lithography comprises means for etching out induction channel coil areas and magnetoresistor areas, where said induction channel coil areas and said magnetoresistor areas, after etching, are filled-in with electron conducting material and, heretofore comprise:

a) top contact conduit-leads, b) bottom contact conduit-leads, c) induction channel coils having as-few-as two coil-channel winding turns or said induction channel coils having as-many-as two hundred coil-channel winding turns, and d) magnetoresistor read elements.

18. The microhead array chip hard disk drive according to claim 15 further including an induction channel coil for every magnetic pole of every microhead yoke core of every said microhead within every said microhead array.

19. The microhead array chip hard disk drive according to claim 18 further including a first induction channel coil, called the alpha induction channel coil, providing means for dedicated creation of binary one data-bits, while a second induction channel coil, called the beta induction channel coil, providing means for dedicated creation of binary zero data-bits.

20. The microhead array chip hard disk drive according to claim 19 further including a coil switching and rotation method providing means for selective switching between said alpha induction channel coil and said beta induction channel coil within said selected microhead array chip, where said coil switching and rotation method is controlled and executed by a write driver circuit, and a coil switch and rotate toggling flip-flop circuit located within a microhead selection and coil rotation circuit.

* * * * *